(12) United States Patent
Ludvik et al.

(10) Patent No.: US 10,173,900 B2
(45) Date of Patent: Jan. 8, 2019

(54) PREPARATION OF POLYMERIC RESINS AND CARBON MATERIALS

(71) Applicants: Georgia-Pacific Chemicals LLC, Atlanta, GA (US); EnerG2 Technologies, Inc., Seattle, WA (US)

(72) Inventors: Joseph F. Ludvik, Midlothian, VA (US); Xing Dong, Decatur, GA (US); Shahid P. Qureshi, Duluth, GA (US); John B. Hines, Atlanta, GA (US); Gerald Knazek, Alpharetta, GA (US); Renette E. Richard, Atlanta, GA (US); Katharine Geramita, Seattle, WA (US); Benjamin E. Kron, Seattle, WA (US); Henry R. Costantino, Woodinville, WA (US); Aaron M. Feaver, Seattle, WA (US); Avery Sakshaug, Lynnwood, WA (US); Leah A. Thompkins, Seattle, WA (US); Alan Tzu-Yang Chang, Renton, WA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 39 days.

(21) Appl. No.: 13/763,460

(22) Filed: Feb. 8, 2013

(65) Prior Publication Data
US 2013/0209348 A1   Aug. 15, 2013

Related U.S. Application Data

(60) Provisional application No. 61/729,967, filed on Nov. 26, 2012, provisional application No. 61/597,127, (Continued)

(51) Int. Cl.
*C08G 8/32* (2006.01)
*C01B 32/336* (2017.01)
(Continued)

(52) U.S. Cl.
CPC .......... *C01B 32/336* (2017.08); *H01G 11/24* (2013.01); *H01G 11/34* (2013.01); *H01G 11/42* (2013.01);
(Continued)

(58) Field of Classification Search
CPC .... C01B 32/336; H01M 4/133; C08J 2361/06
See application file for complete search history.

(56) References Cited

U.S. PATENT DOCUMENTS

| | | |
|---|---|---|
| 3,895,826 A | 7/1975 | Gunning et al. |
| 4,006,081 A | 2/1977 | Nakamura et al. |

(Continued)

FOREIGN PATENT DOCUMENTS

| | | |
|---|---|---|
| EP | 2117068 A1 | 11/2009 |
| JP | 2004315283 | 11/2004 |

(Continued)

OTHER PUBLICATIONS

"Mineral Oil (High Viscosity)" Data sheet. No Author, No date. Obtained online on Feb. 9, 2015 from http://www.fao.org/ag.agn/jecfa-additives/specs/Monograph1/Additive-282.pdf.*
(Continued)

*Primary Examiner* — Michael A Salvitti
(74) *Attorney, Agent, or Firm* — Edmonds & Cmaidalka, P.C.; Jared E. Cmaidalka; Ram W. Sabnis

(57) ABSTRACT

The present application is directed to methods for preparation of polymer particles in gel form and carbon materials made therefrom. The carbon materials can have enhanced electrochemical properties and find utility in any number of electrical devices, for example, as electrode material in ultracapacitors or batteries.

35 Claims, 42 Drawing Sheets

Related U.S. Application Data filed on Feb. 9, 2012, provisional application No. 61/597,121, filed on Feb. 9, 2012, provisional application No. 61/597,118, filed on Feb. 9, 2012.

(51) Int. Cl.

| | | |
|---|---|---|
| *H01M 4/133* | (2010.01) | |
| *H01M 4/1393* | (2010.01) | |
| *H01M 4/587* | (2010.01) | |
| *H01M 4/62* | (2006.01) | |
| *H01G 11/24* | (2013.01) | |
| *H01G 11/34* | (2013.01) | |
| *H01G 11/42* | (2013.01) | |
| *H01M 10/0525* | (2010.01) | |

(52) U.S. Cl.
CPC ......... *H01M 4/133* (2013.01); *H01M 4/1393* (2013.01); *H01M 4/587* (2013.01); *H01M 4/625* (2013.01); *H01M 10/0525* (2013.01); *Y02E 60/13* (2013.01)

(56) References Cited

U.S. PATENT DOCUMENTS

| | | | |
|---|---|---|---|
| 4,206,095 | A | 6/1980 | Wynstra et al. |
| 5,583,162 | A | 12/1996 | Li et al. |
| 5,670,571 | A * | 9/1997 | Gabrielson et al. .......... 524/604 |
| 5,858,055 | A * | 1/1999 | Jahnke et al. ................ 71/27 |
| 5,908,896 | A | 6/1999 | Mayer et al. |
| 8,158,556 | B2 | 4/2012 | Feaver et al. |
| 8,404,384 | B2 | 3/2013 | Feaver et al. |
| 9,133,295 | B2 * | 9/2015 | Qureshi ............... C08G 8/22 |
| 2003/0013804 | A1 * | 1/2003 | Phillips et al. ............... 524/594 |
| 2004/0182711 | A1 | 9/2004 | Liang et al. |
| 2004/0201567 | A1 | 10/2004 | Yu et al. |
| 2006/0078682 | A1 | 4/2006 | McDaniel et al. |
| 2007/0167534 | A1 | 7/2007 | Coronado et al. |
| 2008/0277115 | A1 | 11/2008 | Rediger et al. |
| 2008/0293911 | A1 * | 11/2008 | Qureshi et al. ............... 528/144 |
| 2009/0301972 | A1 * | 12/2009 | Hines et al. .................. 210/705 |
| 2010/0092370 | A1 * | 4/2010 | Zhang ..................... C01B 31/02 423/448 |
| 2010/0092778 | A1 | 4/2010 | Watanabe et al. |
| 2010/0256298 | A1 | 10/2010 | Wu et al. |
| 2010/0331179 | A1 | 12/2010 | Feaver et al. |
| 2011/0002086 | A1 * | 1/2011 | Feaver et al. ................. 361/502 |
| 2011/0028599 | A1 * | 2/2011 | Costantino et al. .......... 523/309 |
| 2011/0159375 | A1 * | 6/2011 | Feaver et al. ................. 429/302 |
| 2011/0199716 | A1 | 8/2011 | Feaver et al. |
| 2011/0223494 | A1 | 9/2011 | Feaver et al. |
| 2012/0081838 | A1 | 4/2012 | Costantino et al. |
| 2012/0202033 | A1 | 8/2012 | Chang et al. |
| 2013/0209348 | A1 * | 8/2013 | Ludvik et al. ................ 423/460 |
| 2013/0211005 | A1 * | 8/2013 | Ludvik et al. ................ 524/876 |
| 2013/0280601 | A1 * | 10/2013 | Geramita et al. ............. 429/204 |
| 2014/0148560 | A1 * | 5/2014 | Qureshi et al. ............... 525/472 |
| 2014/0272592 | A1 * | 9/2014 | Thompkins et al. ...... 429/231.8 |

FOREIGN PATENT DOCUMENTS

| | | |
|---|---|---|
| JP | 2005105090 | 4/2005 |
| JP | 2008169269 | 7/2008 |
| JP | 2010070738 | 4/2010 |
| JP | 2011084703 | 4/2011 |
| KR | 10-2011-0130628 A | 12/2011 |
| WO | 1995/001165 | 1/1995 |

OTHER PUBLICATIONS

Span 80 product data sheet. No author, No date. Obtained online on Feb. 9, 2015 from http://www.sigmaaldrich.com/catalog/product/fluka/85548?lang=en&region=US.*

Q&A Boiling oil and water. Obtained from https://van.physics.illinois.edu/qa/listing.php?id=1428 on Aug. 20, 2015. No author, dated Jan. 7, 2014.*

Lee et al. Materials Letters 37 1998 197-200.*

Horikawa et al. Carbon 42 (2004) 169-175.*

Yamamoto et al. Carbon 40 (2002) 1345-1351.*

Accu Dyne Test viscosity table. No Author, No Date. Obtained from https://www.accudynetest.com/visc_table.html on Aug. 30, 2016.*

Shaheen A., Al-Muhtaseb, et al; "Preparation and Properties of Resourcinol Formaldehyde Organic and Carbon Gels", Advanced Materials, Jan. 16, 2003, vol. 15, No. 2, pp. 101-114.

Lee, Hae-Joon, et al,; "Synthesis of Resorcinol/Formaldehyde Gel Particles by the Sol-Emulsion Gel Technique", Materials Letters, Apr. 16, 1998, vol. 37, No. 4/5, pp. 197-200.

Hwang, Sung-Woo, et al.; "Capacitance control of Carbon Aerogel Electrode", Journal of Non-Crystalline Solids, Oct. 22, 2004, vol. 347, Issues 1-3, pp. 238-245.

International Search Report and Written Opinion of the International Searching Authority for PCT/US2013/025421 dated Jun. 2, 2013.

Dingcai, Wu et al., "Fabrication and Non-Structure Control of Carbon Aerogels via a Microemulsion-Templated Sol-Gel Polymerization Method", accepted Sep. 22, 2005; Available online Nov. 8, 2005 (www.sciencedirect.com); Carbon 44 (2006) 675-681.

T. Yamamoto et al., "Preparation and Characterization of Carbon Cryogel Microspheres", Department of Chemical Engineering, Kyoto University, Kyoto 606-8501, Japan accepted Nov. 6, 2001; Carbon 40 (2002) 1345-1351.

Takahiro Hasegawa, et al., "Preparation of Carbon Gel Microspheres Containing Silicon Powder for Lithium Ion Battery Anodes", Department of Chemical Engineering, Graduate School of Engineering, Kyoto University, Katsura, Kyoto 615-8510, Japan, accepted May 25, 2004, Available online Jul. 20, 2004; Carbon 42 (2004) 2573-2579.

T. Yamamoto et al., "Porous Properties of Carbon Gel Microspheres as Adsorbents for Gas Separation", accepted Feb. 18, 2004; Available online Mar. 24, 2004; (www.sciencedirect.com); Carbon 42 (2004) 1671-1676.

Esther Calvo G. et al., "Designing Nanostructured Carbon Xerogels", (www.intechopen.com) Chapter 9, Dec. 22, 2011; pp. 192-193.

N. Tonanon et al., "Influence of Surfactants on Porous Properties of Carbon Cryogels Prepared by Sol-Gel Polycondensation of Resorcinol and Formaldehyde" Department of Chemical Engineering, Faculty of Engineering, Chulalongkorn University, Bangkok 10330, Thailand, accepted Aug. 29, 2003; Carbon 41 (2003) 2981-2990.

Yang Limin et al., "Liquid-liquid turbulent dispersion in agitator tank (I)—Factors affecting dispersion characteristics", Journal of Chemical Engineering, No. 6, pp. 18-25, Dec. 27, 1986.

* cited by examiner

Example 25

Example 26

PREPARATION OF POLYMERIC RESINS AND CARBON MATERIALS

CROSS-REFERENCE TO RELATED APPLICATIONS

This application claims priority to U.S. Provisional Patent Application having Ser. No. 61/597,118, filed on Feb. 9, 2012, U.S. Provisional Patent Application having Ser. No. 61/597,121, filed on Feb. 9, 2012, U.S. Provisional Patent Application having Ser. No. 61/597,127, filed on Feb. 9, 2012, and U.S. Provisional Patent Application having Ser. No. 61/729,967, filed on Nov. 26, 2012, all of which are incorporated by reference herein.

BACKGROUND

Technical Field

The present invention generally relates to novel methods for preparing polymeric resin materials and preparation of carbon materials from the same.

Description of the Related Art

Activated carbon is commonly employed in electrical storage and distribution devices. The surface area, conductivity and porosity of activated carbon allows for the design of electrical devices having desirable electrochemical performance. Electric double-layer capacitors (EDLCs or "ultracapacitors") are an example of such devices. EDLCs often have electrodes prepared from an activated carbon material and a suitable electrolyte, and have an extremely high energy density compared to more common capacitors. Typical uses for EDLCs include energy storage and distribution in devices requiring short bursts of power for data transmissions, or peak-power functions such as wireless modems, mobile phones, digital cameras and other hand-held electronic devices. EDLCs are also commonly used in electric vehicles such as electric cars, trains, buses and the like.

Batteries are another common energy storage and distribution device which often contain an activated carbon material (e.g., as anode material, current collector, or conductivity enhancer). For example, lithium/carbon batteries having a carbonaceous anode intercalated with lithium represent a promising energy storage device. Other types of carbon-containing batteries include lithium air batteries, which use porous carbon as the current collector for the air electrode, and lead acid batteries which often include carbon additives in either the anode or cathode. Batteries are employed in any number of electronic devices requiring low current density electrical power (as compared to an EDLC's high current density).

One known limitation of EDLCs and carbon-based batteries is decreased performance at high-temperature, high voltage operation, repeated charge/discharge cycles and/or upon aging. This decreased performance has been attributed, at least in part, to electrolyte impurity or impurities in the carbon electrode itself, causing breakdown of the electrode at the electrolyte/electrode interface. Thus, it has been suggested that EDLCs and/or batteries comprising electrodes prepared from higher purity carbon materials could be operated at higher voltages and for longer periods of time at higher temperatures than existing devices.

In addition to purity, another known limitation of carbon-containing electrical devices is the pore structure of the activated carbon itself. While activated carbon materials typically comprise high porosity, the pore size distribution is not optimized for use in electrical energy storage and distribution devices. Such optimization may include a blend of both micropores and mesopores. Additionally in some applications a high surface area carbon may be desirable, while in others a low surface are material is preferred. Idealized pore size distributions can maximize performance attributes including but not limited to, increased ion mobility (i.e., lower resistance), increased power density, improved volumetric capacitance, increased cycle life efficiency of devices prepared from the optimized carbon materials.

One common method for producing carbon materials is to pyrolyze an existing carbon-containing material (e.g., coconut fibers or tire rubber). This results in a char with relatively low surface area which can subsequently be over-activated to produce a material with the surface area and porosity necessary for the desired application. Such an approach is inherently limited by the existing structure of the precursor material, and typically results in a carbon material having an unoptimized pore structure and an ash content (e.g., metal impurities) of 1% or higher.

Activated carbon materials can also be prepared by chemical activation. For example, treatment of a carbon-containing material with an acid, base or salt (e.g., phosphoric acid, potassium hydroxide, sodium hydroxide, zinc chloride, etc.) followed by heating results in an activated carbon material. However, such chemical activation results in relatively high levels of undesired non-carbon elements (even after washing procedures), that in turn impair the carbon performance in electrical devices.

Another approach for producing high surface area activated carbon materials is to prepare a synthetic polymer from carbon-containing organic building blocks (e.g., a polymer gel). As with the existing organic materials, the synthetically prepared polymers are pyrolyzed and activated to produce an activated carbon material. In contrast to the traditional approach described above, the intrinsic porosity of the synthetically prepared polymer results in higher process yields because less material is lost during the activation step. Methods for producing activated carbon from synthetic polymer, for example production of carbon aerogels, xerogels, and cryogels on the laboratory scale are known in the art.

Although such methods may be applicable in laboratory or small-scale settings, preparation of large quantities of carbon materials via synthetic polymers may be limited at large scales. The monolithic nature of polymer gels are difficult and expensive to produce and convert into the end product, i.e., aerogel, xerogel, or cryogel. Due to the monolith's large size and low thermal conductivity a significant amount of energy, time, and specialized equipment is required in order to polymerize the monomer component that makes up the monolith structure. Additionally, due to the uneven heating of the monolithic polymer gel as heat is transferred from the outside to the inside thereof, heterogeneous physical differences in the monolithic polymer are formed which can negatively impact the performance of the carbon material produced therefrom. This uneven heating combined with the exothermic nature of polymerization results in difficulty in controlling the extent of polymerization, with the consequence of reduced ability to fine tune the gel pore structure (and pre structure of the carbon material produced therefrom). Furthermore, large monolithic polymer gels are difficult to work with (e.g., transfer from one vessel to another) and in order to facilitate processed into carbon require post-polymerization particle size reduction (e.g., grinding, milling, etc.), which results in increased labor, capital and production costs, and processing steps and time.

There is a need, therefore, for improved methods for making polymer particles in gel form, in order to further facilitate cost-effective and tunable methods for preparing high pure purity and high performance carbon materials for use in electrical energy storage devices. The present invention fulfills these needs and provides further related advantages, including achievement of unprecedently high levels of capacitance in double layer ultracapacitor systems.

BRIEF SUMMARY

Methods for making polymer particles in gel form via an emulsion and/or suspension process are provided. In at least one specific embodiment, the method for making polymer particles in gel form via an emulsion or suspension process can include preparing a reactant mixture comprising a monomer component containing one or more phenolic compounds and optionally one or more crosslinking compounds, and a carrier fluid. The carrier fluid can contain less than 50 wt % cyclohexane, based on the total weight of the carrier fluid. The monomer component can polymerize to form the polymer particles in gel form. The volume average particle size (Dv,50) of the polymer particles in gel form can be greater than or equal to 1 mm.

In at least one specific embodiment, the method for making polymer particles in gel form via an emulsion or suspension process can include preparing a reactant mixture comprising a monomer component containing one or more phenolic compounds and optionally one or more crosslinking compounds, and a carrier fluid. The monomer component can polymerize to form the polymer particles in gel form. The carrier fluid can be free of or contain a surfactant at a concentration less than the critical micelle concentration. The volume average particle size (Dv,50) of the polymer particles in gel form can be greater than or equal to 1 mm.

In at least one specific embodiment, the method for making polymer particles in gel form via an emulsion or suspension process can include preparing a reactant mixture comprising a monomer component containing one or more phenolic compounds and optionally one or more crosslinking compounds, and a carrier fluid. The monomer component can polymerize to form the polymer particles in gel form. The carrier fluid can contain less than 50 wt % cyclohexane, based on the total weight of the carrier fluid. The carrier fluid can be free of or contain a surfactant at a concentration less than the critical micelle concentration. The volume average particle size (Dv,50) of the polymer particles can be less than or equal to 1 mm.

In at least one specific embodiment, a polymer gel can have a particle size distribution such that a volume average particle size (Dv, 50) is greater than about 1 mm and (a volume average particle size (Dv,90)—a volume average particle size (Dv,10))/(a volume average particle size (Dv, 50)) is less than 3, where a volume average particle size (Dv,10), a volume average particle size (Dv,50), and a volume average particle size (Dv,90) are the particle sizes at 10%, 50% and 90%, respectively, of the particle size distribution by volume.

In at least one specific embodiment, a carbon material can have greater than 26 F/cm$^3$ for the maximum theoretical capacitance as measured at a current density of 0.5 Amp/g employing an electrolyte comprising tetraethylammonium tetrafluoroborane in acetonitrile. The carbon material can have less than 200 ppm of all atoms having a molecular weight between 11 and 92, as measured by photon induced x-ray emissions.

In one or more embodiments, the methods generally comprise preparation of a mixture of the monomer component or polymer precursors (i.e., a polymer phase) and a continuous phase and allowing the monomer component or polymer precursors (e.g., resorcinol and formaldehyde) to polymerize. The mixture may be an emulsion and/or a suspension. The resulting polymer can then optionally be converted to carbon materials by any number of post-processing procedures, including pyrolysis and/or activation. Advantageously, the present inventors have discovered that the presently disclosed methods allow for preparation of polymer gels (e.g., condensation polymer gels) and carbon materials at commercially relevant scales, and physical properties such as the pore structure and particle size of the gels and carbon materials can be controlled via process parameters (e.g., continuous phase selections, etc.).

Accordingly, in one embodiment the present disclosure provides a method for preparing a condensation polymer gel via an emulsion or suspension process, the method comprising:

a) preparing a mixture comprising a continuous phase and a polymer phase, wherein the polymer phase comprises one or more polymer precursors and an optional solvent and an optional catalyst; and b) aging the mixture at a temperature and for a time sufficient for the one or more polymer precursors to react with each other and form a condensation polymer gel.

In another embodiment, the present disclosure is directed to a method for preparing a dried condensation polymer gel, the method comprising drying a condensation polymer gel, wherein the condensation polymer gel has been prepared by an emulsion or suspension process comprising:

a) preparing a mixture comprising a continuous phase and a polymer phase, wherein the polymer phase comprises one or more polymer precursors and an optional solvent; and b) aging the mixture at a temperature and for a time sufficient for the one or more polymer precursors to react with each other and form a condensation polymer gel.

In yet other embodiments, the present disclosure provides a method for preparing a pyrolyzed carbon material, the method comprising pyrolysis of condensation polymer gel particles to obtain a pyrolyzed carbon material, wherein the condensation polymer gel particles have been prepared by a process comprising:

a) preparing a mixture comprising a continuous phase and a polymer phase, wherein the polymer phase comprises one or more polymer precursors and an optional solvent; and b) aging the mixture at a temperature and for a time sufficient for the one or more polymer precursors to react with each other and form a condensation polymer gel.

In yet other embodiments, the present disclosure provides a method for preparing a pyrolyzed carbon material, the method comprising pyrolysis of dried condensation polymer gel particles to obtain a pyrolyzed carbon material, wherein the condensation polymer gel particles have been prepared by a process comprising:

a) preparing a mixture comprising a continuous phase and a polymer phase, wherein the polymer phase comprises one or more polymer precursors and an optional solvent; and b) aging the mixture at a temperature and for a time sufficient for the one or more polymer precursors to react with each other and form a condensation polymer gel.

In yet other embodiments, the present disclosure provides a method for preparing a activated carbon material, the method comprising activation of pyrolyzed carbon prepared from dried or non-dried polymer gel particles to obtain an activated carbon material, wherein the condensation polymer gel particles have been prepared by a process comprising:

a) preparing a mixture comprising a continuous phase and a polymer phase, wherein the polymer phase comprises one or more polymer precursors and an optional solvent; and b) aging the mixture at a temperature and for a time sufficient for the one or more polymer precursors to react with each other and form a condensation polymer gel.

Compositions of matter for gel particles with narrow particle size distribution are also described. The control of particle size distribution may control polymer gel properties and/or properties of carbon materials produced therefrom. The span (expressed as $((Dv,90)-(Dv,10))/(Dv,50)$) can be less than or equal to three and the average particle size can be greater than or equal to 1 mm.

Also described herein are composition of matter for activated carbon with unprecedently high levels of maximum theoretical capacitance as measured in an electric double layer ultracapacitor employing an electrolyte comprising tetraethylammonium tetrafluoroborane in acetonitrile.

Furthermore described herein are devices such as electrodes, ultracapacitors, batteries, and other energy storage devices comprising carbon materials produced according to methods and/or exhibiting novel properties described herein.

These and other aspects of the invention will be apparent upon reference to the following detailed description. To this end, various references are set forth herein which describe in more detail certain background information, procedures, compounds and/or compositions, and are each hereby incorporated by reference in their entirety.

BRIEF DESCRIPTION OF THE DRAWINGS

In the figures, identical reference numbers identify similar elements. The sizes and relative positions of elements in the figures are not necessarily drawn to scale and some of these elements are arbitrarily enlarged and positioned to improve figure legibility. Further, the particular shapes of the elements as drawn are not intended to convey any information regarding the actual shape of the particular elements, and have been solely selected for ease of recognition in the figures.

DETAILED DESCRIPTION

Figure 1:
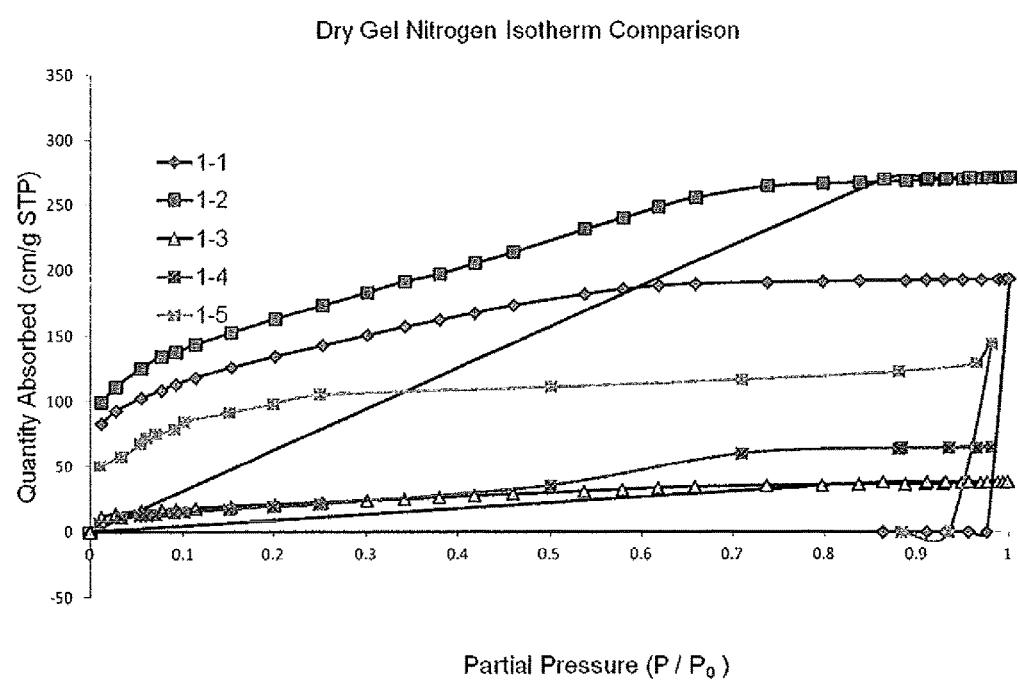
FIG. 1 shows $N_2$ absorption isotherms for freeze dried gels.

In the following description, certain specific details are set forth in order to provide a thorough understanding of various embodiments. However, one skilled in the art will understand that the invention may be practiced without these details. In other instances, well-known structures have not been shown or described in detail to avoid unnecessarily obscuring descriptions of the embodiments. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Definitions

As used herein, and unless the context dictates otherwise, the following terms have the meanings as specified below.

"Carbon material" refers to a material or substance comprised substantially of carbon (e.g., greater than 90%, greater than 95%, greater than 99% or greater than 99.9% carbon on a weight basis). Carbon materials include ultrapure as well as amorphous and crystalline carbon materials. Some carbon materials may comprise electrochemical modifiers (e.g., Si or N) to modify (e.g., enhance) device performance as described in more detail below. Examples of carbon materials can include, but are not limited to, activated carbon, pyrolyzed dried polymer gels, pyrolyzed polymer cryogels, pyrolyzed polymer xerogels, pyrolyzed polymer aerogels, activated dried polymer gels, activated polymer cryogels, activated polymer xerogels, activated polymer aerogels, and the like.

"Electrochemical modifier" refers to any chemical element, compound comprising a chemical element or any combination of different chemical elements and compounds which modifies (e.g., enhances or decreases) the electrochemical performance of a carbon material. Electrochemical modifiers can change (increase or decrease) the resistance, capacity, power performance, stability and other properties of a carbon material. Electrochemical modifiers generally impart a desired electrochemical effect. In contrast, an impurity in a carbon material is generally undesired and tends to degrade, rather than enhance, the electrochemical performance of the carbon material. Examples of electrochemical modifiers within the context of the present disclosure can include, but are not limited to, elements, and compounds or oxides comprising elements, in groups 12-15 of the periodic table, other elements such as sulfur, tungsten and silver and combinations or mixtures thereof. For example, electrochemical modifiers can include, but are not limited to, lead, tin, antimony, bismuth, arsenic, tungsten, silver, zinc, cadmium, indium, silicon, combinations thereof, or mixtures thereof, as well as oxides of the same and compounds comprising the same.

"Group 12" elements include zinc (Zn), cadmium (Cd), mercury (Hg), and copernicium (Cn).

"Group 13" elements include boron (B), aluminum (Al), gallium (Ga), indium (In) and thallium (Tl).

"Group 14" elements include carbon (C), silicon (Si), germanium (Ge), tin (Sn) and lead (Pb).

"Group 15" elements include nitrogen (N), phosphorous (P), arsenic (As), antimony (Sb) and bismuth (Bi).

"Amorphous" refers to a material, for example an amorphous carbon material, whose constituent atoms, molecules, or ions are arranged randomly without a regular repeating pattern. Amorphous materials may have some localized crystallinity (i.e., regularity) but lack long-range order of the positions of the atoms. Pyrolyzed and/or activated carbon materials are generally amorphous.

"Crystalline" refers to a material whose constituent atoms, molecules, or ions are arranged in an orderly repeating pattern. Examples of crystalline carbon materials include, but are not limited to, diamond and graphene.

"Synthetic" refers to a substance which has been prepared by chemical means rather than from a natural source. For example, a synthetic carbon material is one which is synthesized from precursor materials and is not isolated from natural sources.

"Impurity" or "impurity element" refers to a foreign substance (e.g., a chemical element) within a base material that differs from the chemical composition of the base material, where the foreign substance is not intentionally added. For example, an impurity in a carbon material refers to any element or combination of elements, other than carbon, which is present in the carbon material. Impurity levels are typically expressed in parts per million (ppm).

"PIXE impurity" or "PIXE element" is any impurity element having an atomic number ranging from 11 to 92 (i.e., from sodium to uranium). The phrases "total PIXE impurity content" and "total PIXE impurity level" both refer to the sum of all PIXE impurities present in a sample, for example, a polymer gel or a carbon material. PIXE impurity concentrations and identities may be determined by proton induced x-ray emission (PIXE).

"Ultrapure" refers to a substance having a total PIXE impurity content of less than 0.050%. For example, an "ultrapure carbon material" is a carbon material having a total PIXE impurity content of less than 0.050% (i.e., 500 ppm).

"Ash content" refers to the nonvolatile inorganic matter which remains after subjecting a substance to a decomposition temperature. Herein, the ash content of a carbon material is calculated from the total PIXE impurity content as measured by proton induced x-ray emission, assuming that any elements detected by PIXE are completely converted to expected combustion products (i.e., oxides).

"Polymer" refers to a macromolecule comprised of one or more structural repeating units.

"Synthetic polymer precursor material" or "polymer precursor" refer to compounds used in the preparation of a synthetic polymer. Polymer precursors are generally compounds that may be combined (i.e., reacted) with other compounds to form a polymer, for example a condensation polymer. Polymer precursors include monomers, as well as monomers which have been partially polymerized (i.e., dimers, oligomers, etc.). Generally, the polymer precursors are selected from aromatic or aliphatic alcohols or amines and carbonyl containing compounds (e.g., carboxylic acids, ketones, aldehydes, isocyanates, ureas, amides, acid halides, esters, activated carbonyl-containing compounds, and the like). Examples of polymer precursors that can be used in certain embodiments of the preparations disclosed herein can include, but are not limited to, aldehydes (i.e., HC(=O)R, where R is an organic group), such as for example, methanal (formaldehyde); ethanal (acetaldehyde); propanal (propionaldehyde); butanal (butyraldehyde); furfural (furfuraldehyde), glucose, benzaldehyde, and cinnamaldehyde. Other exemplary polymer precursors include, but are not limited to, phenolic compounds such as phenol and polyhydroxy benzenes, such as dihydroxy or trihydroxy benzenes, for example, resorcinol (i.e., 1,3-dihydroxy benzene), catechol, hydroquinone, and phloroglucinol. Amines, such as melamine, and/or urea may also be used. Mixtures of two or more polyhydroxy benzenes are also contemplated within the meaning of polymer precursor.

"Condensation polymer" is a polymer that results from reaction of one or more polymer precursors with elimination of a small molecule (e.g., water). Exemplary condensation polymers include, but are not limited to, polymers formed from reaction of an alcohol or amine with a carbonyl containing compound.

"Monolithic" refers to a solid, three-dimensional structure that is not particulate in nature.

"Sol" refers to a colloidal suspension of precursor particles (e.g., polymer precursors), and the term "gel" refers to a wet three-dimensional porous network obtained by condensation or reaction of the precursor particles.

"Polymer gel" refers to a gel in which the network component is a polymer; generally a polymer gel is a wet (aqueous or non-aqueous based) three-dimensional structure comprised of a polymer formed from synthetic precursors or polymer precursors.

"Sol gel" refers to a sub-class of polymer gel where the polymer is a colloidal suspension that forms a wet three-dimensional porous network obtained by reaction of the polymer precursors.

"Polymer hydrogel" or "hydrogel" refers to a subclass of polymer gel or gel where the solvent for the synthetic precursors or monomers is water or mixtures of water and one or more water-miscible solvents.

"RF polymer hydrogel" refers to a sub-class of polymer gel where the polymer was formed from the catalyzed reaction of resorcinol and formaldehyde in water or mixtures of water and one or more water-miscible solvents.

"Continuous Phase" refers to the liquid phase in which the polymerization components (i.e., polymer precursors, catalyst, acid, etc.) are dissolved, suspended and/or emulsified. Continuous phases may be either hydrophilic or hydrophobic and have varying viscosities. Mixtures of two or more different continuous phases are also contemplated. Any number of different liquids (e.g., solvents) may be employed within the context of the invention as described in more detail herein.

"Acid" refers to any substance that is capable of lowering the pH of a solution. Acids include Arrhenius, Brønsted and Lewis acids. A "solid acid" refers to a dried or granular compound that yields an acidic solution when dissolved in a solvent. The term "acidic" means having the properties of an acid.

"Base" refers to any substance that is capable of raising the pH of a solution. Bases include Arrhenius, Brønsted and Lewis bases. A "solid base" refers to a dried or granular compound that yields a basic solution when dissolved in a solvent. The term "basic" means having the properties of a base.

"Mixed solvent system" refers to a solvent system comprised of two or more solvents, for example, two or more miscible solvents. Examples of binary solvent systems (i.e., a mixed solvent containing two solvents) include, but are not limited to: water and acetic acid; water and formic acid; water and propionic acid; water and butyric acid and the like. Examples of ternary solvent systems (i.e., containing three solvents) include, but are not limited to: water, acetic acid, and ethanol; water, acetic acid and acetone; water, acetic acid, and formic acid; water, acetic acid, and propionic acid; and the like. The present invention contemplates all mixed solvent systems comprising two or more solvents.

"Miscible" refers to the property of a mixture wherein the mixture forms a single phase over certain ranges of temperature, pressure, and composition.

"Catalyst" is a substance which alters the rate of a chemical reaction. Catalysts participate in a reaction in a cyclic fashion such that the catalyst is cyclically regenerated. The present disclosure contemplates catalysts which are sodium free. The catalyst used in the preparation of a polymer gel (e.g., an ultrapure polymer gel) as described herein can be any compound that facilitates the polymerization of the polymer precursors to form an ultrapure polymer gel. A "volatile catalyst" is a catalyst which has a tendency to vaporize at or below atmospheric pressure. Exemplary volatile catalysts include, but are not limited to, ammoniums salts, such as ammonium bicarbonate, ammonium carbonate, ammonium hydroxide, and combinations thereof.

"Solvent" refers to a substance which dissolves or suspends reactants (e.g., ultrapure polymer precursors) and provides a medium in which a reaction may occur. Examples of solvents useful in the preparation of the gels, ultrapure polymer gels, ultrapure synthetic carbon materials and ultrapure synthetic amorphous carbon materials disclosed herein include, but are not limited to, water, alcohols and mixtures thereof. Exemplary alcohols include ethanol, t-butanol, methanol and mixtures thereof. Such solvents are useful for dissolution of the synthetic ultrapure polymer precursor materials, for example dissolution of a phenolic or aldehyde compound. In addition, in some processes such solvents are employed for solvent exchange in a polymer hydrogel (prior to freezing and drying), wherein the solvent from the polymerization of the precursors, for example, resorcinol and formaldehyde, is exchanged for a pure alcohol. In one embodiment of the present application, a cryogel is prepared by a process that does not include solvent exchange. "Percent solids" refers to the total amount of polymer forming agents (e.g., resorcinol, phenol, formaldehyde, urea, etc.) added to the system divided by the total amount of monomer forming agents and liquids (e.g., water, acetic acid, etc.). The calculation does not include any catalysts or otherwise "Added water" refers to water independently added to the system (either as a pre-mix or as part of the main solution) and does not include any water that is critical to the formation of a given monomer.

"Dried gel" or "dried polymer gel" refers to a gel or polymer gel, respectively, from which the solvent, generally water, or mixture of water and one or more water-miscible solvents, has been substantially removed, for example by methods known in the art such as freeze drying, spray drying, vacuum drying, solvent extraction, and the like.

"Pyrolyzed dried polymer gel" refers to a dried polymer gel which has been pyrolyzed but not yet activated, while an "activated dried polymer gel" refers to a dried polymer gel which has been activated.

"Cryogel" refers to a dried gel that has been dried by freeze drying.

"RF cryogel" refers to a dried gel that has been dried by freeze drying wherein the gel was formed from the catalyzed reaction of resorcinol and formaldehyde.

"Pyrolyzed cryogel" is a cryogel that has been pyrolyzed but not yet activated.

"Activated cryogel" is a cryogel which has been activated to obtain activated carbon material.

"Xerogel" refers to a dried gel that has been dried by air drying, for example, at or below atmospheric pressure.

"Pyrolyzed xerogel" is a xerogel that has been pyrolyzed but not yet activated.

"Activated xerogel" is a xerogel which has been activated to obtain activated carbon material.

"Aerogel" refers to a dried gel that has been dried by supercritical drying, for example, using supercritical carbon dioxide.

"Pyrolyzed aerogel" is an aerogel that has been pyrolyzed but not yet activated.

"Activated aerogel" is an aerogel which has been activated to obtain activated carbon material.

"Organic extraction solvent" refers to an organic solvent added to a polymer hydrogel after polymerization of the polymer precursors has begun, generally after polymerization of the polymer hydrogel is complete.

"Rapid multi-directional freezing" refers to the process of freezing a polymer gel by creating polymer gel particles from a monolithic polymer gel, and subjecting said polymer gel particles to a suitably cold medium. The cold medium can be, for example, liquid nitrogen, nitrogen gas, or solid carbon dioxide. During rapid multi-directional freezing nucleation of ice dominates over ice crystal growth. The suitably cold medium can be, for example, a gas, liquid, or solid with a temperature below about −10° C. Alternatively, the suitably cold medium can be a gas, liquid, or solid with a temperature below about −20° C. Alternatively, the suitably cold medium can be a gas, liquid, or solid with a temperature below about −30° C.

"Activate" and "activation" each refer to the process of heating a raw material or carbonized/pyrolyzed substance at an activation dwell temperature during exposure to oxidizing atmospheres (e.g., carbon dioxide, oxygen, steam or combinations thereof) to produce an "activated" substance (e.g., activated cryogel or activated carbon material). The activation process generally results in a stripping away of the surface of the particles, resulting in an increased surface area. Alternatively, activation can be accomplished by chemical means, for example, by impregnation of carbon-containing precursor materials with chemicals such as acids like phosphoric acid or bases like potassium hydroxide, sodium hydroxide or salts like zinc chloride, followed by carbonization. "Activated" refers to a material or substance, for example a carbon material, which has undergone the process of activation.

"Carbonizing", "pyrolyzing", "carbonization" and "pyrolysis" each refer to the process of heating a carbon-containing substance at a pyrolysis dwell temperature in an inert atmosphere (e.g., argon, nitrogen or combinations thereof) or in a vacuum such that the targeted material collected at the end of the process is primarily carbon. "Pyrolyzed" refers to a material or substance, for example a carbon material, which has undergone the process of pyrolysis.

"Dwell temperature" refers to the temperature of the furnace during the portion of a process which is reserved for maintaining a relatively constant temperature (i.e., neither increasing nor decreasing the temperature). For example, the pyrolysis dwell temperature refers to the relatively constant temperature of the furnace during pyrolysis, and the activation dwell temperature refers to the relatively constant temperature of the furnace during activation.

"Pore" refers to an opening or depression in the surface, or a tunnel in a carbon material, such as for example activated carbon, pyrolyzed dried polymer gels, pyrolyzed polymer cryogels, pyrolyzed polymer xerogels, pyrolyzed polymer aerogels, activated dried polymer gels, activated polymer cryogels, activated polymer xerogels, activated polymer aerogels and the like. A pore can be a single tunnel or connected to other tunnels in a continuous network throughout the structure.

"Pore structure" refers to the layout of the surface of the internal pores within a carbon material, such as an activated carbon material. Components of the pore structure include pore size, pore volume, surface area, density, pore size distribution and pore length. Generally the pore structure of an activated carbon material comprises micropores and mesopores. For example, in certain embodiments the ratio of micropores to mesopores is optimized for enhanced electrochemical performance.

"Mesopore" generally refers to a pore having a diameter ranging from 2 nanometers to 50 nanometers while the term "micropore" refers to a pore having a diameter less than 2 nanometers.

"Surface area" refers to the total specific surface area of a substance measurable by the BET technique. Surface area is typically expressed in units of $m^2/g$. The BET (Brunauer/Emmett/Teller) technique employs an inert gas, for example nitrogen, to measure the amount of gas adsorbed on a material and is commonly used in the art to determine the accessible surface area of materials.

"Connected" when used in reference to mesopores and micropores refers to the spatial orientation of such pores.

"Effective length" refers to the portion of the length of the pore that is of sufficient diameter such that it is available to accept salt ions from the electrolyte.

"Electrode" refers to a conductor through which electricity enters or leaves an object, substance or region.

"Binder" refers to a material capable of holding individual particles of a substance (e.g., a carbon material) together such that after mixing a binder and the particles together the resulting mixture can be formed into sheets, pellets, disks or other shapes. In certain embodiments, an electrode may comprise the disclosed carbon materials and a binder. Non-exclusive examples of binders include fluoro polymers, such as, for example, PTFE (polytetrafluoroethylene, Teflon), PFA (perfluoroalkoxy polymer resin, also known as Teflon), FEP (fluorinated ethylene propylene, also known as Teflon), ETFE (polyethylenetetrafluoroethylene, sold as Tefzel and Fluon), PVF (polyvinyl fluoride, sold as Tedlar), ECTFE (polyethylenechlorotrifluoroethylene, sold as Halar), PVDF (polyvinylidene fluoride, sold as Kynar), PCTFE (polychlorotrifluoroethylene, sold as Kel-F and CTFE), trifluoroethanol, combinations thereof, and mixtures thereof.

"Inert" refers to a material that is not active in the electrolyte of an electrical energy storage device, that is it does not absorb a significant amount of ions or change chemically, e.g., degrade.

"Conductive" refers to the ability of a material to conduct electrons through transmission of loosely held valence electrons.

"Current collector" refers to a part of an electrical energy storage and/or distribution device which provides an electrical connection to facilitate the flow of electricity in to, or out of, the device. Current collectors often comprise metal and/or other conductive materials and may be used as a backing for electrodes to facilitate the flow of electricity to and from the electrode.

"Electrolyte" means a substance containing free ions such that the substance is electrically conductive. Electrolytes are commonly employed in electrical energy storage devices. Examples of electrolytes include, but are not limited to, solvents such as propylene carbonate, ethylene carbonate, butylene carbonate, dimethyl carbonate, methyl ethyl carbonate, diethyl carbonate, sulfolane, methylsulfolane, acetonitrile or mixtures thereof in combination with solutes such as tetralkylammonium salts such as TEA TFB (tetraethylammonium tetrafluoroborate), MTEATFB (methyltriethylammonium tetrafluoroborate), EMITFB (1-ethyl-3-methylimidazolium tetrafluoroborate), tetraethylammonium, triethylammonium based salts or mixtures thereof. In some embodiments, the electrolyte can be a water-based acid or water-based base electrolyte such as mild aqueous sulfuric acid or aqueous potassium hydroxide.

An "amine" is a compound including a nitrogen atom, such as —NH2.

An "alcohol" is a compound including a —OH moiety.

A "carbonyl" is a compound including a carbon double bonded to oxygen (C=O).

A "phenol" refers to an aromatic ring (e.g., benzene) having one or more alcohol moieties attached thereto. Phenol and resorcinol are both "phenols."

A "polyalcohol" refers to any compound having more than one alcohol moiety.

A "sugar" is a polyalcohol such as glucose, fructose, lactose and the like.

An "alkylamine" refers to an alkyl group (i.e., a saturated or unsaturated optionally substituted hydrocarbon compound) comprising an amine moiety (e.g., methyl amine and the like).

An "aromatic amine" refers to an aromatic group (i.e., a cyclic, unsaturated hydrocarbon having a cyclic array of conjugated pi bonds, such as benzene) comprising an amine group (e.g., aniline and the like).

An "aldehyde" is a compound comprising a —C(=O)H moiety.

A "ketone" is a compound comprising a —C(=O)— moiety.

A "carboxylic acid" is a compound comprising a —C(=O)OH moiety.

An "esters" is a compounds comprising a —C(=O)O— moiety.

An "acid halide" is any compound comprising a —C(=O)X moiety, wherein X is fluorine, chlorine, bromine, iodide or astatine.

"Isocyanate" refers to compounds comprising a —N=C=O moiety.

"Carrier fluid" can refer to a suspension fluid, solvent, diluent, dispersion fluid, emulsion fluid, and/or the continuous phase of the suspension and/or emulsion. In one or more embodiments, the term "continuous phase" has the same definition as "carrier fluid" as defined herein. In one or more embodiments, the term carrier fluid has the same definition as "continuous phase" as defined herein. In one or more embodiments, the term "carrier fluid" has the same definition as "solvent" as defined herein. In one or more embodiments, the term "solvent" has the same definition as "carrier fluid" as defined herein.

"Suspension process," "suspension polymerization process," "dispersion process," and "dispersion polymerization process" are used interchangeably and refer to a heterogeneous polymerization process that mixes the reactant mixture in the carrier or "continuous phase" fluid such as a hydrocarbon and/or water, where the reactant mixture phase and the carrier or continuous phase fluid are not miscible. In some embodiments, the reactant mixture can be suspended or dispersed in the carrier fluid or continuous phase as droplets, where the monomer component undergoes polymerization to form particles of polymer and/or curing to form cured particles of polymer. In some embodiments, the reaction mixture can be agitated. In some embodiments, the reaction mixture is not agitated.

"Emulsion process" and "emulsion polymerization process" refer to both "normal" emulsions and "inverse" emulsions. Emulsions differ from suspensions in one or more aspects. One difference is that an emulsion will usually include the use of a surfactant that creates or forms the emulsions (very small size droplets). When the carrier or continuous phase fluid is a hydrophilic fluid such as water and the reactant mixture phase is a hydrophobic compound(s), normal emulsions (e.g., oil-in-water) form, where droplets of monomers are emulsified with the aid of a surfactant in the carrier or continuous phase fluid. Monomers react in these small size droplets. These droplets are typically small in size as the particles are stopped from coagulating with each other because each particle is surrounded by the surfactant and the charge on the surfactant electrostatically repels other particles. Whereas suspension polymerization usually creates much larger particles than those made with emulsion polymerization. When the carrier or continuous phase fluid is a hydrophobic fluid such as oil and the reactant mixture phase is hydrophilic compounds, inverse-emulsions (e.g., water-in-oil) form.

As used herein, the terms "suspension and/or emulsion process" and "suspension and/or emulsion polymerization" are not limited to or necessarily refer to traditional polymerization. Instead, the terms "suspension and/or emulsion process" and "suspension and/or emulsion polymerization" may, but not necessarily, refer to a curing process or a combination of traditional polymerization and a curing process. As discussed and described herein, in one or more embodiments, the monomer component can be or include a prepolymer and/or a polymer in addition to or in lieu of the monomer mixture alone. The curing process refers to the further cross-linking or hardening of the polymer as compared to the polymerization of a monomer mixture. As such, if a pre-polymer is present, the suspension/emulsion process can, in addition to or in lieu of polymerization, also include the curing process. As used herein, the term "curing" refers to the toughening or hardening of polymers via an increased degree of cross-linking of polymer chains. Cross-linking refers to the structural and/or morphological change that occurs in the pre-polymer and/or polymer, such as by covalent chemical reaction, ionic interaction or clustering, phase transformation or inversion, and/or hydrogen bonding.

As used herein, the terms "polymer particulates in gel form" and "polymer particles in gel form" are used interchangeably and refer to a network of polymer chains that have one or more pores or voids therein, and a liquid at least partially occupies or fills the one or more pores or voids. As used herein, the terms "dried polymer particulates" and "dried polymer particles" are used interchangeably and refer to a network of polymer chains having one or more pores or voids therein, and a gas at least partially occupies or fills the one or more pores or voids. If the liquid that at least partially occupies or fills the voids is water, the polymer particles can be referred to as "hydrogel polymer particles."

"Monomer component" can include, but is not limited to, one or more phenolic compounds and/or one or more crosslinking compounds; and/or a prepolymer. If the phenolic compound can polymerize and crosslink with itself, the use of the crosslinking compound can be optional. In another example, the phenolic compound and all or a portion of the crosslinking compound can polymerize with one another to form the polymer particles in gel form. In another example, the phenolic compound and the crosslinking compound can react or crosslink with one another to produce the polymer particles in gel form. In another example, the phenolic compound and the crosslinking compound can polymerize with one another and/or crosslink with one another to produce the polymer particles in gel form.

In one or more embodiments, the term "polymer phase" means the same thing as the term "monomer component" as defined herein. In one or more embodiments, the term "polymer precursor" means the same thing as the term "monomer component" as defined herein.

As used herein, the term "prepolymer" refers to the reacted monomer compounds of the one or more phenolic compounds and the one or more crosslinking compounds; and/or a polymer formed by polymerizing the one or more phenolic compounds and/or the one more crosslinking compounds so long as the polymer remains in liquid form.

"Reactant mixture" comprises components that accomplish polymerization according to the methods described herein. The components of the reactant mixture, e.g., the monomer component, the catalyst, and the carrier fluid can be combined with one another in any order or sequence. For example, the monomer component can be added to the carrier fluid, the carrier fluid can be added to the monomer component, or the monomer component and the carrier fluid can be simultaneously combined with one another. The catalyst can then be added to the mixture of the monomer component and the carrier fluid.

As used herein, "particle size" refers to the volume average particle size (Dv,50) as measured either by visual counting and measurement of individual particles or by laser light scattering of particles in a suspension fluid. The volume average particle size is determined by image capture using a digital camera and ImageJ freeware, for particles above 0.1 mm in diameter. Particles sizes below 0.1 mm are determined by dilute dispersions in water by light scattering using a Malvern MASTERSIZER® 3000. Samples below 0.1 mm are added to the Malvern analyzer until the recommended obscuration level is obtained.

As used herein, "span" is defined as ((Dv,90)-(Dv,10))/(Dv,50) wherein the Dv,10 and Dv,50 and the Dv,90 are the volume particle size measured at 10%, 50%, and 90% of the size distribution respectively, wherein the particle size distribution is measured either by visual counting and measurement of individual particles or by laser light scattering of particles in a suspension fluid.

As used herein, "normalized F/cc" or "maximum theoretical F/cc" is defined as the capacitance expressed per envelope volume of carbon particles (the sum of carbon skeletal volume and carbon pore volume); note that this envelope volume does not include any inter-particle volume.

As used herein, "CMC" is the critical micelle concentration and is defined as the concentration above which a surfactant(s) forms micelles, and all additional surfactant(s) added to the system go to micelles.

As used herein, "semi metal ion" is defined as any ion comprised of an element with a very small overlap between the bottom of the conduction band and the top of the valence band. Illustrative semi metal ions include, but are not limited to, arsenic, antimony, bismuth, molybdenum, and uranium.

As used herein, the term "gerameter" or "GM" is a measurement of the relative micro-, meso- and macro-porosity of a carbon sample. The gerameter or GM is calculated according to the following equation: GM=[BET specific surface area $(m^2/g)$]/[100*Pore Volume (cc/g)], where PV is single point desorption total pore volume of pores less than 530.559 Å diameter at P/Po=0.96, BET is as defined above, P is pressure, and Po is saturation pressure. Generally the units of GM are not reported.

A. Preparation of Polymer Gels and Carbon Materials

Carbon materials have traditionally been made by admixing polymer precursors and allowing them to polymerize into a polymer monolith. The monolith must then be isolated and ground or milled to small particles before it can be pyrolyzed and/or activated into carbon materials. Such procedures suffer from a number of drawbacks. For example, at large scales previously described monolith preparations present significant material handling problems and the possibility of heterogenous polymerizations and/or uncontrolled exothermic reactions. Furthermore, other considerations, such as the incompatibility of typical production equipment (e.g., ovens, etc.) with known monolith procedures, makes scale up of these procedures challenging and economically difficult.

The present methods overcome these limitations and represent a number of other improvements. For example, the described polymerizations provide the possibility to isolate the gel product by filtration or by decanting excess solvent, thus making the methods amendable to large scale production. Furthermore, heat transfer is more effective in the present methods compared to monolith procedures, thus the products are expected to be more homogeneous and the risk of uncontrolled exotherms is significantly reduced. Furthermore, by changing the gel formulation and/or processing parameters, carbon materials having certain desired characteristics (e.g., microporosity, mesoporosity, high density, low density, specific particle sizes, near monodisperse particle size distributions, etc.) can be obtained without additional processing steps (e.g., milling, etc.). Certain aspects of the disclosed methods are described in more detail in the following sections.

The various physical and chemical properties of the carbon materials and polymer gels are as described in the following section and as disclosed in co-pending U.S. application Ser. Nos. 12/748,219; 12/897,969; 12/829,282; 13/046,572; 12/965,709; 13/336,975; and 61/585,611, each of which are hereby incorporated by reference in their entireties for all purposes.

1. Preparation of Polymer Gels

As noted above, on embodiment of the present disclosure provides methods for preparation of polymer gels and carbon materials. For example, in one embodiment the present application provides a method for preparing a condensation polymer gel via an emulsion or suspension process, the method comprising:

a) preparing a mixture comprising a continuous phase and a polymer phase, wherein the polymer phase comprises one or more polymer precursors and an optional solvent; and b) aging the mixture at a temperature and for a time sufficient for the one or more polymer precursors to react with each other and form a condensation polymer gel.

In another embodiment, the disclosed methods include preparing a dried condensation polymer gel, the method comprises drying a condensation polymer gel, wherein the condensation polymer gel has been prepared by an emulsion or suspension process comprising:

a) preparing a mixture comprising a continuous phase and a polymer phase, wherein the polymer phase comprises one or more polymer precursors and an optional solvent; and b) aging the mixture at a temperature and for a time sufficient for the one or more polymer precursors to react with each other and form a condensation polymer gel.

In yet other embodiments, the invention provides a method for preparing a pyrolyzed carbon material, the method comprising pyrolyzing condensation polymer gel particles to obtain a pyrolyzed carbon material, wherein the condensation polymer gel particles have been prepared by a process comprising:

a) preparing a mixture comprising a continuous phase and a polymer phase, wherein the polymer phase comprises one or more polymer precursors and an optional solvent; and b) aging the mixture at a temperature and for a time sufficient for the one or more polymer precursors to react with each other and form a condensation polymer gel.

In yet other embodiments, the invention provides a method for preparing an activated carbon material, the method comprising activation of pyrolyzed carbon derived from condensation polymer gel particles, wherein the condensation polymer gel particles have been prepared by a process comprising:

a) preparing a mixture comprising a continuous phase and a polymer phase, wherein the polymer phase comprises one or more polymer precursors and an optional solvent; and b) aging the mixture at a temperature and for a time sufficient for the one or more polymer precursors to react with each other and form a condensation polymer gel.

The condensation polymer gel may be used without drying or the methods may further comprise drying the condensation polymer gel. In certain embodiments of the foregoing methods, the polymer gel is dried by freeze drying to create a cryogel.

The methods disclosed herein can be useful for preparation of condensation polymer gels and/or carbon materials having any number of various pore structures. In this regard, the present Applicants have discovered that the pore structure can be controlled by variation of any number of process parameters such as continuous phase type, stir rate, temperature, aging time, etc. In some embodiments, the condensation polymer gel can be microporous, and in other embodiments the condensation polymer gel can be mesoporous. In certain other embodiments, the condensation polymer gel comprises a pore structure having a mixture of microporous and mesoporous pores.

In related embodiments, the carbon material can be microporous or the carbon material can be mesoporous. In other embodiments, the carbon material comprises a pore structure having mixture of microporous (for example, pores with diameter less than about 2 nm) and mesoporous pores (for example, pores with diameter between about 2 nm and 50 nm).

In yet other embodiments, the carbon material can be macroporous. In other embodiments, the carbon material comprises a pore structure having mixture of microporous (for example, pores with diameter less than about 2 nm) and macroporous pores (for example, pores with diameter greater than about 50 nm). In other embodiments, the carbon material comprises a pore structure having mixture of mesoporous (for example, pores with diameter between about 2 nm and 50 nm) and macroporous pores (for example, pores with diameter greater than about 50 nm). In other embodiments, the carbon material comprises a pore structure having mixture of microporous (for example, pores with diameter less than about 2 nm), and mesoporous (for example, pores with diameter between about 2 nm and 50 nm) and macroporous pores (for example, pores with diameter greater than about 50 nm).

Microporous carbon can have a gerameter or GM of greater than 21. In certain embodiments, the microporous carbon can have a GM greater than 22, greater than 23, or greater than 24. In at least one embodiment, microporous carbon can have a GM of greater than 21, greater than 22, greater than 23, or greater than 24 to about 27, about 29, about 30, or about 35. Carbon having both micro- and mesoporous structure can have a gerameter or GM of from 9 to 21. For example, the GM for carbon having both micro- and mesoporous structure can be from a low of about 9, about 10, about 11, about 12, about 13, or about 14 to a high of about 15, about 16, about 17, about 18, about 19, about 20, or about 21. In certain embodiments, carbon having both micro- and mesoporous structure can have a GM of from 9 to 13, from 9 to 15, from 9 to 17, from 12 to 15, from 11 to 15, from 12 to 17, or from 10 to 16. Carbon with micro-, meso-, and macroporous structure can have a gerameter or GM of from 5 to 9. For example, the GM of carbon with micro-, meso-, and macroporous structure can have a GM from a low of about 5, about 6, or about 7 to a high of about 8, or about 9. In certain embodiments, carbon with micro- and meso- and macoporous structure can have a gerameter or GM of from 7 to 9 or from 5 to 7 or from 6 to 8.

The polymer phase may be prepared by admixing the one or more polymer precursors and the optional solvent, and in some examples the reactant mixture can be prepared by admixing the continuous phase and the polymer phase. The method can include embodiments where the mixture is an emulsion, while in other embodiments the mixture is a suspension.

For example, in some embodiments the continuous phase and the polymer phase are not miscible with each other, and the mixture is an emulsion. While in other exemplary methods the continuous phase and the polymer phase are not soluble in each other, and the mixture is a suspension. In other examples, the polymer phase is aged prior to preparation of the mixture, and the mixture is an emulsion and/or a suspension upon combination of the continuous phase and the polymer phase.

In other different aspects, both the continuous phase and the polymer phase are soluble in each other (i.e., miscible). In some variations of this embodiment, the continuous phase and polymer phase are miscible initially but the polymer phase is aged such that it becomes immiscible with the continuous phase and the mixture becomes a suspension upon aging.

The polymer phase may be prepared by admixing the one or more polymer precursors and the optional solvent and/or optional catalyst to form a prepolymer composition. In some embodiments, the polymer phase is "pre-reacted" prior to mixing with the continuous phase such the polymer precursors are at least partially polymerized. In other embodiments, the polymer precursors are not pre-reacted. In certain other embodiments, the method is a continuous process. For example, the polymer precursors may be continuously mixed with a continuous phase and the final condensation polymer gel may be continuously isolated from the mixture.

In some embodiments, the conditions under which the polymer phase is pre-reacted can contribute to the properties of the final gel and/or carbon material. For example, the particle size of the resulting gel and/or carbon material can be varied by varying certain pre-reaction conditions, for example the pre-reaction temperature, the pre-reaction time and/or the composition of the prepolymer composition. Unexpectedly, in certain embodiments the variation of particle size does not result in a concomitant change in pore structure of the gel and/or carbon material. Accordingly, variation of these parameters provides flexibility to arrive at optimum processing conditions while maintaining the desired pore structure of the ultimate products (e.g., gel and/or carbon material).

The components of the reactant mixture, e.g., the monomer component, the catalyst, and the carrier fluid can be combined with one another in any order or sequence. For example, the monomer component can be added to the carrier fluid, the carrier fluid can be added to the monomer component, or the monomer component and the carrier fluid can be simultaneously combined with one another. The catalyst can then be added to the mixture of the monomer component and the carrier fluid. In another example, the catalyst can be added to the monomer component or vice versa to form a monomer component and catalyst mixture and the monomer component and catalyst mixture can be combined with the carrier fluid, e.g., added to the carrier fluid. In another example, the catalyst can be added to the carrier fluid or vice versa to form a carrier fluid and catalyst mixture and the carrier fluid and catalyst mixture can be combined with the monomer component, e.g., added to the monomer component.

The individual components of the reactant mixture, e.g., the phenolic compound, the crosslinking compound, and the catalyst, can each independently be mixed, blended, contacted, located, placed, directed, added, disposed, or otherwise combined with the carrier fluid in any order or sequence to produce the suspension and/or emulsion. In other words, one or less than all of the components that make up the monomer component can be combined with the carrier fluid to form or produce an intermediate suspension and/or emulsion. For example, the phenolic compound and the catalyst can be combined with the carrier fluid to form or produce an intermediate suspension and/or emulsion and the crosslinking compound can be combined with the intermediate suspension and/or emulsion to form or produce the suspension and/or emulsion of the reactant mixture and the carrier fluid. In another example, the carrier fluid can be combined with one or more components of the monomer component, e.g., the phenolic compound, to produce an intermediate suspension and/or emulsion and one or more other components, e.g., the cross linking compound, can be added to the intermediate suspension and/or emulsion to produce a second intermediate suspension and/or emulsion. To the second intermediate suspension and/or emulsion the catalyst can be added to produce final suspension and/or emulsion. In other words, the phenolic compound, the crosslinking compound, the catalyst, and/or the carrier fluid can be combined with one another in any order or sequence and/or any two or more components can be simultaneously combined with one another to produce the suspension and/or emulsion.

The suspension and/or emulsion can have a concentration of the monomer component ranging from a low of about 1 wt % to about 90 wt %, based on the combined weight of the monomer component and the carrier fluid. For example, the suspension and/or emulsion can have a concentration of the monomer component ranging from a low of about 1 wt %, about 3 wt %, about 5 wt %, about 10 wt %, about 15 wt %, about 20 wt %, or about 25 wt % to a high of about 40 wt %, about 45 wt %, about 50 wt %, about 55 wt %, about 60 wt %, about 65 wt %, about 70 wt %, about 75 wt %, about 80 wt %, or about 85 wt %, based on the combined weight of the monomer component and the carrier fluid. In another example, the monomer component in the suspension and/or emulsion can range from about 25 wt % to about 35 wt %, about 20 wt % to about 45 wt %, about 30 wt % to about 50 wt %, about 10 wt % to about 25 wt %, or about 15 wt % to about 50 wt %, based on the combined weight of the monomer component and the carrier fluid.

The pH of the polymer phase can be varied. For example, the pH of the polymer phase can be acid, for example exhibit a pH below 7, below 6, below 5, below 4, below 4, below 3, or below 2. In certain embodiments, the pH of the polymer phase can be between pH 2 and pH 6, for example between pH 3 and pH 5, for example, between pH 3 and pH 4. In other embodiments, the pH of the polymer phase can be basic, for example exhibit a pH above 7, for example above 8, above 9, above 10. In certain embodiments, the pH of the polymer phase can be between pH 7 and pH 10, for example between pH 8 and pH 10, between pH 8 and pH 9. In one or more embodiments, the pH of the polymer phase can be from a low of about 2.5, about 3.5, about 4.5, about 5.5, or about 6.5 to a high of about 7.5, about 8.5, about 9.5, about 10.5, or about 11.5.

The pH of the prepolymer can be varied. For example, the pH of the prepolymer can be acidic, for example exhibit a pH below 7, below 6, below 5, below 4, below 3, or below 2. In certain embodiments, the pH of the prepolymer can be between pH 2 and pH 6, for example between pH 3 and pH 5, for example, between pH 3 and pH 4. In other embodiments, the pH of the prepolymer can be basic, for example exhibit a pH above 7, for example above 8, above 9, above 10. In certain embodiments, the pH of the prepolymer can be between pH 7 and pH 10, for example between pH 8 and pH 10, between pH 8 and pH 9. In one or more embodiments, the pH of the prepolymer can be from a low of about 2.5, about 3.5, about 4.5, about 5.5, or about 6.5 to a high of about 7.5, about 8.5, about 9.5, about 10.5, or about 11.5.

In certain embodiments, the pH of the prepolymer and polymer phase can be different. In certain embodiments, the pH of the prepolymer can be basic (above pH 7), and the pH of the polymer phase can be acidic (below pH 7). In certain other embodiments, the pH of the prepolymer can be below 7, and the pH of the polymer phase can be above 7. In certain embodiments, the pH and pH ranges of the prepolymer and polymer phase can be different and described by the bounds elucidated in the previous two paragraphs.

The pH of the monomer component can be varied. For example, the pH of the monomer component can be acidic, for example exhibit a pH below 7, below 6, below 5, below 4, below 4, below 3, or below 2. In certain embodiments, the pH of the monomer component can be between pH 2 and pH 6, for example between pH 3 and pH 5, for example, between pH 3 and pH 4. In other embodiments, the pH of the monomer component can be basic, for example exhibit a pH above 7, for example above 8, above 9, above 10. In certain embodiments, the pH of the monomer component can be between pH 7 and pH 10, for example between pH 8 and pH 10, between pH 8 and pH 9. In one or more embodiments, the pH of the monomer component can be from a low of about 2.5, about 3.5, about 4.5, about 5.5, or about 6.5 to a high of about 7.5, about 8.5, about 9.5, about 10.5, or about 11.5.

The suspension/emulsion process can be carried out under a wide range of pH values. For example, the suspension/emulsion process can be carried out at a pH ranging from a low of about 1, about 2, or about 3 to a high of about 7, about 8, about 9, about 10, about 11, or about 12. In one or more embodiments, the suspension/emulsion process can be carried out under acidic conditions. For example, the pH of the reactant mixture or at least the monomer component can be less than 7, less than 6.5, less than 6, less than 5.5, less than 5, less than 4.5, or less than 4. In another example, the pH of the reactant mixture or at least the monomer component can range from about 1 to about 6.5, about 1.5 to about 5.5, about 2 to about 5, about 1.5 to about 4.5, about 1 to about 4, about 2 to about 4, about 1 to about 3.5, or about 2 to about 4.5.

The temperature at which the prepolymer can be aged can be varied while still staying with the scope of the present methods. Certain particular embodiments of the method provide for preparing a prepolymer composition and allowing the prepolymer composition to react at a temperature from a low of about 20° C., about 25° C., about 30° C., about 35° C., about 40° C., about 50° C., or about 60° C. to a high of about 100° C., about 110° C., about 125° C., about 135° C., about 150° C., about 175° C., about 200° C., about 225° C., or about 250° C. In at least one specific embodiment, the prepolymer composition can be reacted at a temperature from a low of about 20° C., about 25° C., about 30° C., about 35° C., about 40° C., about 50° C., or about 60° C. to a temperature lower than the boiling point of the prepolymer composition and/or a temperature lower than the boiling point of the lowest boiling component of the prepolymer composition before the prepolymer composition is combined to the continuous phase. Higher reaction temperature can be realized either using higher boiling point chemicals or preparing prepolymer under elevated pressure. More specific embodiments include aging the prepolymer composition at temperatures ranging from about 50° C. to about 90° C., or from about 60° C. to about 85° C., or from about 65° C. or about 80° C. prior to combining with the continuous phase. In another embodiment, the prepolymer composition can be aged at a temperature of at least 20° C., at least 25° C., at least 30° C., at least 35° C., at least 40° C., at least 45° C., at least 60° C., at least 65° C., at least 70° C., at least 75° C., at least 80° C., or at least 85° C. In some cases the pressure of the vessel may be increased and/or higher boiling point solvents may be used to enable reaction at higher temperatures without inducing a phase change in the reactants. In other cases an external condenser may be used to enable reactions at higher temperatures.

The time which the prepolymer phase is allowed to react prior to mixing with the continuous phase is also varied throughout different embodiments of the methods, and different temperatures may result in different particle sizes for the resulting gel and/or carbon materials. Exemplary reaction times in this regard include a time period from a low of about 5 minutes, about 30 minutes, about 1 hour, about 2 hours, about 4 hours, about 8 hours, about 16 hours, about 24 hours, or about 30 hours to a high of about 40 hours, about 44 hours, about 48 hours, about 56 hours, about 60 hours, about 66 hours, or about 72 hours.

If the prepolymer is formed, the polymerization of the prepolymer can be carried out to an endpoint based on the refractive index of the liquid prepolymer. For example, the prepolymer can be polymerized until the prepolymer has a refractive index ranging from a low of about 1.1000, about 1.2000, about 1.3000, or about 1.3200 to a high of about 1.4500, about 1.4800, about 1.5000, about 1.5500, about 1.6000, about 1.6500, about 1.7000, about 1.7500, or about 1.8000. In another example, the polymerization of the monomer mixture to produce the prepolymer can be carried out to a refractive index of about 1.3500 to about 1.4500, about 1.3800 to about 1.4400, about 1.3900 to about 1.4350, about 1.3900 to about 1.45000, about 1.1000 to about 1.7000, about 1.3000 to about 1.6000, about 1.4200 to about 1.5500, about 1.4800 to about 1.6400, or about 1.3700 to about 1.4300.

The suspension and/or emulsion can be agitated to improve and/or maintain a homogeneous or substantially homogenous distribution of the reactant mixture within or in the carrier fluid (suspension and inverse emulsion) or a homogeneous or substantially homogenous distribution of the carrier fluid within or in the reactant mixture (suspension and normal emulsion). The components of the suspension and/or emulsion can be combined within one or more mixers. The mixer can be or include any device, system, or combination of device(s) and/or system(s) capable of batch, intermittent, and/or continuous mixing, blending, contacting, or the otherwise combining of two or more components, e.g., the phenolic compound and the crosslinking compound or the suspension and/or emulsion that includes the monomer component and the carrier fluid. Illustrative mixers can include, but are not limited to, mechanical mixer agitation, ejectors, static mixers, mechanical/power mixers, shear mixers, sonic mixers, vibration mixing, e.g., movement of the mixer itself, or any combination thereof. The mixer can include one or more heating jackets, heating coils, internal heating elements, cooling jackets, cooling coils, internal cooling elements, or the like, to regulate the temperature therein. The mixer can be an open vessel or a closed vessel. The components of the suspension and/or emulsion can be combined within the mixer under a vacuum, at atmospheric pressure, or at pressures greater than atmospheric pressure. In one or more embodiments, the components of the suspension and/or emulsion can be combined within the mixer at a temperature from a low of about 0° C., about 10° C., about 20° C., about 30° C., about 40° C., about 50° C., about 60° C., or about 70° C. to a high of about 90° C., about 100° C., about 110° C., about 130° C., about 150° C., about 175° C., about 200° C., about 225° C., or about 250° C. The mixer can be capable of producing a homogeneous suspension and/or emulsion. In other words, the mixer can produce a suspension and/or emulsion in which the distribution of the monomer component is substantially the same throughout the carrier fluid. It should be noted that an emulsion does not necessarily require any agitation in order to form and/or maintain the emulsion, but such agitation can be used to accelerate and/or improve the homogeneous distribution of the components within the emulsion. As such, if an emulsion alone is formed the emulsion does not necessarily require external energy such as mechanical and/or acoustic energy in order to form and/or maintain the emulsion.

The particular method or combination of methods used to agitate the suspension and/or emulsion can be used, at least in part, as one variable that can be controlled or adjusted to influence the size and/or morphology of the polymer particles in gel form. For example, if a stirring paddle or blade agitates the suspension and/or emulsion by rotation within the suspension and/or emulsion, the speed at which the stirring paddle or blade rotates can influence the size of the polymer particles in gel form. The particular shape or configuration of the stirring paddle or blade can also influence the size of the polymer particles in gel form.

Once the suspension and/or emulsion forms the monomer component can be polymerized to produce the polymer particles in gel form. As discussed and described above, the suspension and/or emulsion process can also include curing in addition to or in lieu of traditional polymerization. The monomer component can form small droplets or micelles in suspension and/or emulsion. The monomer component, e.g., the phenolic compound, the crosslinking compound, the prepolymer, and/or the polymer contained within the droplets or micelles can undergo polymerization and/or curing to produce the polymer particles in gel form. The liquid that can at least partially fill any pores or voids in the polymer gel particles can be present in the reaction mixture and/or formed during polymerization of the monomer component.

The monomer component can undergo suspension and/or emulsion polymerization within the mixer. The monomer component can be removed from the mixer and introduced into another vessel or container "reactor" in which the suspension and/or emulsion can undergo suspension and/or emulsion polymerization. Illustrative mixers/reactors can include batch, intermittent, and/or continuous type mixers or reactors. A continuous mixer or reactor, for example, can be a "loop" reactor. The suspension and/or emulsion can be formed within other systems, devices, and/or combinations thereof in addition to the one or more mixers discussed and described above. For example, suitable suspension and/or emulsion polymerizations processes can also be carried out under gas phase conditions. For example, the monomer component, the carrier fluid, and/or the optional catalyst can be in the gaseous phase. In another example, the monomer component and the carrier fluid can be in the gaseous phase and the catalyst can be in the solid and/or liquid phase. Accordingly, in one or more embodiments, the reactant mixture or at least one or more components of the reactant mixture can be introduced to the reactor in gas phase. In one or more embodiments, the reactant mixture or at least one or more of the components thereof can be in a liquid phase. In one or more embodiments, the reactant mixture or at least one or more components thereof can be in a solid phase.

Other suitable suspension and/or emulsion processes can be carried out in a continuous process and/or a batch process. Illustrative processes can include, but are not limited to, continuous stirred tank reactor (CSTR), loop reactor, and/or plug flow reactors. The suspension and/or emulsion process can be carried out in one reactor or more than one reactor. When two or more reactors are used the two or more reactor same be the same or different. When two or more reactors are used the two or more reactors can be operated in series and/or parallel. These reactors may have or may not have internal cooling or heating.

Referring to the loop reactor in more detail, the loop reactor can include a circulating slurry or mixture of growing polymer particles in the carrier fluid. The loop reactor can be maintained at a pressure from a low of about 50 kPa, about 101 kPa, about 120 kPa, about 200 kPa, about 400 kPa, about 800 kPa, about 1,200 kPa, about 1,700 kPa, or about 2,100 kPa to a high of about 3,200 kPa, about 3,600 kPa, about 4,100 kPa, about 4,700 kPa, about 5,100 kPa, or about 5,500 kPa. The circulating slurry or mixture of growing polymer particles in the carrier fluid can be at a temperature from a low of about 30° C., about 45° C., about 60° C., about 70° C., about 80° C., or about 90° C. to a high of about 95° C., about 99° C., about 110° C., about 120° C., about 130° C., about 140° C., about 150° C., about 175° C., about 200° C., about 225° C., or about 250° C. Reaction heat can be removed and/or input through the loop wall. The loop wall can be in the form of a double jacketed pipe. The slurry or mixture can be allowed to exit the reactor at regular intervals or continuously to one or more systems, devices, and/or combination of systems and/or devices capable of separating the polymer particles from the carrier fluid. At least a portion of the carrier fluid can be recycled back to the loop reactor. Additionally, any non polymerized monomer component can be recycled back to the loop reactor. The loop reactor can be used to carry out the suspension and/or emulsion process as a single loop reactor, or two or more loop reactors in parallel and/or series configurations. For example, the loop reactor can include 1, 2, 3, 4, 5, 10, 20, or more loops operated in series and/or parallel. The reactant mixture can be introduced to one or more locations of any given loop reactor. The monomer component or separate compounds of the monomer component can be introduced to any given loop reactor at the same location or different locations with respect to one another. For example, the phenolic compound and the catalyst can be introduced to a given loop reactor at a first location and the crosslinking compound can be introduced to the loop reactor at a second location, where the first and second locations are at the same location on the reactor or where first and second locations are at different locations on the reactor.

In one or more embodiments, if the polymer particles in gel form are produced within the loop reactor (or any other reactor), polymer particles can be removed during, as, and/or within a relatively short time period after being produced, but prior to full cure thereof. For example, the polymer particles can be formed in a few minutes and/or after several minutes or even hours, where the polymer particles have sufficient integrity so that they do not or substantially do not "stick" or "glue" together with one another, but are not fully cured. The separated polymer particles can be introduced to a second vessel, container, or other system, device, and/or combination thereof, where the polymer particles can be further cured. The formation of the polymer particles within the loop reactor can be carried out in a first carrier fluid and when the polymer particles are removed from the loop reactor they can be kept in the first carrier fluid and/or separated from the first carrier fluid and combined with a second carrier fluid. For example, the carrier fluid in the loop reactor (first carrier fluid) can be or include one or more hydrocarbons and the carrier fluid in the second container (second carrier fluid) can be water. The separated first carrier fluid and/or at least a portion of any non-polymerized monomers can be recycled back to the reactor. Accordingly, the formation of the polymer particles in gel form can be carried out in a single vessel or reactor or a plurality of reactors or vessels. Additionally, the formation of the polymer particles in gel form can include the use or combination of different process conditions, e.g., temperature and/or pressure, polymer particle concentration in the carrier fluid (loop reactor as compared to the second vessel), and the like.

The suspension/emulsion process when utilizing liquid components generally can be carried out at a pressure from a low of about 50 kPa, about 101 kPa, about 120 kPa, about 200 kPa, about 400 kPa, about 800 kPa, about 1,200 kPa, about 1,700 kPa, or about 2,100 kPa to a high of about 3,200 kPa, about 3,600 kPa, about 4,100 kPa, about 4,700 kPa, about 5,100 kPa, or about 5,500 kPa or even greater. The suspension/emulsion process can also be carried out at a temperature ranging from a low of about 0° C., about 20° C., about 40° C., or about 50° C. to a high of about 70° C., about 80° C., about 90° C., about 100° C., about 120° C., about 150° C., about 175° C., about 200° C., about 225° C., or about 250° C. For example, the temperature of the suspension and/or emulsion can be maintained, e.g., from about 80° C. to about 99° C., until the suspension and/or emulsion polymerization, i.e., the polymerization between the phenolic compound and the crosslinking compound, reaches a desired degree or level of polymerization. In another example, the temperature of the suspension and/or emulsion can be maintained at a temperature of about 80° C. or more, about 83° C. or more, about 85° C. or more, about 87° C. or more, about 90° C. or more, about 93° C. or more, about 95° C. or more, about 97° C. or more, about 98° C. or more, about 99° C. or more, about 100° C. or more, about 103° C. or more, about 105° C. or more, about 107° C. or more, about 110° C. or more about 112° C. or more, or about 115° C. or more until the suspension and/or emulsion polymerization reaches a desired degree or level of polymerization and/or curing. As noted above, the suspension and/or emulsion process can be carried out under acidic and/or basic conditions. The suspension and/or emulsion polymerization can be conducted until the polymer particles maintain their integrity so that they do not or substantially do not "stick" or "glue" together with one another. The polymerization can be reduced or stopped by decreasing the temperature of the suspension and/or emulsion and/or polymer particles in gel form. The cooled suspension and/or emulsion and/or polymer particles in gel form can be stored for further processing.

Compositions useful for controlling the pore structure (e.g., mesoporosity, microporosity, etc.) and/or particle size of the gel and/or carbon materials are described in more detail below. With regard to particle size, the present inventors have discovered that a higher solids content may contribute to larger gel particle sizes as well as higher viscosity of either continuous or dispersed phase. Various embodiments of the prepolymer composition are described in more detail below.

A single polymer precursor may be used or the methods may comprise use of two or more different polymer precursors. The structure of the polymer precursors is not particularly limited, provided that the polymer precursor is capable of reacting with another polymer precurser or with a second polymer precursor to form a polymer. Polymer precursors include amine-containing compounds, alcohol-containing compounds and carbonyl-containing compounds, for example in some embodiments the polymer precursors are selected from an alcohol, a phenol, a polyalcohol, a sugar, an alkyl amine, an aromatic amine, an aldehyde, a ketone, a carboxylic acid, an ester, a urea, an acid halide and an isocyanate. Some embodiments of using resorcinol and formaldehyde as polymer precursor can have various formaldehyde to resorcinol mole ratio, ranging from 1 to 2.5. More specific embodiment has formaldehyde to resorcinol mole ratio of 2. In another specific embodiment formaldehyde to resorcinol mole ratio can be 1.5.

In one embodiment, the method comprises use of a first and second polymer precursor, and in some embodiments the first or second polymer precursor can be a carbonyl containing compound and the other of the first or second polymer precursor can be an alcohol containing compound. In some embodiments, a first polymer precursor can be a phenolic compound and a second polymer precursor can be an aldehyde compound (e.g., formaldehyde). In one embodiment, of the method the phenolic compound can be phenol, resorcinol, catechol, hydroquinone, phloroglucinol, or a combination thereof; and the aldehyde compound can be formaldehyde, acetaldehyde, propionaldehyde, butyraldehyde, benzaldehyde, cinnamaldehyde, or a combination thereof. In a further embodiment, the phenolic compound can be resorcinol, phenol or a combination thereof, and the aldehyde compound can be formaldehyde. In yet further embodiments, the phenolic compound can be resorcinol and the aldehyde compound can be formaldehyde. In yet further embodiments, the phenolic compound can be phenol and the aldehyde can be formaldehyde. In some embodiments, the polymer precursors are alcohols and carbonyl compounds (e.g., resorcinol and aldehyde). In one or more embodiments, in a polymer precursor containing an alcohol and a carbonyl compound, the alcohol to carbonyl compound molar ratio can be from about 0.2:1 to about 1:1, about 0.3:1 to about 0.8:1, about 0.4:1 to about 0.6:1, about 0.5:1.0 to about 0.7:1, about 0.4:1 to about 0.5:1, or about 0.3:1 to about 0.7:1.

In one or more embodiments, the suitable phenolic compounds can be represented by Formula I:

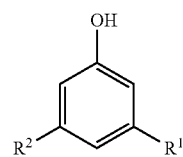

Formula I where R1 and are R2 are independent selected from hydrogen (H), a hydroxy group, C1-5 alkyl, or OR3, where R3 is a C1-5 alkyl or C1-5 aryl, and where at least one of R1 and R2 is a hydroxy group. Other suitable phenolic compounds can be represented by Formula II:

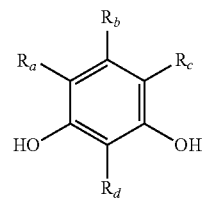

Formula II where each of $R_a$, $R_b$, $R_c$, and $R_d$ is independently hydrogen (H); hydroxy; a halide, e.g., fluoride, chloride, bromide or iodide; a nitro; a benzo; a carboxy; an acyl such as formyl, an alkyl-carbonyl, e.g., acetyl, and an arylcarbonyl, e.g., benzoyl; alkyl such as methyl, ethyl, propyl, butyl, pentyl, hexyl, heptyl, octyl, nonyl, decyl and the like; an alkenyl such as unsubstituted or substituted vinyl and allyl; unsubstituted or substituted methacrylate, unsubstituted or substituted acrylate; silyl ether; siloxanyl; aryl such as phenyl and naphthyl; aralkyl such as benzyl; or alkaryl such as alkylphenyls, and where at least two of $R_a$, $R_c$, and $R_d$ is hydrogen.

Other suitable phenolic compounds can be or include phenol itself (i.e., mono-hydroxy benzene). Other suitable examples of substituted phenols can include, but are not limited to, alkyl-substituted phenols such as the cresols and xylenols; cycloalkyl-substituted phenols such as cyclohexyl phenol; alkenyl-substituted phenols; aryl-substituted phenols such as p-phenyl phenol; alkoxy-substituted phenols such as 3,5-dimethyoxyphenol; aryloxy phenols such as p-phenoxy phenol; and halogen-substituted phenols such as p-chlorophenol. Dihydric phenols such as catechol, resorcinol, hydroquinone, bisphenol A and bisphenol F also can also be used. In particular, the phenol component can be selected from the group consisting of phenol; alkyl-substituted phenols such as the cresols and xylenols; cycloalkyl-substituted phenols such as cyclohexyl phenol; alkenyl-substituted phenols; aryl-substituted phenols such as p-phenyl phenol; alkoxy-substituted phenols such as 3,5-dimethyoxyphenol; aryloxy phenols such as p-phenoxy phenol; halogen-substituted phenols such as p-chlorophenol; catechol, hydroquinone, bisphenol A and bisphenol F. Still other suitable phenolic compounds can be or include resorcinol, phenol, catechol, hydroquinone, pyrogallol, 5-methylresorcinol, 5-ethylresorcinol, 5-propylresorcinol, 4-methylresorcinol, 4-ethylresorcinol, 4-propylresorcinol, resorcinol monobenzoate, resorcinol monosinate, resorcinol diphenyl ether, resorcinol monomethyl ether, resorcinol monoacetate, resorcinol dimethyl ether, phloroglucinol, benzoylresorcinol, resorcinol rosinate, alkyl substituted resorcinol, aralkyl substituted resorcinol, 2-methylresorcinol, phloroglucinol, 1,2,4-benzenetriol, 3,5-dihydroxybenzaldehyde, 2,4-dihydroxybenzaldehyde, 4-ethylresorcinol, 2,5-dimethylresorcinol, 5-methylbenzene-1,2,3-triol, 3,5-dihydroxybenzyl alcohol, 2,4,6-trihydroxytoluene, 4-chlororesorcinol, 2',6'-dihydroxyacetophenone, 2',4'-dihydroxyacetophenone, 3',5'-dihydroxyacetophenone, 2,4,5-trihydroxybenzaldehyde, 2,3,4-trihydroxybenzaldehyde, 2,4,6-trihydroxybenzaldehyde, 3,5-dihydroxybenzoic acid, 2,4-dihydroxybenzoic acid, 2,6-dihydroxybenzoic acid, 1,3-dihydroxynaphthalene, 2',4'-dihydroxypropiophenone, 2',4'-dihydroxy-6'-methylacetophenone, 1-(2,6-dihydroxy-3-methylphenyl)ethanone, 3-methyl 3,5-dihydroxybenzoate, methyl 2,4-dihydroxybenzoate, gallacetophenone, 2,4-dihydroxy-3-methylbenzoic acid, 2,6-dihydroxy-4-methylbenzoic acid, methyl 2,6-dihydroxybenzoate, 2-methyl-4-nitroresorcinol, 2,4,5-trihydroxybenzoic acid, 3,4,5-trihydroxybenzoic acid, 2,3,4-trihydroxybenzoic acid, 2,4,6-trihydroxybenzoic acid, 2-nitrophloroglucinol or a combination thereof. Another suitable phenolic compound can be or include phloroglucinol.

In at least one example, the phenolic compound can be or include, but is not limited to, phenol, resorcinol, i.e., 1,3-dihydroxybenzene, or a combination thereof. In another example, the phenolic compound can be or include, but is not limited to, any compound or combination of compounds, from which resorcinol or any resorcinol derivative can be derived. In another example, the phenolic compound can be a polyhydroxybenzene, a dihydroxybenzene, a trihydroxybenzene, or any combination thereof. The phenolic compound can include any combination of two or more phenolic compounds combined with one another and/or added independent of one another to the reactant mixture.

Resorcinol can be provided as a white/off-white solid or flake and/or the resorcinol component can be heated and supplied as a liquid. The solids component of a liquid monomer component, e.g., a resorcinol-formaldehyde copolymer, a phenol-formaldehyde copolymer, and/or a phenol-resorcinol-formaldehyde copolymer, can be from about 5 wt % to about 95 wt %. For example, the solids component of the liquid monomer component can be from a low of about 5 wt %, about 10 wt %, about 15 wt %, about 20 wt %, about 25 wt %, or about 20 wt % to a high of about 50 wt %, about 55 wt %, about 60 wt %, about 65 wt %, about 70 wt %, or about 75 wt %. In another example, the solids component of the liquid monomer component can be from about 10 wt % to about 75 wt %, about 10 wt % to about 40 wt %, about 30 wt % to about 80 wt %, about 45 wt % to about 75 wt %, or about 15 wt % to about 70 wt %. Liquid monomer components can have a Brookfield viscosity at 25° C. that varies widely. For example, liquid monomer component can have Brookfield viscosity at 25° C. from a low of about 5 cP, about 50 cP, about 100 cP, about 200 cP, about 400 cP, or about 600 cP to a high of about 1,000 cP, about 2,500 cP, about 5,000 cP, about 10,000 cP, about 15,000 cP, or about 20,000 cP. Liquid resorcinol copolymers typically have a dark amber color.

In one or more embodiments, the phenolic compound can also be or include one or more tannins. As used herein, the term "tannin" refers to both hydrolyzable tannins and condensed tannins. As such, the phenolic compound can be or include hydrolyzable tannins, condensed tannins, or a combination of hydrolyzable tannins and condensed tannins. Illustrative genera of shrubs and/or trees from which suitable tannins can be derived can include, but are not limited to, *Acacia, Castanea, Vachellia, Senegalia, Terminalia, Phyllanthus, Caesalpinia, Quercus, Schinopsis, Tsuga, Rhus, Juglans, Carya*, and *Pinus*, or any combination thereof. In another example, genera from which suitable tannins can be derived can include, but are not limited to, *Schinopsis, Acacia*, or a combination thereof. In another example, genera from which suitable tannins can be derived can include, but are not limited to, *Pinus, Carya*, or a combination thereof.

Hydrolyzable tannins are mixtures of simple phenols such as pyrogallol and ellagic acid and of esters of a sugar, e.g., glucose, with gallic and digallic acids. Illustrative hydrolyzable tannins can include, but are not limited to, extracts recovered from *Castanea sativa*, (e.g., chestnut), *Terminalia* and *Phyllanthus* (e.g., myrabalans tree species), *Caesalpinia coriaria* (e.g., divi-divi), *Caesalpinia spinosa*, (e.g., tara), algarobilla, valonea, and *Quercus* (e.g., oak). Condensed tannins are polymers formed by the condensation of flavans. Condensed tannins can be linear or branched molecules. Illustrative condensed tannins can include, but are not limited to *Acacia mearnsii* (e.g., wattle or mimosa bark extract), *Schinopsis* (e.g., quebracho wood extract), *Tsuga* (e.g., hemlock bark extract), *Rhus* (e.g., sumach extract), *Juglans* (e.g., walnut), *Carya illinoinensis* (e.g., pecan), and *Pinus* (e.g., Radiata pine, Maritime pine, bark extract species).

The condensed tannins include about 70 wt % to about 80 wt % active phenolic ingredients (the "tannin fraction") and the remaining ingredients (the "non-tannin fraction") can include, but are not limited to, carbohydrates, hydrocolloid gums, and amino and/or imino acid fractions. The condensed tannins can be used as recovered or extracted from the organic matter or the condensed tannins can be purified, e.g., to about 95 wt % or more active phenolic ingredients. Hydrolyzable tannins and condensed tannins can be extracted from the starting material, e.g., trees and/or shrubs, using well established processes. A more detailed discussion of tannins is discussed and described in the *Handbook of Adhesive Technology*, Second Edition, CRC Press, 2003, chapter 27, "Natural Phenolic Adhesives I: Tannin," and in *Monomers, Polymers and Composites from Renewable Resources*, Elsevier, 2008, chapter 8, "Tannins: Major Sources, Properties and Applications."

The condensed tannins can be classified or grouped into one of two main categories, namely, those containing a resorcinol unit and those containing a phloroglucinol unit. Illustrative tannins that include the resorcinol unit include, but are not limited to, black wattle tannins and quebracho tannins. Illustrative tannins that include the phloroglucinol unit include, but are not limited to, pecan tannins and pine tannins.

The polymer precursor materials as disclosed herein include (a) alcohols, phenolic compounds, and other mono- or polyhydroxy compounds and (b) aldehydes, ketones, and combinations thereof. Representative alcohols in this context include straight chain and branched, saturated and unsaturated alcohols. Suitable phenolic compounds include polyhydroxy benzene, such as a dihydroxy or trihydroxy benzene. Representative polyhydroxy benzenes include resorcinol (i.e., 1,3-dihydroxy benzene), catechol, hydroquinone, and phloroglucinol. Mixtures of two or more polyhydroxy benzenes can also be used. Phenol (monohydroxy benzene) can also be used. Representative polyhydroxy compounds include sugars, such as glucose, sucrose, chitin and other polyols, such as mannitol. Aldehydes in this context include: straight chain saturated aldeydes such as methanal (formaldehyde), ethanal (acetaldehyde), propanal (propionaldehyde), butanal (butyraldehyde), and the like; straight chain unsaturated aldehydes such as ethenone and other ketenes, 2-propenal (acrylaldehyde), 2-butenal (crotonaldehyde), 3 butenal, and the like; branched saturated and unsaturated aldehydes; and aromatic-type aldehydes such as benzaldehyde, salicylaldehyde, hydrocinnamaldehyde, and the like. Suitable ketones include: straight chain saturated ketones such as propanone and 2 butanone, and the like; straight chain unsaturated ketones such as propenone, 2 butenone, and 3-butenone (methyl vinyl ketone) and the like; branched saturated and unsaturated ketones; and aromatic-type ketones such as methyl benzyl ketone (phenylacetone), ethyl benzyl ketone, and the like. The polymer precursor materials can also be combinations of the precursors described above.

In some embodiments, one polymer precursor is an alcohol-containing species and another polymer precursor is a carbonyl-containing species, for example an aldehyde and a phenol. The relative amounts of alcohol-containing species (e.g., alcohols, phenolic compounds and mono- or polyhydroxy compounds or combinations thereof) reacted with the carbonyl containing species (e.g., aldehydes, ketones or combinations thereof) can vary substantially. In some embodiments, the ratio of alcohol-containing species to aldehyde species is selected so that the total moles of reactive alcohol groups in the alcohol-containing species is approximately the same as the total moles of reactive carbonyl groups in the aldehyde species. Similarly, the ratio of alcohol-containing species to ketone species may be selected so that the total moles of reactive alcohol groups in the alcohol containing species is approximately the same as the total moles of reactive carbonyl groups in the ketone species. The same general 1:1 molar ratio holds true when the carbonyl-containing species comprises a combination of an aldehyde species and a ketone species.

The crosslinking compound can be or include, but is not limited to, unsubstituted aldehyde compounds and/or substituted aldehyde compounds. Aldehyde compounds suitable for use as the crosslinking compound can be represented by the formula RCHO, where R is hydrogen or a hydrocarbon radical. Illustrative hydrocarbon radicals can include from 1 to about 8 carbon atoms. In another example, suitable aldehyde compounds can also include the so-called masked aldehydes or aldehyde equivalents, such as acetals or hemiacetals. Illustrative aldehyde compounds can include, but are not limited to, formaldehyde, paraformaldehyde, acetaldehyde, propionaldehyde, butyraldehyde, furfuraldehyde, benzaldehyde, glutaraldehyde, or any combination thereof. One or more other aldehydes, such as glyoxal can be used in place of or in combination with formaldehyde and/or other aldehydes. In at least one example, the aldehyde compound can include formaldehyde, UFC, or a combination thereof.

The aldehyde compounds can be used as a solid, liquid, and/or gas. Considering formaldehyde in particular, the formaldehyde can be or include paraform (solid, polymerized formaldehyde), formalin solutions (aqueous solutions of formaldehyde, sometimes with methanol, in 37 percent, 44 percent, or 50 percent formaldehyde concentrations), Urea-Formaldehyde Concentrate ("UFC"), and/or formaldehyde gas in lieu of or in addition to other forms of formaldehyde can also be used. In another example, the aldehyde can be or include a pre-reacted urea-formaldehyde mixture having a urea to formaldehyde weight ratio of about 1:2 to about 1:3.

The crosslinking compound can be or include, but is not limited to, one or more multifunctional aldehyde compounds. As used herein, the terms "multifunctional aldehyde compound" and "multifunctional aldehyde" are used interchangeably and refer to compounds having at least two functional groups, with at least one of the functional groups being an aldehyde group. For example, the multifunctional aldehyde can include two or more aldehyde functional groups. In another example, the multifunctional aldehyde can include at least one aldehyde functional group and at least one functional group other than an aldehyde functional group. As used herein, the term "functional group" refers to reactive groups in the multifunctional aldehyde compound and can include, but is not limited to, aldehyde groups, carboxylic acid groups, ester groups, amide groups, imine groups, epoxide groups, aziridine groups, azetidinium groups, and hydroxyl groups.

The multifunctional aldehyde compound can include two or more carbon atoms and have two or more aldehyde functional groups. For example, the multifunctional aldehyde compound can include two, three, four, five, six, or more carbon atoms and have two or more aldehyde functional groups. The multifunctional aldehyde compound can include two or more carbon atoms and have at least one aldehyde functional group and at least one functional group other than an aldehyde group such as a carboxylic acid group, an ester group, an amide group, an imine groups, an epoxide group, an aziridine group, an azetidinium group, and/or a hydroxyl group. For example, the multifunctional aldehyde compound can include two, three, four, five, six, or more carbon atoms and have at least one aldehyde functional group and at least one functional group other than an aldehyde group such as a carboxylic acid group, an ester group, an amide group, an imine groups, an epoxide group, an aziridine group, an azetidinium group, and/or a hydroxyl group.

Suitable bifunctional or difunctional aldehydes that include three (3) or more carbon atoms and have two aldehyde functional groups (—CHO) can be represented by the following formula:

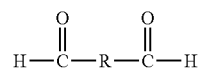

where R is a divalent aliphatic, cycloaliphatic, aromatic, or heterocyclic group having from 1 to 12 carbon atoms. Illustrative multi-functional aldehydes can include, but are not limited to, malonaldehyde, succinaldehyde, glutaraldehyde, 2-hydroxyglutaraldehyde, β-methylglutaraldehyde, adipaldehyde, pimelaldehyde, suberaldehyde, malealdehyde, fumaraldehyde, sebacaldehyde, phthalaldehyde, isophthalaldehyde, terephthalaldehyde, ring-substituted aromatic aldehydes, or any combination thereof. A suitable bifunctional or difunctional aldehyde that includes two carbon atoms and has two aldehyde functional groups is glyoxal.

Illustrative multifunctional aldehyde compounds that include an aldehyde group and a functional group other than an aldehyde group can include, but are not limited to, glyoxylic acid, glyoxylic acid esters, glyoxylic acid amides, 5-(hydroxymethyl)furfural, or any combination thereof. The aldehyde group in the multifunctional aldehyde compound can exist in other forms, e.g., as a hydrate. As such, any form or derivative of a particular multifunctional aldehyde compound can be used to prepare the binder compositions discussed and described herein. For example, in the context of glyoxylic acid, glyoxylic acid, glyoxylic acid monohydrate, and/or glyoxylate can be combined with the tannins and the Lewis acid to produce the binder composition. The crosslinking compound can include any combination of two or more crosslinking compounds combined with one another and/or added independent of one another to the reactant mixture.

In one or more embodiments, the monomer component of the phenolic compound and the crosslinking compound can be partially or completely replaced with a mixture of Maillard reactants. Similarly, the prepolymer can be or include a partially or pre-reacted mixture of the Maillard reactants. In other words, all or a portion of the monomer component of the reactant mixture can be a mixture of Maillard reactants, a pre-reacted mixture of Maillard reactants or a combination thereof. The mixture of Maillard reactants can include, but is not limited to, a source of a carbohydrate (carbohydrate reactant) and an amine reactant capable of participating in a Maillard reaction with the carbohydrate reactant.

The source of the carbohydrate can include one or more reactants having one or more reducing sugars, one or more reactants that yields one or more reducing sugars under thermal curing conditions, or a combination thereof. A reducing sugar can be a sugar that contains aldehyde groups, or can isomerize, i.e., tautomerize, to contain aldehyde groups. Such aldehyde groups are reactive with an amino group (amine reactant) under Maillard reaction conditions. Usually such aldehyde groups can also be oxidized with, for example, $Cu^{+2}$ to afford carboxylic acids. The carbohydrate reactant can optionally be substituted with other functional groups, such as with hydroxy, halo, alkyl, alkoxy, and the like. The carbohydrate source can also possess one or more chiral centers. The carbohydrate source can also include each possible optical isomer at each chiral center. Various mixtures, including racemic mixtures, or other diastereomeric mixtures of the various optical isomers of any such carbohydrate source, as well as various geometric isomers thereof, can be used.

The carbohydrate source can be nonvolatile. Nonvolatile carbohydrate sources can increase or maximize the ability of the carbohydrate reactant to remain available for reaction with the amine reactant under Maillard reaction conditions. Pre-reacting the mixture of the source of the carbohydrate and the amine reactant can expand the list of suitable carbohydrate sources. The carbohydrate source can be a monosaccharide in its aldose or ketose form, including a triose, a tetrose, a pentose, a hexose, or a heptose; or a polysaccharide, or any combination thereof.

If a triose serves as the carbohydrate source, or is used in combination with other reducing sugars and/or a polysaccharide, an aldotriose sugar or a ketotriose sugar can be utilized, such as glyceraldehyde and dihydroxyacetone, respectively. If a tetrose serves as the carbohydrate source, or is used in combination with other reducing sugars and/or a polysaccharide, aldotetrose sugars, such as erythrose and threose; and ketotetrose sugars, such as erythrulose, can be utilized. If a pentose serves as the carbohydrate source, or is used in combination with other reducing sugars and/or a polysaccharide, aldopentose sugars, such as ribose, arabinose, xylose, and lyxose; and ketopentose sugars, such as ribulose, arabulose, xylulose, and lyxulose, can be utilized. If a hexose serves as the carbohydrate source, or is used in combination with other reducing sugars and/or a polysaccharide, aldohexose sugars, such as glucose (i.e., dextrose), mannose, galactose, allose, altrose, talose, gulose, and idose; and ketohexose sugars, such as fructose, psicose, sorbose and tagatose, can be utilized. If a heptose serves as the carbohydrate source, or is used in combination with other reducing sugars and/or a polysaccharide, a ketoheptose sugar such as sedoheptulose can be utilized. Other stereoisomers of such carbohydrate sources not known to occur naturally are also contemplated to be useful in preparing the binder compositions. If a polysaccharide serves as the carbohydrate source, or is used in combination with monosaccharides, then sucrose, lactose, maltose, starch, and cellulose can be utilized.

The carbohydrate reactant can also be used in combination with a non-carbohydrate polyhydroxy reactant. Examples of non-carbohydrate polyhydroxy reactants can include, but are not limited to, trimethylolpropane, glycerol, pentaerythritol, polyvinyl alcohol, partially hydrolyzed polyvinyl acetate, fully hydrolyzed polyvinyl acetate, and mixtures thereof. The non-carbohydrate polyhydroxy reactant can be sufficiently nonvolatile to maximize its ability to remain available for reaction with other binder components during curing. Partially pre-reacting the mixture of the source of the carbohydrate (carbohydrate reactant) and the amine reactant can expand the list of suitable non-carbohydrate polyhydroxy reactants. The hydrophobicity of the non-carbohydrate polyhydroxy reactant can be a factor in determining the physical properties of the binder composition.

The amine reactant capable of participating in a Maillard reaction with the source of the carbohydrate can be a compound possessing an amino group. The compound can be present in the form of an amino acid. The free amino group can also come from a protein where the free amino groups are available in the form of, for example, the e-amino group of lysine residues, and/or the α-amino group of the terminal amino acid. The amine reactant can also be formed separately or in situ by using a polycarboxylic acid ammonium salt reactant. Ammonium salts of polycarboxylic acids can be generated by neutralizing the acid groups of a polycarboxylic acid with an amine base, thereby producing polycarboxylic acid ammonium salt groups. Complete neutralization, i.e., about 100% calculated on an equivalents basis, can eliminate any need to titrate or partially neutralize acid groups in the polycarboxylic acid(s). However, it is expected that less-than-complete neutralization would also yield a satisfactory mixture of Maillard reactants.

In certain embodiments, the polymer precursors comprise formaldehyde and resorcinol or formaldehyde and phenol, or formaldehyde in combination with a mixture of phenol and resorcinol. In other embodiments, the polymer precursors comprise formaldehyde and urea.

In other embodiments, the polymer precursor is a urea or an amine containing compound. For example, in some embodiments the polymer precursor is urea or melamine Other embodiments include polymer precursors selected from isocyanates or other activated carbonyl compounds such as acid halides and the like.

Some embodiments of the disclosed methods include preparation of polymer gels (and carbon materials) comprising electrochemical modifiers. Electrochemical modifiers include those known in the art and described in co-pending U.S. application Ser. No. 12/965,709, previously incorporated by reference in its entirety. Such electrochemical modifiers are generally selected from elements useful for modifying the electrochemical properties of the resulting carbon materials or polymer gels, and in some embodiments include nitrogen or silicon. In other embodiments, the electrochemical modifier comprises nitrogen, iron, tin, silicon, nickel, aluminum or manganese. The electrochemical modifier can be included in the preparation procedure at any step. For example, in some the electrochemical modifier is admixed with the mixture, the polymer phase or the continuous phase.

The total solids content in the gel formulation prior to polymer formation (i.e., the monomer component) can be varied. This total solids content is the weight fraction of components that are generally non-volatile (compared to the total weight of volatile and non-volatile components).

The weight ratio of the monomer component to solvent (e.g., water, acid, etc.) can be from about 0.05 to 3 to about 0.70 to 2. Alternatively, the ratio of the monomer component to solvent can be from about 0.15 to 1 to about 0.6 to 1.5. Alternatively, the ratio of the monomer component to solvent can be from about 0.15 to 1 to about 0.35 to 1. Alternatively, the ratio of the monomer component to solvent can be from about 0.25 to 1 to about 0.5 to 1. Alternatively, the ratio of the monomer component to solvent can be from about 0.3 to 1 to about 0.6 to 1.

In some embodiments, the solids content of the monomer component can vary from a low of about 10%, about 15%, about 20%, about 25%, about 35%, about 40%, or about 45% to a high of about 55%, about 60%, about 65%, about 70%, about 75%, about 80%, about 85%, or about 90%. In other embodiments, the solids content of the monomer component can be from about 35% to about 70%, about 40% to about 60%, or about 45% to about 55%. In one or more embodiments, the solids content of the monomer component can be greater than 20%, greater than 25%, greater than 30%, greater than 35%, greater than 40%, or great than 45%, great than 50%, great than 55%, great than 60%, great than 65%, great than 70%, great than 75%, great than 80%, great than 85%, or great than 90%. %. In one or more embodiments, the solids content of the monomer component can be less than 90%, less than 85%, less than 80%, less than 75%, less than 70%, less than 65%, less than 60%, less than 55%, less than 50%, less than 45%, less than 40%, less than 35%, less than 30%, less than 25%, less than 20%, or less than 15%.

In some embodiments, the gel polymerization process is performed under catalytic conditions. Accordingly, in some embodiments, the method comprises admixing a catalyst with the mixture, the polymer phase and/or the continuous phase. In some embodiments, the catalyst comprises a basic volatile catalyst. For example, in one embodiment, the basic volatile catalyst comprises ammonium carbonate, ammonium bicarbonate, ammonium acetate, ammonium hydroxide, or combinations thereof. In a further embodiment, the basic volatile catalyst can be ammonium carbonate. In another further embodiment, the basic volatile catalyst can be ammonium acetate.

The catalyst can be or include one or more acids, one ore more bases, or any combination thereof. Illustrative basic catalyst can be or include, but are not limited to, sodium hydroxide, sodium carbonate, sodium bicarbonate, potassium hydroxide, potassium carbonate, potassium bicarbonate, ammonium carbonate, hexamethylenetetramine, or any combination thereof. Illustrative acidic catalysts can include, but are not limited to, acetic acid, hydrochloric acid, sulfuric acid, phosphoric acid, phosphorous acid, sulfonic acid (including but not limited to monosulfonic acid, disulfonic acid, trisulfonic acid, toluene sulfonic acid, and alkane sulfonic acid), gallic acid, oxalic acid, picric acid, or any combination thereof.

The molar ratio of catalyst to polymer precursor may have an effect on the final properties of the polymer gel as well as the final properties of the carbon materials. Thus, in some embodiments such catalyst can be used in a molar ratio from a low of about 1:1, about 3:1, about 5:1, about 7:1, about 10:1, about 15:1, about 20:1, about 25:1, about 30:1, about 40:1, or about 50:1 to a high of about 100:1, about 150:1, about 200:1, about 300:1, about 400:1, about 600:1, about 800:1, about 1,000:1, about 1,200:1, about 1,400:1, about 1,600:1, about 1,800:1, or about 2000:1 polymer precursor:catalyst. In some embodiments, such catalysts can be used at a molar ratio of 10:1 to 400:1 polymer precursor:catalyst. For example in other embodiments, such catalysts can be used at a molar ratio of 5:1 to 100:1 polymer precursor:catalyst. For example, in some embodiments the molar ratio of polymer precursor to catalyst can be about 400:1. In other embodiments the molar ratio of polymer precursor to catalyst can be about 100:1. In other embodiments the molar ratio of polymer precursor to catalyst can be about 50:1. In other embodiments the molar ratio of polymer precursor to catalyst can be about 25:1. In other embodiments the molar ratio of polymer precursor to catalyst can be about 10:1. In one or more embodiments, the molar ratio of the polymer precursor to catalyst can be from about 5:1 to about 15:1, about 5:1 to about 25:1, about 3:1 to about 12:1, about 7:1 to about 13:1, about 10:1 to about 20:1, about 15:1 to about 40:1, about 20:1 to about 30:1, about 8:1 to about 12:1, about 6:1 to about 15:1, about 18:1 to about 32:1, about 25:1 to about 50:1, or about 7:1 to about 11:1. In certain of the foregoing embodiments, the polymer precursor includes a phenolic compound such as resorcinol and/or phenol.

In the specific embodiment wherein one of the polymer precursors is resorcinol and another polymer precursor is formaldehyde, the resorcinol to catalyst ratio can be varied to obtain the desired properties of the resultant polymer gel and carbon materials. In some embodiments of the methods described herein, the molar ratio of resorcinol to catalyst can be from a low of about 1:1, about 3:1, about 5:1, about 7:1, about 10:1, about 15:1, about 20:1, about 25:1, about 30:1, about 40:1, or about 50:1 to a high of about 100:1, about 150:1, about 200:1, about 300:1, about 400:1, about 600:1, about 800:1, about 1,000:1, about 1,200:1, about 1,400:1, about 1,600:1, about 1,800:1, or about 2,000:1. In other embodiments, the molar ratio of resorcinol to catalyst can be from about 5:1 to about 2,000:1 or the molar ratio of resorcinol to catalyst can be from about 10:1 to about 400:1. In further embodiments, the molar ratio of resorcinol to catalyst can be from about 5:1 to about 100:1. In further embodiments, the molar ratio of resorcinol to catalyst can be from about 25:1 to about 50:1. In further embodiments, the molar ratio of resorcinol to catalyst can be from about 15:1 to about 50:1. In further embodiments, the molar ratio of resorcinol to catalyst can be from about 10:1 to about 50:1. In some embodiments of the foregoing, the catalyst can be ammonium acetate.

In the specific embodiment where one of the polymer precursors is phenol and another polymer precursor is formaldehyde, the phenol to catalyst ratio can be varied to obtain the desired properties of the resultant polymer gel and carbon materials. In some embodiments of the methods described herein, the molar ratio of phenol to catalyst can be can be from a low of about 1:1, about 3:1, about 5:1, about 7:1, about 10:1, about 15:1, about 20:1, about 25:1, about 30:1, about 40:1, or about 50:1 to a high of about 100:1, about 150:1, about 200:1, about 300:1, about 400:1, about 600:1, about 800:1, about 1,000:1, about 1,200:1, about 1,400:1, about 1,600:1, about 1,800:1, or about 2000:1. In other embodiments, the molar ratio of resorcinol to catalyst can be from about 5:1 to about 2000:1 or the molar ratio of phenol to catalyst can be from about 10:1 to about 400:1. In further embodiments, the molar ratio of phenol to catalyst can be from about 5:1 to about 100:1. In further embodiments, the molar ratio of phenol to catalyst can be from about 25:1 to about 50:1. In further embodiments, the molar ratio of phenol to catalyst can be from about 25:1 to about 50:1. In further embodiments, the molar ratio of phenol to catalyst can be from about 100:1 to about 5:1. In some embodiments of the foregoing, the catalyst can be ammonium acetate.

In the specific embodiment wherein one of the polymer precursors is a mixture of phenol resorcinol and formaldehyde, the phenol/resorcinol to catalyst ratio can be varied to obtain the desired properties of the resultant polymer gel and carbon materials. In some embodiments of the methods described herein, the molar ratio of phenol/resorcinol to catalyst can be can be from a low of about 1:1, about 3:1, about 5:1, about 7:1, about 10:1, about 15:1, about 20:1, about 25:1, about 30:1, about 40:1, or about 50:1 to a high of about 100:1, about 150:1, about 200:1, about 300:1, about 400:1, about 600:1, about 800:1, about 1,000:1, about 1,200:1, about 1,400:1, about 1,600:1, about 1,800:1, or about 2000:1. In other embodiments, the molar ratio of resorcinol to catalyst can be from about 5:1 to about 2000:1 or the molar ratio of phenol/resorcinol to catalyst can be from about 10:1 to about 400:1. In further embodiments, the molar ratio of phenol/resorcinol to catalyst can be from about 5:1 to about 100:1. In further embodiments, the molar ratio of phenol/resorcinol to catalyst can be from about 25:1 to about 50:1. In further embodiments, the molar ratio of phenol/resorcinol to catalyst can be from about 25:1 to about 50:1. In further embodiments, the molar ratio of phenol/resorcinol to catalyst can be from about 100:1 to about 5:1. In some embodiments of the foregoing, the catalyst can be ammonium acetate.

In still other embodiments, the method comprises admixing an acid with the mixture, the polymer phase and/or the continuous phase. The acid may be selected from any number of acids suitable for the polymerization process. For example, in some embodiments the acid can be or include acetic acid, in other embodiments the acid can be or include oxalic acid, and in other embodiments the acid can be or include a mixture of acetic acid and oxalic acid. In one or more embodiments, the acid can be mixed with the first or second solvent in a ratio of acid to solvent from a low of about 1:100, about 1:90, about 1:50, about 1:10, about 1:5, about 1:4, about 1:3, or about 1:2 to a high of about 2:1, about 3:1, about 4:1, about 5:1, about 10:1, about 50:1, or about 100:1. In further embodiments, the acid can be mixed with the first or second solvent in a ratio of acid to solvent of 99:1, 90:10, 75:25, 50:50, 25:75, 20:80, 10:90 or 1:90. In other embodiments, the acid is acetic acid and the first or second solvent is water. In other embodiments, acidity is provided by adding a solid acid to the emulsion, suspension or gel formulation.

The total content of acid in the reaction mixture can be varied to alter the properties of the final product. In some embodiments, the acid can be present in an amount from a low of about 1%, about 3%, about 5%, about 10%, about 15%, about 20%, about 25%, about 30%, or about 40% to a high of about 50%, about 55%, about 60%, about 70%, or about 75% by weight of the monomer component. In other embodiments, the acid can be present in an amount from about 5% to about 50%, about 5% to about 15%, about 10% to about 25%, about 15% to about 35%, about 15% to about 45%, about 25% to about 45%, or about 30% to about 50% by weight of the monomer component. In other embodiments, the acid can be present in an amount from about 5% to about 40%, for example about 5%, about 10%, about 15%, about 20%, about 25%, about 30%, about 35%, about 40%, about 45%, or about 50% by weight of the monomer component.

Suitable polycarboxylic acids can include dicarboxylic acids, tricarboxylic acids, tetracarboxylic acids, pentacarboxylic acids, and the like, monomeric polycarboxylic acids, anhydrides, and any combination thereof, as well as polymeric polycarboxylic acids, anhydrides, and any combination thereof. Preferably, the polycarboxylic acid ammonium salt reactant is sufficiently non-volatile to maximize its ability to remain available for reaction with the carbohydrate reactant of a Maillard reaction. Again, partially pre-reacting the mixture of the source of the carbohydrate and the amine reactant can expand the list of suitable amine reactants, including polycarboxylic acid ammonium salt reactants. In another example, polycarboxylic acid ammonium salt reactants can be substituted with other chemical functional groups.

Illustrative monomeric polycarboxylic acids can include, but are not limited to, unsaturated aliphatic dicarboxylic acids, saturated aliphatic dicarboxylic acids, aromatic dicarboxylic acids, unsaturated cyclic dicarboxylic acids, saturated cyclic dicarboxylic acids, hydroxy-substituted derivatives thereof, and the like. Other suitable polycarboxylic acids can include unsaturated aliphatic tricarboxylic acids, saturated aliphatic tricarboxylic acids such as citric acid, aromatic tricarboxylic acids, unsaturated cyclic tricarboxylic acids, saturated cyclic tricarboxylic acids, hydroxy-substituted derivatives thereof, and the like. It is appreciated that any such polycarboxylic acids can be optionally substituted, such as with hydroxy, halo, alkyl, alkoxy, and the like. Other suitable polycarboxylic acids can include, but are not limited to, aconitic acid, adipic acid, azelaic acid, butane tetracarboxylic acid dihydride, butane tricarboxylic acid, chlorendic acid, citraconic acid, dicyclopentadiene-maleic acid adducts, diethylenetriamine pentaacetic acid, adducts of dipentene and maleic acid, ethylenediamine tetraacetic acid (EDTA), fully maleated rosin, maleated tall-oil fatty acids, fumaric acid, glutaric acid, isophthalic acid, itaconic acid, maleated rosin oxidized with potassium peroxide to alcohol then carboxylic acid, maleic acid, malic acid, mesaconic acid, biphenol A or bisphenol F reacted via the KOLBE-Schmidt reaction with carbon dioxide to introduce 3-4 carboxyl groups, oxalic acid, phthalic acid, sebacic acid, succinic acid, tartaric acid, terephthalic acid, tetrabromophthalic acid, tetrachlorophthalic acid, tetrahydrophthalic acid, trimellitic acid, trimesic acid, and the like, and anhydrides, and any combination thereof.

Suitable polymeric polycarboxylic acids can include organic polymers or oligomers containing more than one pendant carboxy group. The polymeric polycarboxylic acid can be a homopolymer or copolymer prepared from unsaturated carboxylic acids that can include, but are not limited to, acrylic acid, methacrylic acid, crotonic acid, isocrotonic acid, maleic acid, cinnamic acid, 2-methylmaleic acid, itaconic acid, 2-methylitaconic acid, α,β-methyleneglutaric acid, and the like. The polymeric polycarboxylic acid can also be prepared from unsaturated anhydrides. Unsaturated anhydrides can include, but are not limited to, maleic anhydride, itaconic anhydride, acrylic anhydride, methacrylic anhydride, and the like, as well as mixtures thereof.

Preferred polymeric polycarboxylic acids can include polyacrylic acid, polymethacrylic acid, polymaleic acid, and the like. Examples of commercially available polyacrylic acids include AQUASET-529 (Rohm & Haas, Philadelphia, Pa., USA), CRITERION 2000 (Kemira, Helsinki, Finland, Europe), NF1 (H. B. Fuller, St. Paul, Minn., USA), and SOKALAN (BASF, Ludwigshafen, Germany, Europe). With respect to SOKALAN, this is believed to be a water-soluble polyacrylic copolymer of acrylic acid and maleic acid, having a molecular weight of approximately 4,000. AQUASET-529 is understood to be a composition containing polyacrylic acid cross-linked with glycerol, also containing sodium hypophosphite as a catalyst. CRITERION 2000 is thought to be an acidic solution of a partial salt of polyacrylic acid, having a molecular weight of approximately 2,000. NF1 is believed to be a copolymer containing carboxylic acid functionality and hydroxy functionality, as well as units with neither functionality; NF1 is also thought to contain chain transfer agents, such as sodium hypophosphite or organophosphate catalysts.

The amine reactant for reaction with the polycarboxylic acid can include, but is not limited to, ammonia, a primary amine, i.e., $NH_2R^1$, and a secondary amine, i.e., $NHR^1R^2$, where $R^1$ and $R^2$ are each independently selected from the group consisting of: an alkyl, a cycloalkyl, an alkenyl, a cycloalkenyl, a heterocyclyl, an aryl, and a heteroaryl group. The amine base can be volatile or substantially non-volatile under conditions sufficient to promote reaction among the mixture of Maillard reactants during any partial pre-reaction or during thermal cure of the binder composition. Suitable amine bases can include, but are not limited to, a substantially volatile base, a substantially non-volatile base, or a combination thereof. Illustrative substantially volatile bases can include, but are not limited to, ammonia, ethylamine, diethylamine, dimethylamine, ethylpropylamine, or any combination thereof. Illustrative substantially non-volatile bases can include, but are not limited to, aniline, 1-naphthylamine, 2-naphthylamine, para-aminophenol, or any combination thereof.

One example of the mixture of Maillard reactants includes a mixture of aqueous ammonia, citric acid, and dextrose (glucose). In this mixture, the ratio of the number of molar equivalents of acid salt groups present on the polycarboxylic, citric acid reactant (produced upon neutralization of the —COOH groups of the citric acid by ammonia) to the number of molar equivalents of hydroxyl groups present on the carbohydrate reactant(s) can range from about 0.04:1 to about 0.15:1. Thus, in one embodiment, the number of molar equivalents of hydroxyl groups present on the dextrose, carbohydrate reactant can be about twenty five-fold greater than the number of molar equivalents of acid salt groups present on the polycarboxylic, citric acid reactant. In another embodiment, the number of molar equivalents of hydroxyl groups present on the dextrose carbohydrate reactant is about ten-fold greater than the number of molar equivalents of acid salt groups present on the polycarboxylic citric acid reactant. In yet another embodiment, the number of molar equivalents of hydroxyl groups present on the dextrose carbohydrate reactant is about six-fold greater than the number of molar equivalents of acid salt groups present on the polycarboxylic citric acid reactant.

As noted above, the mixture of Maillard reactants can include a source of a carbohydrate and an amine reactant capable of participating in a Maillard reaction therewith. Also, as noted above, the mixture of Maillard reactants can include a partially reacted mixture of a source of a carbohydrate and an amine reactant. For example, the source of a carbohydrate can be mixed with an amine reactant capable of participating in a Maillard reaction with the source of the carbohydrate and the mixture can be heated to a temperature from a low of about 40° C., about 50° C., about 60° C., or about 70° C. to a high of about 80° C., about 90° C., about 95° C., about 100° C., about 110° C., about 120° C., about 130° C., about 140° C., or about 150° C. for a time sufficient to initiate the Maillard reaction(s), but not allow the reaction(s) to proceed to completion, before finally formulating the binder composition. Suitable Maillard reactants and Maillard reaction products can be as discussed and described in U.S. Patent Application Publication No. 2009/0301972.

In one or more embodiments, the monomer component of the phenolic compound and the crosslinking compound can be partially or completely replaced with one or more hydrocarbon resins. Illustrative hydrocarbon resins can include, but are not limited to, a polyethylene, a polypropylene, an ethylene vinyl acetate, an ethylene ethyl acrylate, polyurethane, natural polymers, a styrene-isoprene-styrene, an acrylonitrile-butadiene-styrene, a styrene-butadiene-styrene, a polystyrene, a polyurethane, an acrylic polymer, a polyvinyl chloride, a fluoroplastic, a pine rosin (e.g., tall oil rosin, wood rosin, and gum rosin), a modified rosin (e.g., disproportionated rosins, hydrogenated rosins, polymerized or oligomerized rosins, diels-alder rosin adducts), a rosin ester (e.g., hydrogenated rosin esters, polymerized rosin esters, phenolic-modified rosin esters, dibasic acid-modified rosin esters; the rosin esters can be derived from tall oil rosin, wood rosin, and/or gum rosin), a polysulfide, a styrene-acrylonitrile, a nylon, a phenol-formaldehyde novolac resin, or any combination thereof. Other illustrative hydrocarbon resins can include, but are not limited to, oligomers of $C_5$ hydrocarbons (e.g., oligomers of cyclopentadiene), oligomers of $C_9$ hydrocarbons (e.g., oligomers of alpha-methylstyrene and vinyl toluene, often referred to as aromatic hydrocarbon tackifiers), terpene resins (e.g., oligomers of terpenes such as alpha-pinene, beta-pinene, and limonene), oligomeric reaction products of terpenes and phenolics, coumarone-indene resins, oligomeric reaction products of terpenes and styrenics, cycloaliphatic resins (e.g., dicyclopentadiene-based resins), crude tall oil, distilled tall oil, or any combination thereof. The hydrocarbon resin, if present, can be added prior to polymerization, during polymerization, and/or after polymerization been completed.

In another example, the crosslinking compound in the monomer component can be at least partially replaced with one or more carbohydrates. The one or more carbohydrates can include one or more monosaccharides, disaccharides, oligosaccharides, polysaccharides, or any combinations thereof. In one or more embodiments, the one or more carbohydrates can include one or more aldose sugars. In one or more embodiments, the monosaccharide can be or include D-Glucose (dextrose monohydrate), L-Glucose, or a combination thereof. Other carbohydrate aldose sugars can include, but are not limited to, glyceraldehyde, erythrose, threose, ribose, deoxyribose, arabinose, xylose, lyxose, allose, altrose, gulose, mannose, idose, galactose, talose, and any combination thereof. The carbohydrate can also be or include one or more reduced or modified starches such as dextrin, maltodextrin, and oxidized maltodextrins.

Although a surfactant is not required (and is not present in certain embodiments), some embodiments include use of a surfactant. The surfactant may be admixed with the mixture, the polymer phase and/or the continuous phase or included in the process in any other appropriate manner. In some embodiments which include a surfactant, the polymer phase is pre-reacted prior to mixing with the continuous phase such the polymer precursors are at least partially polymerized.

The surfactant may be selected from any number of surfactants which are useful for emulsifying two immiscible solutions. For example, in some embodiments the surfactant comprises a non ionic surfactant. For example, the non ionic surfactant can be a sorbitan surfactant such as SPAN™ 80, SPAN™ 85, SPAN™ 65, SPAN™ 60, SPAN™ 40, SPAN™ 20, TWEEN® 80, TWEEN® 40, TWEEN® 20, TWEEN® 21, TWEEN® 60, Triton-X® 100, or any mixture thereof. In another example, the surfactant can be or include a non-ionic surfactant having a molecular weight of from about 100 Daltons to about 2,000 Daltons. In one or more embodiments, suitable non-ionic surfactants can have a molecular weight from a low of about 100, about 200, about 300, about 400, about 500, about 600, about 700, about 800, or about 900 to a high of about 1,100, about 1,300, about 1,500, about 1,700, about 1,900, about 2,100, about 2,300, about 2,500, about 2,700, about 3,000, about 3,300, about 3,500, about 3,700, or about 4,000 Daltons. In certain embodiments, the surfactant can be or include SPAN™ 80. In other embodiments, the surfactant can be or include SPAN™ 20. In other embodiments polyfunctional alcohols such as ethyl cellulose, glycol, alkyl ethers can be used as stabilizers and/or surfactants.

Such surfactants are well known in the art and are available commercially from a number of sources, including Sigma-Aldrich, St. Louis Mo. While not wishing to be bound by theory, it is believed that the amount of surfactant present in the mixture may be a parameter that can be modified to control the physical properties of the resulting gel and/or carbon materials. For example, surfactant concentrations less than or equal to about 2% may be associated with mesoporous carbons, while higher surfactant concentrations may be associated with microporous carbons. However, high concentrations of surfactant (e.g., greater than about 30%) do not appear to be as effective. While surfactant may be desirable in some embodiments, it is not required in all embodiments of the disclosed methods.

In some embodiments when a surfactant is present, the reaction mixture can include from a low of about 0.01%, about 0.05%, about 0.1%, about 0.5%, about 1%, about 1.5%, about 2%, about 3%, or about 5% to a high of about 7%, about 10%, about 12%, about 14%, about 16%, about 18%, about 20%, about 22%, about 24%, or about 26% surfactant (w/w). For example, the reaction mixture can include from about 0.2% to about 20%, about 0.6% to about 15%, about 4% to about 13%, about 7% to about 14%, about 9% to about 11%, or about 8% to about 14% surfactant (w/w). In other embodiments, the reaction mixture can include from about 0.1% to about 10% surfactant (w/w), for example about 5% surfactant (w/w). In other embodiments, the reaction mixture can include from about 0.1% to about 2% surfactant (w/w), for example about 0.5% or about 1% surfactant (w/w). In other embodiments, the reaction mixture can include from about 0.01% to about 1.0% surfactant (w/w), for example about 0.1% to about 1.0% surfactant (w/w). In other embodiments, the reaction mixture can include from about 1.0% to about 2.0% surfactant (w/w). In other embodiments, the reaction mixture can include from about 2.0% to about 5.0% surfactant (w/w). In other embodiments, the reaction mixture can include from about 5.0% to about 10% surfactant (w/w). In some certain embodiments, the reaction mixture can include about 0.1%, about 0.2%, about 0.3%, about 0.4%, about 0.5%, about 0.6%, about 0.7%, about 0.8%, about 0.9%, about 1.0%, about 1.1%, about 1.2%, about 1.3%, about 1.4%, about 1.5%, about 1.6%, about 1.7%, about 1.8%, about 1.9% or about 2.0% surfactant (w/w). In other embodiments, the reaction mixture comprise from about 9.0% to about 11.0%, from about 0.05% to about 1.1% surfactant or from about 0.9% to about 1.1% surfactant (w/w).

In some embodiments, the surfactant level can be at a concentration above the CMC. In other embodiments, the surfactant level can be at a concentration below the CMC. For example, the surfactant level can be present at a concentration less than 100%, less than 95%, less than 90%, less than 85%, less than 80%, less than 75%, less than 70%, less than 65%, less than 60%, less than 55%, less than 50%, less than 45%, less than 40%, less than 35%, less than 30%, less than 25%, less than 20%, less than 15%, less than 10%, less than 5%, less than 3%, less than 2%, less than 1%, less than 0.5%, less than 0.3%, less than 0.1%, less than 0.05%, or less than 0.01% of the CMC. In at least one specific embodiment, the emulsion, suspension, or combination thereof can be free from any surfactant.

The continuous phase is another process parameter that may be varied to obtain the desired properties (e.g., surface area, porosity, purity, particle size etc.) of the polymer gels and carbon materials. For example, the present inventors have surprisingly discovered that by careful selection of the continuous phase, the porosity of the final polymer gel and carbon materials can be controlled (see data provided in Examples). Thus, the present methods provide the ability to prepare carbon materials (and the precursor gels) having any desired porosity. A further advantage of careful selection of the continuous phase is in the scaleability of the process. For example, when continuous phases are selected which have low toxicity, flammability, etc., the process is more amenable to scale up than other known polymer processes.

A further advantage of certain embodiments of the present methods is that the continuous phase can be selected to obtain a desired particle size of the resulting gel particles. Experiments performed in support of the present invention unexpectedly revealed that the particle size of the gel particles can vary significantly while the pore structure remains substantially the same. Accordingly, the methods allow a great deal of flexibility to tailor the particle size to obtain optimum processing properties (e.g., filtration, pyrolysis, and the like) without sacrificing control over the pore structure of the final gel or carbon product. Further, in certain embodiments the particle size of the ultimate carbon material can be tailored by choice of continuous phase (or other process parameters described herein) without the need for milling or other physical means of particle sizing.

Continuous phase properties which have been shown to affect the particle size of the gel particles include viscosity and molecular weight (e.g., hydrocarbon chain length). Continuous phases having various viscosities are useful for implementation of the methods, and the viscosity of the continuous phase is not particularly limited. In certain embodiments of the methods a continuous phase is selected which has a viscosity at 25° C. from a low of about 1.0 cP, about 3 cP, about 5 cP, about 7 cP, about 10 cP, about 15 cP, about 25 cP, about 40 cP, or about 60 cP to a high of about 100 cP, about 125 cP, about 150 cP, about 175 cP, about 200 cP, about 225 cP, about 250 cP, about 275 cP, about 300 cP, about 400 cP, or about 500 cP. For example, certain embodiments can employ a continuous phase having a viscosity at 25° C. of from about 2.5 cP to about 200 cP or about 5 cP to about 100 cP. In other embodiments, the continuous phase can have a viscosity at 25° C. of about 10 cP, about 20 cP, about 30 cP or about 40 cP. In various embodiments, the viscosity of the continuous phase can be determined at 80° C. and can be from a low of about <1.0 cP to about 100 cP. For example, certain embodiments employ a continuous phase having a viscosity at 80° C. of from a low of about 1 cP, about 2.5 cP, about 5 cP, about 10 cP, about 20 cP, or about 30 cP to a high of about 40 cP, about 50 cP, about 60 cP, about 70 cP, about 80 cP, about 90 cP, or about 100 cP. In another embodiment, the continuous phase can have a viscosity at 80° C. of from about 1 cP to about 75 cP or about 2.5 cP to about 50 cP. In other embodiments, the continuous phase viscosity at 80° C. can be about ScP, about 10 cP, about 20 cP or about 30 cP. In other embodiments it may be desirable to have the viscosity of the continuous phase change during or throughout the process. For example a higher viscosity may be desirable during the particle formation step and a lower viscosity could be beneficial during the separation step. In other embodiments the desired viscosity targets may be reversed.

The hydrocarbon chain length of certain continuous phases (e.g., paraffinic oils) can also be varied to obtain gels and carbon materials having desired properties, such as particle size. The hydrocarbon chain length of the continuous phase or carrier fluid can be from a low of about 10 carbons, about 15 carbons, about 20 carbons, about 25 carbons, or about 30 carbons to a high of about 50 carbons, about 60 carbons, about 70 carbons, about 80 carbons, about 90 carbons, or about 100 carbons. For example, the hydrocarbon chain length of the continuous phase or carrier fluid can be from about 15 carbons to about 40 carbons, about 10 carbons to about 20 carbons, about 10 carbons to about 35 carbons, about 15 carbons to about 50 carbons, about 20 carbons to about 40 carbons, about 20 carbons to about 60 carbons, about 25 carbons to about 35 carbons, about 25 carbons to about 40 carbons, about 25 carbons to about 45 carbons, about 30 carbons to about 40 carbons, about 30 carbons to about 45 carbons, or about 30 carbons to about 50 carbons. In certain embodiments, the hydrocarbon chain length can be about 20 carbons, about 25 carbons, about 30 carbons, about 35 carbons or about 40 carbons. In one or more embodiments, about 50% or more of the continuous phase or carrier fluid can have a hydrocarbon chain length from a low of about 10 carbons, about 15 carbons, about 20 carbons, about 25 carbons, or about 30 carbons to a high of about 50 carbons, about 60 carbons, about 70 carbons, about 80 carbons, about 90 carbons, or about 100 carbons. In one or more embodiments, about 60% or more of the continuous phase or carrier fluid can have a hydrocarbon chain length from a low of about 10 carbons, about 15 carbons, about 20 carbons, about 25 carbons, or about 30 carbons to a high of about 50 carbons, about 60 carbons, about 70 carbons, about 80 carbons, about 90 carbons, or about 100 carbons. In one or more embodiments, about 70% or more of the continuous phase or carrier fluid can have a hydrocarbon chain length from a low of about 10 carbons, about 15 carbons, about 20 carbons, about 25 carbons, or about 30 carbons to a high of about 50 carbons, about 60 carbons, about 70 carbons, about 80 carbons, about 90 carbons, or about 100 carbons. In one or more embodiments, about 80% or more of the continuous phase or carrier fluid can have a hydrocarbon chain length from a low of about 10 carbons, about 15 carbons, about 20 carbons, about 25 carbons, or about 30 carbons to a high of about 50 carbons, about 60 carbons, about 70 carbons, about 80 carbons, about 90 carbons, or about 100 carbons. In one or more embodiments, about 90% or more of the continuous phase or carrier fluid can have a hydrocarbon chain length from a low of about 10 carbons, about 15 carbons, about 20 carbons, about 25 carbons, or about 30 carbons to a high of about 50 carbons, about 60 carbons, about 70 carbons, about 80 carbons, about 90 carbons, or about 100 carbons. In one or more embodiments, about 100% of the continuous phase or carrier fluid can have a hydrocarbon chain length from a low of about 10 carbons, about 15 carbons, about 20 carbons, about 25 carbons, or about 30 carbons to a high of about 50 carbons, about 60 carbons, about 70 carbons, about 80 carbons, about 90 carbons, or about 100 carbons.

The continuous phase not only affects particle formation (size) as mentioned above; it also affects fouling. Some important criteria for proper continuous phase selection are: a) type and amount of functional groups present in continuous phase chemical structure; b) saturated or unsaturated chemical structure; c) specific gravity; d) viscosity; and e) surface tension In some embodiments, the shear rate is found to affect particle size and fouling. Low shear rate is believed to create larger particles. Combining proper continuous phase with low shear rate may provide benefits for both particle formation and fouling reduction.

Particle formation temperature has been shown to affect particle size and fouling. In one embodiment, lower particle formation (e.g., 65° C.) helped to reduce fouling and produce slightly larger particles.

In some embodiments of the method, the polymer phase and the continuous phase or carrier fluid are not miscible with each other and an emulsion or suspension is formed. In other embodiments the polymer phase and continuous phase or carrier fluid are miscible or partially miscible with each other. In these cases the polymer phase may become less miscible with the continuous phase over the course of the reaction. In this respect, certain embodiments are directed to methods wherein the optional solvent is an aqueous and/or polar solvent and the continuous phase is an organic and/or nonpolar solvent. Suitable aqueous and/or polar solvents include, but are not limited to, water, water/acetic acid, alcohols (e.g., ethanol, methanol, etc.), polar ethers (e.g., PEG, etc.), organic acids (e.g., acetic) and mixtures thereof. Illustrative alcohols can include, but are not limited to, methanol, ethanol, propanol, isopropanol, butanol, and the like, and mixtures thereof. Other suitable liquid mediums can include, but are not limited to, acetone, tetrahydrofuran, benzene, toluene, xylene, ethylbenzene, cumene, mesitylene, or mixtures thereof. In certain embodiments, the optional solvent is present. In certain embodiments, the optional solvent is present and comprises water. For example, in some embodiments, the polymer phase comprises water or an acetic acid/water mix.

Suitable organic and/or nonpolar solvents for use as a continuous phase or carrier fluid include hydrocarbon solvents, aromatic solvents, oils, nonpolar ethers, ketones and the like. For example, suitable organic and/or nonpolar solvents include, but are not limited to hexane, cyclohexane, pentane, cyclopentane, benzene, toluene, xylenes, diethyl ether, ethylmethylketone, dichlormethane, tetrahydrorfuran, mineral oils, paraffin oils, isopariffic fluids, vegetable derived oils and any and all water insoluble fluids could be used by those knowledgeable in the art. In some embodiments, the continuous phase is an organic solvent, for example a hydrocarbon solvent. In more specific embodiments, the continuous phase is cyclohexane, mineral oil, paraffinic oil, xylene, isoparaffinic oils or combinations thereof. In other embodiments, the continuous phase is cyclohexane, paraffinic oil, xylene, isoparaffinic oil or combinations thereof. In some specific embodiments, the continuous phase comprises paraffinic oil. In other specific embodiments, the optional solvent is present and comprises water and the continuous phase comprises cyclohexane, mineral oil, xylene, water or combinations thereof. In certain embodiments, the viscosity of the continuous phase is selected such that certain properties (e.g., particle size) of the polymer gel are controlled.

In one or more embodiments, the continuous phase or carrier fluid can be or include one or more hydrocarbons, water, or a combination thereof. Illustrative carrier fluids can include paraffinic oils, naphthenic oils, aromatic oils, or any combination thereof. Illustrative paraffinic hydrocarbons can include mineral oils or any thereof. Suitable mineral oils include one or more alkanes having from about 15 to about 40 carbon atoms. Illustrative naphthenic oils can be hydrocarbons based on cycloalkanes. Illustrative cycloalkanes can include, but are not limited to cyclohexane, cycloheptane, cyclooctane, cyclononane, cyclodecane, or any combination thereof. Another suitable carrier fluid can be or include one or more plant based or plant derived oils. Illustrative plant based or plant derived oils can include, but are not limited to, such as linseed (flaxseed) oil, castor oil, tung oil, soybean oil, cottonseed oil, olive oil, canola oil, corn oil, sunflower seed oil, peanut oil, coconut oil, safflower oil, palm oil, vegetable oil, or any combination thereof. Suitable commercially available vegetable oils can include, but are not limited to, those sold under the tradename WESSON® and sold by CONAGRA FOODS®, such as the vegetable oil, canola oil, corn oil, blended oils, and the like. Another suitable carrier fluid can be or include one or more chlorinated hydrocarbons. Illustrative chlorinated hydrocarbons can include, but are not limited to, carbon tetrachloride, chloroform, methylene chloride, or any combination thereof. Any type of water can be used as the carrier fluid or to make-up at least a portion of the carrier fluid. For example, the water can be distilled water, deionized water, or a combination thereof.

The use of a carrier fluid that contains or includes water can reduce the cost associated with the production of the polymer particles in gel form as compared to the use of hydrocarbons. The use of a carrier fluid that contains or includes water can also allow for an increased concentration of the monomer component relative to the carrier fluid as compared to a carrier fluid that contains one or more hydrocarbons and is free or substantially free of water, e.g., less than 5 wt % water. In other words, a carrier fluid that is or includes a majority of water, e.g., greater than about 50 wt % water, can allow for a more concentrated suspension and/or emulsion to be formed as compared to when the carrier fluid is or includes a majority of non-water fluid(s), e.g., greater than about 50 wt % hydrocarbons. The use of a carrier fluid that is or includes water may also at least partially remove any residual carrier fluid composed of one or more hydrocarbons. In one or more embodiments, the carrier fluid used to form the reaction mixture can have a water concentration from a low of about 1 wt %, about 3 wt %, about 5 wt %, about 10 wt %, about 15 wt %, about 20 wt %, about 25 wt %, about 30 wt %, about 35 wt %, or about 40 wt % to a high of about 50 wt %, about 55 wt %, about 60 wt %, about 65 wt %, about 70 wt %, about 75 wt %, about 80 wt %, about 85 wt %, about 90 wt %, about 95 wt %, or about 100 wt %. In one or more embodiments, the carrier fluid used to form the reaction mixture can be free from any water.

The carrier fluid can have a boiling point at atmospheric pressure of about 40° C. or more, about 50° C. or more, about 60° C. or more, about 70° C. or more, about 80° C. or more, about 90° C. or more, about 100° C. or more, about 110° C. or more, about 120° C. or more, about 130° C. or more, about 140° C. or more, about 150° C. or more, about 175° C. or more, about 200° C. or more, about 225° C. or more, or about 250° C. or more. The carrier fluid can have a boiling point at the conditions the monomer component undergoes polymerization of about 40° C. or more, about 50° C. or more, about 60° C. or more, about 70° C. or more, about 80° C. or more, about 90° C. or more, about 100° C. or more, about 110° C. or more, about 120° C. or more, about 130° C. or more, about 140° C. or more, about 150° C. or more, about 175° C. or more, about 200° C. or more, about 225° C. or more, or about 250° C. or more The carrier fluid can have a flash point greater than about −25° C., greater than about −20° C., greater than about −10° C., greater than about 0° C., greater than about 10° C., greater than about 20° C., greater than about 30° C., greater than about 40° C., greater than about 50° C., or greater than about 60° C.

In one or more embodiments, the carrier fluid can be free or essentially free of cycloalkanes, e.g., cyclohexane, cycloheptane, cyclooctane, and the like. As used herein, the phrase "essentially free of cycloalkanes" refers to a carrier fluid that contains less than 3 wt %, less than 2 wt %, less than 1 wt %, less than 0.9 wt %, less than 0.8 wt %, less than 0.7 wt %, less than 0.6 wt %, less than 0.5 wt %, less than 0.4 wt %, less than 0.3 wt %, less than 0.2 wt %, less than 0.1 wt %, less than 0.07 wt %, less than 0.05 wt %, less than 0.03 wt %, or less than 0.01 wt % cycloalkanes. In one or more embodiments, the carrier fluid can be free or essentially free, e.g. less than 1 wt %, of cycloalkanes, e.g., cyclohexane. As such, it should also be noted that one other difference between the suspension and/or emulsion polymerization process and the conventional inverse emulsion polymerization process used to produce polymer particles in gel form can be that the use of cyclohexane as the carrier fluid can be avoided. Similarly, another difference between the suspension and/or emulsion polymerization process and the conventional inverse emulsion polymerization process used to produce polymer particles in gel form can be that the use of cycloalkanes as the carrier fluid can be avoided.

In one or more embodiments, the carrier fluid can be or include one or more cycloalkanes, e.g., cyclohexane, cycloheptane, cyclooctane, and the like. For example, the carrier fluid can include one or more cycloalkanes in an amount from a low of about 0.1 wt %, about 1 wt %, about 3 wt %, about 5 wt %, about 10 wt %, about 20 wt %, about 30 wt %, or about 40 wt % to a high of about 50 wt %, about 60 wt %, about 70 wt %, about 80 wt %, about 90 wt %, or about 100 wt %, based on the total weight of the carrier fluid. Said another way, in at least one specific embodiment, the carrier fluid can include any amount of a cycloalkane or any amount of a combination of cycloalkanes. In at least one embodiment, the amount of cyclohexane in the carrier fluid can range from about 1 wt % to about 20 wt %, about 10 wt % to about 30 wt %, about 20 wt % to about 40 wt %, about 30 wt % to about 50 wt %, about 40 wt % to about 60 wt %, about 50 wt % to about 70 wt %, about 60 wt % to about 80 wt %, about 70 wt % to about 90 wt %, or about 80 wt % to about 100 wt %. In one or more embodiments, the carrier fluid can be or include one or more cycloalkanes in an amount of 100 wt %, less than 95 wt %, less than 90 wt %, less than 85 wt %, less than 80 wt %, less than 75 wt %, less than 70 wt %, less than 65 wt %, less than 60 wt %, less than 55 wt %, less than 50 wt %, less than 45 wt %, less than 40 wt %, less than 35 wt %, less than 30 wt %, less than 25 wt %, less than 20 wt %, less than 15 wt %, less than 10 wt %, less than 5 wt %, less than 4 wt %, less than 3 wt %, less than 2 wt %, or less than 1 wt %. In one or more embodiments, the carrier fluid can be or include one or more cycloalkanes in an amount of at least 1 wt %, at least 2 wt %, at least 3 wt %, at least 4 wt %, at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %.

In one or more embodiments, the carrier fluid can be or include one or more hydrocarbons, e.g., paraffinic hydrocarbons, naphthenic hydrocarbons, aromatic hydrocarbons, plant based or plant derived oils, mineral oils, and/or chlorinated hydrocarbons, having a wide range of carbon atoms. For example, the carrier fluid can be or include one or more hydrocarbons having at least 6, at least 8, at least 10, at least 12, at least 14, at least 16, at least 18, at least 20, at least 22, at least 24, at least 26, at least 28, at least 30, at least 32, at least 34, at least 36, at least 38, at least 40, at least 42, at least 44, at least 46, at least 48, at least 50, at least 52, at least 54, at least 56, at least 58, or at least 60 carbon atoms. For example, the carrier fluid can include one or more hydrocarbons having from a low of about 6, about 8, about 10, about 12, about 14, about 16, about 18, about 20, about 22, about 24, about 26, about 28, or about 30 to a high of about 32, about 34, about 36, about 38, about 40, about 42, about 44, about 46, about 58, about 50, about 60, about 70, about 80, about 90, about 100, about 110, about 120, about 130, about 140, or about 150 carbon atoms.

In one or more embodiments, the carrier fluid can be or include a hydrocarbon having at least 8 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 10 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 12 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 14 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 16 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 18 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 20 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 22 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 24 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 26 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 28 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 30 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 32 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 34 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 36 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 38 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, the carrier fluid include a hydrocarbon having at least 40 carbon atoms in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In one or more embodiments, suitable hydrocarbons having at least 8, 10, 12, 14, 16, 18, 20, 22, 24, 26, 28, 30, 32, 34, 36, 38, or 40 carbon atoms can have up to about 40, about 50, about 60, about 70, about 80, about 100, about 110, about 120, about 130, about 140, or about 150 carbon atoms.

In some embodiments the continuous phase can be selected to be amenable for large scale production. In this regard, continuous phase properties important for large scale production include low toxicity, low flammability, price and/or ease of removal from final product and the like. The continuous phase may also be selected to have high purity, which in turn may contribute to high purity of the final polymer gel and/or carbon material. In this regard, continuous phases having purities greater than 99%, greater than 99.5%, greater than 99.9%, greater than 99.99% or even greater than 99.999% may be used. In certain embodiments, the polymer precursor components are mixed together in a single aqueous phase and subsequently emulsified or suspended with an outer non-aqueous phase using techniques known in the art, and subsequently held for a time and at a temperature sufficient to at a temperature sufficient to achieve complete polymerization of precursors within the aqueous phase. In other embodiments, the precursor components are mixed together in a single aqueous phase, held for a time and at a temperature sufficient to achieve partial polymerization, and subsequently suspended in an outer non-aqueous phase using techniques known in the art, and subsequently held for a time and achieve complete polymerization of precursors within the aqueous phase. In this embodiment, the partial polymerization step may result in increased viscosity, allowing for control of polymer resin particle size depending on the emulsification/suspension energy conditions and viscosities of the partially polymerized aqueous phase and the non-aqueous phase. In other embodiments, the precursor components are mixed together in a single aqueous phase, held for a time and at a temperature sufficient to achieve partial polymerization, and subsequently suspended in an outer aqueous phase using techniques known in the art, and subsequently held for a time and achieve complete polymerization of precursors within the aqueous phase. In this embodiment, the partial polymerization step may result in increased viscosity, allowing for control of polymer resin particle size depending on the emulsification energy conditions, viscosities and immiscibility of the partially polymerized aqueous phase and the continuous aqueous phase. In other embodiments specific control of the viscosity of the polymer phase and the viscosity of the continuous phase might be chosen to enable suitable particle formation.

If any one or more of the components discussed and described herein include two or more different compounds, those two or more different compounds can be present in any ratio with respect to one another. For example, if the phenolic compound includes a first phenolic compound and a second phenolic compound, the phenolic compounds can have a concentration of the first phenolic compound ranging from about 1 wt % to about 99 wt % and conversely about 99 wt % to about 1 wt % of the second phenolic compound, based on the total weight of the first and second phenolic compound. In another example, the amount of the first phenolic compound can range from a low of about 5 wt %, about 10 wt %, about 15 wt %, about 20 wt %, about 25 wt % about 30 wt %, about 35 wt %, about 40 wt %, or about 45 wt % to a high of about 60 wt %, about 65 wt %, about 70 wt %, about 75 wt %, about 80 wt %, about 85 wt %, about 90 wt %, or about 95 wt %, based on the total weight of the first and second phenolic compounds. When the crosslinking compound, catalyst, and/or liquid medium includes two or more different compounds, those two or more different compounds can be present in similar amounts as the first and second phenolic compound.

The suspension and/or emulsion polymerization of the monomer component can be carried out in the presence of one or more filler materials. In other words, the suspension and/or emulsion can include one or more filler materials. The filler material can be combined with the monomer component, the prepolymer, the carrier fluid, or any combination thereof. The filler material can be or include solid particles, hollow particles, porous particles, or any combination thereof. Illustrative filler materials can include, but are not limited to, naturally occurring organic filler material such as pecan shells, inorganic oxides, inorganic carbides, inorganic nitrides, inorganic hydroxides, inorganic oxides having hydroxide coatings, inorganic carbonitrides, inorganic oxynitrides, inorganic borides, inorganic borocarbides, or any combination thereof. Material suitable for use as a filler material can include those discussed and described in U.S. Patent Application Publication Nos. 2006/0078682 and 2008/0277115. The filler material can be coated with the polymer in gel form to produce polymer particles in gel form having a core of the filler material and an outer layer of the gel disposed thereon. The particles in gel form can include a single filler component or filler particle or a plurality of filler components or filler particles. For example, the particles in gel form can include anywhere form about 1 discrete filler component to about 10, about 20, about 30, about 40, about 50, about 60, about 70, about 80, about 90, about 100, about 150, about 200, about 250, about 500, about 1,000, about 1,500, about 2,000, about 10,000, about 20,000 or more discrete filler components. The size of the filler component can, at least in part, dictate the number of particular filler component particles within any given polymer particle in gel form.

The suspension and/or emulsion polymerization of the monomer component can also be carried out in the presence of one or more tetra alkyl orthosilicates other orthosilicates to increase the yield, the crosslink density, and/or strength of the polymer particle in gel form. Illustrative tetra alkyl orthosilicates can include, but are not limited to, tetraethyl orthosilicate, tetramethyl orthosilicate (TMOS), or a combination thereof.

Metal ions can also be intentionally doped or added to the reactant mixture, the monomer component, the carrier fluid, the polymer particles in gel form, dried polymer particles produced by removing at least a portion of any of the liquid from the particles in gel form, the suspension and/or emulsion, or any combination thereof. For example, metal doped hydrocarbons such as metal doped furfural can be combined with the monomer component and/or the suspension and/or emulsion to add metals to the polymer particles in gel form and/or increase carbon yield.

A nitrogen-containing electrochemical modifier can be intentionally doped or added to the reactant mixture, the monomer component, the carrier fluid, the polymer particles in gel form, dried polymer particles produced by removing at least a portion of any of the liquid from the particles in gel form, the suspension and/or emulsion, or any combination thereof. For example, nitrogen-rich compounds can be combined with the monomer component and/or the suspension and/or emulsion to add nitrogen to the polymer particles in gel form. Adding or increasing the concentration of nitrogen in the polymer particles in gel form and/or dried form can improve the capacitance of one or more end products, e.g., carbonized particles. Illustrative nitrogen sources or nitrogen-containing electrochemical modifiers can include, but are not limited to, urea, melamine, nitric acid, or any combination thereof.

As an alternative to the suspension and/or emulsion polymerization methods discussed and described herein one or more alternative polymerizations processes can be used to produce the polymer particles in gel form and/or in a non-gel form. For example, one alternative processes, can include, but is not limited to, gas phase polymerization in which the monomer component is initially in the gaseous phase and the polymer particles form within the fluidized or gaseous medium.

It should also be noted that the monomer component, the prepolymer, or the combination thereof can further include one or more other additives. Illustrative additives can include, but are not limited to, sulfur, carbon black, antioxidants, zinc oxide, accelerators, cellulose, filler, rheology modifiers, thickeners, wetting agents, colorants, lubricants, leveling agents, UV stabilizers, plasticizers, silica, processing oils, softening oils, bloating agents, or any combination thereof. If one or more other additives are present in the monomer component, the total amount of the one or more other additives can be present in an amount from a low of about 0.001 wt %, about 0.01 wt %, about 0.1 wt %, about 0.5 wt %, about 1 wt %, about 2 wt %, about 3 wt %, or about 5 wt % to a high of about 10 wt %, about 15 wt %, about 20 wt %, about 25 wt %, about 30 wt %, about 35 wt %, about 40 wt %, about 45 wt %, or about 50 wt %.

One reaction parameter can include, but is not limited to, aging the reaction mixture at a temperature and for a time sufficient for the one or more polymer precursors to react with each other and form the polymer particles in gel form. In this respect, suitable aging temperature ranges from about room temperature to temperatures at or near the boiling point of the continuous phase. Higher reaction temperature can be realized either using higher boiling point chemicals or preparing prepolymer under elevated pressure. For example, in some embodiments the emulsion, suspension, or combination thereof can be aged at a temperature from a low of about 10° C., about 20° C., about 25° C., about 30° C., about 35° C., about 40° C., about 45° C., about 50° C., about 55° C., about 60° C., about 65° C., about 70° C., or about 75° C. to a high of about 100° C., about 120° C., about 140° C., about 160° C., about 180° C., about 200° C., about 225° C., or about 250° C. For example, the emulsion, suspension, or combination thereof can be aged at a temperature from about 20° C. to about 140° C., about 40° C. to about 120° C., about 50° C. to about 115° C., about 60° C. to about 110° C. or about 65° C. to about 105° C. Other embodiments include aging the emulsion, suspension, or combination thereof at a temperature from about 30° C. to about 99° C., about 45° C. to about 99° C., about 55° C. to about 95° C., or about 65° C. to about 99° C. In other embodiments, the emulsion, suspension, or combination thereof can be aged at a temperature from about 65° C. to about 99° C. Other embodiments can include aging the emulsion, suspension, or combination thereof at two or more temperatures, for example about 45° C. and from about 70° C. to about 99° C. or from about 80° C. to about 99° C. Aging may include stirring in certain embodiments. In some cases the pressure within the vessel may be increased and/or higher boiling point solvents may be used to enable reaction at higher temperatures without inducing a phase change in the reactants. In other cases an external condenser may be used to enable reactions at higher temperatures.

The reaction duration is generally sufficient to allow the polymer precursors to react and form the polymer particles in gel form, for example the mixture may be aged anywhere from 30 seconds to 48 hours or 30 seconds to 72 hours, or more or less depending on the desired result. For example, the monomer mixture can be polymerized and/or cured in a time ranging from a low of about 1 minute, about 2 minutes, about 3 minutes, about 4 minutes, about 5 minutes, about 10 minutes, about 15 minutes, or about 20 minutes to a high of about 40 minutes, about 1 hour, about 1.5 hours, about 2 hours, about 3 hours, about 4 hours, about 5 hours, about 10 hours, about 15 hours, about 20 hours, or about 24 hours. In another example, the monomer mixture can be polymerized and/or cured in a time ranging from a low of about 1 hour, about 2 hours, about 3 hours, about 4 hours, about 5 hours, about 10 hours, about 15 hours, or about 20 hours to a high of about 25 hours, about 30 hours, about 35 hours, about 40 hours, about 45 hours, about 50 hours, about 55 hours, about 60 hours, about 65 hours, about 70 hours, or about 75 hours.

The particular mixer and/or reactor design or configuration can also be used, at least in part, as one variable that can be controlled or adjusted to influence the size and/or morphology of the polymer particles in gel form. For example, a reactor within which the suspension and/or emulsion polymerization be carried out in can be or include "rifled" piping or conduits that can be adapted or configured to increase, decrease, and/or maintain a velocity of the suspension and/or emulsion flowing through and across a cross-section of the piping or conduit. The mixer and/or reactor can include zig-zag piping or conduits adapted or configured to increase, decrease, and/or maintain a velocity of the suspension and/or emulsion across and/or through a cross-section of the piping or conduit.

The temperature of the suspension and/or emulsion during the suspension and/or emulsion polymerization can be controlled, adjusted, or otherwise maintained using any one or more processes. For example, heating and/or cooling coils, exchangers, elements and the like can be used to control the temperature of the suspension and/or emulsion. In another example, steam, e.g., superheated steam, or other heated fluids can be injected into, directed toward, or otherwise used to heat the suspension and/or emulsion. In another example, an ultrasonic process heat can be directed toward the suspension and/or emulsion to polymerize the monomer component therein. In still another example, the suspension and/or emulsion can be subjected to a melt spinning process to produce the polymer particles in gel form. In still another example, the suspension and/or emulsion can be subjected to an extrusion process, e.g., an extrusion process similar to fiber production, to produce the polymer particles in gel form. In yet another example, the suspension and/or emulsion can be subjected to a Pastillation process to produce the polymer particles in gel form. In yet another example, the suspension and/or emulsion can be subjected to a drum, oven, and grinding process with injection molds instead of drums to increase the rate of heat transfer.

In one or more embodiments, the polymer particles in gel form are ultrapure, for example exhibiting a total impurity content of less than 1,000 ppm, less than 900 ppm, less than 800 ppm, less than 700 ppm, less than 600 ppm, less than 500 ppm, less than 400 ppm, less than 300 ppm, less than 250 ppm, less than 200 ppm, less than 175 ppm, less than 150 ppm, less than 130 ppm, less than 115 ppm, less than 100 ppm less than 95 ppm, less than 90 ppm, less than 80 ppm, less than 70 ppm, less than 60 ppm, less than 50 ppm, less than 40 ppm, less than 30 ppm, or less than 20 ppm of elements having atomic numbers ranging from 11 to 92 as measured by proton induced x-ray emission. Impurities such as metal atoms and/or metal ions can be introduced to the polymer particles in gel form via any one or more of several possible sources, which can include, but are not limited to, the particular type of catalyst, leaching from the mixer and/or reactor into the monomer component and/or during and/or after the polymer particles in gel form are made. Accordingly, the materials used to make the mixer, line the inner surfaces or walls of the mixer, and/or components thereof, e.g., agitator blades, reactor, and the like can be chosen so as to reduce the potential or likelihood of contamination. For example, depending on a particular metal, the metal can leach or otherwise loose metal ions that can be incorporated into the polymer particle in gel form during the suspension and/or emulsion polymerization thereof.

One way to reduce and/or eliminate contamination of metal or metal ions within the polymer particles in gel form and/or the aerogel, xerogel, or cryogel particles can be to construct the mixer and/or reactor from non-reactive or very low reactive materials, materials having a reduced or less tendency to leach or give up metal atoms or ions to the reactant mixture as compared to materials that are known to leach metal atoms into the reactant mixture. Some potential materials that can be suitable for making the mixer and/or reactor used to produce the polymer particle in gel form that can also help reduce the contamination of metal ions leaching or otherwise transferring from the mixer and/or reactor to the polymer particles in gel form can include, but are not limited to, metals, glass, e.g., a glass lined vessel, fiber reinforced vessels, e.g., FRP (FRB, FRVE, FRSVE.) and Dual laminate like PP/FRP, PVC/FRP, CPVC/FRP, PVDF/FRP, ECTFE/FRP, ETFE/FRP, FEP/FRP and PFA/FRP, polymer reactors, e.g., Teflon, polyethylene (PE), polypropylene (PP), Chlorinated Poly(Vinyl Chloride) (CPVC). Illustrative metals can include, but are not limited to, cobalt, chromium, tungsten, carbon, silicon, iron, manganese, molybdenum, vanadium, nickel, boron, phosphorous, sulfur, titanium, aluminum, copper, tungsten, alloys thereof, or any combination thereof. For example, the one or more inner surfaces of the reactor can be made of steel such as stainless steels, carbon steels, tool steels, alloy steels, or any combination thereof. Illustrative steels can include, but are not limited to, A387 Grade 11 low chrome steel, 304 stainless steel, 316 stainless steel, and 347 stainless steel.

In one or more embodiments, the surfaces of the mixer and/or reactor and/or components thereof can be treated to reduce the likelihood of metal ions (or other impurities) from leaching or otherwise transferring from the surfaces to the polymer particle in gel form. The inner metal surfaces can be subjected a passivation process to reduce the likelihood of contamination of the polymer particles in gel form with metal ions. For example, metal surfaces of the mixer and/or reactor that contact the suspension and/or emulsion can be subjected one or more treatment processes such as carburization, boronization, and/or nitridization. In another example the inner surfaces of the mixer and/or reactor can be subjected to a pickling process.

In one or more embodiments, the mixer and/or reactor or inner surfaces thereof can be heated in the presence of a carbon source to a temperature below the melting point of the inner surfaces, but sufficiently high to cause carbon to deposit within the outer layer or surface of the inner surfaces, i.e., the layer or surface exposed to the reactant mixture. Any suitable form of carbon can be used as the carbon source, for example carbon containing gases, liquids, solids, and/or plasmas. Illustrative gases can include, but are not limited to, carbon dioxide, methane, ethane, propane, or the like. In another example, the mixer and/or reactor or/or inner surfaces thereof can be heated in the presence of a boron source to a sufficient temperature, but below the melting point of the inner surfaces, but sufficiently high to cause boron to diffuse into the surface and form borides with the material. In yet another example, the mixer and/or reactor and/or inner surfaces thereof can be heated in the presence of a nitrogen source to a sufficient temperature, but below the melting point of the inner surfaces, causing nitrogen to diffuse into the surface and form nitrides with the material. Any suitable process can be used to nitride the inner surfaces of the mixer and/or reactor and/or other components thereof. For example, gas nitriding, liquid or salt bath nitriding, and ion or plasma nitriding can be used. In another example, the mixer and/or reactor, and/or inner surfaces thereof can under-go both carburization and nitridization ("carbonitriding") in which both carbon and nitrogen are diffused into the inner surfaces thereof. Subjecting the mixer and/or reactor and/or other components and/or inner surfaces thereof to carburization, boronization, and/or nitridization can reduce or eliminate the likelihood that metal ions or other contaminants from the mixer and/or reactor and/or other components thereof can leach or otherwise transfer therefrom to the monomer component, the suspension and/or emulsion, and/or the polymer particles in gel form.

Generally, the methods further comprise isolating the polymer gel particles and/or carbon materials. Suitable means for isolating include filtering, decanting a solvent or continuous phase or combinations thereof. The isolated product may be further processed by methods including drying the isolated polymer gel particles to remove volatile content, for example, freeze drying.

The polymer particles in gel form can have an volume average cross-sectional length (Dv,50) of about 0.1 mm or more, about 0.5 mm or more, about 1 mm or more, about 1.5 mm or more, about 2 mm or more, about 2.5 mm or more, about 3 mm or more, about 3.5 mm or more, about 4 mm or more, about 4.5 mm or more, about 5 mm or more, about 5.5 mm or more, or about 6 mm or more.

In some embodiments, the particle size distribution of the polymer particles exhibit a polydispersity index (Dv,90-Dv, 10)/Dv,50, wherein Dv,10, Dv,50 and Dv,90 are the particle size at 10%, 50% and 90%, respectively of the particle size distribution by volume) of less than 1,000, less than 900, less than 800, less than 700, less than 600, less than 500, less than 400, less than 300, less than 200, less than 100, less than 90, less than 80, less than 70, less than 60, less than 50, less than 40, less than 30, less than 20, less than 10, less than 5, less than 3, less than 2, less than 1.5, less than 1, less than 0.9, less than 0.8, less than 0.7, less than 0.6, less than 0.5, less than 0.4, less than 0.3, less than 0.2, or less than 0.1. In some embodiments, two or more populations of polymer particle size distribution may be achieved. For example, the final polymer particle distribution achieved may consist of two or more nodes, where the ratio between the highest and lowest node is about 1,000 or lower, about 900 or lower, about 800 or lower, about 700 or lower, about 600 or lower, about 500 or lower, about 400 or lower about 300 or lower, about 200 or lower, about 100 or lower, about 90 or lower, about 80 or lower, about 70 or lower, about 60 or lower, about 50 or lower, about 40 or lower, about 30 or lower, about 20 or lower, about 10 or lower, about 5 or lower, about 3 or lower, about 2 or lower, or about 1.5 or lower.

Furthermore, the methods may comprise freeze drying the polymer gel particles prior to pyrolyzing and/or activating, however such drying is not required and the polymer gel can be pyrolyzed without drying. In some embodiments, the polymer gel particles can be frozen via immersion in a medium having a temperature of less than −10° C., less than −15° C., less than −20° C., less than −30° C., less than −40° C., or less than −50° C. For example, the medium may be liquid nitrogen or ethanol (or other organic solvent) in dry ice or ethanol cooled by another means. In some embodiments, freeze drying comprises subjecting the frozen particles to a vacuum pressure of below about 1,000 mTorr, below about 1,500 mTorr, below about 2,500 mTorr, below about 3,000 mTorr, or below about 3,500 mTorr. Alternatively, drying under vacuum comprises subjecting the frozen particles to a vacuum pressure of less than 1000 mTorr, less than 900 mTorr, less than 800 mTorr, less than 700 mTorr, less than 600 mTorr, less than 500 mTorr, less than 400 mTorr, less than 300 mTorr, or less than 200 mTorr Alternatively, drying under vacuum comprises subjecting the frozen particles to a vacuum pressure of less than about 100 mTorr, less than 90 mTorr, less than 80 mTorr, less than 70 mTorr, or less than 50 mTorr.

Other methods of rapidly freezing the polymer gel particles are also envisioned. For example, in another embodiment the polymer gel is rapidly frozen by co-mingling or physical mixing of polymer gel particles with a suitable cold solid, for example, dry ice (solid carbon dioxide). Another envisioned method comprises using a blast freezer with a metal plate at −60° C. to rapidly remove heat from the polymer gel particles scattered over its surface. Another method of rapidly cooling water in a polymer gel particle is to snap freeze the particle by pulling a high vacuum very rapidly (the degree of vacuum is such that the temperature corresponding to the equilibrium vapor pressure allows for freezing). Yet another method for rapid freezing comprises admixing a polymer gel with a suitably cold gas. In some embodiments the cold gas may have a temperature below about −10° C. In some embodiments the cold gas may have a temperature below about −20° C. In some embodiments the cold gas may have a temperature below about −30° C. In yet other embodiments, the gas may have a temperature of about −196° C. For example, in some embodiments, the gas is nitrogen. In yet other embodiments, the gas may have a temperature of about −78° C. For example, in some embodiments, the gas is carbon dioxide.

In other embodiments, the polymer gel particles are frozen on a lyophilizer shelf at a temperature of −20° C. or lower. For example, in some embodiments the polymer gel particles are frozen on the lyophilizer shelf at a temperature of −30° C. or lower. In some other embodiments, the polymer gel monolith is subjected to a freeze thaw cycle (from room temperature to −20° C. or lower and back to room temperature), physical disruption of the freeze-thawed gel to create particles, and then further lyophilization processing. For example, in some embodiments, the polymer gel monolith is subjected to a freeze thaw cycle (from room temperature to −30° C. or lower and back to room temperature), physical disruption of the freeze-thawed gel to create particles, and then further lyophilization processing.

In the preparation of microporous material, mesoporous material, and/or macroporous material, any one of the solids content, catalyst, catalyst amount, pH, the phenolic precursor-to-catalyst ratio, and surfactant concentration can be varied to produce microporous, mesoporous, and/or macroporous carbon materials.

In some embodiments, carbon materials having high density and microporosity can be prepared. Gel formulations useful in this regard include, but are not limited to, formulations that include greater than 30% solids, greater than 5% organic acid catalyst, and a phenolic precursor-to-catalyst ratio of less than 50. Gel formulation in this regard may or may not contain a surfactant, for example a non-ionic surfactant above the CMC.

In some embodiments, mesoporous carbon materials can also be prepared by the disclosed methods. Formulations useful in this regard include, but are not limited to, formulation that include less than 50% solids, less than 25% acetic acid, and a phenolic precursor-to-catalyst ratio of greater than 50. Gel formulations is this regard may or may not contain a surfactant, for example a non-ionic surfactant above the CMC.

As used herein, the solids content of a composition, as understood by those skilled in the art, can be measured by determining the weight loss upon heating a small sample, e.g., 1-5 grams of the composition, to a suitable temperature, e.g., 125° C., and a time sufficient to remove the liquid. By measuring the weight of the sample before and after heating, the percent solids in the composition can be directly calculated or otherwise estimated.

One or more fluids, e.g., liquid and/or gas, can be injected into the suspension and/or emulsion during the polymerization of the monomer component. For example, carbon dioxide can be directed or otherwise introduced into the suspension and/or emulsion during polymerization to direct, control, or otherwise adjust the structural development of the polymer particles in gel form. The one or more fluids can also be directed or otherwise introduced to the pre-polymer during formation thereof and/or after formation of the pre-polymer.

Other more specific methods according to the instant disclosure include a method for preparing a condensation polymer, the method comprising:

a) preparing an emulsion, suspension or combination thereof by admixing a surfactant, one or more polymer precursors and a first and second solvent, wherein the first and second solvents are not miscible with each other; and b) aging the emulsion at a temperature and for a time sufficient for the one or more polymer precursors to react with each other and form a condensation polymer.

In certain embodiments of the foregoing, the polymer precursors are selected from an alcohol, a phenol, a polyalcohol, a sugar, an alkyl amine, an aromatic amine, an aldehyde, a ketone, a carboxylic acid, an ester, a urea, an acid halide and an isocyanate.

In some embodiments, at least one polymer precursor is a phenolic compound. For example, in some embodiments at least one polymer precursor is resorcinol. In still other embodiments at least one polymer precursor is phenol. In other examples, at least one polymer precursor is an aldehyde compound, for example, at least one polymer precursor may be formaldehyde.

In some more specific embodiments, at least one polymer precursor is formaldehyde, at least one polymer precursor is resorcinol and the condensation polymer is a resorcinol-formaldehyde polymer.

In some embodiments at least one polymer precursor is urea, and in other embodiments at least one polymer precursor is melamine.

The foregoing method may further comprise including an electrochemical modifier, such as silicon or nitrogen, in the emulsion.

The various reaction parameters, including choice of polymer precursor, solvent, etc., of the method for preparing a condensation polymer can be modified as described in the above section to obtain condensation polymers having various properties.

2. Creation of Polymer Gel Particles (Size Reduction of Polymer Gel Particles)

In contrast to prior monolith techniques, the presently disclosed methods generally do not require milling or grinding prior to further processing. Instead, the polymer gel particles are generally filtered and/or the solvent removed by decanting and the gel particles are optionally dried (e.g., freeze drying) prior to further processing.

3. Rapid Freezing of Polymer Gels

As noted above, certain embodiments of the method include freeze drying prior to pyrolysis and/or activation; however such drying is optional and is not included in some of the disclosed embodiments. Freezing of the polymer gel particles may be accomplished rapidly and in a multidirectional fashion as described in more detail above. Freezing slowly and in a unidirectional fashion, for example by shelf freezing in a lyophilizer, results in dried material having a very low surface area. Similarly, snap freezing (i.e., freezing that is accomplished by rapidly cooling the polymer gel particles by pulling a deep vacuum) also results in a dried material having a low surface area. As disclosed herein rapid freezing in a multidirectional fashion can be accomplished by rapidly lowering the material temperature to at least about $-10°$ C. or lower, for example, $-20°$ C. or lower, or for example, to at least about $-30°$ C. or lower. Rapid freezing of the polymer gel particles creates a fine ice crystal structure within the particles due to widespread nucleation of ice crystals, but leaves little time for ice crystal growth. This provides a high specific surface area between the ice crystals and the hydrocarbon matrix, which is necessarily excluded from the ice matrix.

The concept of extremely rapid freezing to promote nucleation over crystal growth can also be applied to mixed solvent systems. In one embodiment, as the mixed solvent system is rapidly cooled, the solvent component that predominates will undergo crystallization at its equilibrium melting temperature, with increased concentration of the co-solvent(s) and concomitant further freezing point depression. As the temperature is further lowered, there is increased crystallization of the predominant solvent and concentration of co-solvent(s) until the eutectic composition is reached, at which point the eutectic composition undergoes the transition from liquid to solid without further component concentration or product cooling until complete freezing is achieved. In the specific case of water and acetic acid (which as pure substances exhibit freezing points of $0°$ C. and $17°$ C., respectively), the eutectic composition is comprised of approximately 59% acetic acid and 41% water and freezes at about $-27°$ C. Accordingly, in one embodiment, the mixed solvent system is the eutectic composition, for example, in one embodiment the mixed solvent system comprises 59% acetic acid and 41% water.

4. Drying of Polymer Gels

Some embodiments include an optional drying step. In one embodiment, the frozen polymer particles in gel form containing a fine ice matrix are lyophilized under conditions designed to avoid collapse of the material and to maintain fine surface structure and porosity in the dried product. Generally drying is accomplished under conditions where the temperature of the product is kept below a temperature that would otherwise result in collapse of the product pores, thereby enabling the dried material to retain the desired surface area.

The structure of the final carbon material is reflected in the structure of the dried polymer gel which in turn is established by the polymer gel properties. These features can be created in the polymer gel using a sol-gel processing approach as described herein, but if care is not taken in removal of the solvent, then the structure is not preserved. It is of interest to both retain the original structure of the polymer gel and modify its structure with ice crystal formation based on control of the freezing process. In some embodiments prior to drying, the aqueous content of the polymer gel is in the range of about 50% to about 99%. In certain embodiments upon drying, the aqueous content of the dried polymer gel is less than 10%, alternately less than 5% or less than 2.5%.

A lyophilizer chamber pressure of about 2250 microns results in a primary drying temperature in the drying product of about $-10°$ C. Drying at about 2250 micron chamber pressure or lower case provides a product temperature during primary drying that is no greater than about $-10°$ C. As a further illustration, a chamber pressure of about 1500 microns results in a primary drying temperature in the drying product of about $-15°$ C. Drying at about 1500 micron chamber pressure or lower provides a product temperature during primary drying that is no greater than about $-15°$ C. As yet a further illustration, a chamber pressure of about 750 microns results in a primary drying temperature in the drying product of about $-20°$ C. Drying at 750 micron chamber pressure or lower provides a product temperature during primary drying that is no greater than about $-20°$ C. As yet a further illustration, a chamber pressure of about 300 microns results in a primary drying temperature in the drying product of about $-30°$ C. Drying at 300 micron chamber pressure or lower provides a product temperature during primary drying that is no greater than about $-30°$ C.

5. Pyrolysis and Activation of Polymer Gels

The polymer gels described above, can be further processed to obtain carbon materials. Such processing includes, for example, pyrolysis and/or activation. Generally, in the pyrolysis process, dried polymer gels are weighed and placed in a rotary kiln. The temperature ramp is set at $5°$ C. per minute, the dwell time and dwell temperature are set; cool down is determined by the natural cooling rate of the furnace. The entire process is usually run under an inert atmosphere, such as a nitrogen environment. Pyrolyzed samples are then removed and weighed. Other pyrolysis processes are well known to those of skill in the art.

In some embodiments, pyrolysis dwell time (the period of time during which the sample is at the desired temperature) is from about 0 minutes to about 120 minutes, from about 20 minutes to about 150 minutes, from about 30 minutes to about 100 minutes, from about 50 minutes to about 60 minutes or from about 55 minutes to about 60 minutes.

Pyrolysis may also be carried out more slowly than described above. For example, in one embodiment the pyrolysis is carried out in about 120 to 480 minutes. In other embodiments, the pyrolysis is carried out in about 120 to 240 minutes.

In some embodiments, the pyrolysis dwell temperature ranges from about 500° C. to 2400° C. In some embodiments, the pyrolysis dwell temperature ranges from about 600° C. to 1800° C. In other embodiments the pyrolysis dwell temperature ranges from about 700° C. to about 1200° C. In other embodiments the pyrolysis dwell temperature ranges from about 850° C. to about 1050° C. In other embodiments the pyrolysis dwell temperature ranges from about 800° C. to about 900° C. In some embodiments, the pyrolysis dwell temperature is about 600° C. or 900° C. In some other specific embodiments, the pyrolysis dwell temperature ranges from about 550° C. to about 900° C.

In some embodiments, the pyrolysis dwell temperature is varied during the course of pyrolysis. In one embodiment, the pyrolysis is carried out in a rotary kiln with separate, distinct heating zones. The temperature for each zone is sequentially decreased from the entrance to the exit end of the rotary kiln tube. In one embodiment, the pyrolysis is carried out in a rotary kiln with separate distinct heating zones, and the temperature for each zone is sequentially increased from entrance to exit end of the rotary kiln tube.

Activation time and activation temperature both have a large impact on the performance of the resulting activated carbon material, as well as the manufacturing cost thereof. Increasing the activation temperature and the activation dwell time results in higher activation percentages, which generally correspond to the removal of more material compared to lower temperatures and shorter dwell times. Activation temperature can also alter the pore structure of the carbon where lower temperatures result in more microporous carbon and higher temperatures result in mesoporosity. This is a result of the activation gas diffusion limited reaction that occurs at higher temperatures and reaction kinetic driven reactions that occur at lower temperature. Higher activation percentage often increases performance of the final activated carbon, but it also increases cost by reducing overall yield. Improving the level of activation corresponds to achieving a higher performance product at a lower cost.

Pyrolyzed polymer gels may be activated by contacting the pyrolyzed polymer gel with an activating agent. Many gases are suitable for activating, for example gases which contain oxygen. Non-limiting examples of activating gases include carbon dioxide, carbon monoxide, steam, oxygen and combinations thereof. Activating agents may also include corrosive chemicals such as acids, bases or salts (e.g., phosphoric acid, acetic acid, citric acid, formic acid, oxalic acid, uric acid, lactic acid, potassium hydroxide, sodium hydroxide, zinc chloride, etc.). Other activating agents are known to those skilled in the art.

In some embodiments, the activation time is between 1 minute and 48 hours. In other embodiments, the activation time is between 10 minute and 24 hours. In other embodiments, the activation time is between 60 minutes and 24 hours. In other embodiments, the activation time is between 2 hour and 24 hours. In further embodiments, the activation time is between 12 hours and 24 hours. In certain other embodiments, the activation time is between 30 min and 8 hours. In some further embodiments, the activation time is between 3 hour and 6 hours.

Pyrolyzed polymer gels may be activated using any number of suitable apparatuses known to those skilled in the art, for example, fluidized beds, rotary kilns, elevator kilns, roller hearth kilns, pusher kilns, etc. In one embodiment of the activation process, samples are weighed and placed in a rotary kiln, for which the automated gas control manifold is set to ramp at a 20° C. per minute rate. Carbon dioxide is introduced to the kiln environment for a period of time once the proper activation temperature has been reached. After activation has occurred, the carbon dioxide is replaced by nitrogen and the kiln is cooled down. Samples are weighed at the end of the process to assess the level of activation. Other activation processes are well known to those of skill in the art. In some of the embodiments disclosed herein, activation temperatures may range from 800° C. to 1300° C. In another embodiment, activation temperatures may range from 800° C. to 1,050° C. In another embodiment, activation temperatures may range from about 850° C. to about 950° C. In another embodiment, the activation temperature is about 900° C. In some embodiments, the carbon materials are activated to achieve a specific surface area ranging from 1700 to 1900 m$^2$/g. One skilled in the art will recognize that other activation temperatures, either lower or higher, may be employed.

The degree of activation is measured in terms of the mass percent of the pyrolyzed dried polymer gel that is lost during the activation step. In one embodiment of the methods described herein, activating comprises a degree of activation from 5% to 90%; or a degree of activation from 10% to 80%; in some cases activating comprises a degree of activation from 40% to 70%, or a degree of activation from 45% to 65%.

B. Properties of Polymer Gels

One embodiment of the present disclosure provides a polymer gel prepared by any of the methods disclosure herein. The polymer gels produced by the disclosed methods are unique in many respects. In some embodiments, the method produces polymer gels having monodisperse or near monodisperse particle size distributions. As discussed above, the particle size of the polymer gels (and carbon materials) can be controlled by a number of process parameters, including the stirring rate. For example, in some embodiments the present disclosure provides a polymer gel having a particle size distribution such that (Dv,90-Dv,10)/Dv,50 is less than 3, wherein Dv,10, Dv,50 and Dv,90 are the particle size at 10%, 50% and 90%, respectively of the particle size distribution by volume. In some embodiments, (Dv,90-Dv,10)/Dv,50 is less than 2 and in other embodiments (Dv90-Dv10)/Dv50 is less than 1.

Figure 14:
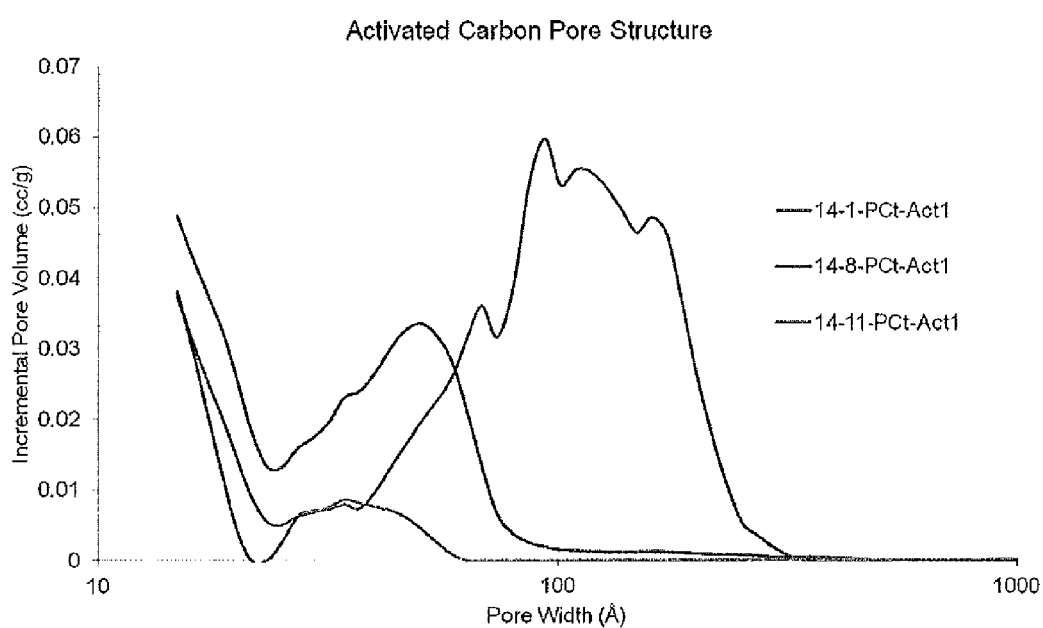
FIG. 14 is pore size data for activated carbon samples.
Figure 15:
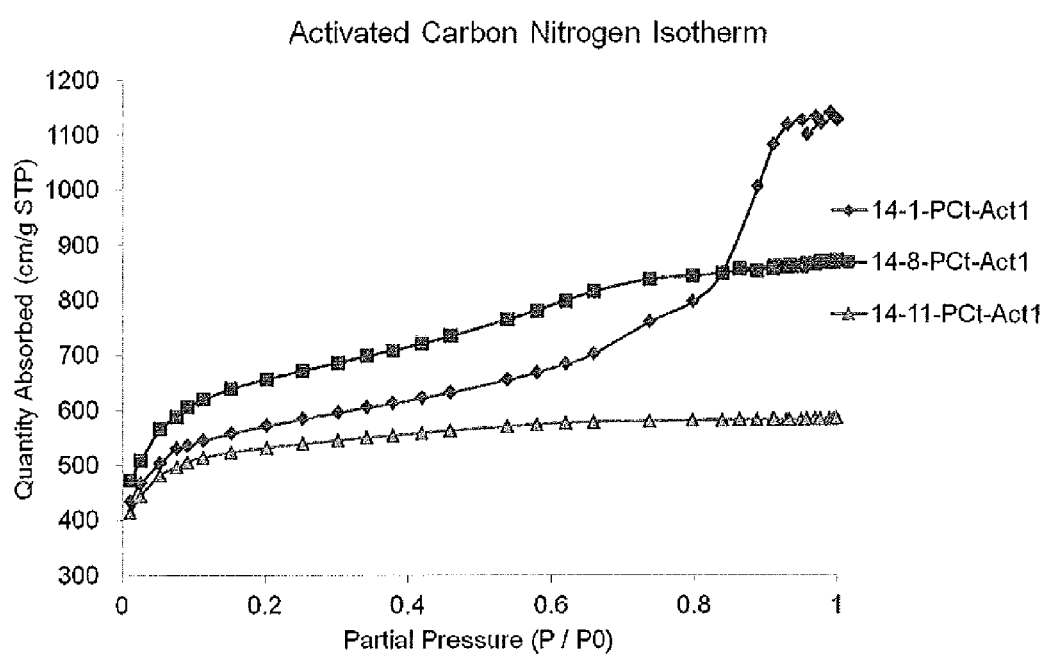
FIG. 15 presents nitrogen absorption isotherms for activated carbon samples.

The polymer gel particles are also substantially spherical in shape (see e.g., FIG. 14A). The spherical nature of the gels results in spherical carbon materials which in turn may contribute to desirable electrochemical properties. In some embodiments, the polymer gels comprise a plurality of polymer gel particles, wherein greater than 90% of the polymer gel particles have a spherical geometry. In other embodiments, greater than 95% of the polymer gel particles have a spherical geometry. The particle size of the polymer particles in gel form can be expressed alternatively as the average cross-sectional length. For the embodiment of spherical particles, the range of average cross-sectional lengths for polymer particles in gel form in various embodiments can mirror the embodiments described herein for the volume average particle size (Dv,50). For other embodiments of non-spherical particles, the important dimension with regards to heat transfer and polymerization within the particle is the minimum characteristic cross sectional length (for example, for rod-like particles the minimum characteristic cross sectional length is the rod diameter). For the embodiment of non-spherical particles, the range of minimum characteristic cross section length can be any of the ranges discussed and described herein with regard to the volume average particle size (Dv,50).

The specific surface area of the polymer gels as determined by BET analysis ranges from about 50 $m^2/g$ to about 1000 $m^2/g$. In some embodiments, the specific surface area ranges from about 50 $m^2/g$ to about 100 $m^2/g$. In other embodiments, the specific surface area ranges from about 300 $m^2/g$ to about 700 $m^2/g$. In some other embodiments, the specific surface area ranges from about 300 $m^2/g$ to about 400 $m^2/g$. In some other embodiments, the specific surface area ranges from about 400 $m^2/g$ to about 500 $m^2/g$. In some other embodiments, the specific surface area ranges from about 500 $m^2/g$ to about 600 $m^2/g$. In some other embodiments, the specific surface area ranges from about 600 $m^2/g$ to about 700 $m^2/g$.

The total pore volume of the polymer gels ranges from about 0.01 cc/g to about 1.5 cc/g. For example, in some embodiments the total pore volume ranges from about 0.1 cc/g to about 0.9 cc/g. In other embodiments the total pore volume ranges from about 0.2 cc/g to about 0.8 cc/g. In other embodiments the total pore volume ranges from about 0.3 cc/g to about 0.6 cc/g. In other embodiments the total pore volume ranges from about 0.6 cc/g to about 0.9 cc/g.

In other embodiments, the polymer gel comprises a total of less than 500 ppm of all other elements having atomic numbers ranging from 11 to 92. For example, in some other embodiments the polymer gel comprises less than 200 ppm, less than 100 ppm, less than 50 ppm, less than 25 ppm, less than 10 ppm, less than 5 ppm or less than 1 ppm of all other elements having atomic numbers ranging from 11 to 92. In some embodiments, the electrochemical modifier content and impurity content of the polymer gels can be determined by proton induced x-ray emission (PIXE) analysis.

In some embodiments, the polymer gel is a dried polymer gel, for example, a polymer cryogel. In other embodiments, the dried polymer gel is a polymer xerogel or a polymer aerogel. In some embodiments, the polymer precursors are selected from aliphatic and aromatic alcohols, aliphatic and aromatic amines and carbonyl-containing compounds. For example, the polymer precursors may be selected from an alcohol, a phenol, a polyalcohol, a sugar, an alkyl amine, an aromatic amine, an aldehyde, a ketone, a carboxylic acid, an ester, a urea, an acid halide and an isocyanate. In some specific embodiments, the polymer gels are prepared from phenolic compounds and aldehyde compounds, for example, in one embodiment, the polymer gels can be produced from resorcinol and formaldehyde. In some embodiments, acidity can be provided by dissolution of a solid acid compound, by employing an acid as the reaction solvent or by employing a mixed solvent system where one of the solvents is an acid.

Some embodiments of the disclosed process comprise polymerization to form a polymer gel in the presence of a basic volatile catalyst. Accordingly, in some embodiments, the polymer gel comprises one or more salts, for example, in some embodiments the one or more salts are basic volatile salts. Examples of basic volatile salts include, but are not limited to, ammonium carbonate, ammonium bicarbonate, ammonium acetate, ammonium hydroxide, and combinations thereof. Accordingly, in some embodiments, the present disclosure provides a polymer gel comprising ammonium carbonate, ammonium bicarbonate, ammonium acetate, ammonium hydroxide, or combinations thereof. In further embodiments, the polymer gel comprises ammonium carbonate. In other further embodiments, the polymer gel comprises ammonium acetate.

The disclosed methods are useful for preparation polymer gels having high purity as determined by PIXE analysis and/or ash content. As described herein, any intentionally added electrochemical modifier is not considered an impurity and thus excluded from the specifically described PIXE and ash content values. In some embodiments, the polymer gels comprise low ash content which may contribute to the low ash content of a carbon material prepared therefrom. Thus, in some embodiments, the ash content of the polymer gel ranges from 0.1% to 0.001%. In other embodiments, the ash content of the polymer gel is less than 0.1%, less than 0.08%, less than 0.05%, less than 0.03%, less than 0.025%, less than 0.01%, less than 0.0075%, less than 0.005% or less than 0.001%.

In other embodiments, the polymer gel has a total PIXE impurity content of less than 500 ppm and an ash content of less than 0.08%. In a further embodiment, the polymer gel has a total PIXE impurity content of less than 300 ppm and an ash content of less than 0.05%. In another further embodiment, the polymer gel has a total PIXE impurity content of less than 200 ppm and an ash content of less than 0.02%. In another further embodiment, the polymer gel has a total PIXE impurity content of less than 200 ppm and an ash content of less than 0.01%.

Polymer gels comprising impurities generally yield carbon materials which also comprise impurities, and thus potentially undesired electrochemical properties. Accordingly, one aspect of the present disclosure is a polymer particles in gel form prepared via the disclosed methods and having low levels of residual undesired impurities. The amount of individual PIXE impurities present in the polymer particles in gel form can be determined by proton induced x-ray emission.

In one or more embodiments, the polymer particles in gel form can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm of any one or more of the metal atoms (or metal ions) having an atomic number of 3 to 5 and/or 11 to 92. For example, in one or more embodiments, the polymer particles in gel form can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm sodium. In one or more embodiments, the polymer particles in gel form can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm magnesium. In one or more embodiments, the polymer particles in gel form can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm silicon. In one or more embodiments, the polymer particles in gel form can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm sulfur. In one or more embodiments, the polymer particles in gel form can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm calcium. In one or more embodiments, the polymer particles in gel form can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm iron. In one or more embodiments, the polymer particles in gel form can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm nickel. In one or more embodiments, the polymer particles in gel form can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm copper. In one or more embodiments, the polymer particles in gel form can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm chromium. In one or more embodiments, the polymer particles in gel form can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm zinc. As noted above, in some embodiments other impurities such as hydrogen, oxygen and/or nitrogen can be present in levels ranging from less than 10%, less than 9%, less than 8%, less than 7%, less than 6%, less than 5%, less than 4%, less than 3%, less than 2%, less than 1%, less than 0.5%, less than 0.1%, less than 0.05%, or less than 0.01%.

In some specific embodiments, the polymer gel comprises less than 100 ppm sodium, less than 300 ppm silicon, less than 50 ppm sulfur, less than 100 ppm calcium, less than 20 ppm iron, less than 10 ppm nickel, less than 40 ppm copper, less than 5 ppm chromium and less than 5 ppm zinc. In other specific embodiments, the polymer gel comprises less than 50 ppm sodium, less than 100 ppm silicon, less than 30 ppm sulfur, less than 50 ppm calcium, less than 10 ppm iron, less than 5 ppm nickel, less than 20 ppm copper, less than 2 ppm chromium and less than 2 ppm zinc.

In other specific embodiments, the polymer gel comprises less than 50 ppm sodium, less than 50 ppm silicon, less than 30 ppm sulfur, less than 10 ppm calcium, less than 2 ppm iron, less than 1 ppm nickel, less than 1 ppm copper, less than 1 ppm chromium and less than 1 ppm zinc.

In some other specific embodiments, the polymer gel comprises less than 100 ppm sodium, less than 50 ppm magnesium, less than 50 ppm aluminum, less than 10 ppm sulfur, less than 10 ppm chlorine, less than 10 ppm potassium, less than 1 ppm chromium and less than 1 ppm manganese.

The disclosed method yields a polymer gel comprising various specific surface areas depending on the exact reaction parameters. Without being bound by theory, it is believed that the surface area of the polymer gel contributes, at least in part, to the surface area properties of the carbon materials. The surface area can be measured using the BET technique well-known to those of skill in the art. In one embodiment of any of the aspects disclosed herein the polymer gel comprises a BET specific surface area of at least 150 m$^2$/g, at least 250 m$^2$/g, at least 400 m$^2$/g, at least 500 m$^2$/g, at least 600 m$^2$/g, at least 700 m$^2$/g, at least 800 m$^2$/g, or at least 900 m$^2$/g, or at least 1000 m$^2$/g, or at least 1100 m$^2$/g.

In one embodiment, the polymer gel comprises a BET specific surface area of 100 m$^2$/g to 1000 m$^2$/g. Alternatively, the polymer gel comprises a BET specific surface area of between 150 m$^2$/g and 900 m$^2$/g. Alternatively, the polymer gel comprises a BET specific surface area of between 400 m$^2$/g and 800 m$^2$/g.

In one embodiment, the polymer gel comprises a tap density of from 0.10 g/cc to 0.60 g/cc. In one embodiment, the polymer gel comprises a tap density of from 0.15 g/cc to 0.25 g/cc. In one embodiment of the present disclosure, the polymer gel comprises a BET specific surface area of at least 150 m$^2$/g and a tap density of less than 0.60 g/cc. Alternately, the polymer gel comprises a BET specific surface area of at least 250 m$^2$/g and a tap density of less than 0.4 g/cc. In another embodiment, the polymer gel comprises a BET specific surface area of at least 500 m$^2$/g and a tap density of less than 0.30 g/cc.

In another embodiment of any of the aspects or variations disclosed herein the polymer gel comprises a residual water content of less than 15%, less than 13%, less than 10%, less than 5% or less than 1%.

In one embodiment, the polymer gel comprises a fractional pore volume of pores at or below 500 angstroms that comprises at least 25% of the total pore volume, 50% of the total pore volume, at least 75% of the total pore volume, at least 90% of the total pore volume or at least 99% of the total pore volume. In another embodiment, the polymer gel comprises a fractional pore volume of pores at or below 20 nm that comprises at least 50% of the total pore volume, at least 75% of the total pore volume, at least 90% of the total pore volume or at least 99% of the total pore volume.

In some embodiments, the amount of nitrogen adsorbed per mass of polymer gel at 0.05 relative pressure is at least 10% of the total nitrogen adsorbed up to 0.99 relative pressure or at least 20% of the total nitrogen adsorbed up to 0.99 relative pressure. In another embodiment, the amount of nitrogen adsorbed per mass of polymer gel at 0.05 relative pressure is between 10% and 50% of the total nitrogen adsorbed up to 0.99 relative pressure, is between 20% and 60% of the total nitrogen adsorbed up to 0.99 relative pressure or is between 20% and 30% of the total nitrogen adsorbed up to 0.99 relative pressure.

In one embodiment, the polymer gel comprises a fractional pore surface area of pores at or below 100 nm that comprises at least 50% of the total pore surface area, at least 75% of the total pore surface area, at least 90% of the total pore surface area or at least 99% of the total pore surface area. In another embodiment, the polymer gel comprises a fractional pore surface area of pores at or below 20 nm that comprises at least 50% of the total pore surface area, at least 75% of the total pore surface area, at least 90% of the total pore surface or at least 99% of the total pore surface area.

As described in more detail above, methods for preparing the disclosed carbon materials may include pyrolysis of a polymer gel. In some embodiments, the pyrolyzed polymer gels have a surface area from about 100 to about 1200 m$^2$/g. In other embodiments, the pyrolyzed polymer gels have a surface area from about 500 to about 800 m$^2$/g. In other embodiments, the pyrolyzed polymer gels have a surface area from about 500 to about 700 m$^2$/g.

In other embodiments, the pyrolyzed polymer gels have a tap density from about 0.1 to about 1.0 g/cc. In other embodiments, the pyrolyzed polymer gels have a tap density from about 0.3 to about 0.6 g/cc. In other embodiments, the pyrolyzed polymer gels have a tap density from about 0.3 to about 0.5 g/cc.

In some embodiments, the polymer gels exhibit a mean particle diameter ranging from about 4 μm to about 10 mm. In other embodiments, the mean particle diameter ranges from about 1 μm to about 4 mm. In other embodiments, the mean particle diameter ranges from about 10 μm to about 1 mm. Yet in other embodiments, the mean particle diameter ranges from about 20 μm to about 500 μm. Still in other embodiments, the mean particle diameter ranges from about 500 μm to about 4 mm. Yet still in other embodiments, the mean particle diameter ranges from about 2 μm to about 300 μm. In other embodiments, the mean particle diameter ranges from about 100 μm to about 10 μm. In some embodiments, the mean particle diameter is about 0.9 mm, about 0.8 mm or about 0.5 mm. In other embodiments, the mean particle diameter is about 100 μm, about 50 μm or about 10 μm.

In still other embodiments, the polymer gels comprise a monodisperse, or near monodisperse particle size distribution. For example, in some embodiments the polymer gels have a particle size distribution such that (Dv,90-Dv,10)/Dv,50 is less than 3, wherein Dv,10, Dv,50 and Dv,90 are the particle size at 10%, 50% and 90%, respectively of the particle size distribution by volume. In further embodiments, (Dv,90-Dv,10)/Dv,50 is less than 2 or even less than 1. In still other embodiments, (Dv,90-Dv,10)/Dv,50 is less than 1,000, less than 100, less than 10, less than 5, less than 3, less than 2, less than 1.5 or even less than 1.

Figure 23A:
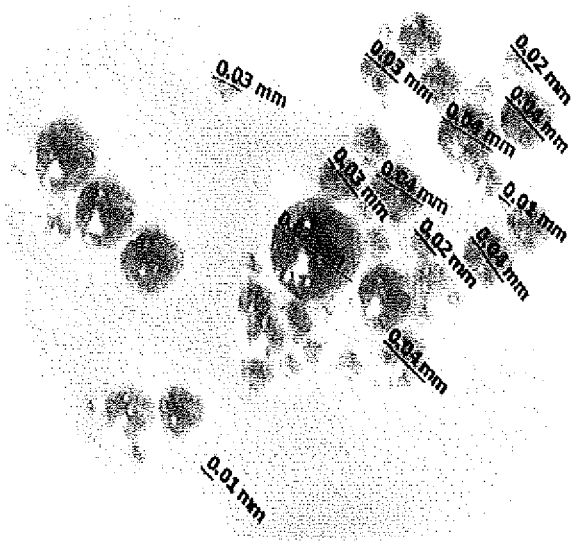
FIGS. 23A and 23B are pictures showing spherical gel particles and spherical carbon material particles, respectively.

In yet other embodiments, the polymer gel particles have a substantially spherical geometry (see e.g., FIG. 23A). Such geometry contributes to a spherical geometry in some embodiments of the resulting carbon particles as discussed in more detail below. In some embodiments, the polymer gels comprise a plurality of polymer gel particles, wherein greater than 90% of the polymer gel particles have a spherical geometry. For example, in some embodiments, greater than 95% of the polymer gel particles have a spherical geometry.

Since the polymer gels may comprise electrochemical modifiers, the elemental content of the gels may vary. In some embodiments, the polymer gels comprise greater than about 100 ppm of an electrochemical modifier. In certain embodiments, the electrochemical modifier is selected from nitrogen, iron, tin, silicon, nickel, aluminum and manganese. In some embodiments, the electrochemical modifier is silicon and in other embodiments the electrochemical modifier is nitrogen.

The amount of electrochemical modifier in the polymer gels is controlled to a level desirable for the final carbon material. Accordingly, in some embodiments, the polymer gel comprises at least 0.10%, at least 0.25%, at least 0.50%, at least 1.0%, at least 5.0%, at least 10%, at least 25%, at least 50%, at least 75%, at least 90%, at least 95%, at least 99% or at least 99.5% of the electrochemical modifier. For example, in some embodiments, the polymer gels comprise between 0.5% and 99.5% carbon and between 0.5% and 99.5% electrochemical modifier. The percent of the electrochemical modifier is calculated on weight percent basis (wt %).

C. Properties of Carbon Materials

One embodiment of the present disclosure provides a carbon material prepared by any of the methods disclosed herein. The pore size distribution of the carbon materials may contribute to the superior performance of electrical devices comprising the carbon materials relative to devices comprising other known carbon materials. For example, in some embodiments, the carbon material comprises an optimized blend of both micropores and mesopores and may also comprise low surface functionality upon pryolysis and/or activation. In other embodiments, the carbon material comprises a total of less than 500 ppm of all elements having atomic numbers ranging from 11 to 92, as measured by proton induced x-ray emission. The high purity and optimized micropore and/or mesopore distribution make the carbon materials ideal for use in electrical storage and distribution devices, for example ultracapacitors.

While not wishing to be bound by theory, Applicants believe the optimized pore size distributions, as well as the high purity, of the disclosed carbon materials can be attributed, at least in part, to the disclosed emulsion/suspension polymerization methods. The properties of the disclosed carbon materials, as well as methods for their preparation are discussed in more detail below.

While not wishing to be bound by theory, it is believed that, in addition to the pore structure, the purity profile, surface area and other properties of the carbon materials are a function of its preparation method, and variation of the preparation parameters may yield carbon materials having different properties. Accordingly, in some embodiments, the carbon material is a pyrolyzed dried polymer gel, for example, a pyrolyzed polymer cryogel, a pyrolyzed polymer xerogel or a pyrolyzed polymer aerogel. In other embodiments, the carbon material is pyrolyzed and activated (e.g., a synthetic activated carbon material). For example, in further embodiments the carbon material is an activated dried polymer gel, an activated polymer cryogel, an activated polymer xerogel or an activated polymer aerogel.

As noted above, activated carbon particles are widely employed as an energy storage material. In this regard, a critically important characteristic is high power density, which is possible with electrodes that have low ionic resistance that yield high frequency response. It is important to achieve a low ionic resistance, for instance in situations with device ability to respond to cyclic performance is a constraint. The disclosed methods are useful for preparing carbon material that solves the problem of how to optimize an electrode formulation and maximize the power performance of electrical energy storage and distribution devices. Devices comprising the carbon materials exhibit long-term stability, fast response time and high pulse power performance.

In some embodiments, the disclosed methods produce carbon materials comprising micropore and/or mesopore structure, which is typically described in terms of fraction (percent) of total pore volume residing in either micropores or mesopores or both. Accordingly, in some embodiments the pore structure of the carbon materials can include from a low of about 20%, about 23%, about 25%, about 27%, about 30%, about 33%, about 35%, or about 37% to a high of about 45%, about 47%, about 50%, about 53%, about 55%, about 60%, about 65%, about 70%, about 75%, about 80%, about 85%, or about 90% micropores. In other embodiments, the pore structure of the carbon materials can include from 30% to 70% micropores. In other embodiments, the pore structure of the carbon materials can include from 40% to 60% micropores. In other embodiments, the pore structure of the carbon materials can include from 40% to 50% micropores. In other embodiments, the pore structure of the carbon materials can include from 43% to 47% micropores, from 40% to 50% micropores, from 40% to 45% micropores, from 43% to 47% micropores, or from 42% to 48% micropores. In certain embodiments, the pore structure of the carbon materials comprises about 45% micropores.

The mesoporosity of the carbon materials may contribute to high ion mobility and low resistance. In some embodiments, the pore structure of the carbon materials can include from a low of about 20%, about 23%, about 25%, about 27%, about 30%, about 33%, about 35%, or about 37% to a high of about 45%, about 47%, about 50%, about 53%, about 55%, about 60%, about 65%, about 70%, about 75%, or about 80% mesopores. In other embodiments, the pore structure of the carbon materials can include from 30% to 70% mesopores. In other embodiments, the pore structure of the carbon materials can include from 40% to 60% mesopores. In other embodiments, the pore structure of the carbon materials can include from 50% to 60% mesopores. In other embodiments, the pore structure of the carbon materials can include from 53% to 57% mesopores, 50% to 60% mesopores, from 51% to 59% mesopores, from 52% to 58% mesopores, or from 54% to 56% mesopores. In other embodiments, the pore structure of the carbon materials comprises about 55% mesopores.

An optimized blend of micropores and mesopores within the carbon materials may contribute to the enhanced electrochemical performance of the same. Thus, in some embodiments the pore structure of the carbon materials comprises from a low of about 20%, about 23%, about 25%, about 27%, about 30%, about 33%, about 35%, or about 37% to a high of about 45%, about 47%, about 50%, about 53%, about 55%, about 60%, about 65%, about 70%, about 75%, or about 80% micropores and from a low of about 20%, about 23%, about 25%, about 27%, about 30%, about 33%, about 35%, or about 37% to a high of about 45%, about 47%, about 50%, about 53%, about 55%, about 60%, about 65%, about 70%, about 75%, or about 80% mesopores. In other embodiments, the pore structure of the carbon materials comprises from 30% to 70% micropores and from 30% to 70% mesopores. In other embodiments, the pore structure of the carbon materials comprises from 40% to 60% micropores and from 40% to 60% mesopores. In other embodiments, the pore structure of the carbon materials comprises from 40% to 50% micropores and from 50% to 60% mesopores. In other embodiments, the pore structure of the carbon materials comprises from 43% to 47% micropores and from 53% to 57% mesopores. In other embodiments, the pore structure of the carbon materials comprises about 45% micropores and about 55% mesopores.

In other variations, the carbon materials do not have a substantial volume of pores greater than 20 nm. For example, in certain embodiments the carbon materials comprise less than 25%, less than 20%, less than 15%, less than 10%, less than 5%, less than 2.5% or even less than 1% of the total pore volume in pores greater than 20 nm.

The porosity of the carbon materials contributes to their enhanced electrochemical performance. Accordingly, in one embodiment the carbon material comprises a pore volume residing in pores less than 20 angstroms of at least 1.8 cc/g, at least 1.2, at least 0.6, at least 0.30 cc/g, at least 0.25 cc/g, at least 0.20 cc/g or at least 0.15 cc/g. In other embodiments, the carbon material comprises a pore volume residing in pores greater than 20 angstroms of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.10 cc/g, at least 1.00 cc/g, at least 0.85 cc/g, at least 0.80 cc/g, at least 0.75 cc/g, at least 0.70 cc/g, at least 0.65 cc/g, at least 0.50 cc/g, at least 0.4 cc/g, at least 0.2 cc/g or at least 0.1 cc/g.

In other embodiments, the carbon material comprises a pore volume of at least 7.00 cc/g, at least 5.00 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, at least 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g or at least 0.1 cc/g for pores ranging from 20 angstroms to 500 angstroms.

In other embodiments, the carbon material comprises a pore volume of at least at least 7.00 cc/g, at least 5.00 cc/g, 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.10 cc/g, at least 1.00 cc/g, at least 0.85 cc/g, at least 0.80 cc/g, at least 0.75 cc/g, at least 0.70 cc/g, at least 0.65 cc/g, at least 0.50 cc/g, at least 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g or at least 0.1 cc/g for pores ranging from 20 angstroms to 300 angstroms.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 1000 angstroms.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 2000 angstroms.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 5000 angstroms.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 1 micron.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 2 microns.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 3 microns.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 4 microns.

In other embodiments, the carbon material comprises a pore volume of at least 7 cc/g, at least 5 cc/g, at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.0 cc/g, at least 0.8 cc/g, at least 0.6 cc/g, at least 0.4 cc/g, at least 0.2 cc/g, at least 0.1 cc/g for pores ranging from 20 angstroms to 5 microns.

In yet other embodiments, the carbon materials comprise a total pore volume of at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.10 cc/g, at least 1.00 cc/g, at least 0.85 cc/g, at least 0.80 cc/g, at least 0.75 cc/g, at least 0.70 cc/g, at least 0.65 cc/g, at least 0.60 cc/g, at least 0.55 cc/g, at least 0.50 cc/g, at least 0.45 cc/g, at least 0.40 cc/g, at least 0.35 cc/g, at least 0.30 cc/g, at least 0.25 cc/g, at least 0.20 cc/g or at least 0.10 cc/g.

In yet other embodiments, the carbon materials comprise a pore volume residing in pores of less than 20 angstroms of at least 0.2 cc/g and a pore volume residing in pores of between 20 and 300 angstroms of at least 0.8 cc/g. In yet other embodiments, the carbon materials comprise a pore volume residing in pores of less than 20 angstroms of at least 0.5 cc/g and a pore volume residing in pores of between 20 and 300 angstroms of at least 0.5 cc/g. In yet other embodiments, the carbon materials comprise a pore volume residing in pores of less than 20 angstroms of at least 0.6 cc/g and a pore volume residing in pores of between 20 and 300 angstroms of at least 2.4 cc/g. In yet other embodiments, the carbon materials comprise a pore volume residing in pores of less than 20 angstroms of at least 1.5 cc/g and a pore volume residing in pores of between 20 and 300 angstroms of at least 1.5 cc/g.

In some embodiments, the pores of the carbon material comprise a peak pore volume ranging from 2 nm to 10 nm. In other embodiments, the peak pore volume ranges from 10 nm to 20 nm. Yet in other embodiments, the peak pore volume ranges from 20 nm to 30 nm. Still in other embodiments, the peak pore volume ranges from 30 nm to 40 nm. Yet still in other embodiments, the peak pore volume ranges from 40 nm to 50 nm. In other embodiments, the peak pore volume ranges from 50 nm to 100 nm.

In certain embodiments a mesoporous carbon material having low pore volume in the micropore region (e.g., less than 60%, less than 50%, less than 40%, less than 30%, less than 20% microporosity) is prepared by the disclosed methods. For example, the mesoporous carbon can be a polymer gel that has been pyrolyzed, but not activated. In some embodiments, the pyrolyzed mesoporous carbon comprises a specific surface area of at least 400 $m^2/g$, at least 500 $m^2/g$, at least 600 $m^2/g$, at least 675 $m^2/g$ or at least 750 $m^2/g$. In other embodiments, the mesoporous carbon material comprises a total pore volume of at least 0.50 cc/g, at least 0.60 cc/g, at least 0.70 cc/g, at least 0.80 cc/g or at least 0.90 cc/g. In yet other embodiments, the mesoporous carbon material comprises a tap density of at least 0.30 g/cc, at least 0.35 g/cc, at least 0.40 g/cc, at least 0.45 g/cc, at least 0.50 g/cc or at least 0.55 g/cc.

In other embodiments, the carbon materials comprise a total pore volume ranging greater than or equal to 0.1 cc/g, and in other embodiments the carbon materials comprise a total pore volume less than or equal to 0.6 cc/g. In other embodiments, the carbon materials comprise a total pore volume ranging from about 0.1 cc/g to about 0.6 cc/g. In some other embodiments, the total pore volume of the carbon materials ranges from about 0.1 cc/g to about 0.2 cc/g. In some other embodiments, the total pore volume of the carbon materials ranges from about 0.2 cc/g to about 0.3 cc/g. In some other embodiments, the total pore volume of the carbon materials ranges from about 0.3 cc/g to about 0.4 cc/g. In some other embodiments, the total pore volume of the carbon materials ranges from about 0.4 cc/g to about 0.5 cc/g. In some other embodiments, the total pore volume of the carbon materials ranges from about 0.5 cc/g to about 0.6 cc/g.

The carbon material comprises low total PIXE impurities. Thus, in some embodiments the total PIXE impurity content of all other PIXE elements in the carbon material (as measured by proton induced x-ray emission) is less than 1000 ppm. In other embodiments, the total PIXE impurity content of all other PIXE elements in the carbon material is less than 800 ppm, less than 500 ppm, less than 300 ppm, less than 200 ppm, less than 150 ppm, less than 100 ppm, less than 50 ppm, less than 25 ppm, less than 10 ppm, less than 5 ppm or less than 1 ppm. In further embodiments of the foregoing, the carbon material is a pyrolyzed dried polymer gel, a pyrolyzed polymer cryogel, a pyrolyzed polymer xerogel, a pyrolyzed polymer aerogel, an activated dried polymer gel, an activated polymer cryogel, an activated polymer xerogel or an activated polymer aerogel.

In addition to low content of undesired PIXE impurities, the disclosed carbon materials may comprise high total carbon content. In addition to carbon, the carbon material may also comprise oxygen, hydrogen, nitrogen and the electrochemical modifier. In some embodiments, the material comprises at least 75% carbon, 80% carbon, 85% carbon, at least 90% carbon, at least 95% carbon, at least 96% carbon, at least 97% carbon, at least 98% carbon or at least 99% carbon on a weight/weight basis. In some other embodiments, the carbon material comprises less than 10% oxygen, less than 5% oxygen, less than 3.0% oxygen, less than 2.5% oxygen, less than 1% oxygen or less than 0.5% oxygen on a weight/weight basis. In other embodiments, the carbon material comprises less than 10% hydrogen, less than 5% hydrogen, less than 2.5% hydrogen, less than 1% hydrogen, less than 0.5% hydrogen or less than 0.1% hydrogen on a weight/weight basis. In other embodiments, the carbon material comprises less than 5% nitrogen, less than 2.5% nitrogen, less than 1% nitrogen, less than 0.5% nitrogen, less than 0.25% nitrogen or less than 0.01% nitrogen on a weight/weight basis. The oxygen, hydrogen and nitrogen content of the disclosed carbon materials can be determined by combustion analysis. Techniques for determining elemental composition by combustion analysis are well known in the art.

In other embodiments, the carbon content is greater than 98 wt % as measured by CHNO analysis. In another embodiment, the carbon content ranges from 50 to 98 wt % of the total mass. In yet other embodiments, the carbon content ranges 90 wt % to 98 wt % of the total mass. In yet other embodiments, the carbon content ranges from 80 wt % to 90 wt % of the total mass. In yet other embodiments, the carbon content ranges from 70 wt % to 80 wt % of the total mass. In yet other embodiments, the carbon content ranges from 60 wt % to 70 wt % of the total mass.

In another embodiment, the nitrogen content ranges from 0 wt % to 30 wt % as measured by CHNO analysis. In another embodiment, the nitrogen content ranges from 1 wt % to 10 wt % of the total mass. In yet other embodiments, the nitrogen content ranges from 10 wt % to 20 wt % of the total mass. In yet other embodiments, the nitrogen content ranges from 20 wt % to 30 wt % of the total mass. In another embodiment, the nitrogen content is greater than 30 wt %.

The carbon and nitrogen content may also be measured as a ratio of C:N. In one embodiment, the C:N ratio ranges from 1:0.001 to 1:1. In another embodiment, the C:N ratio ranges from 1:0.001 to 0.01. In yet another embodiment, the C:N ratio ranges from 1:0.01 to 1:1. In yet another embodiment, the content of nitrogen exceeds the content of carbon.

The carbon materials may also comprise an electrochemical modifier or (i.e., a dopant). The electrochemical modifier can be selected to optimize the electrochemical performance of the carbon materials. The electrochemical modifier can be added before, during, and/or after the polymerization step, described above, is started. For example, the electrochemical modifier can be added to the above described reaction mixture, continuous phase or polymer phase, or included within the polymerization process in any other manner.

The electrochemical modifier may be incorporated within the pore structure and/or on the surface of the carbon material or incorporated in any number of other ways. For example, in some embodiments, the carbon materials comprise a coating of the electrochemical modifier (e.g., $Al_2O_3$) on the surface of the carbon materials. In some embodiments, the carbon materials comprise greater than about 100 ppm of an electrochemical modifier. In certain embodiments, the electrochemical modifier is selected from iron, tin, silicon, nickel, aluminum and manganese. In some embodiments, the electrochemical modifier is silicon and in other embodiments the electrochemical modifier is nitrogen.

In certain embodiments the electrochemical modifier comprises an element with the ability to lithiate from 3 to 0 V versus lithium metal (e.g., silicon, tin, sulfur). In other embodiments, the electrochemical modifier comprises metal oxides with the ability to lithiate from 3 to 0 V versus lithium metal (e.g., iron oxide, molybdenum oxide, titanium oxide). In still other embodiments, the electrochemical modifier comprises elements which do not lithiate from 3 to 0 V versus lithium metal (e.g., aluminum, manganese, nickel, metal-phosphates). In yet other embodiments, the electrochemical modifier comprises a non-metal element (e.g., fluorine, nitrogen, hydrogen). In still other embodiments, the electrochemical modifier comprises any of the foregoing electrochemical modifiers or any combination thereof (e.g., tin-silicon, nickel-titanium oxide).

The electrochemical modifier may be provided in any number of forms. For example, in some embodiments the electrochemical modifier comprises a salt. In other embodiments, the electrochemical modifier comprises one or more elements in elemental form, for example elemental iron, tin, silicon, nickel or manganese. In other embodiments, the electrochemical modifier comprises one or more elements in oxidized form, for example iron oxides, tin oxides, silicon oxides, nickel oxides, aluminum oxides or manganese oxides.

In other embodiments, the electrochemical modifier comprises iron. In other embodiments, the electrochemical modifier comprises tin. In other embodiments, the electrochemical modifier comprises silicon. In some other embodiments, the electrochemical modifier comprises nickel. In yet other embodiments, the electrochemical modifier comprises aluminum. In yet other embodiments, the electrochemical modifier comprises manganese. In yet other embodiments, the electrochemical modifier comprises $Al_2O_3$.

The electrochemical properties of the carbon materials can be modified, at least in part, by the amount of the electrochemical modifier in the carbon material. Accordingly, in some embodiments, the carbon material comprises at least 0.10%, at least 0.25%, at least 0.50%, at least 1.0%, at least 5.0%, at least 10%, at least 25%, at least 50%, at least 75%, at least 90%, at least 95%, at least 99% or at least 99.5% of the electrochemical modifier. For example, in some embodiments, the carbon materials comprise between 0.5% and 99.5% carbon and between 0.5% and 99.5% electrochemical modifier. The percent of the electrochemical modifier is calculated on weight percent basis (wt %). In some other more specific embodiments, the electrochemical modifier is selected from iron, tin, silicon, nickel and manganese.

The total ash content of the carbon material may, in some instances, have an effect on the electrochemical performance of the carbon material. Accordingly, in some embodiments, the ash content of the carbon material ranges from 0.1% to 0.001% weight percent ash, for example in some specific embodiments the ash content of the carbon material is less than 0.1%, less than 0.08%, less than 0.05%, less than 0.03%, than 0.025%, less than 0.01%, less than 0.0075%, less than 0.005% or less than 0.001%.

In other embodiments, the carbon material comprises a total PIXE impurity content of less than 500 ppm and an ash content of less than 0.08%. In further embodiments, the carbon material comprises a total PIXE impurity content of less than 300 ppm and an ash content of less than 0.05%. In other further embodiments, the carbon material comprises a total PIXE impurity content of less than 200 ppm and an ash content of less than 0.05%. In other further embodiments, the carbon material comprises a total PIXE impurity content of less than 200 ppm and an ash content of less than 0.025%. In other further embodiments, the carbon material comprises a total PIXE impurity content of less than 100 ppm and an ash content of less than 0.02%. In other further embodiments, the carbon material comprises a total PIXE impurity content of less than 50 ppm and an ash content of less than 0.01%.

The amount of individual PIXE impurities present in the disclosed carbon materials can be determined by proton induced x-ray emission. Individual PIXE impurities may contribute in different ways to the overall electrochemical performance of the disclosed carbon materials. Thus, in some embodiments, the level of sodium present in the carbon material can be less than 1000 ppm, less than 500 ppm, less than 100 ppm, less than 50 ppm, less than 10 ppm, or less than 1 ppm. As noted above, in some embodiments other impurities such as hydrogen, oxygen and/or nitrogen may be present in levels ranging from less than 10% to less than 0.01%.

In some embodiments, the carbon material comprises undesired PIXE impurities near or below the detection limit of the proton induced x-ray emission analysis. For example, in some embodiments the carbon material comprises less than 50 ppm sodium, less than 15 ppm magnesium, less than 10 ppm aluminum, less than 8 ppm silicon, less than 4 ppm phosphorous, less than 3 ppm sulfur, less than 3 ppm chlorine, less than 2 ppm potassium, less than 3 ppm calcium, less than 2 ppm scandium, less than 1 ppm titanium, less than 1 ppm vanadium, less than 0.5 ppm chromium, less than 0.5 ppm manganese, less than 0.5 ppm iron, less than 0.25 ppm cobalt, less than 0.25 ppm nickel, less than 0.25 ppm copper, less than 0.5 ppm zinc, less than 0.5 ppm gallium, less than 0.5 ppm germanium, less than 0.5 ppm arsenic, less than 0.5 ppm selenium, less than 1 ppm bromine, less than 1 ppm rubidium, less than 1.5 ppm strontium, less than 2 ppm yttrium, less than 3 ppm zirconium, less than 2 ppm niobium, less than 4 ppm molybdenum, less than 4 ppm, technetium, less than 7 ppm rubidium, less than 6 ppm rhodium, less than 6 ppm palladium, less than 9 ppm silver, less than 6 ppm cadmium, less than 6 ppm indium, less than 5 ppm tin, less than 6 ppm antimony, less than 6 ppm tellurium, less than 5 ppm iodine, less than 4 ppm cesium, less than 4 ppm barium, less than 3 ppm lanthanum, less than 3 ppm cerium, less than 2 ppm praseodymium, less than 2 ppm, neodymium, less than 1.5 ppm promethium, less than 1 ppm samarium, less than 1 ppm europium, less than 1 ppm gadolinium, less than 1 ppm terbium, less than 1 ppm dysprosium, less than 1 ppm holmium, less than 1 ppm erbium, less than 1 ppm thulium, less than 1 ppm ytterbium, less than 1 ppm lutetium, less than 1 ppm hafnium, less than 1 ppm tantalum, less than 1 ppm tungsten, less than 1.5 ppm rhenium, less than 1 ppm osmium, less than 1 ppm iridium, less than 1 ppm platinum, less than 1 ppm silver, less than 1 ppm mercury, less than 1 ppm thallium, less than 1 ppm lead, less than 1.5 ppm bismuth, less than 2 ppm thorium, or less than 4 ppm uranium.

In some specific embodiments, the carbon material comprises less than 100 ppm sodium, less than 300 ppm silicon, less than 50 ppm sulfur, less than 100 ppm calcium, less than 20 ppm iron, less than 10 ppm nickel, less than 140 ppm copper, less than 5 ppm chromium and less than 5 ppm zinc as measured by proton induced x-ray emission. In other specific embodiments, the carbon material comprises less than 50 ppm sodium, less than 30 ppm sulfur, less than 100 ppm silicon, less than 50 ppm calcium, less than 10 ppm iron, less than 5 ppm nickel, less than 20 ppm copper, less than 2 ppm chromium and less than 2 ppm zinc.

In other specific embodiments, the carbon material comprises less than 50 ppm sodium, less than 50 ppm silicon, less than 30 ppm sulfur, less than 10 ppm calcium, less than 2 ppm iron, less than 1 ppm nickel, less than 1 ppm copper, less than 1 ppm chromium and less than 1 ppm zinc.

In some other specific embodiments, the carbon material comprises less than 100 ppm sodium, less than 50 ppm magnesium, less than 50 ppm aluminum, less than 10 ppm sulfur, less than 10 ppm chlorine, less than 10 ppm potassium, less than 1 ppm chromium and less than 1 ppm manganese.

The disclosed carbon materials may also comprise a high surface area. While not wishing to be bound by theory, it is thought that the high surface area may contribute, at least in part, to their superior electrochemical performance. Accordingly, in some embodiments, the carbon material comprises a BET specific surface area of at least 100 m$^2$/g, at least 300 m$^2$/g, at least 500 m$^2$/g, at least 1000 m$^2$/g, at least 1500 m$^2$/g, at least 2000 m$^2$/g, at least 2400 m$^2$/g, at least 2500 m$^2$/g, at least 2750 m$^2$/g or at least 3000 m$^2$/g. In other embodiments, the BET specific surface area ranges from about 100 m$^2$/g to about 3000 m$^2$/g, for example from about 500 m$^2$/g to about 1000 m$^2$/g, from about 1000 m$^2$/g to about 1500 m$^2$/g, from about 1500 m$^2$/g to about 2000 m$^2$/g, from about 2000 m$^2$/g to about 2500 m$^2$/g or from about 2500 m$^2$/g to about 3000 m$^2$/g. For example, in some embodiments of the foregoing, the carbon material is activated.

In some specific embodiments the surface area ranges from about 50 m$^2$/g to about 1200 m$^2$/g for example from about 50 m$^2$/g to about 400 m$^2$/g. In other particular embodiments, the surface area ranges from about 200 m$^2$/g to about 300 m$^2$/g for example the surface area may be about 250 m$^2$/g.

In another embodiment, the carbon material comprises a tap density between 0.1 and 1.0 g/cc, between 0.2 and 0.8 g/cc, between 0.3 and 0.5 g/cc or between 0.4 and 0.5 g/cc. In another embodiment, the carbon material has a total pore volume of at least 0.1 cc/g, at least 0.2 cc/g, at least 0.3 cc/g, at least 0.4 cc/g, at least 0.5 cc/g, at least 0.7 cc/g, at least 0.75 cc/g, at least 0.9 cc/g, at least 1.0 cc/g, at least 1.1 cc/g, at least 1.2 cc/g, at least 1.3 cc/g, at least 1.4 cc/g, at least 1.5 cc/g or at least 1.6 cc/g.

The pore size distribution of the disclosed carbon materials is one parameter that may have an effect on the electrochemical performance of the carbon materials. For example, the carbon materials may comprise mesopores with a short effective length (i.e., less than 10 nm, less than 5, nm or less than 3 nm as measured by TEM) which decreases ion diffusion distance and may be useful to enhance ion transport and maximize power. Accordingly, in one embodiment, the carbon material comprises a fractional pore volume of pores at or below 100 nm that comprises at least 50% of the total pore volume, at least 75% of the total pore volume, at least 90% of the total pore volume or at least 99% of the total pore volume. In other embodiments, the carbon material comprises a fractional pore volume of pores at or below 20 nm that comprises at least 50% of the total pore volume, at least 75% of the total pore volume, at least 90% of the total pore volume or at least 99% of the total pore volume.

In another embodiment, the carbon material comprises a fractional pore surface area of pores between 20 and 300 angstroms that comprises at least 40% of the total pore surface area, at least 50% of the total pore surface area, at least 70% of the total pore surface area or at least 80% of the total pore surface area. In another embodiment, the carbon material comprises a fractional pore surface area of pores at or below 20 nm that comprises at least 20% of the total pore surface area, at least 30% of the total pore surface area, at least 40% of the total pore surface area or at least 50% of the total pore surface area.

In another embodiment, the carbon material comprises a fractional pore surface area of pores at or below 100 nm that comprises at least 50% of the total pore surface area, at least 75% of the total pore surface area, at least 90% of the total pore surface area or at least 99% of the total pore surface area. In another embodiment, the carbon material comprises a fractional pore surface area of pores at or below 20 nm that comprises at least 50% of the total pore surface area, at least 75% of the total pore surface area, at least 90% of the total pore surface area or at least 99% of the total pore surface area.

In another embodiment, the carbon material comprises pores predominantly in the range of 1000 angstroms or lower, for example 100 angstroms or lower, for example 50 angstroms or lower. Alternatively, the carbon material comprises micropores in the range of 0-20 angstroms and mesopores in the range of 20-300 angstroms. The ratio of pore volume or pore surface in the micropore range compared to the mesopore range can be in the range of 95:5 to 5:95. Alternatively, the ratio of pore volume or pore surface in the micropore range compared to the mesopore range can be in the range of 20:80 to 60:40.

In other embodiments, the carbon materials are mesoporous and comprise monodisperse mesopores. As used herein, the term "monodisperse" when used in reference to a pore size refers generally to a span (further defined as (Dv,90-Dv,10)/Dv, 50 where Dv,10, Dv,50 and Dv,90 refer to the pore size at 10%, 50% and 90% of the distribution by volume of about 3 or less, typically about 2 or less, often about 1.5 or less.

Yet in other embodiments, the carbons materials comprise a pore volume of at least 1 cc/g, at least 2 cc/g, at least 3 cc/g, at least 4 cc/g or at least 7 cc/g. In one particular embodiment, the carbon materials comprise a pore volume of from 1 cc/g to 7 cc/g.

In other embodiments, the carbon materials comprise at least 50% of the total pore volume residing in pores with a diameter ranging from 50 Å to 5000 Å. In some instances, the carbon materials comprise at least 50% of the total pore volume residing in pores with a diameter ranging from 50 Å to 500 Å. Still in other instances, the carbon materials comprise at least 50% of the total pore volume residing in pores with a diameter ranging from 500 Å to 1000 Å. Yet in other instances, the carbon materials comprise at least 50% of the total pore volume residing in pores with a diameter ranging from 1000 Å to 5000 Å.

In some embodiments, the mean particle diameter for the carbon materials ranges from 1 to 1000 microns. In other embodiments the mean particle diameter for the carbon materials ranges from 1 to 100 microns. Still in other embodiments the mean particle diameter for the carbon materials ranges from 1 to 50 microns. Yet in other embodiments, the mean particle diameter for the carbon materials ranges from 5 to 15 microns or from 1 to 5 microns. Still in other embodiments, the mean particle diameter for the carbon materials is about 10 microns. Still in other embodiments, the mean particle diameter for the carbon materials is less than 4, is less than 3, is less than 2, is less than 1 microns.

In some embodiments, the carbon materials exhibit a mean particle diameter ranging from 1 nm to 10 nm. In other embodiments, the mean particle diameter ranges from 10 nm to 20 nm. Yet in other embodiments, the mean particle diameter ranges from 20 nm to 30 nm. Still in other embodiments, the mean particle diameter ranges from 30 nm to 40 nm. Yet still in other embodiments, the mean particle diameter ranges from 40 nm to 50 nm. In other embodiments, the mean particle diameter ranges from 50 nm to 100 nm. In other embodiments, the mean particle diameter ranges from about 1 μm to about 1 mm. In other embodiments, the mean particle diameter ranges from about 100 μm to about 10 μm. In other embodiments, the mean particle diameter is about 100 μm, about 50 μm or about 10 μm.

In some embodiments, the mean particle diameter for the carbons ranges from 1 μm to 1000 μm. In other embodiments the mean particle diameter for the carbon ranges from 1 μm to 100 μm. Still in other embodiments the mean particle diameter for the carbon ranges from 5 μm to 50 μm. Yet in other embodiments, the mean particle diameter for the carbon ranges from 5 μm to 15 μm. Still in other embodiments, the mean particle diameter for the carbon is about 10 μm.

In some embodiments, the carbon materials exhibit a mean particle diameter ranging from 1 μm to 5 μm. In other embodiments, the mean particle diameter ranges from 5 μm to 10 μm. In yet other embodiments, the mean particle diameter ranges from 10 nm to 20 μm. Still in other embodiments, the mean particle diameter ranges from 20 nm to 30 μm. Yet still in other embodiments, the mean particle diameter ranges from 30 μm to 40 μm. Yet still in other embodiments, the mean particle diameter ranges from 40 μm to 50 μm. In other embodiments, the mean particle diameter ranges from 50 μm to 100 μm. In other embodiments, the mean particle diameter ranges in the submicron range<1 μm.

In related embodiments, the carbon materials exhibit a mean particle diameter ranging from 0.1 mm micron to 4 mm. In other embodiments, the mean particle diameter ranges from 0.5 mm to 4 mm. In yet other embodiments, the mean particle diameter ranges from 0.5 mm to 3 mm. Still in other embodiments, the mean particle diameter ranges from 0.5 mm to 2 mm. In other embodiments, the mean particle diameter ranges from 0.5 mm to 1 mm. In certain embodiments, the mean particle diameter is about 0.9 mm, about 0.8 mm or about 0.5 mm.

In still other embodiments, the carbon materials comprise a monodisperse, or near monodisperse particle size distribution. For example, in some embodiments the carbon material has a particle size distribution such that (Dv,90-Dv,10)/Dv,50 is less than 3, wherein Dv,10, Dv,50 and Dv,90 are the particle size at 10%, 50% and 90%, respectively of the particle size distribution by volume. In further embodiments, (Dv,90-Dv,10)/Dv,50 is less than 2 or even less than 1. In still other embodiments, (Dv,90-Dv,10)/Dv,50 is less than 1,000, less than 100, less than 10, less than 5, less than 3, less than 2, less than 1.5 or even less than 1.

Figure 23B:
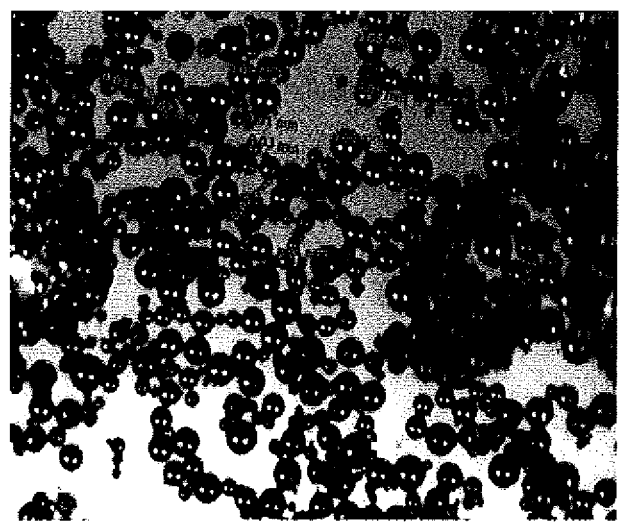

In yet other embodiments, the carbon materials comprise carbon particles having a substantially spherical geometry as determined by optical microscopy and image analysis (see e.g., FIG. 23B). For example, greater than 90%, greater than 95% or even greater than 99% of the carbon particles may have a spherical geometry. Such geometry may improve the performance of any number of electrical devices comprising the carbon materials since the geometry is known to affect particle packing (and thus energy density). In some embodiments, carbon material comprises a plurality of carbon particles, wherein greater than 90% of the carbon particles have a spherical geometry. For example, in some embodiments, greater than 95% of the carbon particles have a spherical geometry.

As noted above, the presently disclosed methods advantageously provide polymer gels and/or carbon materials having optimized particle size distributions. In some embodiments, the particle size distribution contributes to enhanced packing of the individual polymer or carbon particles. Enhanced packing of energy storage particles, for example carbon particles, can be beneficial for a variety of applications. For example, activated carbon materials comprising high surface areas are routinely used in energy storage devices such as capacitors, particularly supercapacitors. Typically such high-surface area carbon materials tend to have low densities, and thus their capacitance on a volume basis (i.e., volumetric capacitance) is relatively low. For practical applications, capacitors require both high gravimetric and high volumetric capacitance. For devices that are constrained with respect to size, volumetric capacitance can be increased by more densely packing the activated carbon particles. Traditional milling of activated carbon materials yields powders having a distribution of particle sizes and a wide and random range of structures (i.e., non-spherical particle shapes). These characteristics limit the ability of activated carbon powders to be densely packed, thus limiting the volumetric capacitance that can be achieved by the same. Carbon materials having enhanced packing properties are described herein and in co-pending U.S. application Ser. No. 13/250,430, which is incorporated herein by reference in its entirety for all purposes.

The particle size distribution of the carbon materials is an important factor in their electrochemical performance. In some embodiments, carbon materials prepared according to the disclosed methods comprise a plurality of carbon particles having particle sizes ranging from about 0.01 µm to about 50 µm. In other embodiments, the particle size distribution comprises particle sizes ranging from about 0.01 µm to about 20 µm. For example, in some embodiments the particle size distribution comprises particle sizes ranging from about 0.03 µm to about 17 µm or from about 0.04 µm to about 12 µm. In certain embodiments of the foregoing, at least 90%, at least 95% or at least 99% of the carbon particles having particles sizes in the range of about 0.01 µm to about 50 µm, about 0.01 µm to about 20 µm, about 0.03 µm to about 17 µm or about 0.04 µm to about 12 µm.

In some embodiments, the disclosed carbon material has a tap density between about 0.1 g/cc and about 0.8 g/cc, for example between about 0.2 g/cc and about 0.6 g/cc. In some embodiments where the carbon comprises predominantly micropores, the tap density ranges between about between 0.3 g/cc and 0.6 g/cc, or between 0.4 g/cc and 0.5 g/cc. In some embodiments where the carbon comprises mesopores and/or macropores, the tap density ranges between about between 0.1 g/cc and 0.4 g/cc, or between 0.2 g/cc and 0.3 g/cc.

In some embodiments, the disclosed carbon material has a total pore volume of at least 0.5 cc/g, at least 0.7 cc/g, at least 0.75 cc/g, at least 0.9 cc/g, at least 1.0 cc/g, at least 1.1 cc/g, at least 1.2 cc/g, at least 1.3 cc/g, at least 1.4 cc/g, at least 1.5 cc/g, at least 1.6 cc/g, at least 1.7 cc/g, at least 1.8 cc/g, at least 1.9 cc/g or at least 2.0 cc/g.

D. Characterization of Polymer Gels and Carbon Materials

The structural properties of the final carbon material and intermediate polymer gels may be measured using Nitrogen sorption at 77K, a method known to those of skill in the art. The final performance and characteristics of the finished carbon material is important, but the intermediate products (both dried polymer gel and pyrolyzed, but not activated, polymer gel), can also be evaluated, particularly from a quality control standpoint, as known to those of skill in the art. The Micromeretics ASAP 2020 is used to perform detailed micropore and mesopore analysis, which reveals a pore size distribution from 0.35 nm to 50 nm in some embodiments. The system produces a nitrogen isotherm starting at a pressure of $10^{-7}$ atm, which enables high resolution pore size distributions in the sub 1 nm range. The software generated reports utilize a Density Functional Theory (DFT) method to calculate properties such as pore size distributions, surface area distributions, total surface area, total pore volume, and pore volume within certain pore size ranges.

The impurity content of the carbon materials can be determined by any number of analytical techniques known to those of skill in the art. One particular analytical method useful within the context of the present disclosure is proton induced x-ray emission (PIXE). This technique is capable of measuring the concentration of elements having atomic numbers ranging from 11 to 92 at low ppm levels. Accordingly, in one embodiment the concentration of impurities present in the carbon materials is determined by PIXE analysis.

E. Devices Comprising the Carbon Materials

One embodiment of the present invention is an electrode, or a device comprising the same, which comprises the disclosed carbon materials. Useful devices in this regard include, but are not limited to, the devices described below and in co-pending U.S. application Ser. Nos. 12/748,219; 12/897,969; 12/829,282; 13/046,572; 12/965,709; 13/336,975; and 61/585,611, each of which are hereby incorporated by reference in their entireties.

1. EDLCs

The disclosed carbon materials can be used as electrode material in any number of electrical energy storage and distribution devices. One such device is an ultracapacitor. Ultracapacitors comprising carbon materials are described in detail in co-owned U.S. Pat. No. 7,835,136 which is hereby incorporated in its entirety.

EDLCs use electrodes immersed in an electrolyte solution as their energy storage element. Typically, a porous separator immersed in and impregnated with the electrolyte ensures that the electrodes do not come in contact with each other, preventing electronic current flow directly between the electrodes. At the same time, the porous separator allows ionic currents to flow through the electrolyte between the electrodes in both directions thus forming double layers of charges at the interfaces between the electrodes and the electrolyte.

When electric potential is applied between a pair of electrodes of an EDLC, ions that exist within the electrolyte are attracted to the surfaces of the oppositely-charged electrodes, and migrate towards the electrodes. A layer of oppositely-charged ions is thus created and maintained near each electrode surface. Electrical energy is stored in the charge separation layers between these ionic layers and the charge layers of the corresponding electrode surfaces. In fact, the charge separation layers behave essentially as electrostatic capacitors. Electrostatic energy can also be stored in the EDLCS through orientation and alignment of molecules of the electrolytic solution under influence of the electric field induced by the potential. This mode of energy storage, however, is secondary.

EDLCS comprising the disclosed carbon material can be employed in various electronic devices where high power is desired. Accordingly, in one embodiment an electrode comprising the carbon materials is provided. In another embodiment, the electrode comprises activated carbon material. In a further embodiment, an ultracapacitor comprising an electrode comprising the carbon materials is provided. In a further embodiment of the foregoing, the ultrapure synthetic carbon material comprises an optimized balance of micropores and mesopores and described above.

The disclosed carbon materials find utility in any number of electronic devices, for example wireless consumer and commercial devices such as digital still cameras, notebook PCs, medical devices, location tracking devices, automotive devices, compact flash devices, mobiles phones, PCMCIA cards, handheld devices, and digital music players. Ultracapacitors are also employed in heavy equipment such as: excavators and other earth moving equipment, forklifts, garbage trucks, cranes for ports and construction and transportation systems such as buses, automobiles and trains.

In one embodiment, the present disclosure is directed to a device comprising the carbon materials described herein, wherein the device is an electric double layer capacitor (EDLC) device comprising:

a) a positive electrode and a negative electrode wherein each of the positive and the negative electrodes comprise the carbon material;

b) an inert porous separator; and c) an electrolyte;

wherein the positive electrode and the negative electrode are separated by the inert porous separator.

In one embodiment, an ultracapacitor device comprising the carbon material comprises a gravimetric power of at least 5 W/g, at least 10 W/g, at least 15 W/g, at least 20 W/g, at least 25 W/g, at least 30 W/g, at least 35 W/g, at least 50 W/g. In another embodiment, an ultracapacitor device comprising the carbon material comprises a volumetric power of at least 2 W/cc, at least 4 W/cc, at least 5 W/cc, at least 10 W/cc, at least 15 W/cc or at least 20 W/cc. In another embodiment, an ultracapacitor device comprising the carbon material carbon material comprises a gravimetric energy of at least 2.5 Wh/kg, at least 5.0 Wh/kg, at least 7.5 Wh/kg, at least 10 Wh/kg, at least 12.5 Wh/kg, at least 15.0 Wh/kg, at least 17.5. Wh/kg, at least 20.0 Wh/kg, at least 22.5 wh/kg or at least 25.0 Wh/kg. In another embodiment, an ultracapacitor device comprising the carbon material comprises a volumetric energy of at least 1.5 Wh/liter, at least 3.0 Wh/liter, at least 5.0 Wh/liter, at least 7.5 Wh/liter, at least 10.0 Wh/liter, at least 12.5 Wh/liter, at least 15 Wh/liter, at least 17.5 Wh/liter or at least 20.0 Wh/liter.

In some embodiments of the foregoing, the gravimetric power, volumetric power, gravimetric energy and volumetric energy of an ultracapacitor device comprising the carbon material are measured by constant current discharge from 2.7 V to 1.89 V employing a 1.0 M solution of tetraethylammonium-tetrafluororoborate in acetonitrile (1.0 M TEATFB in AN) electrolyte and a 0.5 second time constant.

In one embodiment, an ultracapacitor device comprising the carbon material comprises a gravimetric power of at least 10 W/g, a volumetric power of at least 5 W/cc, a gravimetric capacitance of at least 100 F/g (@0.5 A/g) and a volumetric capacitance of at least 10 F/cc (@0.5 A/g). In one embodiment, the aforementioned ultracapacitor device is a coin cell double layer ultracapacitor comprising the carbon material, a conductivity enhancer, a binder, an electrolyte solvent, and an electrolyte salt. In further embodiments, the aforementioned conductivity enhancer is a carbon black and/or other conductivity enhancer known in the art. In further embodiments, the aforementioned binder is Teflon and or other binder known in the art. In further aforementioned embodiments, the electrolyte solvent is acetonitrile or propylene carbonate, or other electrolyte solvent(s) known in the art. In further aforementioned embodiments, the electrolyte salt is tetraethylaminotetrafluoroborate or triethylmethyl aminotetrafluoroborate or other electrolyte salt known in the art, or liquid electrolyte known in the art.

In one embodiment, an ultracapacitor device comprising the carbon material comprises a gravimetric power of at least 15 W/g, a volumetric power of at least 10 W/cc, a gravimetric capacitance of at least 110 F/g (@0.5 A/g) and a volumetric capacitance of at least 15 F/cc (@0.5 A/g). In one embodiment, the aforementioned ultracapacitor device is a coin cell double layer ultracapacitor comprising the carbon material, a conductivity enhancer, a binder, an electrolyte solvent, and an electrolyte salt. In further embodiments, the aforementioned conductivity enhancer is a carbon black and/or other conductivity enhancer known in the art. In further embodiments, the aforementioned binder is Teflon and or other binder known in the art. In further aforementioned embodiments, the electrolyte solvent is acetonitrile or propylene carbonate, or other electrolyte solvent(s) known in the art. In further aforementioned embodiments, the electrolyte salt is tetraethylaminotetrafluoroborate or triethylmethyl aminotetrafluoroborate or other electrolyte salt known in the art, or liquid electrolyte known in the art.

In one embodiment, an ultracapacitor device comprising the carbon material comprises a gravimetric capacitance of at least 90 F/g, at least 95 F/g, at least 100 F/g, at least 105 F/g, at least 110 F/g, at least 115 F/g, at least 120 F/g, at least 125 F/g, or at least 130 F/g. In another embodiment, an ultracapacitor device comprising the carbon material comprises a volumetric capacitance of at least 5 F/cc, at least 10 F/cc, at least 15 F/cc, at least 20 F/cc, at least 25 F/cc, or at least 30 F/cc. In some embodiments of the foregoing, the gravimetric capacitance and volumetric capacitance are measured by constant current discharge from 2.7 V to 0.1 V with a 5-second time constant and employing a 1.8 M solution of tetraethylammonium-tetrafluororoborate in acetonitrile (1.8 M TEATFB in AN) electrolyte and a current density of 0.5 A/g, 1.0 A/g, 4.0 A/g or 8.0 A/g.

In one embodiment, the present disclosure provides ultracapacitors comprising a carbon material as disclosed herein, wherein the percent decrease in original capacitance (i.e., capacitance before being subjected to voltage hold) of the ultracapacitor comprising the carbon material after a voltage hold period is less than the percent decrease in original capacitance of an ultracapacitor comprising known carbon materials. In one embodiment, the percent of original capacitance remaining for an ultracapacitor comprising the carbon material after a voltage hold at 2.7 V for 24 hours at 65° C. is at least 90%, at least 80%, at least 70%, at least 60%, at least 50%, at least 40%, at least 30% at least 20% or at least 10%. In further embodiments of the foregoing, the percent of original capacitance remaining after the voltage hold period is measured at a current density of 0.5 A/g, 1 A/g, 4 A/g or 8 A/g.

In another embodiment, the present disclosure provides ultracapacitors comprising a carbon material as disclosed herein, wherein the percent decrease in original capacitance of the ultracapacitor comprising the carbon material after repeated voltage cycling is less than the percent decrease in original capacitance of an ultracapacitor comprising known carbon materials subjected to the same conditions. For example, in one embodiment, the percent of original capacitance remaining for an ultracapacitor comprising the carbon material is more than the percent of original capacitance remaining for an ultracapacitor comprising known carbon materials after 1000, 2000, 4000, 6000, 8000, or 1000 voltage cycling events comprising cycling between 2 V and 1V at a current density of 4 A/g. In another embodiment, the percent of original capacitance remaining for an ultracapacitor comprising the carbon material after 1000, 2000, 4000, 6000, 8000, or 1000 voltage cycling events comprising cycling between 2 V and 1V at a current density of 4 A/g, is at least 90%, at least 80%, at least 70%, at least 60%, at least 50%, at least 40%, at least 30% at least 20% or at least 10%.

As noted above, the carbon material can be incorporated into ultracapacitor devices. In some embodiments, the carbon material is milled to an average particle size of about 10 microns using a jet mill according to the art. While not wishing to be bound by theory, it is believed that this fine particle size enhances particle-to-particle conductivity, as well as enabling the production of very thin sheet electrodes. The jetmill essentially grinds the carbon against itself by spinning it inside a disc shaped chamber propelled by high-pressure nitrogen. As the larger particles are fed in, the centrifugal force pushes them to the outside of the chamber; as they grind against each other, the particles migrate towards the center where they eventually exit the grinding chamber once they have reached the appropriate dimensions.

In further embodiments, after jet milling the carbon is blended with a fibrous Teflon binder (3% by weight) to hold the particles together in a sheet. The carbon Teflon mixture is kneaded until a uniform consistency is reached. Then the mixture is rolled into sheets using a high-pressure roller-former that results in a final thickness of 50 microns. These electrodes are punched into discs and heated to 195° C. under a dry argon atmosphere to remove water and/or other airborne contaminants. The electrodes are weighed and their dimensions measured using calipers.

The carbon electrodes of the EDLCs are wetted with an appropriate electrolyte solution. Examples of solvents for use in electrolyte solutions for use in the devices of the present application include but are not limited to propylene carbonate, ethylene carbonate, butylene carbonate, dimethyl carbonate, methyl ethyl carbonate, diethyl carbonate, sulfolane, methylsulfolane and acetonitrile. Such solvents are generally mixed with solute, including, tetralkylammonium salts such as TEATFB (tetraethylammonium tetrafluoroborate); TEMATFB (tri-ethyl,methylammonium tetrafluoroborate); EMITFB (1-ethyl-3-methylimidazolium tetrafluoroborate), tetramethylammonium or triethylammonium based salts. Further the electrolyte can be a water based acid or base electrolyte such as mild sulfuric acid or potassium hydroxide.

In some embodiments, the electrodes are wetted with a 1.0 M solution of tetraethylammonium-tetrafluoroborate in acetonitrile (1.0 M TEATFB in AN) electrolyte. In other embodiments, the electrodes are wetted with a 1.0 M solution of tetraethylammonium-tetrafluoroborate in propylene carbonate (1.0 M TEATFB in PC) electrolyte. These are common electrolytes used in both research and industry and are considered standards for assessing device performance. In other embodiments, the symmetric carbon-carbon (C—C) capacitors are assembled under an inert atmosphere, for example, in an Argon glove box, and a NKK porous membrane 30 micron thick serves as the separator. Once assembled, the samples may be soaked in the electrolyte for about 20 minutes or more depending on the porosity of the sample.

In some embodiments, the capacitance and power output are measured using cyclic voltametry (CV), chronopotentiometry (CP) and impedance spectroscopy at various voltages (ranging from 1.0-2.5 V maximum voltage) and current levels (from 1-10 mA) on a Biologic VMP3 electrochemical workstation. In this embodiment, the capacitance may be calculated from the discharge curve of the potentiogram using the formula:

$$C = \frac{I \times \Delta t}{\Delta V} \qquad \text{Equation 1}$$

where I is the current (A) and $\Delta V$ is the voltage drop, $\Delta t$ is the time difference. Because in this embodiment the test capacitor is a symmetric carbon-carbon (C—C) electrode, the specific capacitance is determined from:

$$C_S = 2C/m_e \qquad \text{Equation 2}$$

where $m_e$ is the mass of a single electrode. The specific energy and power may be determined using:

$$E_s = \frac{1}{4} \frac{CV_{max}^2}{m_e} \qquad \text{Equation 3}$$

$$P_s = \frac{E_s}{4ESR} \qquad \text{Equation 4}$$

where C is the measured capacitance $V_{max}$ is the maximum test voltage and ESR is the equivalent series resistance obtained from the voltage drop at the beginning of the discharge. ESR can alternately be derived from impedance spectroscopy.

2. Batteries

The disclosed carbon materials also find utility as electrodes in any number of types of batteries. For example, one embodiment is directed to an electrical energy storage device comprising:

a) at least one anode comprising a carbon material;
b) at least one cathode comprising a metal oxide; and
c) an electrolyte comprising lithium ions;
wherein the carbon material is any of the carbon materials described herein.

Another embodiment is directed to a metal air battery, for example lithium air batteries. Lithium air batteries generally comprise an electrolyte interposed between positive electrode and negative electrodes. The positive electrode generally comprises a lithium compound such as lithium oxide or lithium peroxide and serves to oxidize or reduce oxygen. The negative electrode generally comprises a carbonaceous substance which absorbs and releases lithium ions. As with supercapacitors, batteries such as lithium air batteries which comprise the disclosed carbon materials are expected to be superior to batteries comprising known carbon materials. Accordingly, in one embodiment the present invention provides a metal air battery, for example a lithium air battery, comprising a carbon material as disclosed herein.

Any number of other batteries, for example, zinc-carbon batteries, lithium/carbon batteries, lead acid batteries and the like are also expected to perform better with the carbon materials described herein. One skilled in the art will recognize other specific types of carbon containing batteries which will benefit from the disclosed carbon materials. Accordingly, in another embodiment the present invention provides a battery, in particular a zinc/carbon, a lithium/carbon batteries or a lead acid battery comprising a carbon material as disclosed herein.

EXAMPLES

The carbon materials disclosed in the following Examples were prepared according to the methods disclosed herein. Chemicals were obtained from commercial sources at reagent grade purity or better and were used as received from the supplier without further purification.

In some examples, the polymer phase may be prepared by admixing polymer precursors and the optional solvent and/or optional catalyst to form a prepolymer composition. The polymer phase is then added to continuous phase with optional addition of surfactants. In some embodiments, the polymer phase may be reacted to a certain degree of polymerization (prepolymer) and then mixing with the continuous phase, with optional surfactant addition. The polymerization of the prepolymer can be carried out to an endpoint based on the refractive index of the liquid prepolymer. For example, the prepolymer can be polymerized until the prepolymer has a refractive index ranging from a low of about 1.1000, about 1.2000, about 1.3000, or about 1.3200 to a high of about 1.4500, about 1.4800, about 1.5000, or about 1.5500. In another example, the polymerization of the monomer mixture to produce the prepolymer can be carried out to a refractive index of about 1.3500 to about 1.4500, about 1.3800 to about 1.4400, about 1.3900 to about 1.4350, of about 1.3900 to about 1.4500. The monomer component can be pre-polymerized at a temperature of from a low of about 20° C., about 25° C., about 30° C., about 35° C., or about 40° C. to a high of about 50° C., about 55° C., about 60° C., about 65° C., about 70° C., about 75° C., about 80° C., about 85° C., about 90° C., about 95° C., or about 100° C. For example, the monomer component can be pre-polymerized at a temperature of about 20° C., about 30° C., about 40° C., about 50° C., about 60° C., or about 70° C. prior to forming the suspension or emulsion. The prepolymer can be added to the carrier fluid, the carrier fluid can be added to the prepolymer, or the prepolymer and the carrier fluid can be simultaneously combined with one another.

The prepolymer solution can be combined with an external phase. The temperature of the external phase can be varied from 60° C. to 200° C. The external phase temperature can be about 60° C., 70° C., 80° C., 90° C., 95° C., 100° C. In some embodiments the temperature of the external phase can be above the boiling point at atmospheric pressure. The curing time that the prepolymer phase is in contact with the hot external phase can be varied. The curing time can be varied from 30 seconds to 100 hours. The curing time can be 1 minute, 5 minutes, 30 minutes, 1 hour. In other embodiments the curing time can be 1 hour, 2 hours, 3 hours, 6 hours, and 12 hours.

In some examples, the polymer gel particles are freeze dried prior to pyrolysis and/or activation. In these examples, the lyophilizer shelf was generally pre-cooled to −30° C. before loading a tray containing the frozen polymer hydrogel particles on the lyophilizer shelf. The chamber pressure for lyophilization was typically in the range of 50 to 1000 mTorr and the shelf temperature was in the range of +10 to +25° C. Alternatively, the shelf temperature can be set lower, for example in the range of 0 to +10° C. Alternatively, the shelf temperature can be set higher, for example in the range of 25 to +100° C. Chamber pressure can be held in the range of 50 to 3000 mTorr. For instance, the chamber pressure can be controlled in the range of 150 to 300 mTorr.

Unless noted otherwise, the polymer was pyrolyzed by heating in a nitrogen atmosphere at temperatures ranging from 700-1200° C. for a period of time as specified in the examples, for example 850° C. with a nitrogen gas flow of 200 L/h. Activation conditions generally comprised heating a pyrolyzed polymer hydrogel in a $CO_2$ atmosphere at temperatures ranging from 800-1000° C. for a period of time as specified in the examples, for example 900° C. under a $CO_2$ for 660 min. Specific pyrolysis and activation conditions were as described in the following examples.

TGA studies were performed using a Mettler Toledo TGA/DSC1 707 $N_2/CO_2$ MX5 system. Pyrolysis and activation was performed using a Thermo Scientific, Economy Solid Tube furnace. Surface area and pore volume measurements were obtained using a Micromeritics Tristar II BET system.

Unless stated otherwise, percent values throughout the examples and specification are on a weight (w/w) basis.

Example 1

Emulsion Preparation of Dried Polymer Gel

For each sample, two separate solutions were prepared. Five different gel solutions were made by admixing a resorcinol and formaldehyde (molar ratio of resorcinol:formaldehyde=0.5:1) solution with a water/acetic acid solvent (75:25) and adding an ammonium acetate catalyst. The ratios of the various gel reagents are indicated in Table 1 for the five samples.

A cyclohexane/SPAN 80 solution was also prepared. The gel solution was allowed to mix for 10 minutes before it was poured into the cyclohexane/SPAN80 solution and the temperature was set to 45° C. After 4 hours at 45° C., the temperature was increased to 65-70° C. and held for 24 hours before the excess cyclohexane was decanted and the resin was placed in a 45° C. oven for 10-20 minutes to dry. Sample conditions are summarized in Table 1.

TABLE 1

Polymerization Conditions

| Sample | Gel Formulation (Solids/Acid/R:C)* | RF Solution (mL) | Cyclohexane (mL) | SPAN80 (mL) | % SPAN80 | % Gel** |
|---|---|---|---|---|---|---|
| 1-1 | 41/20/25 | 10 | 100 | 0.5 | 0.5% | 10% |
| 1-2 | 33/20/10 | 10 | 100 | 0.5 | 0.5% | 10% |
| 1-3 | 33/20/25 | 20 | 150 | 1.0 | 0.7% | 13% |
| 1-4 | 41/20/10 | 50 | 400 | 20.0 | 5.0% | 13% |
| 1-5 | 33/20/25 | 30 | 150 | 2.0 | 1.3% | 20% |

*(Solids/Acid/R:C) refers to the solids content in percent (e.g., mass resorcinol and formaldehyde to total mass), percent acid of total liquid (e.g., acid plus water) and R:C is mass ratio of resorcinol to catalyst, respectively.
**% Gel = Percent loading of RF (i.e., resorcinol/formaldehyde) solution in total emulsions/suspension polymerization solution (e.g., RF solution and continuous phase)

Example 2

Dried Polymer Gel Data

Nitrogen isotherm, surface area and pore volume data for the dried gel samples from Example 1 are presented in FIG. 1 and in Table 2. For comparative purposes, two carbon samples were prepare as controls via the general "monolith" approach described in Example 15. Comparative Sample 1 was prepared from a gel formulation that produces a microporous polymer gel and Comparative Sample 2 was prepared from a gel formulation that produces a mesoporous polymer gel. All samples showed a lower surface area and pore volume compared to the comparative samples. While not wishing to be bound by theory, it is thought that this decrease is likely due to surfactant and/or residual non-aqueous solvent in the pores and on the surface of the gel material, and was expected to be burned off during pyrolysis. This theory was supported by the ability to activate the pyrolyzed material to a target surface area, while achieving pore volume and P95/P5 (i.e., ratio of nitrogen sorbed at 95% partial pressure to that sorbed at 5% partial pressure) commensurate with microporous carbon. Therefore certain properties of the dried gel may not be predictive of the properties of the final carbon materials.

TABLE 2

Properties of Dried Polymer Gel Samples

| Sample | SSA (m²/g) | PV (cc/g) | P95/P5 | Max Pore Width (Å) |
|---|---|---|---|---|
| 1-1 | 481 | 0.299 | 1.77 | 63 |
| 1-2 | 583 | 0.419 | 2.15 | 172 |
| 1-3 | 75 | 0.059 | 2.40 | 100 |
| 1-4 | 72 | 0.101 | 5.29 | 86 |
| 1-5 | 325 | 0.297 | 2.75 | 108 |
| Comparative Sample 1 | 545 | 0.327 | 1.80 | 59 |
| Comparative Sample 2 | 625-725 | 0.98-1.20 | 4.4-5.5 | 250 |

Example 3

Activated Carbon Data

Figure 2:
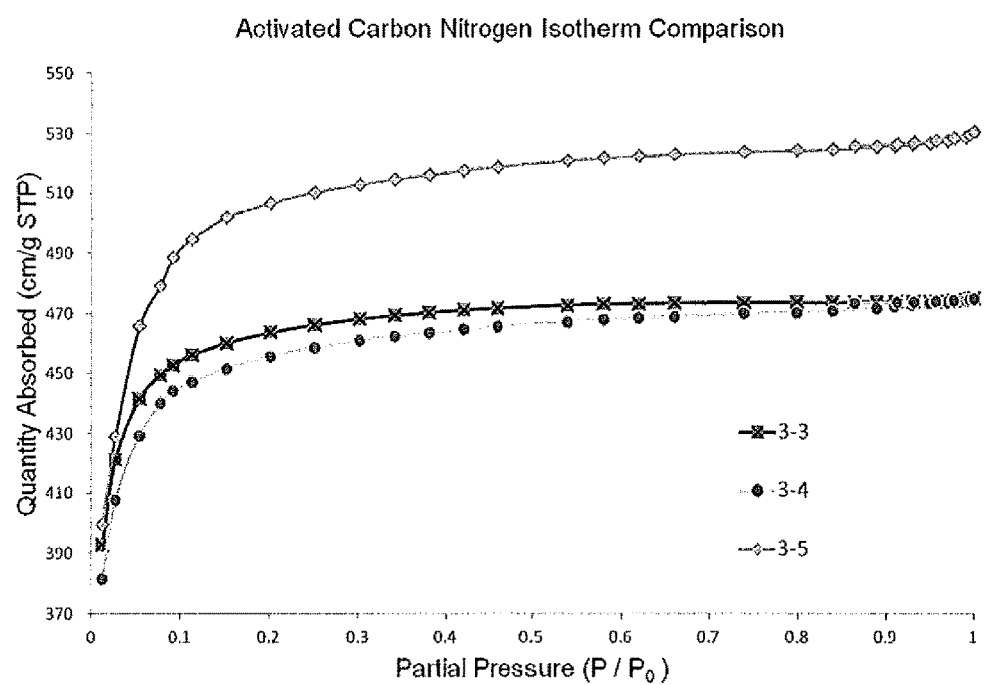
FIG. 2 presents $N_2$ absorption isotherms for activated carbon samples.

Nitrogen isotherm, surface area, pore volume, and electrochemical testing (ECT) data for activated carbon samples (3-3, 3-4, 3-5) are presented in FIG. 2 and in Tables 3 & 4. Samples 3-3 through 3-5 were pyrolyzed at high temperatures under an inert atmosphere while sample 4 was pyrolyzed without any drying step prior to pyrolysis. All three samples were activated at high temperature in a tube furnace ($CO_2$ atmosphere) to achieve a surface area of 1700-1900 m²/g. The isotherm data (FIG. 2) shows that all three samples exhibited a very microporous pore structure and had a surface area to pore volume development comparable or superior to a control carbon material prepared via monolith techniques. For example, the P95/P5 (ratio of nitrogen sorbed at 0.95 partial pressure relative to 0.05 partial pressure) was 1.08 to 1.14 for the carbon samples derived from polymer gel prepared by an emulsion process relative to 1.20 for carbon derived from monolithic polymer gel. The lower P95/P5 is reflective of increased microporosity, which in turn is beneficial for improving volumetric capacitance in the activated carbon.

All samples also demonstrate a normalized electrochemical performance the same or better than the comparative carbon prepared via monolith techniques (Comparative Sample 3 with a normalized volumetric capacitance of 24 F/cc). Although the gel formulations employed (3-3, 3-5) were expected to produce mesoporous carbons based on known monolith preparations, all carbon samples surprisingly showed no mesoporosity in the dried gel or activated carbon.

TABLE 3

Activated Carbon Surface Area and Pore Volume

| Sample | Gel (Solid/Acid/RC) | SSA (m²/g) | PV (cc/g) | P95/P5 |
|---|---|---|---|---|
| Comparative Sample 3 | — | 1847 | 0.809 | 1.20 |
| 3-3 | 33/20/10 | 1760 | 0.734 | 1.08 |
| 3-4 | 41/20/10 | 1731 | 0.733 | 1.10 |
| 3-5 | 33/20/25 | 1928 | 0.818 | 1.14 |

TABLE 4

Activated Carbon Electrochemical Testing Performance

| Sample | Gel (Solid/Acid/RC) | Electrode Wt | F/cc | F/g | Normalized F/cc | −45* (Hz) | Normalized F/cc |
|---|---|---|---|---|---|---|---|
| 3-3 | 33/20/10 | 22.09 | 22.0 | 120.0 | 24.0 | 0.09 | 24.0 |
| 3-4 | 41/20/10 | 15.69 | 23.5 | 120.0 | 25.6 | 0.14 | 25.6 |
| 3-5 | 33/20/25 | 16.17 | 23.8 | 118.2 | 23.5 | 0.16 | 23.5 |

*Frequency response = Frequency as calculated from the Bode plot at a 45° phase angle Example 4

Preparation of Dried Polymer Gel

To explore the ability of the present method for preparing carbon materials having different pore structure (e.g., mesoporosity), five polymerizations were carried out using the general procedures described in Example 1, except the formulations were as set forth in Table 5. As a control, the gel formulation for each for each polymerization was also allowed to polymerize under monolith conditions (i.e., as described in Example 15). The control sample for each gel formulation is designated with a "C" in Table 6.

TABLE 5

Polymerization Conditions

| Sample | Gel Formulation | Gel Solution (mL) | Cyclohexane (mL) | SPAN80 (mL) | % SPAN80 | % RF Gel |
|---|---|---|---|---|---|---|
| 5-1 | 33/20/100 | 40 | 200 | 20 | 10% | 20% |
| 5-2 | 33/10/100 | 40 | 200 | 20 | 10% | 20% |
| 5-3 | 33/20/400 | 40 | 200 | 20 | 10% | 20% |
| 5-4 | 33/10/400 | 40 | 200 | 20 | 10% | 20% |
| 5-5 | 33/10/50 | 40 | 200 | 2 | 1% | 20% |

Example 5

Dried Polymer Gel Data

Figure 3:
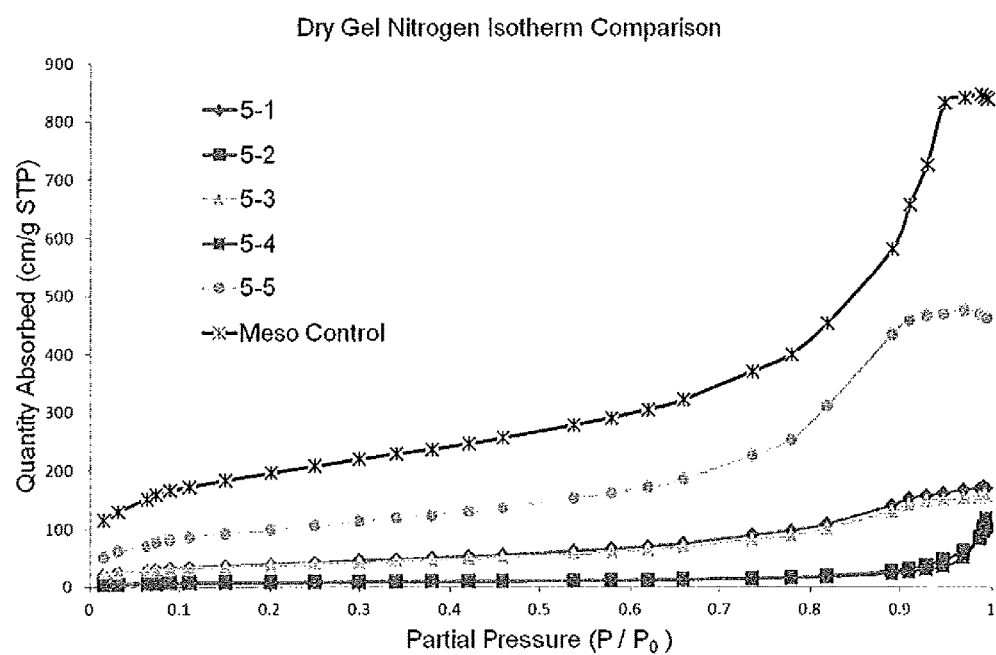
FIG. 3 is a graph showing $N_2$ absorption isotherms for freeze dried gels.

Nitrogen isotherm, surface area and pore volume data for dried gel samples prepared according to Example 4 are presented in FIG. 3 and in Table 6. All polymer gels were freeze dried prior to analysis. All samples showed a collapsed pore structure and lower SSA compared to a monolith prepared control of a mesoporous carbon (designated "MesoControl" herein) and compared to the individual control (monolith) gels. As discussed above, the low SSA and PV may be an artifact created by surfactant clogging the pores, which may or may not be linked to surfactant loading. Samples 1 and 3 both used 20% acid content and show a small pore volume contribution from the mesopore range. Samples 2 and 4 used 10% acid content and both show most of their pore volume being attributed to macropores.

Figure 4:
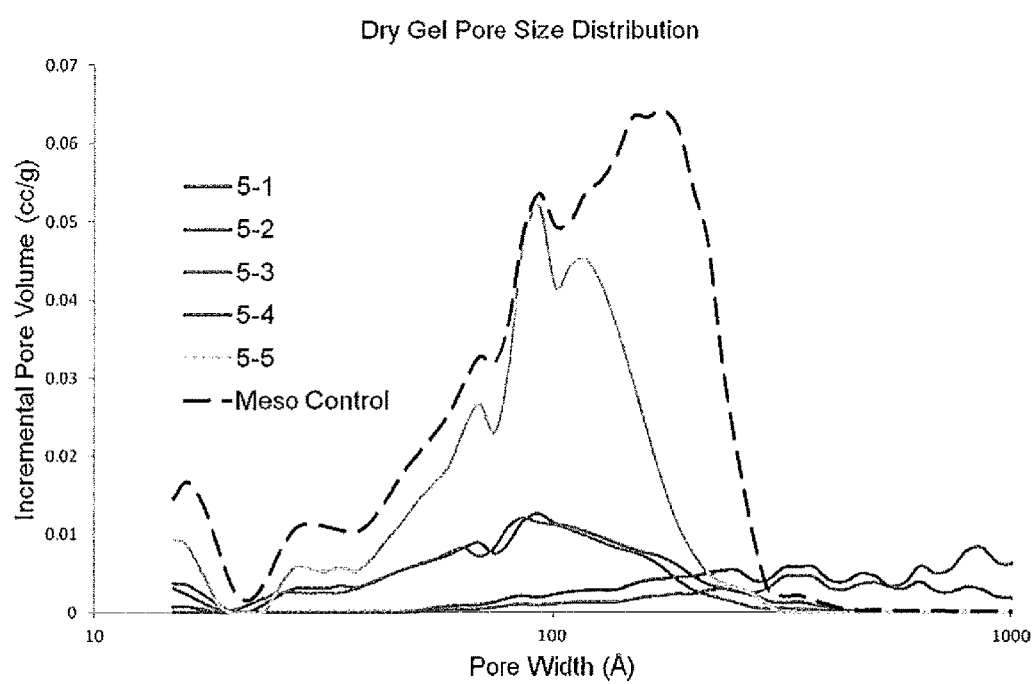
FIG. 4 demonstrates Pore size distributions for dry gels.

Taking into account the contraction of the mesopores in samples 1-4, it was decided to use less surfactant for sample 5. Low acid (10%) with low R:C (50:1) was used to achieve mesoporosity with no macro-porosity. Sample 5 shows (FIG. 4) a much greater contribution of volume from mesopores and maps closely to the MesoControl control dried gel. The surface area (Table 6) is still lower than the control, but based on activation data (see below) this may be due more to surfactant rather than the dried gel material.

TABLE 6

Dried Gel Surface Area and Pore Volume

| Sample | Gel (Solid/Acid/R:C) | SSA (m²/g) | PV (cc/g) | P95/P5 |
|---|---|---|---|---|
| 5-1 | 33/20/100 | 143 | 0.278 | 5.77 |
| 5-1C | 33/20/100 | 633 | 0.882 | 4.22 |
| 5-2 | 33/10/100 | 33 | 0.153 | 7.80 |
| 5-2C | 33/10/100 | 396 | 1.203 | 4.95 |
| 5-3 | 33/20/400 | 137 | 0.249 | 5.58 |
| 5-3C | 33/20/400 | 632 | 1.198 | 5.44 |
| 5-4 | 33/10/400 | 25 | 0.176 | 8.83 |
| 5-4C | 33/10/400 | 469 | 1.169 | 3.31 |
| 5-5 | 33/10/50 | 358 | 0.755 | 6.70 |
| 5-5C | 33/10/50 | 687 | 1.919 | 7.06 |
| MesoControl | — | 625-725 | 0.98-1.20 | 4.4-5.5 |

Example 6

Activated Carbon Data

Figure 5:
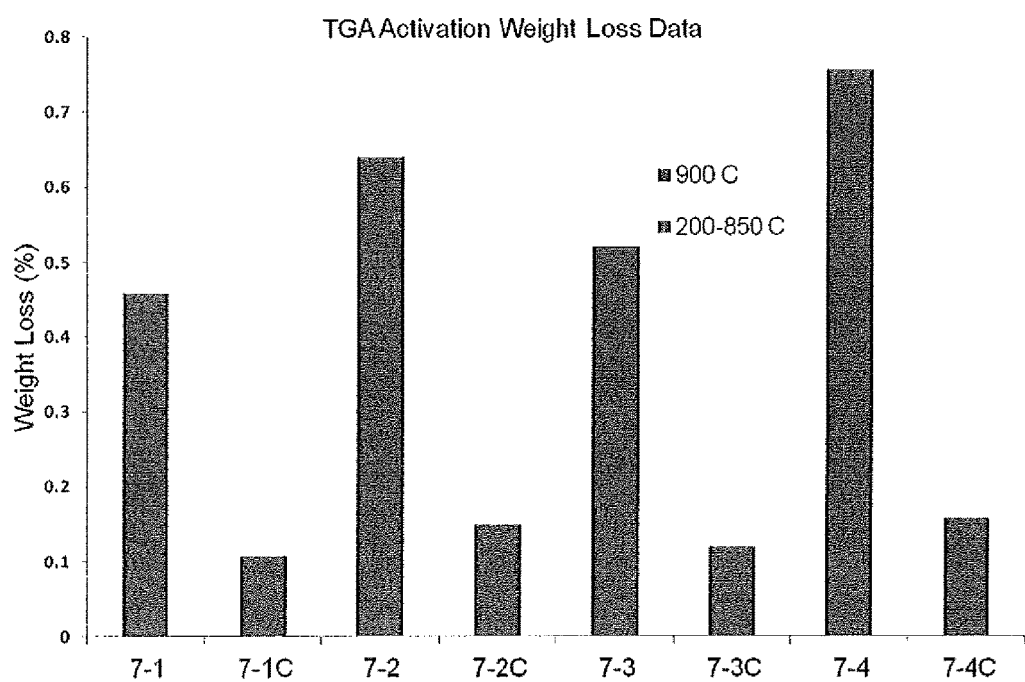
FIG. 5 is a bar graph showing weight loss upon activation.

The gels dried gels from Example 5 were pyrolyzed and activated (samples 7-1,7-5). Weight loss upon activation, nitrogen isotherm, surface area, pore volume, and electrochemical testing data for these activated carbon samples are presented in FIGS. 5 & 6 and in Table 7. All samples and their controls were pyrolyzed at high temperatures under inert atmosphere. All Pyrolyzed Carbon (PC) samples were put on for TGA analysis of activation rates at 900° C. Each emulsion PC sample was activated at high temperature in the tube furnace.

Figure 6:
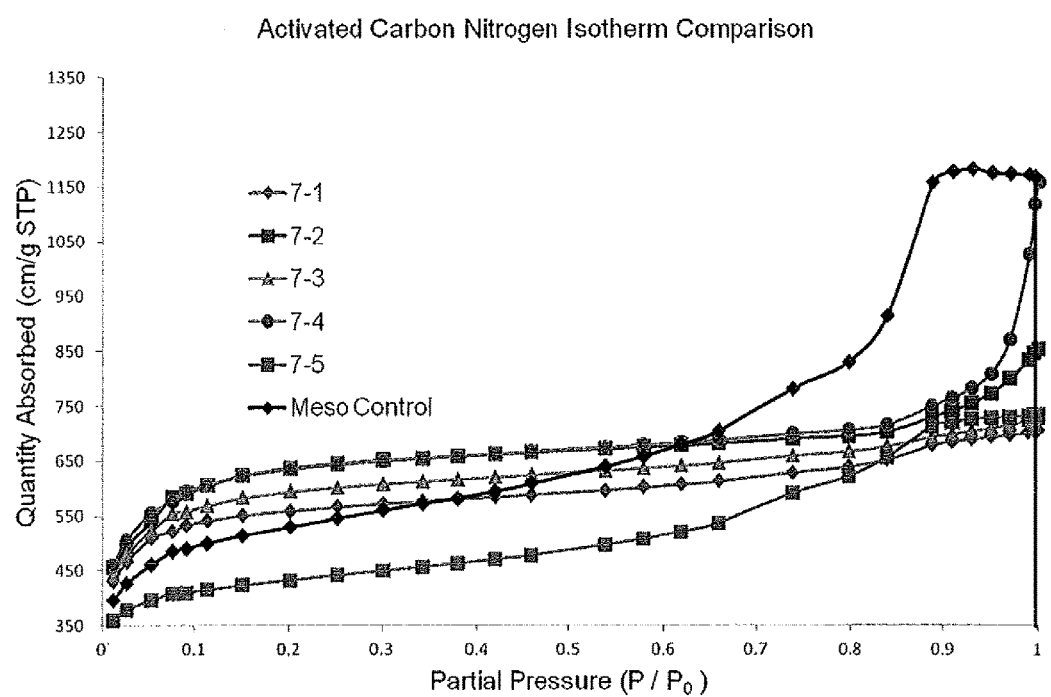
FIG. 6 shows $N_2$ absorption isotherms for activated carbon samples.

TGA data (FIG. 5) shows a significant increase in activation rate for the emulsion samples compared to their control samples. This may be due more to particle size being very small and not solely due to the amount of porosity. Samples 2 and 4 show an increased activation rate compared to samples 1 and 3, as indicated by higher $N_2$ adsorption from the same activation conditions, and are more macroporous. Samples 1 and 3 used a higher acid content and contain more mesopore volume, than other protocols and were more collapsed compared to the MesoControl (FIG. 6). Although samples 1-4 were over-activated, their pore development is not similar to MesoControl carbon. Samples 1 and 3, that used 20% acid, give a more mesoporous carbon development than the samples that used 10% Acid.

Figure 7:
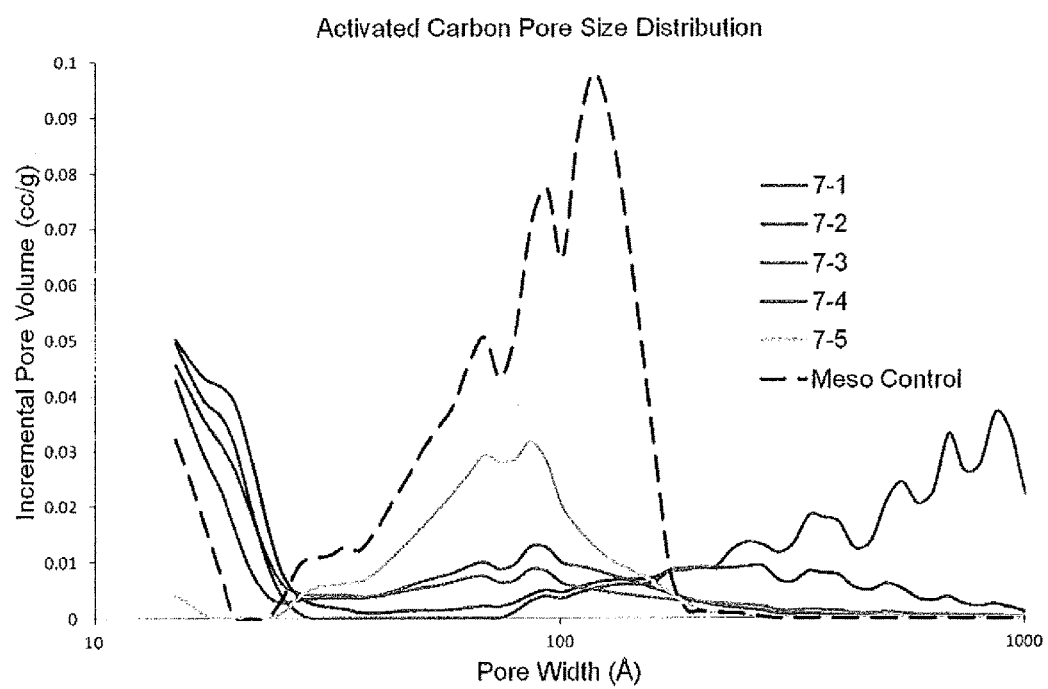
FIG. 7 illustrates pore size distribution DFT for activated carbons.

Sample 5 used less surfactant with the intention of creating more mesoporosity and the data for sample 5 shows successful creation of mesoporosity (see FIG. 7). This carbon material shows less of a pore contribution from 100-200 Å than the MesoControl control, but this may not be an issue for electrochemical performance. Thus the described method is suitable for preparation of a mesoporous carbon material.

TABLE 7

Activated Carbon Surface Area and Pore Volume

| Sample | Gel (Solid/Acid/R:C) | SSA (m²/g) | PV (cc/g) | P95/P5 |
|---|---|---|---|---|
| 7-1 | 33/20/100 | 2122 | 1.090 | 1.37 |
| 7-2 | 33/10/100 | 2423 | 1.312 | 1.42 |
| 7-3 | 33/20/400 | 2258 | 1.125 | 1.36 |
| 7-4 | 33/10/400 | 2411 | 1.777 | 1.48 |
| 7-5 | 33/10/50 | 1704 | 1.217 | 1.88 |
| MesoControl | 33/20/25 | 1800 | 1.420 | 2.04 |

Example 7

Preparation of Dried Polymer Gel

Ten emulsion polymerizations were performed according to the general procedures of Example 1 to explore parameters for preparation of a microporous carbon material. Control samples (designated with "C" in Table 9) were also prepared using the same gel formulations and allowing the gel to polymerize in a monolith fashion. Polymerization conditions are set forth in Table 8.

TABLE 8

Polymerization Conditions

| Sample | % Solids | % Acid | R:C | SPAN 80% | % RF Gel |
|---|---|---|---|---|---|
| 8-1 | 50 | 10 | 10 | 1 | 20 |
| 8-2 | 41 | 10 | 25 | 1 | 20 |
| 8-3 | 41 | 20 | 10 | 30 | 20 |
| 8-4 | 41 | 20 | 25 | 1 | 40 |
| 8-5 | 41 | 20 | 10 | 10 | 20 |
| 8-6 | 41 | 10 | 10 | 10 | 30 |
| 8-7 | 46 | 15 | 15 | 5 | 25 |
| 8-8 | 50 | 10 | 25 | 10 | 30 |
| 8-9 | 50 | 20 | 25 | 10 | 20 |
| 8-10 | 50 | 20 | 10 | 1 | 30 |

Example 8

Dried Polymer Gel Data

Figure 8:
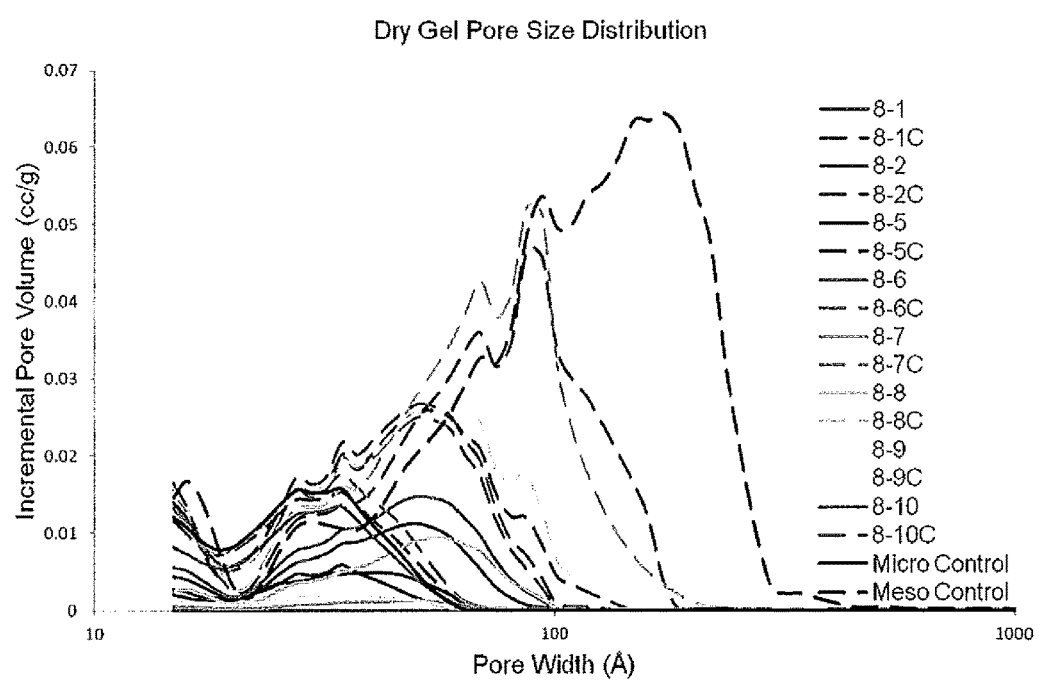
FIG. 8 is a graph of pore volume distributions for freeze dried gels.

Nitrogen isotherm, surface area and pore volume data for dried gel samples of Example 7 are presented in FIG. 8 and in Table 8. Samples 3 and 4 did not make processable wet gel so no data was collected for those samples. All other samples were freeze-dried. DFT pore size distributions (FIG. 8) show a contraction in pore structure in emulsion samples vs. their oven-cured control as noted with the other examples. Following from this, the emulsion samples show a lower specific surface area and pore volume (Table 9) as compared to their corresponding monolith control samples.

TABLE 9

Dried Gel Surface Area and Pore Volume

| Sample | Gel (Solid/Acid/R:C/Surfactant/RF) | SSA (m²/g) | PV (cc/g) | P95/P5 |
|---|---|---|---|---|
| 8-1 | 50/10/10/1/20 | 108 | 0.086 | 2.36 |
| 8-1C | | 615 | 0.543 | 2.70 |
| 8-2 | 41/10/25/1/20 | 185 | 0.195 | 3.08 |
| 8-2C | | 618 | 0.785 | 3.80 |
| 8-5 | 41/20/10/10/20 | 94 | 0.094 | 2.84 |
| 8-5C | | 509 | 0.315 | 1.86 |
| 8-6 | 41/10/10/10/30 | 233 | 0.264 | 3.26 |
| 8-6C | | 555 | 0.479 | 2.62 |
| 8-7 | 46/15/15/5/25 | 23 | 0.026 | 3.19 |
| 8-7C | | 580 | 0.363 | 1.86 |
| 8-8 | 50/10/25/10/30 | 110 | 0.151 | 4.01 |
| 8-8C | | 679 | 0.814 | 3.65 |
| 8-9 | 50/20/25/10/20 | 54 | 0.039 | 2.20 |
| 8-9C | | 660 | 0.587 | 2.69 |
| 8-10 | 50/20/10/1/30 | 355 | 0.234 | 2.03 |
| 8-10C | | 646 | 0.542 | 2.56 |

Example 9

Activated Carbon Data and Electrochemical Testing

Figure 9:
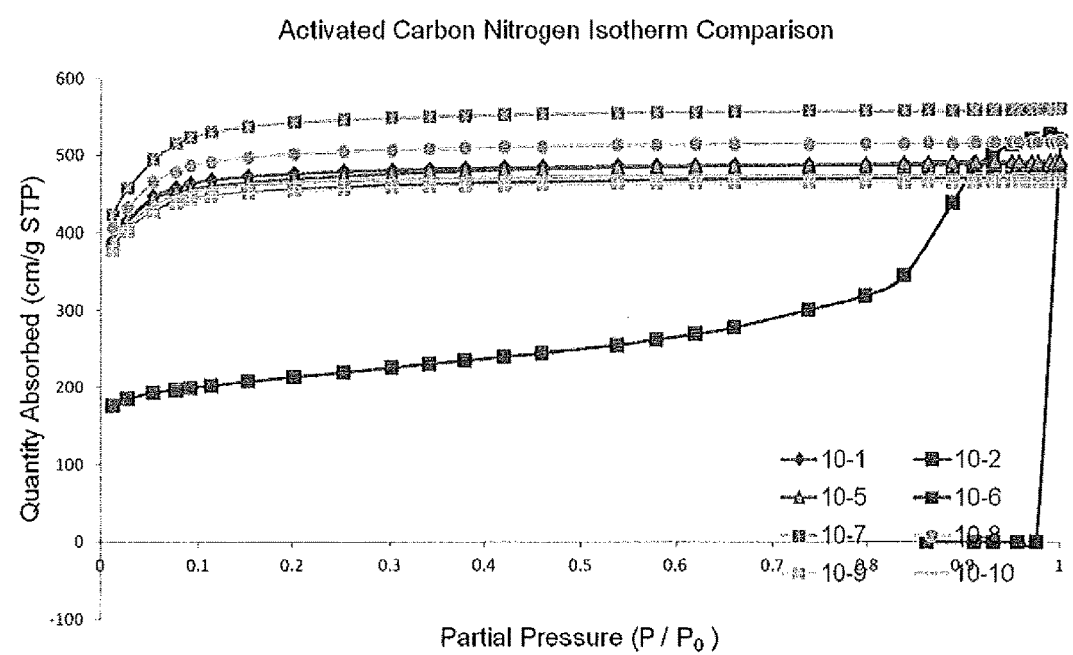
FIG. 9 presents $N_2$ absorption isotherms for activated carbon samples.
Figure 10:
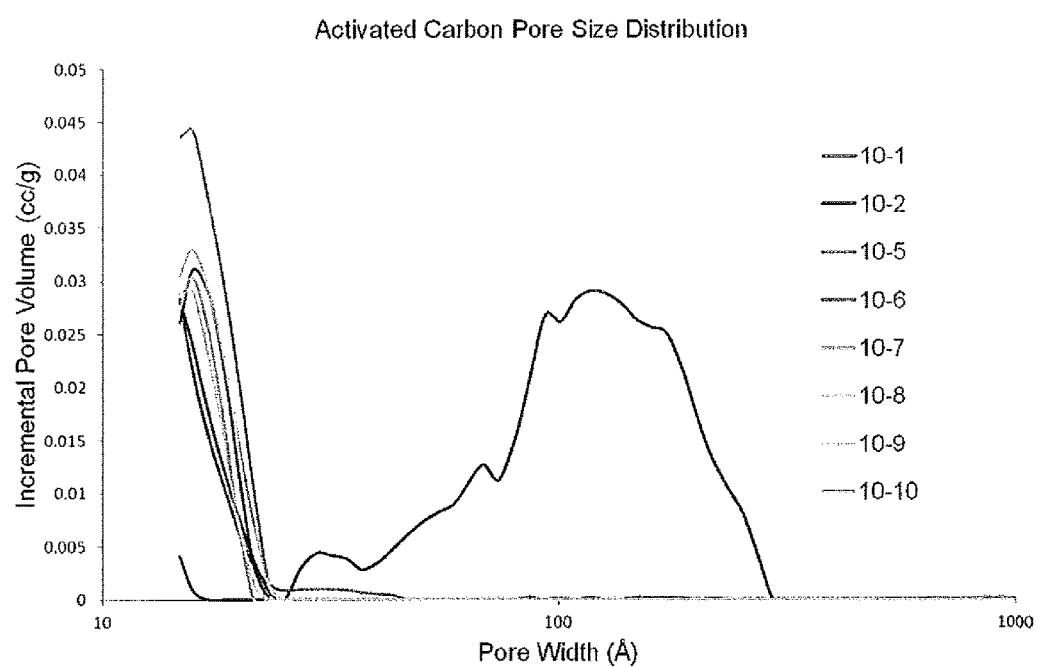
FIG. 10 shows pore size distributions for activated carbons.

Nitrogen isotherm, surface area and pore volume data for activated carbon samples from Example 8 are presented in FIGS. 9 & 10 and in Table 10. Samples were pyrolyzed at high temperature under an inert atmosphere. All samples were activated in a tube furnace at with the goal of achieving 1700-1900 $m^2/g$ SSA. Isotherm data (FIG. 9) and DFT pore size distributions (FIG. 10) demonstrate the ability of the current emulsion formulations to create a microporous carbon, and in fact only one sample (10-2) exhibited any mesoporosity. Mesopore development in 10-2 may be due to the low surfactant concentration along with low catalyst and low acid content. High surfactant loading, >5%, produced similar surface area, pore volume, and isotherm data for activated carbon, independent of gel formulation. With lower surfactant loading, 1%, the material shows more sensitivity to changes in gel formulation.

Electrochemical testing (ECT) data for the activated carbons is presented in Table 11. Samples were milled in a Fritsch mill and then rolled into dry electrodes for ECT. Sample 5 recorded adequate performance compared to current MicroControl carbon at similar activation levels.

TABLE 10

Activated Carbon Surface Area and Pore Volume

| Sample | Gel (Solid/Acid/R:C/Surfactant/RF) | SSA ($m^2/g$) | PV (cc/g) | P95/P5 | GM* |
|---|---|---|---|---|---|
| 10-1 | 50/10/10/1/20 | 1813 | 0.756 | 1.09 | 24.0 |
| 10-2 | 41/10/25/1/20 | 783 | 0.806 | 2.69 | 9.7 |
| 10-5 | 41/20/10/10/25 | 1780 | 0.762 | 1.12 | 23.4 |
| 10-6 | 41/10/10/10/30 | 1736 | 0.733 | 1.10 | 23.7 |
| 10-7 | 46/15/15/5/25 | 2074 | 0.866 | 1.12 | 23.9 |
| 10-8 | 50/10/25/10/30 | 1910 | 0.800 | 1.11 | 23.9 |
| 10-9 | 50/20/25/10/20 | 1726 | 0.721 | 1.09 | 23.9 |
| 10-10 | 50/20/10/1/30 | 1768 | 0.735 | 1.08 | 24.1 |

*GM = (specific surface area)/(100*PV)

TABLE 11

Activated Carbon Electrochemical Testing Performance

| Sample | Gel (Solid/Acid/R:C/Surfactant/RF) | F/cc | F/g | R2 | −45 | Max |
|---|---|---|---|---|---|---|
| 10-5 | 41/20/10/10/20 | 23.9 | 114.2 | 4.63 | 0.14 | 23.8 |
| 10-7 | 46/15/15/5/25 | 21.5 | 121.6 | 5.54 | 0.16 | 23.3 |

Example 10

Preparation of Dried Polymer Gel

To better understand the relationship between formulation and processing parameters, twelve polymerization experiments were performed according to the general procedures described in Example 1. Certain processing parameters such as stir rate, reaction start temperature and cure time were varied as summarized in Table 12.

TABLE 12

Polymerization Conditions

| Sample | % Solids | % Acid | R:C | % SPAN80 | % RF Gel | Start Temp | Cure Time | RPM |
|---|---|---|---|---|---|---|---|---|
| 12-1 | 30 | 5 | 50 | 2 | 30 | 45 | 6 | 200 |
| 12-2 | 50 | 5 | 50 | 0.5 | 30 | 70 | 6 | 400 |
| 12-3 | 30 | 5 | 10 | 0.5 | 10 | 45 | 6 | 200 |
| 12-4 | 30 | 20 | 50 | 0.5 | 30 | 45 | 12 | 400 |
| 12-5 | 50 | 20 | 10 | 2 | 10 | 45 | 6 | 400 |
| 12-6 | 50 | 20 | 50 | 0.5 | 10 | 45 | 12 | 200 |
| 12-7 | 30 | 20 | 50 | 0.5 | 30 | 45 | 12 | 400 |
| 12-8 | 30 | 5 | 10 | 0.5 | 10 | 70 | 12 | 400 |
| 12-9 | 30 | 20 | 10 | 2 | 30 | 70 | 12 | 200 |
| 12-10 | 30 | 20 | 50 | 2 | 10 | 70 | 6 | 400 |
| 12-11 | 50 | 5 | 10 | 2 | 30 | 45 | 12 | 400 |
| 12-12 | 50 | 20 | 10 | 0.5 | 30 | 70 | 6 | 200 |

Example 11

Dried Polymer Gel Data

Figure 11:
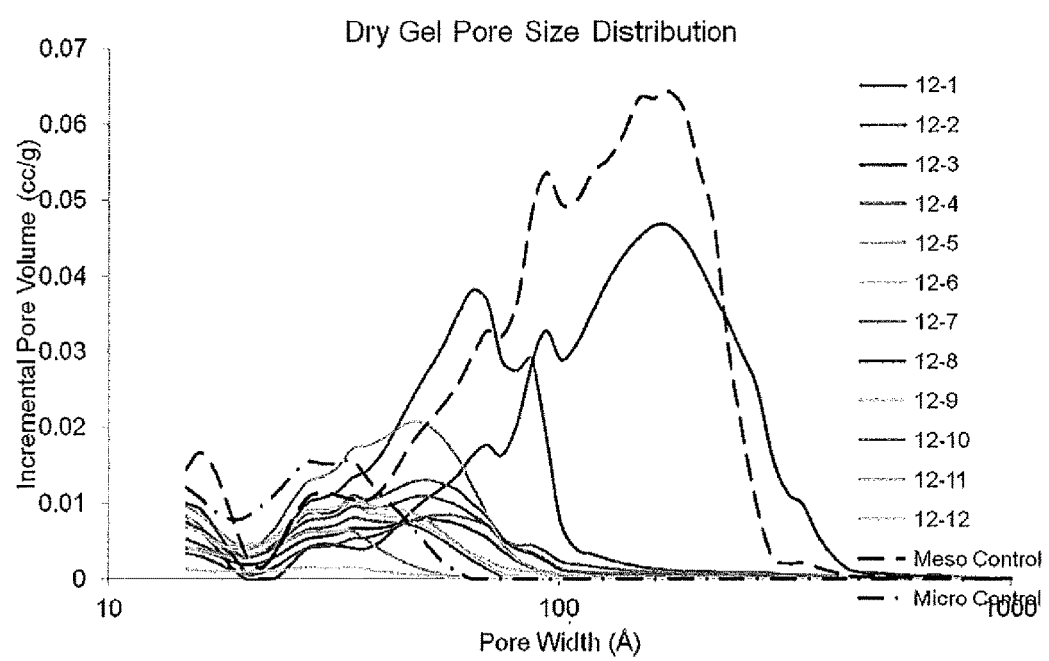
FIG. 11 presents pore volume distributions for freeze dried gels.
Figure 12:
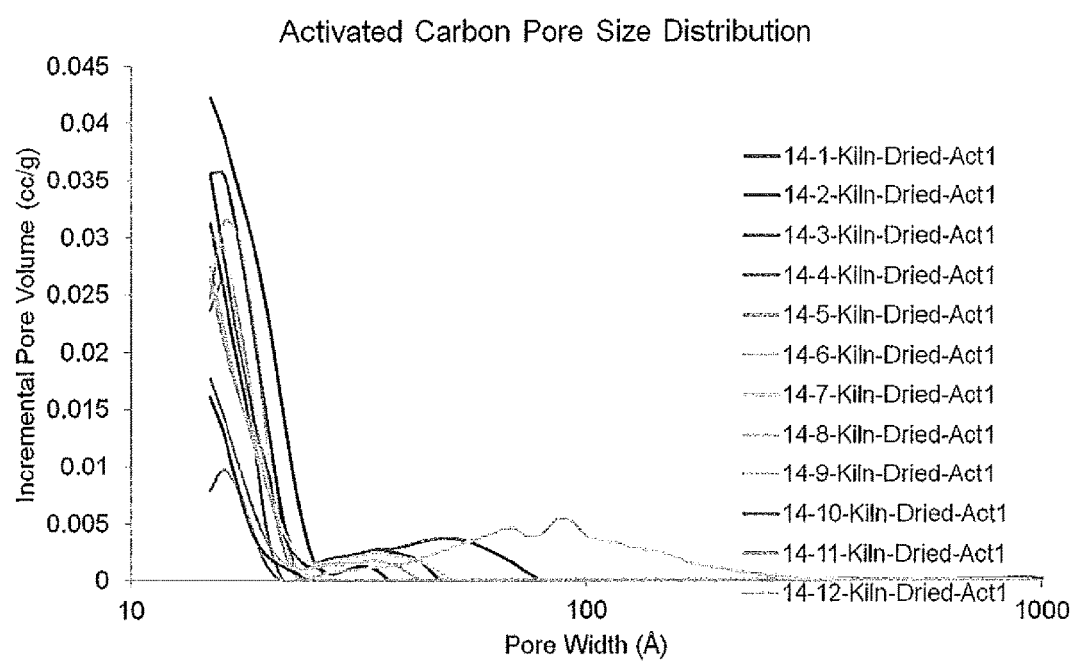
FIG. 12 is a graph of pore size distributions for activated carbons.
Figure 13:
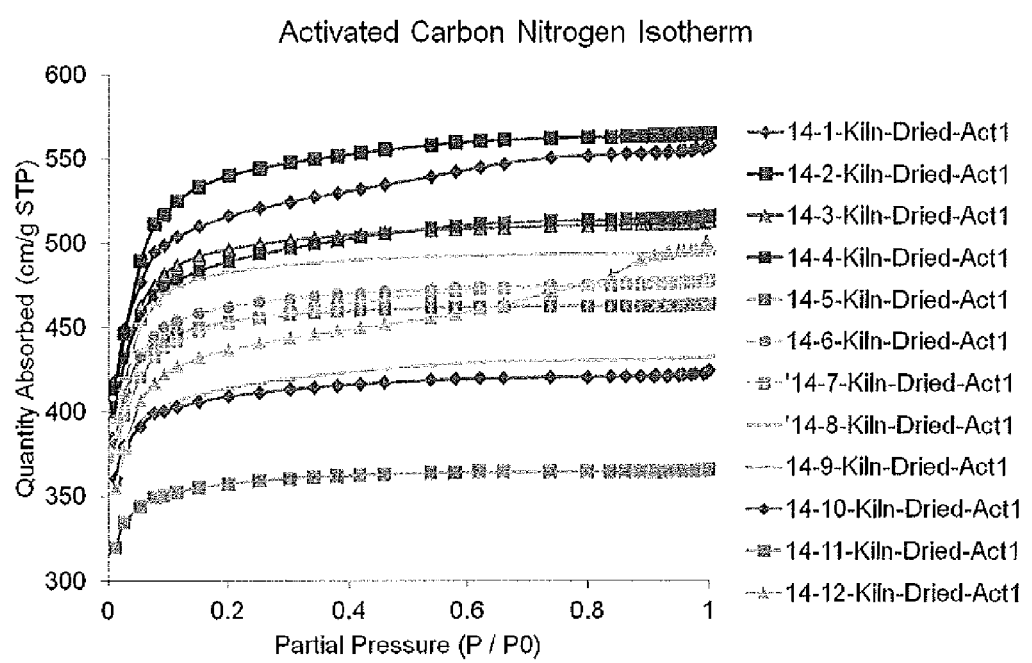
FIG. 13 shows nitrogen absorption isotherms for activated carbon samples.

Nitrogen isotherm, surface area and pore volume data for dried gel samples of Example 10 are presented in FIG. 11 and in Table 13. For comparative purposes, data for representative microporous and micro/mesoporous gels (MicroControl and MesoControl, respectively) prepared via monolith procedures are also presented in FIG. 11. It can be seen that there is a correlation between surface area and cure time. It is also clear that one can obtain a spectrum of dry gels ranging from solely microporous to micro/mesoporous, and their resulting carbons are readily available through emulsion polymerization.

TABLE 13

Dry Gel Data

| Sample | Gel (Solid/Acid/R:C/Surfactant/C:RF) | SSA | PV | P95/P5 | GM | Fines* |
|---|---|---|---|---|---|---|
| 12-1 | 30/5/50/2/30 | 310 | 0.893 | 8.46 | 3.2 | 1 |
| 12-2 | 50/5/50/0.5/30 | 235 | 0.166 | 2.12 | 12.9 | 0 |
| 12-3 | 30/5/10/0.5/10 | 156 | 0.159 | 3.03 | 8.9 | 0 |
| 12-4 | 30/20/50/0.5/30 | 329 | 0.276 | 2.57 | 10.8 | 2 |
| 12-5 | 50/20/10/2/10 | 174 | 0.113 | 2.00 | 14.0 | 3 |
| 12-6 | 50/20/50/0.5/10 | 333 | 0.224 | 2.03 | 13.5 | 2 |
| 12-7 | 30/20/50/0.5/30 | 322 | 0.268 | 2.48 | 10.9 | 3 |
| 12-8 | 30/5/10/0.5/10 | 414 | 0.583 | 4.17 | 6.5 | 3 |
| 12-9 | 30/20/10/2/30 | 286 | 0.206 | 2.20 | 12.6 | 1 |
| 12-10 | 30/20/50/2/10 | 146 | 0.187 | 3.53 | 7.1 | 2 |
| 12-11 | 50/5/10/2/30 | 417 | 0.381 | 2.72 | 9.9 | 1 |
| 12-12 | 50/20/10/0.5/30 | 58 | 0.035 | 1.83 | 15.1 | 0 |
| Micro-Control | 40/20/10 | 545 | 0.327 | 1.80 | — | NA |
| Meso-Control | 33/20/25 | 625-725 | 0.98-1.20 | 4.4-5.5 | — | NA |

*Scale of 0-3, 0 = no fine material, 3 = most fine material

Example 12

Activated Carbon Data

As a means to determine appropriate conditions for preparation of a microporous carbon material via an emulsion polymerization, the gels from example 10 were pyrolyze at high temperature under an inert atmosphere without previously drying the material gel. Only select samples were dried and then pyrolyzed. All samples were activated in the tube furnace at 900° C. with the goal of achieving 1700-1900 m²/g SSA. TGA data was collected to determine activation rates. Pore volume and pore size data is presented in FIGS. 12-15. Tables 14-16 present various physical and electrochemical properties of the carbon materials. As can be seen the full spectrum of microporous to mesoporous carbon materials having various physical and electrochemical properties can be prepared via the described methods. Samples denoted with "PCt" have been freeze dried prior to pyrolysis, while samples identified as "kiln dried" have been pyrolyzed directly from wet gel (i.e., not freeze dried).

TABLE 14

Activated Carbon Data

| Sample | Gel (Solid/Acid/R:C/ Surfactant/C:RF) | SSA | PV | P95/P5 | GM |
|---|---|---|---|---|---|
| 14-1-Kiln dried-ACt1 | 30/5/50/2/30 | 1963 | 0.860 | 1.16 | 22.8 |
| 14-2-Kiln dried-ACt1 | 50/5/50/0.5/30 | 2062 | 0.873 | 1.16 | 23.6 |
| 14-3-Kiln dried-ACt1 | 30/5/10/0.5/10 | 1889 | 0.792 | 1.11 | 23.9 |
| 14-4-Kiln dried-ACt1 | 30/20/50/0.5/30 | 1857 | 0.797 | 1.13 | 23.3 |
| 14-5-Kiln dried-ACt1 | 50/20/10/2/10 | 1722 | 0.716 | 1.07 | 24.1 |
| 14-6-Kiln dried-ACt1 | 50/20/50/0.5/10 | 1762 | 0.738 | 1.10 | 23.9 |
| 14-7-Kiln dried-ACt1 | 30/20/50/0.5/30 | 1713 | 0.738 | 1.13 | 23.2 |
| 14-8-Kiln dried-ACt1 | 30/5/10/0.5/10 | 1566 | 0.668 | 1.09 | 23.4 |
| 14-9-Kiln dried-ACt1 | 30/20/10/2/30 | 1836 | 0.764 | 1.09 | 24.0 |
| 14-10-Kiln dried-ACt1 | 30/20/50/2/10 | 1557 | 0.654 | 1.08 | 23.8 |
| 14-11-Kiln dried-ACt1 | 50/5/10/2/30 | 1362 | 0.565 | 1.06 | 24.1 |
| 14-12-Kiln dried-ACt1 | 50/20/10/0.5/30 | 1654 | 0.767 | 1.22 | 21.6 |

TABLE 15

Activated Carbon Surface Area and Pore Volume

| Sample | Gel (Solid/Acid/R:C/ Surfactant/RF) | SSA (m²/g) | PV (cc/g) | JRI | GM |
|---|---|---|---|---|---|
| 14-1-PCt-ACt1 | 30/5/50/2/30 | 2146 | 1.752 | 2.23 | 12.2 |
| 14-8-PCt-ACt1 | 30/5/10/0.5/10 | 2458 | 1.343 | 1.52 | 18.3 |
| 14-11-PCt-ACt1 | 50/5/10/2/30 | 2008 | 0.905 | 1.21 | 22.2 |

TABLE 16

Activated Carbon Electrochemical Testing Performance

| Sample | Gel (Solid/Acid/ R:C/Surfactant/ RF) | F/cc | F/g | R2 | −45* (Hz) | Normalized F/cc |
|---|---|---|---|---|---|---|
| 14-1-PCt-ACt1 | 30/5/50/2/30 | 14.6 | 127.5 | 4.80 | 0.26 | 14.5 |
| 14-5-Kiln Dried-ACt1 | 50/20/10/2/10 | 23.7 | 119.8 | 4.82 | 0.07 | 25.9 |

*Frequency response = Frequency as calculated from the Bode plot at a 45° phase angle Example 13

Variable Process Parameters

In addition to the above process parameters, polymerizations were performed with various surfactants and solvents. For each sample, two separate solutions were prepared. A gel solution was made as described herein, and a continuous phase/surfactant solution was also prepared and the temperature was increased to 85° C. Once the gel solution was done mixing for 10 minutes, it was poured into the continuous phase/surfactant solution and held for 6 hours at 85° C. The sample was then removed and placed in a large beaker to let settle. The excess continuous phase was decanted off and then the remaining material was rinsed with iso-propanol and filtered through a Buchner funnel Samples conditions are summarized in Table 17. 17-6 was created to test the suspension process with mineral oil as the continuous phase.

TABLE 17

Polymerization Conditions for Example 13

| Sample | Gel Formulation (Solids/Acid/R:C) | RF Solution (mL) | Continuous Phase (mL) | Surfactant (type/mL) |
|---|---|---|---|---|
| 17-1 | 40/10/10 | 60 | Mineral Oil (200) | SPAN80/1 |
| 17-2 | 30/5/50 | 60 | Mineral Oil (200) | SPAN80/4 |
| 17-3 | 40/10/10 | 60 | Mineral Oil (200) | SPAN20/1 |
| 17-4 | 40/10/10 | 60 | Xylene (200) | SPAN80/1 |
| 17-5 | 40/20/10 | 60 | Paraffin Oil (200) | SPAN80/1 |
| 17-6 | 50/5/10 | 60 | Mineral Oil (200) | SPAN80/4 |

Figure 16:
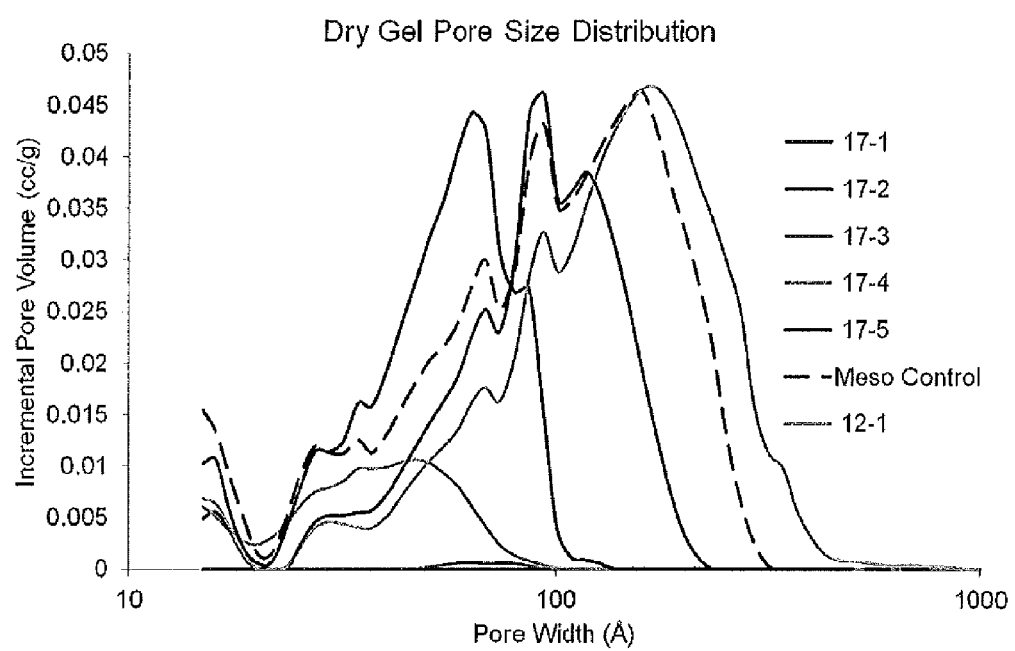
FIG. 16 is a graph of pore size distributions for freeze dried gels.

Nitrogen isotherm, surface area and pore volume data for the dried gel samples from Example 13 are presented in FIG. 16 and in Table 18. Samples 17-1 and 17-3 were not filtered, but rinsed with IPA and let dry in the hood. While not wishing to be bound by theory, it is thought that this decrease in pore volume is likely due to surfactant in the pores and on the surface of the gel material, and was expected to be burned off during pyrolysis. This theory was supported by the ability to activate the pyrolyzed material to a target surface area, pore volume, and P95/P5 (i.e., ratio of nitrogen sorbed at 95% partial pressure to that sorbed at 5% partial pressure) at a reasonable activation rate. Therefore certain properties of the dried gel may not be predictive of the properties of the final carbon materials.

It is important to note the ability of higher solids (>30%) formulations to produce mesoporous resin in an oil emulsion, which was not seen with the cyclohexane system. Sample 17-5 used the microporous monolith formulation, but in the paraffin oil inverse emulsion a mesoporous resin was produced. This may be due to controlled temperature profile of the resin as it cures in the oil. Different continuous phases may allow more or less movement of reagents from one phase to the other, which would contribute to a change in porosity as seen here.

TABLE 18

Dry Gel Surface Area and Pore Volume

| Sample | Gel (Solid/Acid/R:C/ Surfactant/RF) | SSA (m²/g) | PV (cc/g) | JRI | Fines (0 = coarse 3 = fine) |
|---|---|---|---|---|---|
| 17-1 | 40/10/10/0.5/30 | 0.073 | 0 | 0 | 2 |
| 17-2 | 30/5/50/0.5/30 | 260 | 0.642 | 7.39 | 3 |

TABLE 18-continued

Dry Gel Surface Area and Pore Volume

| Sample | Gel (Solid/Acid/R:C/ Surfactant/RF) | SSA (m²/g) | PV (cc/g) | JRI | Fines (0 = coarse 3 = fine) |
|---|---|---|---|---|---|
| 17-3 | 40/10/10/0.5/30 | 2.5 | 0.004 | 5.32 | 1 |
| 17-4 | 40/10/10/0.5/30 | 241 | 0.211 | 2.58 | 1 |
| 17-5 | 40/20/10/0.5/30 | 371 | 0.593 | 4.85 | 1 |

Figure 17:
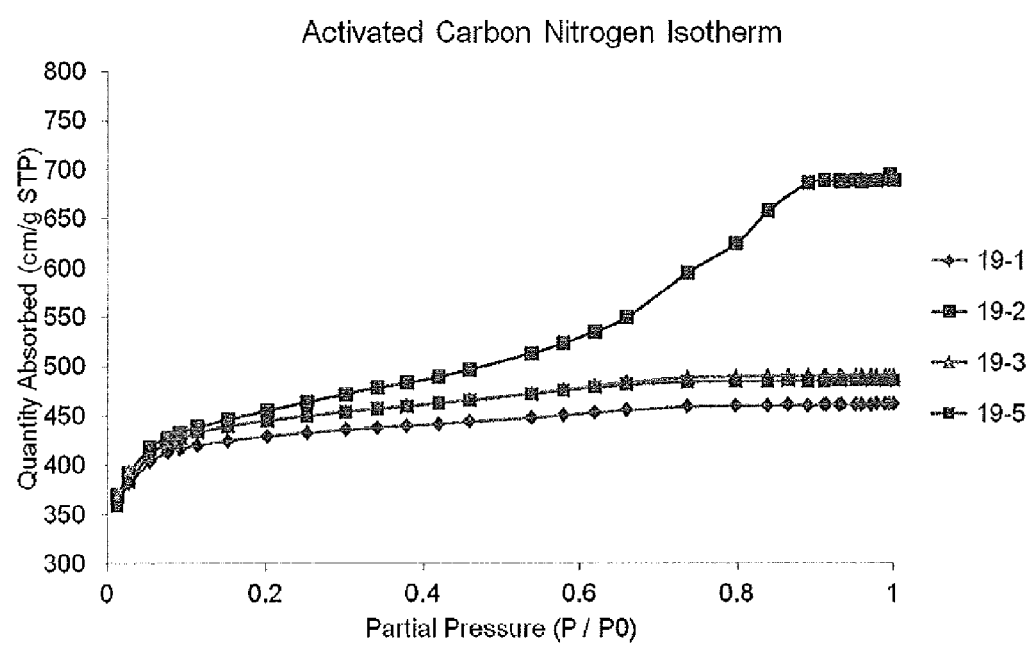
FIG. 17 shows nitrogen absorption isotherms for activated carbon samples.
Figure 18:
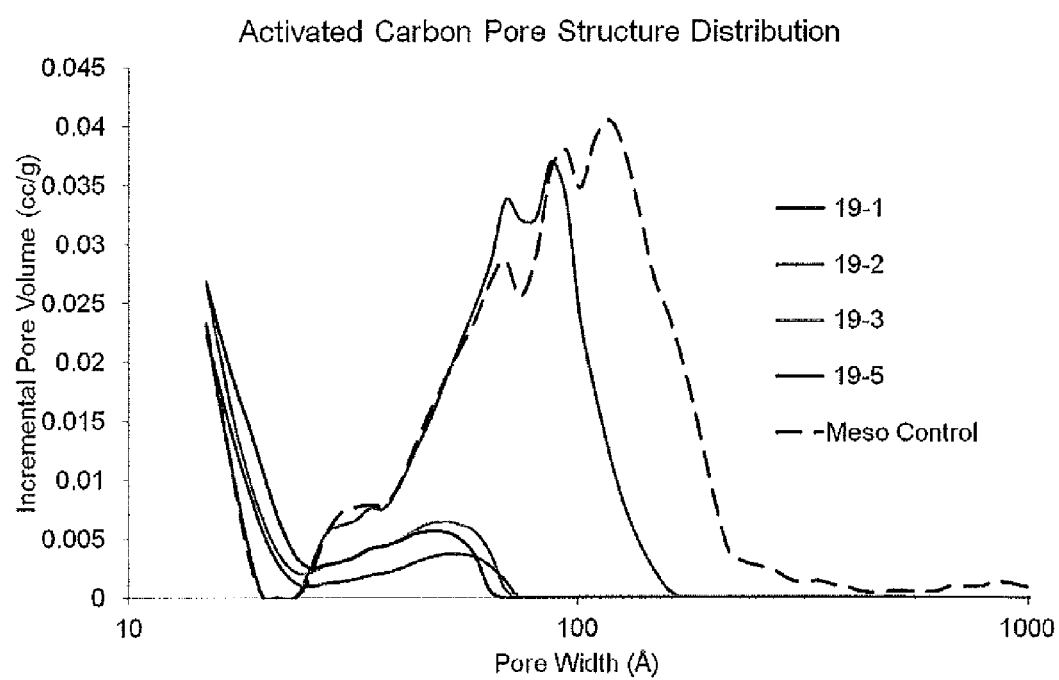
FIG. 18 presents pore size distributions for activated carbons.

Nitrogen isotherm, surface area, pore volume, and electrochemical testing data for 17 series activated carbon samples are presented in FIG. 17 and in Tables 19 & 20. All samples were pyrolyzed at high temperature under an inert atmosphere. Samples 1 and 5 were pyrolyzed without drying using the kiln dried technique. All samples were activated at high temperature in the tube furnaces to achieve a surface area of 1700-1900 m²/g. TGA data was collected to determine activation rates. The isotherm and DFT data (FIGS. 18 & 19) shows the ability to make various carbon materials. With low solids and acid content a mesoporous carbon can be achieved in an oil continuous phase. FIGS. 17 & 18 also show the ability to make carbon with properties of a microporous carbon and a mixed microporous/mesoporous carbon.

Electrochemical testing performance (Table 20) was measured after Fritsch milling the material for 15 minutes. Sample 17-2 data demonstrated adequate performance for a mesoporous carbon compared to current EnerG2's mesoporous product. Sample 17-6 performance was at the same level as current EnerG2's microporous carbon. 17-1 produced a device with exceptional energy density.

TABLE 19

Activated Carbon Surface Area and Pore Volume

| Sample | Gel (Solid/Acid/R:C/ Surfactant/RF) | SSA (m²/g) | PV (cc/g) | JRI |
|---|---|---|---|---|
| 19-1 | 40/10/10/0.5/30 | 1628 | 0.714 | 1.13 |
| 19-2 | 30/5/50/0.5/30 | 1699 | 1.066 | 1.64 |
| 19-3 | 40/10/10/0.5/30 | 1686 | 0.758 | 1.19 |
| 19-5 | 40/20/10/0.5/30 | 1683 | 0.752 | 1.18 |
| 19-6 | 50/5/10/3/30 | 2086 | 0.877 | 1.15 |

TABLE 20

Activated Carbon Electrochemical Testing Performance

| Sample | Gel (Solid/Acid/ R:C/ Surfactant/ RF) | F/cc | F/g | R2 | −45* (Hz) | Normalized F/cc |
|---|---|---|---|---|---|---|
| 19-1 | 40/10/10/0.5/30 | 24.8 | 114.5 | 5.95 | 0.11 | 25.1 |
| 19-2 | 30/5/0/0.5/30 | 14.1 | 115.4 | 7.26 | 0.26 | 19.2 |
| 19-6 | 50/5/10/2/30 | 21.3 | 122.8 | 5.93 | 0.14 | 23.3 |

*Frequency response = Frequency as calculated from the Bode plot at a 45° phase angle Example 14

Preparation of Phenol Formaldehyde Based Gel

Five different gel solutions were made by admixing a phenol and formaldehyde (molar ratio of phenol:formaldehyde=0.5:1) solution with a water/acid solvent. In some cases an ammonium acetate catalyst was added. The ratios of the various gel reagents are indicated in Table 21 for the five samples. The gel solution was allowed to mix for 5-10 minutes before it was poured into the continuous phase/ SPAN80 solution and the temperature was set to 95° C. and held for 3-5 days before the excess continuous phase was decanted. Wet gel samples were pyrolyzed directly at high temperatures under inert atmosphere with weight loss between 50-75%. Representative carbonization and activation data is presented in Table 22.

TABLE 21

Gel Preparation Parameters

| Sample | Acid type | Phenol-Catalyst (g) | Water-Acid-Formaldehyde [1] | Continuous Phase (mL) | SPAN80 (mL) |
|---|---|---|---|---|---|
| 21-1 | acetic | 20-0 | 10-30-27 | Xylenes 200 | 5 |
| 21-2 | acetic | 20-0 | 10-30-27 | Parrafin oil 200 | 5 |
| 21-3 | Oxalic[2] | 20-1 | 10-2-27 | Xylenes 200 | 5 |
| 21-4 | Acetic | 20-0 | 10-30-27 | Parrafin oil 200 | 5 |
| 21-5 | Acetic | 20-0 | 10-25-27 | Parrafin oil 200 | 5 |

[1] Added in the form of a 37 wt % aqueous solution
[2] Added in the form of a 5 wt % aqueous solution

TABLE 22

Carbonization and Activation Data

| Sample | Carbonization wt loss (%) | TGA activation rate (% wt loss/min) | Surface Area (m²/g) | Pore Volume (cc/g) | F/cc | F/g | ~45 Hz |
|---|---|---|---|---|---|---|---|
| 22-4 | 55 | 0.187 | 2209 | 0.972 | 1/14 | 1/14 | 1/14 |

*Frequency response = Frequency as calculated from the Bode plot at a 45° phase angle Example 15

Surfactant-Free Emulsion Urea-Formaldehyde Synthesis

Microspheres of polymer gel can also be created through polymerization using an ultra-dilute solution. Polymer gels were prepared using the following general procedure. Urea and formaldehyde (1.6:1) were mixed into deionized water (143:1 water:urea) at room temperature, forming a dilute solution. The solution was mixed for 5 minutes, wherein formic acid is added. After about 30 minutes, the solution turned from clear to milky white, at which point the solution was allowed to sit, undisturbed until a collection of white polymer spheres were formed. In one embodiment, the specific surface area and pore volume as measured by nitrogen sorption for the polymer spheres is about 7.86 m²/g and about 0.57 cc/g, respectively. In some embodiments the ratio of urea:formaldehyde, urea:water, quantity of formic acid, dwell and stir time, and base or acid catalyst can be altered to yield a preferred polymer.

Figure 19:
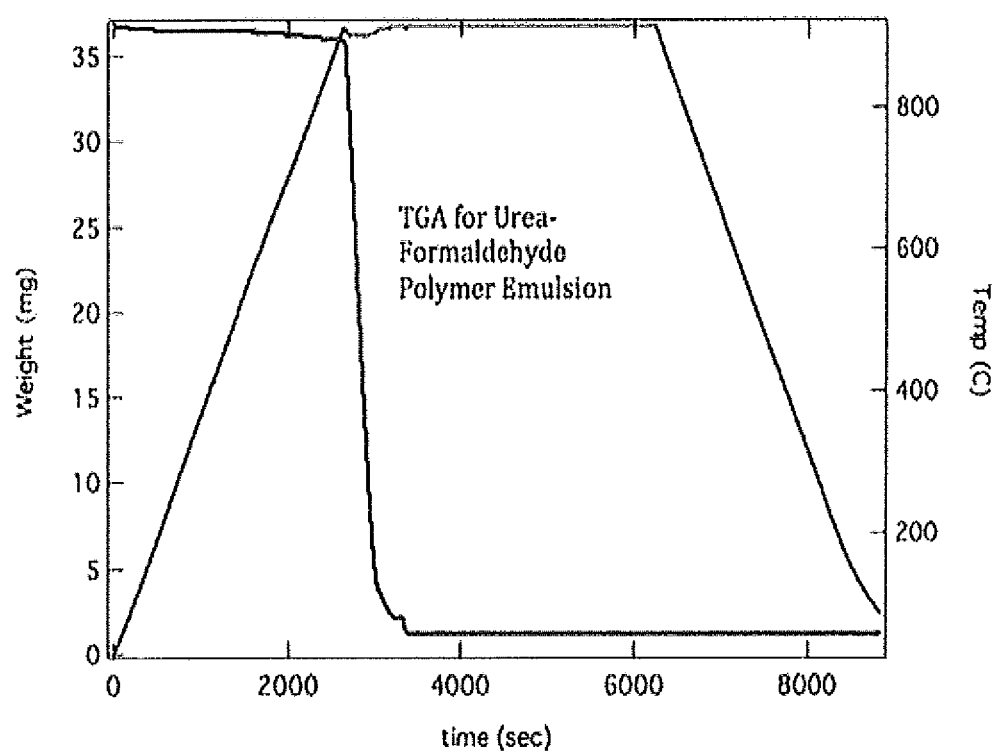
FIG. 19 illustrates TGA data for a urea-formaldehyde emulsion.

Polymers were then pyrolyzed to carbon at high temperature under inert atmosphere. In one embodiment, the physical properties of the carbon after pyrolysis are a surface area of about 48.3 m²/g and a pore volume of about 0.036 cc/g. FIG. 19 shows the TGA for one embodiment of urea-formaldehyde polymer emulsion. Notice there a rapid weight loss>90% occurs at the dwell temperature.

Figure 20:
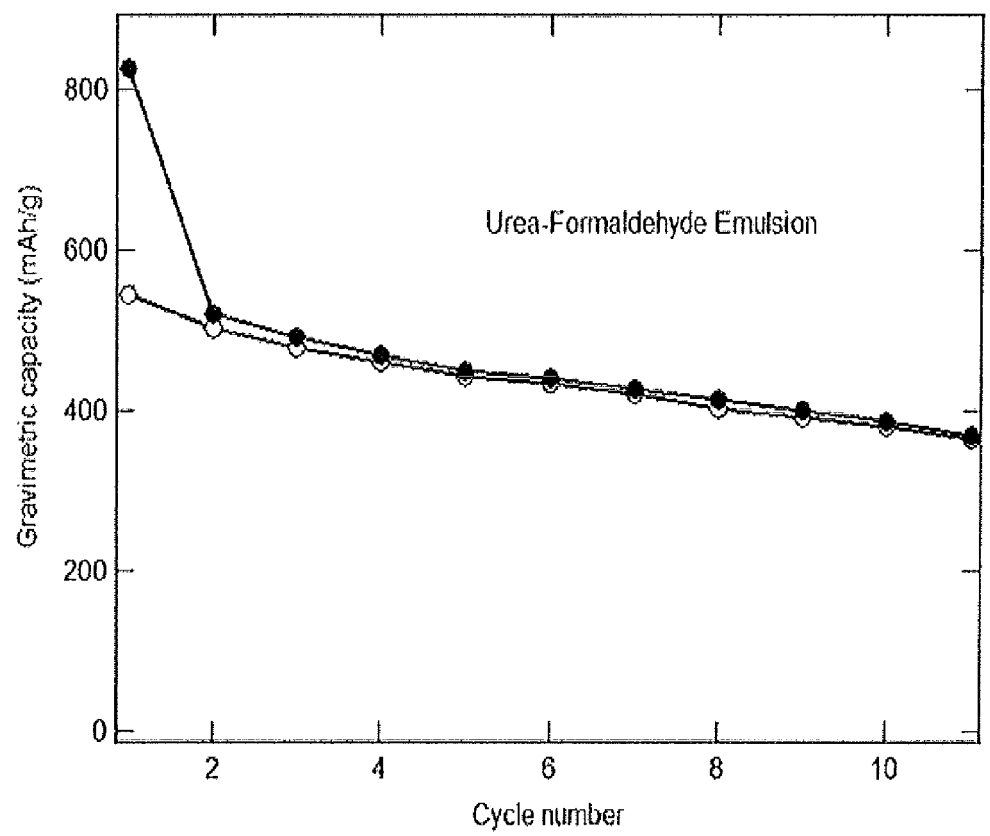
FIG. 20 shows electrochemical performance of a urea-formaldehyde based carbon material.

The carbon was tested in a lithium ion battery as a hard carbon anode material with lithium metal as a counter electrode, 1M $LiPF_6$ in 1:1 ethylene carbon/diethylcarbonate (EC:DEC) as the electrolyte, with a commercial polypropylene separator. In one exemplary embodiment, the electrochemical performance, shown in FIG. 20 with an 88:2:10 (hard carbon:carbon black, PVDF binder) composition, displays high gravimetric capacity (>500 mAh/g).

Example 16

Preparation of Silicon-Carbon Composite

A solution was prepared of resorcinol and formaldehyde (0.5:1 molar ratio) in water and acetic acid (40:1 molar ratio) and ammonium acetate (10:1 molar ratio resorcinol to ammonium acetate). Lastly, 1 molar equivalent (resorcinol to silicon) of micronized (−325 mesh) silicon powder was added to the mixture. The final mixture was stirred for five minutes followed by sonication for 10 minutes. This mixture was poured into a 1:100 by volume solution of SPAN 80 (surfactant):cyclohexane and heated to 45° C. After five hours the temperature was increased to 65° C. and allowed to stir (covered) for 24 hours. Once the powder settled from solution, the cyclohexane was decanted and the recovered powder was dried at 88° C. for 10 minutes then pyrolyzed at high temperature under inert atmosphere. The obtained powder had a surface area of 476 m2/g, pore volume of 0.212 cc/g and average pore width of 17.8 angstroms.

Figure 21:
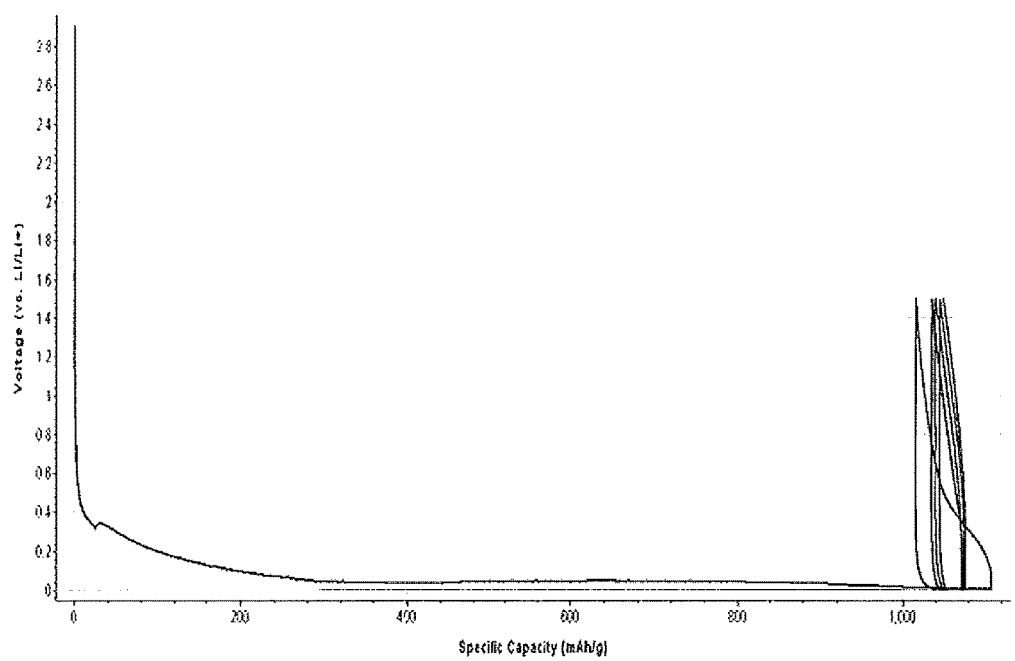
FIG. 21 depicts electrochemical performance of a silicon-carbon composite material.

Voltage vs. specific capacity of the Si—C composite material was tested and results are shown in FIG. 21. Cells were tested using lithium metal as the counter electrode and the working electrode comprised of 88:2:10 by weight Si—C composite material—conductivity enhancer (Super P)—binder (polyvinylidene fluoride). The electrodes were separated by a Rayon 33 micron membrane and the electrolyte was 1M $LiPF_6$ in 1:1 by weight ethylene carbonate-diethylene carbonate. The cells were first discharged to 0.005V at constant current of 40 mA/g and then charged to 2V at the same current.

Example 17

Particle Size Distribution and Shape

Figure 22:
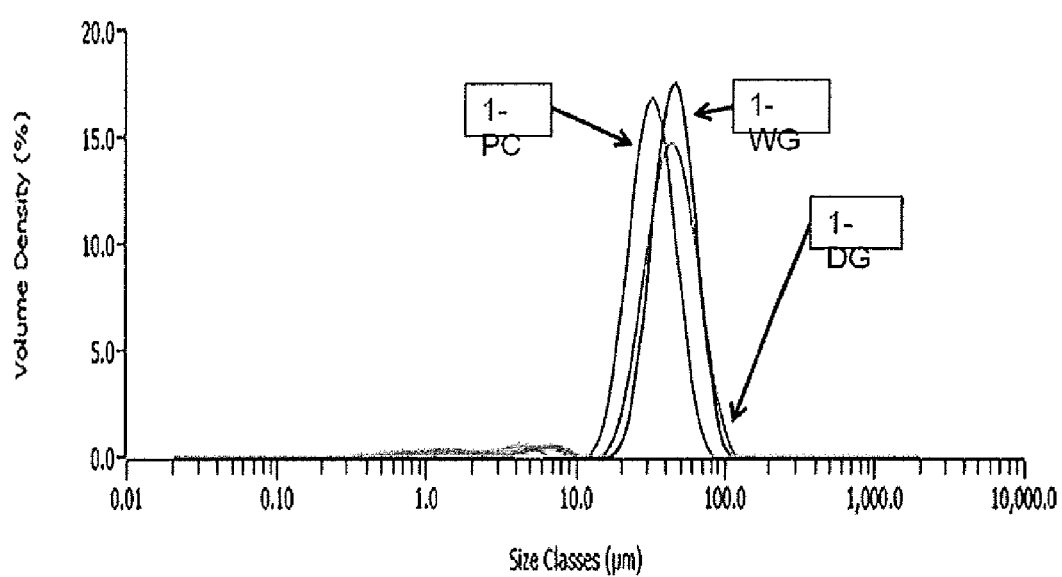
FIG. 22 shows particle size distributions for gels and carbon materials.

Emulsion polymerizations were performed as described above and activated carbon particles prepared. FIG. 22 demonstrates the near monodisperse particle size distribution for wet gel, dry gel and activated carbon particles obtained via emulsion polymerization (1-3/3-3 wet gel particles, dry gel particles and activated carbon particles, respectively from left to right in FIG. 22). The wet gel particles have a Dv10 of 26.4 µm, a Dv50 of 43.6 µm, and a Dv90 of 66.3 µm (Span=0.914). The dry gel particles have a Dv10 of 23.7 µm, a Dv50 of 42.0 µm, and a Dv90 of 69.4 µm (Span=1.090). The carbonized particles have a Dv10 of 19.5 µm, a Dv50 of 31.5 µm, and a Dv90 of 49.3 µm (Span=0.947). Emulsion formulations and process parameters (e.g., stirring rate, etc.) are modified to control the particle size and extent of mono-dispersity of the resulting products. FIGS. 23A and 23B demonstrate the spherical nature of the gel and carbon particles, respectively. The spherical shape has advantages in certain electrochemical applications where packing of carbon particles affects the electrochemical performance of the device.

Example 18

Exemplary Monolith Preparation of Gels and Carbon Materials

A polymer gel was prepared by polymerization of resorcinol and formaldehyde (0.5:1) in a water/acetic acid solvent (75:25) in the presence of ammonium acetate catalyst. The resorcinol to solvent ration (R/S) was 0.3, and the resorcinol to catalyst ratio (R/C) was 25. The reaction mixture was placed at elevated temperature (incubation at 45° C. for about 6 h followed by incubation at 85° C. for about 24 h) to allow for gellation to create a polymer gel. Polymer gel particles were created from the polymer gel and passed through a 4750 micron mesh sieve. The sieved particles were flash frozen by immersion in liquid nitrogen, loaded into a lyophilization tray at a loading of 3 to 7 g/in$^2$, and lyophilized at approximately 50 mTorr. The time to dry (as inferred from time for product to reach within 2° C. of shelf temperature) varied with product loading on the lyophilizer shelf.

Other monolith gels and carbon materials are prepared according to the above general procedures. Modifications to the procedure, including different gel formulations and/or no freeze drying are also used.

Example 19

General Testing of Electrochemical Properties

The carbon samples were analyzed for their electrochemical performance, specifically as an electrode material in EDLC coin cell devices. Specific details regarding fabrication of electrodes, EDLCs and their testing are described below.

Capacitor electrodes comprised about 97 parts by weight carbon particles (average particle size 5-15 microns) and about 3 parts by weight Teflon. The carbon and Teflon were masticated in a mortar and pestle until the Teflon was well distributed and the composite had some physical integrity. After mixing, the composite was rolled out into a flat sheet, approximately 50 microns thick. Electrode disks, approximately 1.59 cm in diameter, were punched out of the sheet. The electrodes were placed in a vacuum oven attached to a dry box and heated for 12 hours at 195° C. This removed water adsorbed from the atmosphere during electrode preparation. After drying, the electrodes were allowed to cool to room temperature, the atmosphere in the oven was filled with argon and the electrodes were moved into the dry box where the capacitors were made.

A carbon electrode was placed into a cavity formed by a 1 inch (2.54 cm) diameter carbon-coated aluminum foil disk and a 50 micron thick polyethylene gasket ring which had been heat sealed to the aluminum. A second electrode was then prepared in the same way. Two drops of electrolyte comprising 1.8 M tetraethylene ammonium tetrafluoroborate in acetonitrile were added to each electrode. Each electrode was covered with a 0.825 inch diameter porous polypropylene separator. The two electrode halves were sandwiched together with the separators facing each other and the entire structure was hot pressed together.

When complete, the capacitor was ready for electrical testing with a potentiostat/function generator/frequency response analyzer. Capacitance was measured by a constant current discharge method, comprising applying a current pulse for a known duration and measuring the resulting voltage profile. By choosing a given time and ending voltage, the capacitance was calculated from the following C=It/ΔV, where C=capacitance, I=current, t=time to reached the desired voltage and ΔV=the voltage difference between the initial and final voltages. The specific capacitance based on the weight and volume of the two carbon electrodes was obtained by dividing the capacitance by the weight and volume respectively. This data is reported for discharge between 2.43 and 1.89V.

Example 20

Particle Size and Porosity as a Function of Continuous Phase Viscosity and Surfactant Resorcinol-formaldehyde polymer formulations known to result in microporous gels (samples 20-1 . . . 5, (solids/Acid/R:C)) and mesoporous gels (20-6 . . . 10, (solids/Acid/R:C)) were prepared according to the general procedures described in Example 1, except no surfactant was used Suspensions and/or emulsions of the polymer formulations were admixed with various paraffinic oils (various suppliers) having different viscosities and allowed to age with stirring at 80° C.

Figure 24:
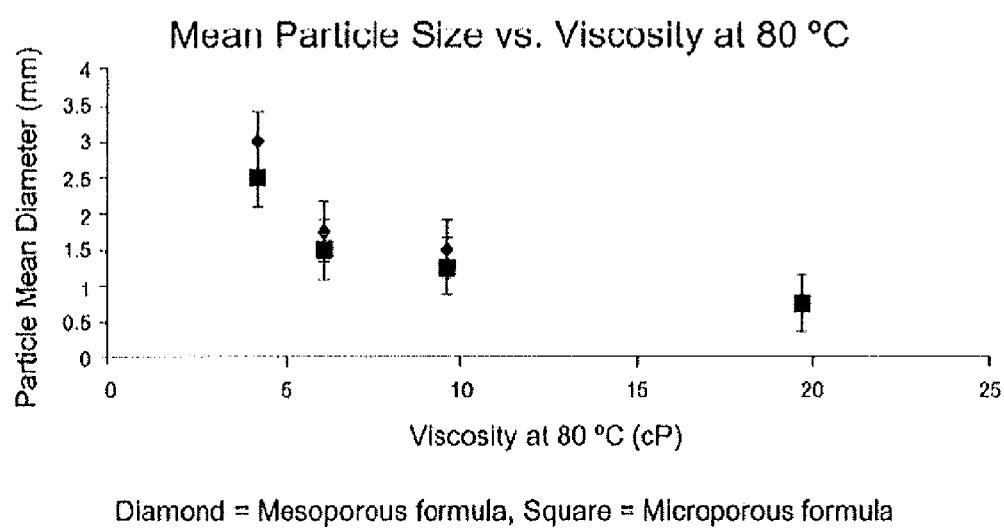
FIG. 24 demonstrates the control of particle size through continuous phase viscosity FIG. 25 describes the pore size distributions for dry gels
Figure 25:
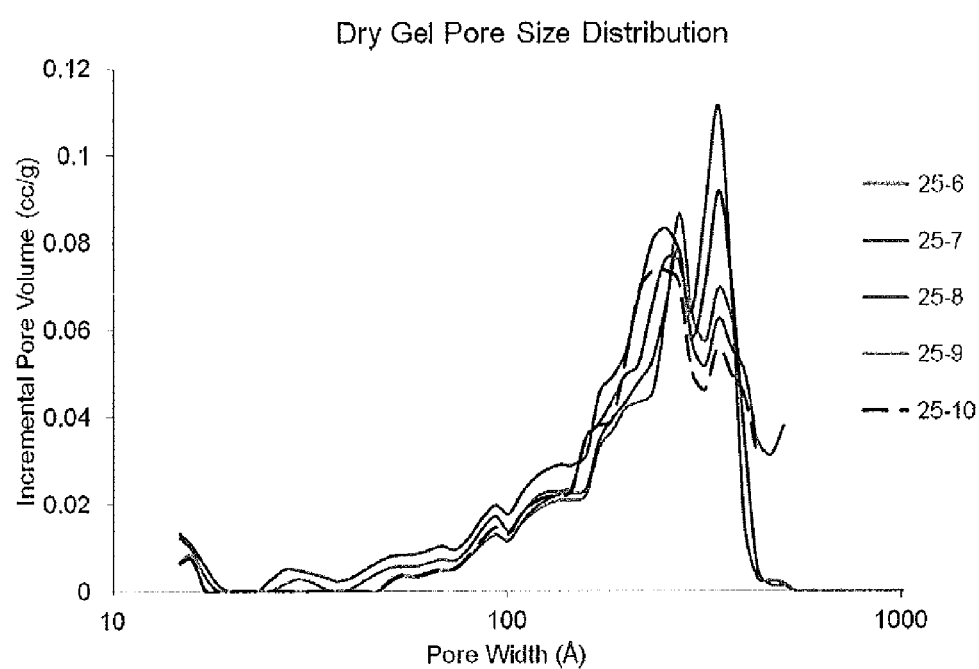
Figure 26:
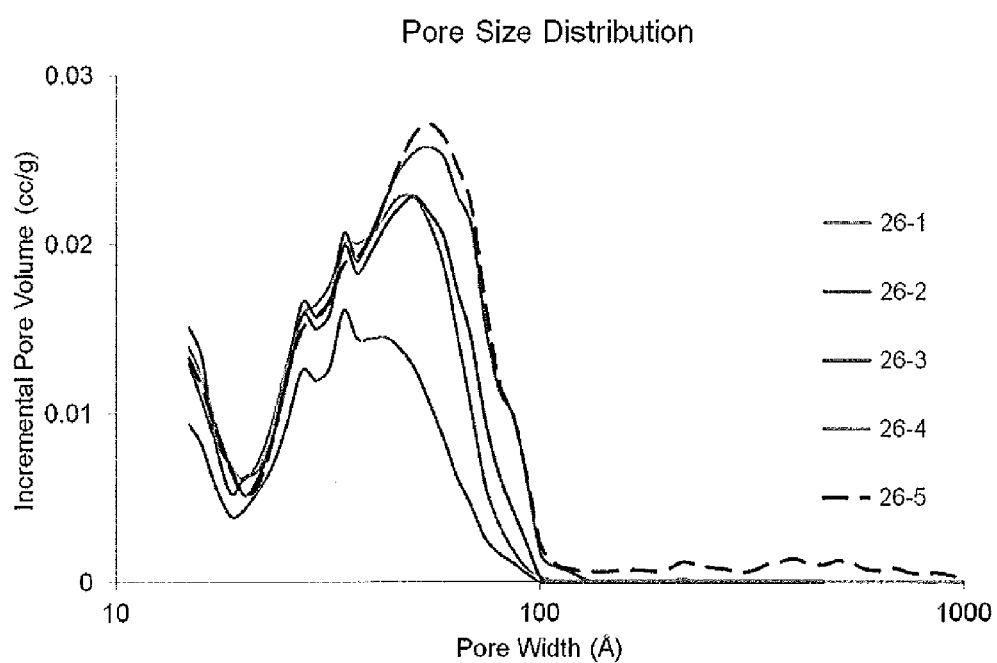
FIG. 26 depicts pore size distribution for activated carbons.

The particle size and incremental pore volume of the resulting gel particles was determined. Results are presented in FIGS. 24-26. As seen in FIG. 24, the particle size of the resulting gel particles ranged from about 0.5 mm to about 3 mm in diameter, and the particle size was indirectly proportional to the continuous phase viscosity. That is, the higher the viscosity of the continuous phase the smaller the average particle diameter. Although the particle size of the gel particles varied, the pore structure of the freeze dried gel particles was very consistent (FIGS. 25 and 26).

Figure 27A:
FIGS. 27 A and B are photographs of particles made with and without surfactant respectively FIG. 28 describes activated carbon pore size distribution
Figure 27B:
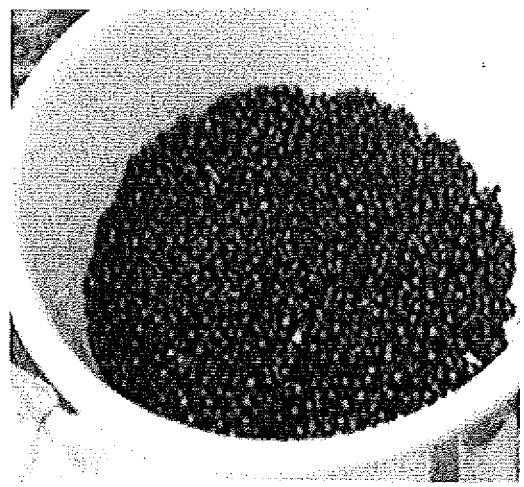
Figure 28:
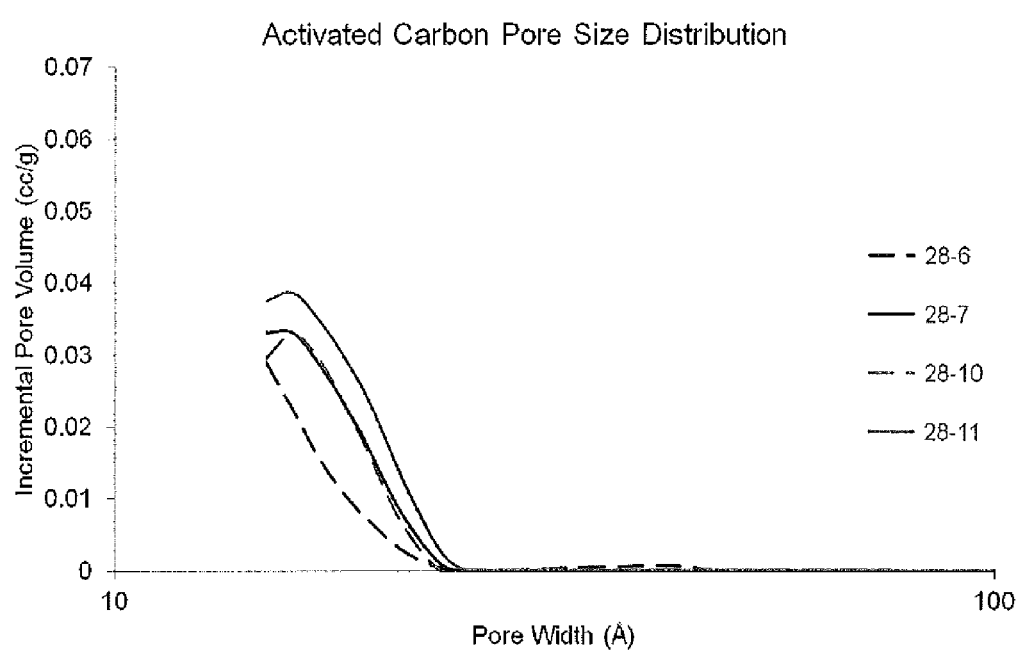

Similar experiments were performed in the presence of surfactant. The presence of surfactant in the polymer formulations results in much smaller gel particle sizes. FIG. 27 compares the particle sizes of gels prepared in the presence of surfactant (FIG. 27A, about 200 □m) and absence of surfactant (FIG. 27B, from about 0.5 mm to about 3 mm). Although the particle size of these two preparation methods varied significantly, the pore structure of the resulting activated carbon was consistent among the two methods (FIG. 28, dotted lines represent surfactant samples and solid lines represent no surfactant).

Accordingly, certain embodiments of the present methods allow manipulation of the particle size while maintaining the desired pore structure, simply by selection of the appropriate continuous phase. Further, the methods provide robust and reproducible manufacturing processes since fluctuations in process parameters which affect the particle size are not expected to affect the resulting pore structure of the final product.

Example 21

Control of Particle Size

As noted in Example 20, in certain embodiments of the method the particle size of the gel particles does not have a significant effect on the pore structure of the gel particles. These embodiments of the invention provide advantages over other known methods since the particle size of the gel can be manipulated to obtain optimum processing properties (e.g., filtration, downstream pyrolysis and activation, final carbon particle size, etc.) while still maintaining the desired pore structure. Accordingly, various experiments were designed to understand how to control the gel particle size so that manufacturing processes can be optimized. Each of the experiments described below were performed with resorcinol/formaldehyde polymers; however, other polymers such as phenol/formaldehyde and melamine/formaldehyde polymers, and the like may also be used.

A. Degree of Polymerization

Figure 29:
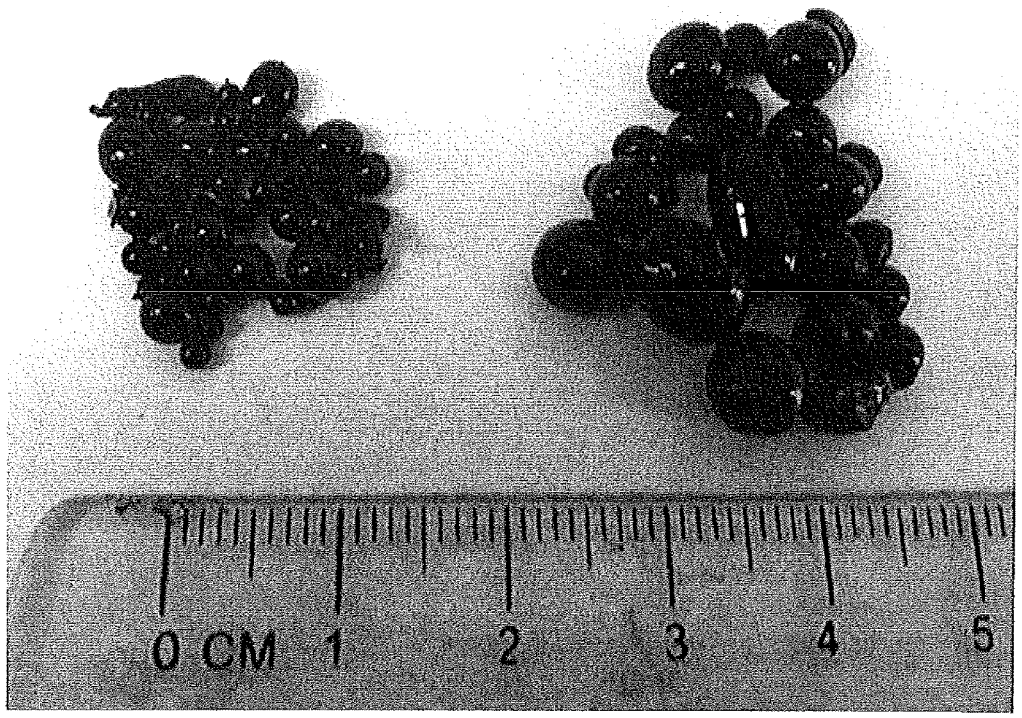
FIG. 29 is a photograph of polymer particles in gel form made according to one or more embodiments described.

As described in example 1 (and throughout the other examples), the polymer precursors and optional acid, solvent and/or catalyst are first admixed to prepare a prepolymer composition. Experiments performed in support of the present invention showed that the longer the prepolymer composition is allowed to react before being added to the continuous layer, the larger the resulting polymer gel particles. FIG. 29 shows gel particles formed by allowing the prepolymer composition to react prior to addition to the continuous phase. As seen in FIG. 29, larger particles result from longer reaction times prior to curing.

B. Temperature Effect

Figure 30:
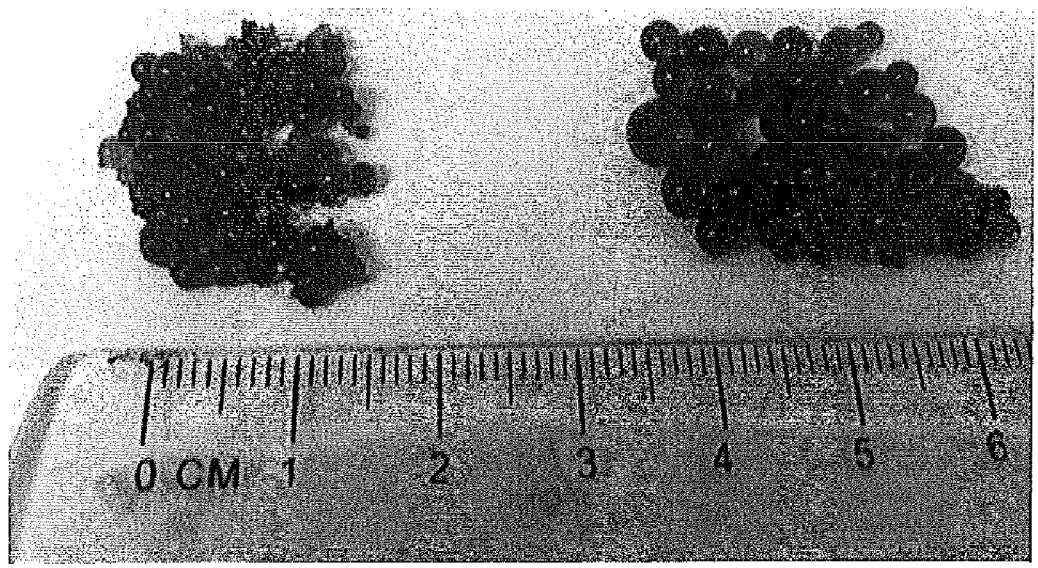
FIG. 30 is a photograph of polymer particles in gel form made according to one or more embodiments described.

In a separate set of experiments, prepolymer compositions were prepared having the following composition: 40% solid, 10% acetic acid, R/C ratio of 10, and formaldehyde:resorcinol ratio of 2. Each prepolymer composition sample was incubated at either 65° C. or 80° C. and then added to a Flint Hills 100-HC continuous phase (resin/continuous phase ratio of 30:100) and stirred under the same conditions. As seen in FIG. 30, a higher preincubation temperature results in smaller gel particles and lower preincubation temperature results in larger gel particles (FIG. 30: left: 80° C. incubation temperature; right: 65° C. incubation temperature). This approach provides a simple, feasible way to control bead particle size in large production scale.

C. Continuous Phase Effect

Figure 31:
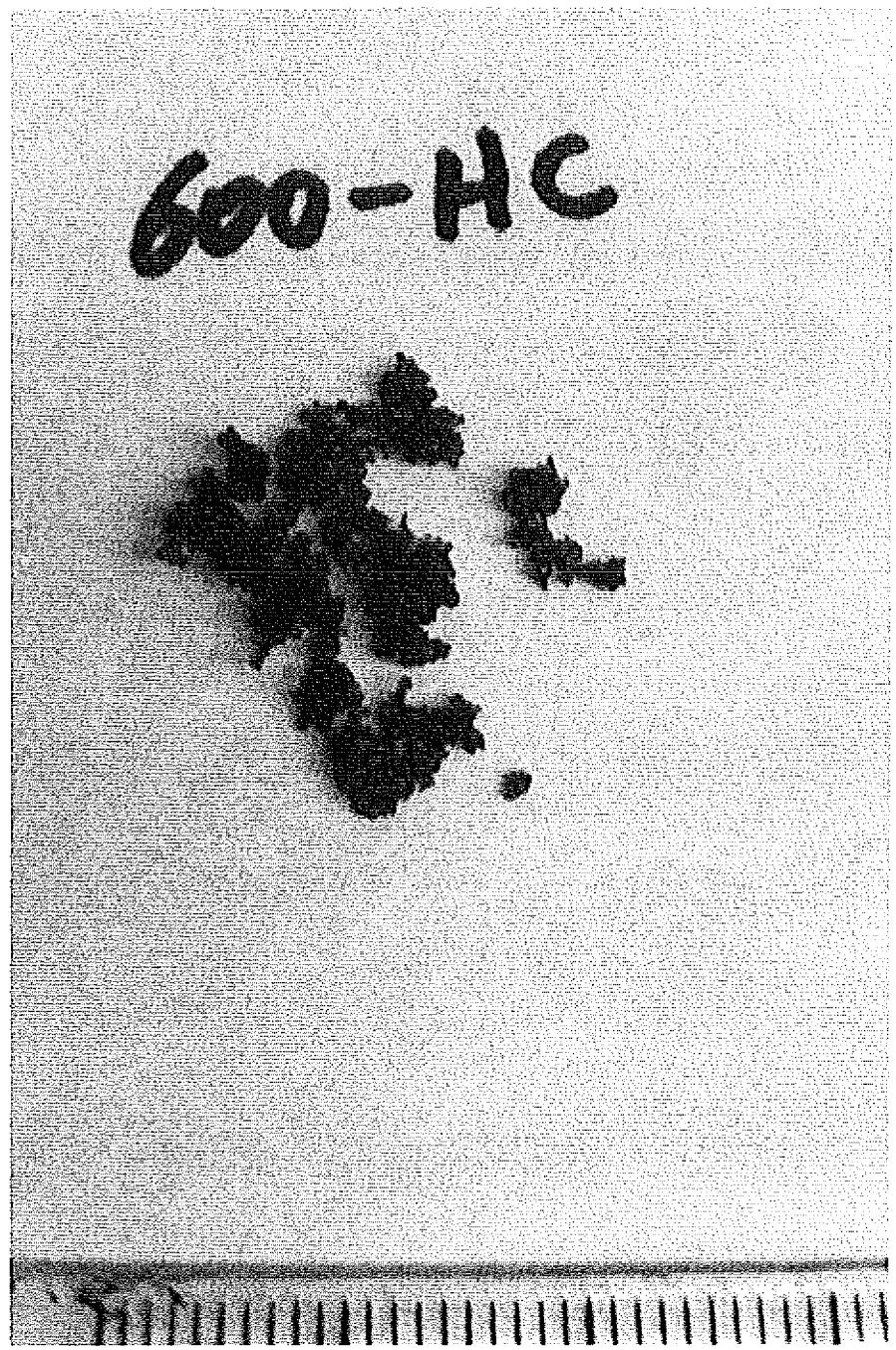
FIG. 31 is a photograph of polymer particles in gel form made according to one or more embodiments described.
Figure 32:
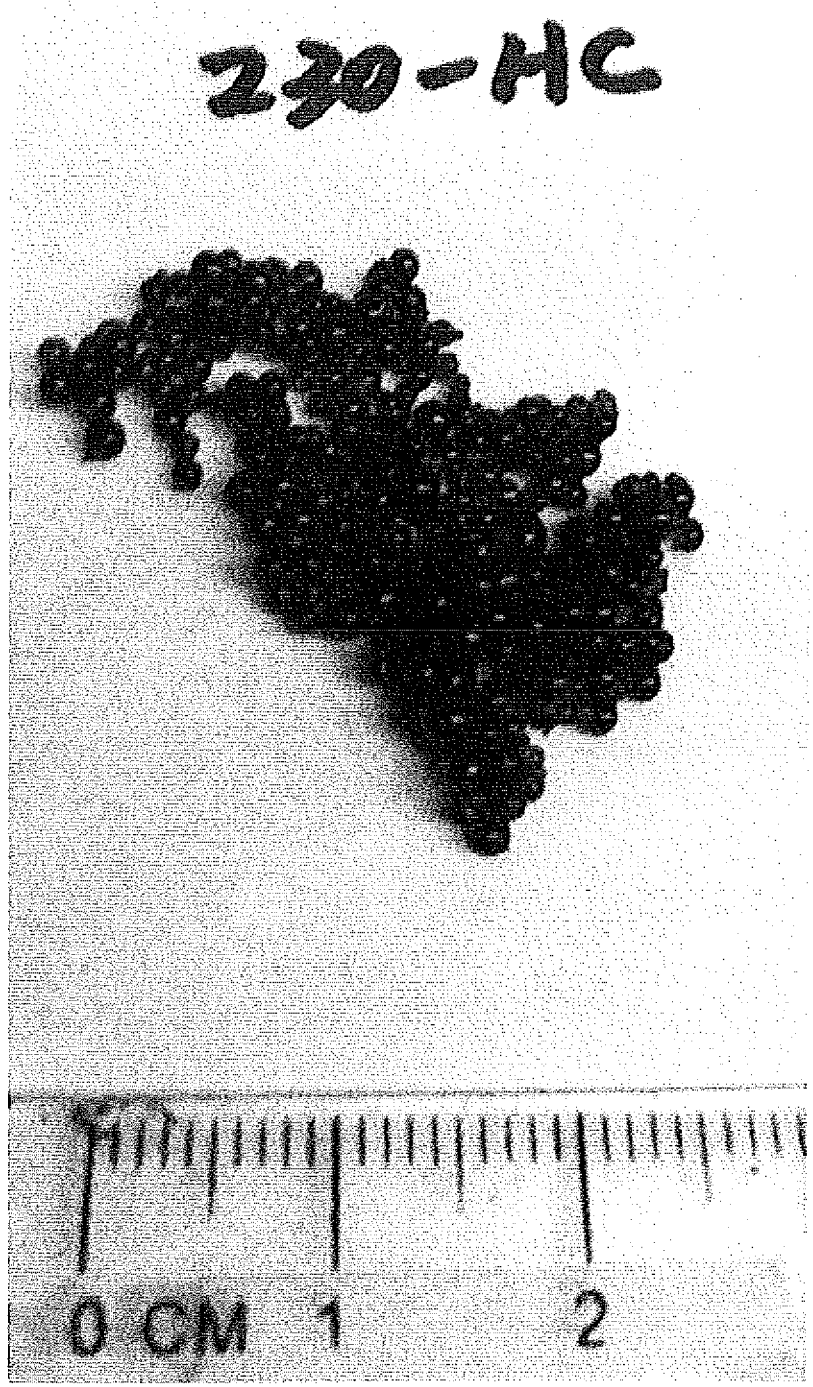
FIG. 32 is a photograph of polymer particles in gel form made according to one or more embodiments described.
Figure 33:
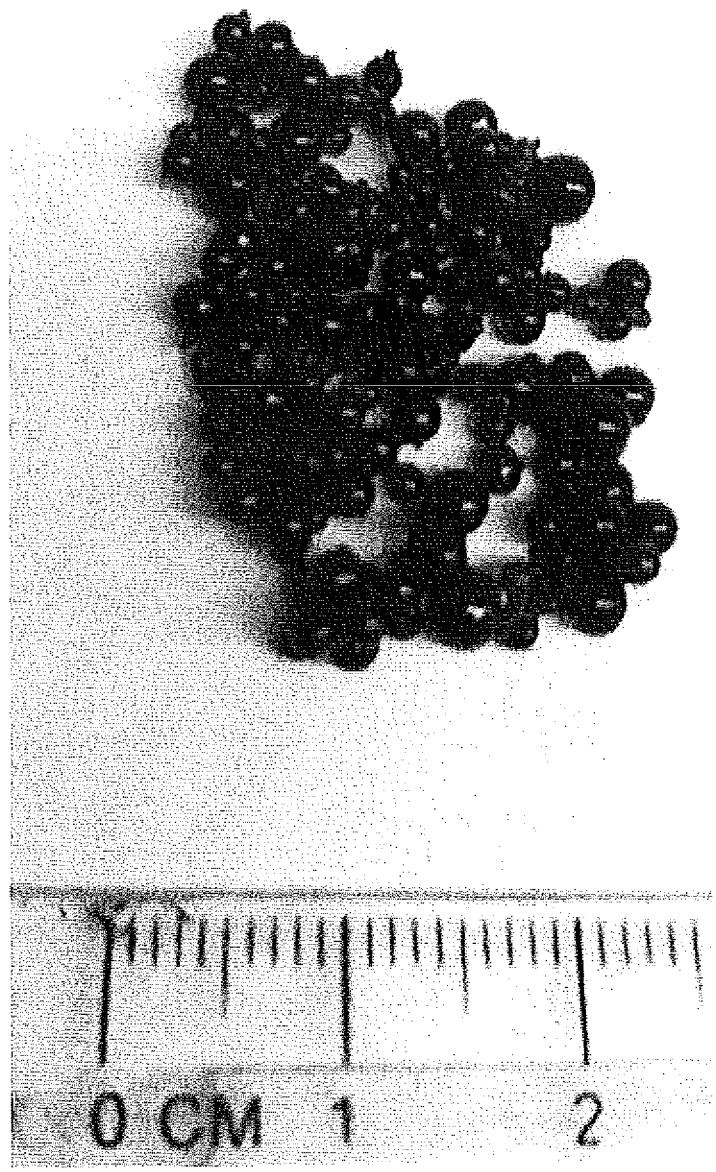
FIG. 33 is a photograph of polymer particles in gel form made according to one or more embodiments described.

In a next set of experiments, all processing parameters, except the continuous phase, were kept the same. A single batch of prepolymer was prepared as described in part B. The continuous phases were selected from the same oil family: Flint Hills' saturated hydrocarbons with different chain lengths. The continuous phase chain lengths of 70-HC, 100-HC, 230-HC, and 600-HC were tested. As shown in FIGS. 31 (600 HC), 32 (230 HC) and 33 (70 Hc), the gel particle size decreases with increasing continuous phase hydrocarbon chain length. This finding demonstrates the easy bead size tenability by simply changing the continuous phase. Depending on the applications and/or processing constraints, polymer beads with various sizes can be realized readily by adjusting continuous phase hydrocarbon chain length.

D. Polymer Formulation Effect

Figure 34:
FIG. 34 is a photograph of polymer particles in gel form made according to one or more embodiments described.

It was also determined that the prepolymer composition has an impact on gel particle size. In this set of experiments, all experimental conditions were kept the same except the prepolymer compositions. The continuous phase was BDH White Paraffin oil, and the bead formation temperature (i.e., pre-reaction temperature) was 80° C. FIG. 34 shows gel particles formed using a prepolymer composition comprising 30% solids, 5% acetic acid, a resorcinol:ammonium acetate ratio of 50 and a formaldehyde:resorcinol ratio of 2.

Figure 35:
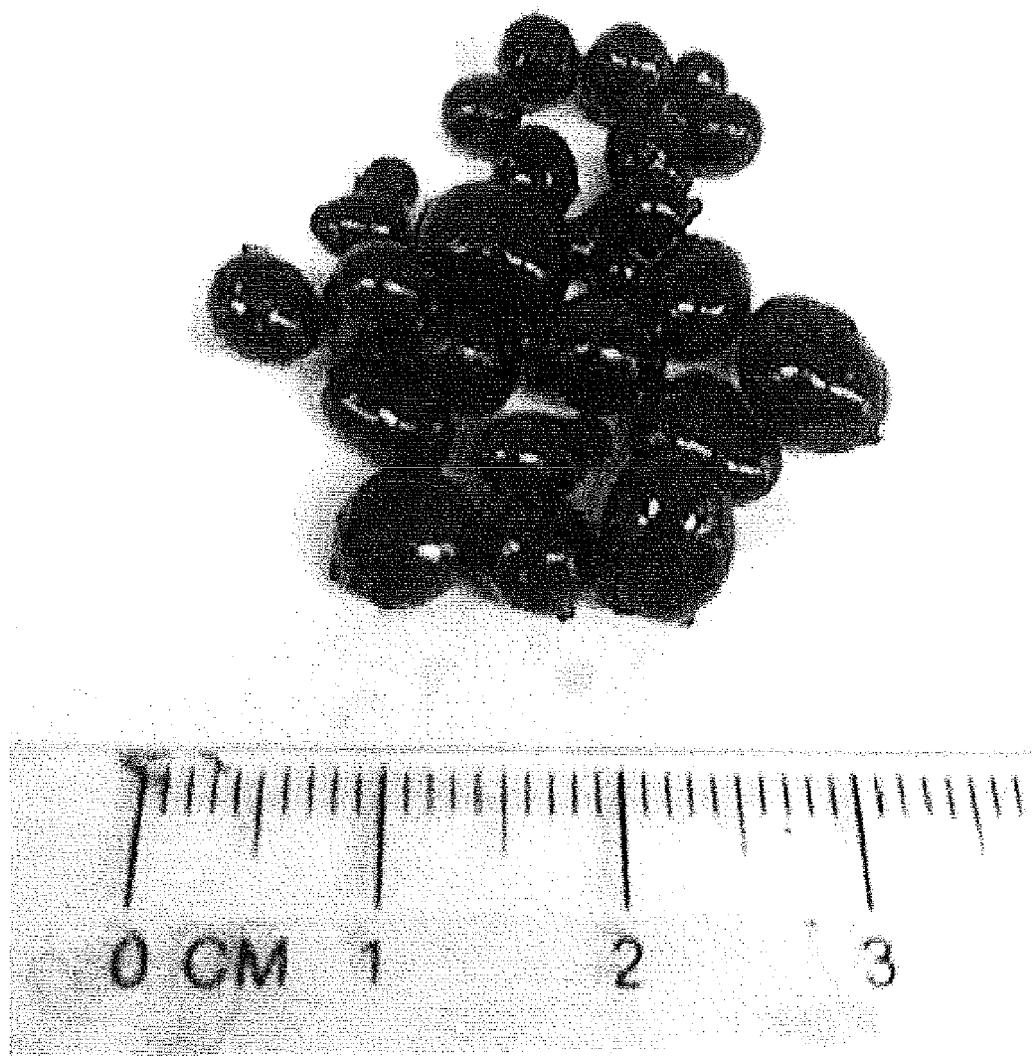
FIG. 35 is a photograph of polymer particles in gel form made according to one or more embodiments described.
Figure 36:
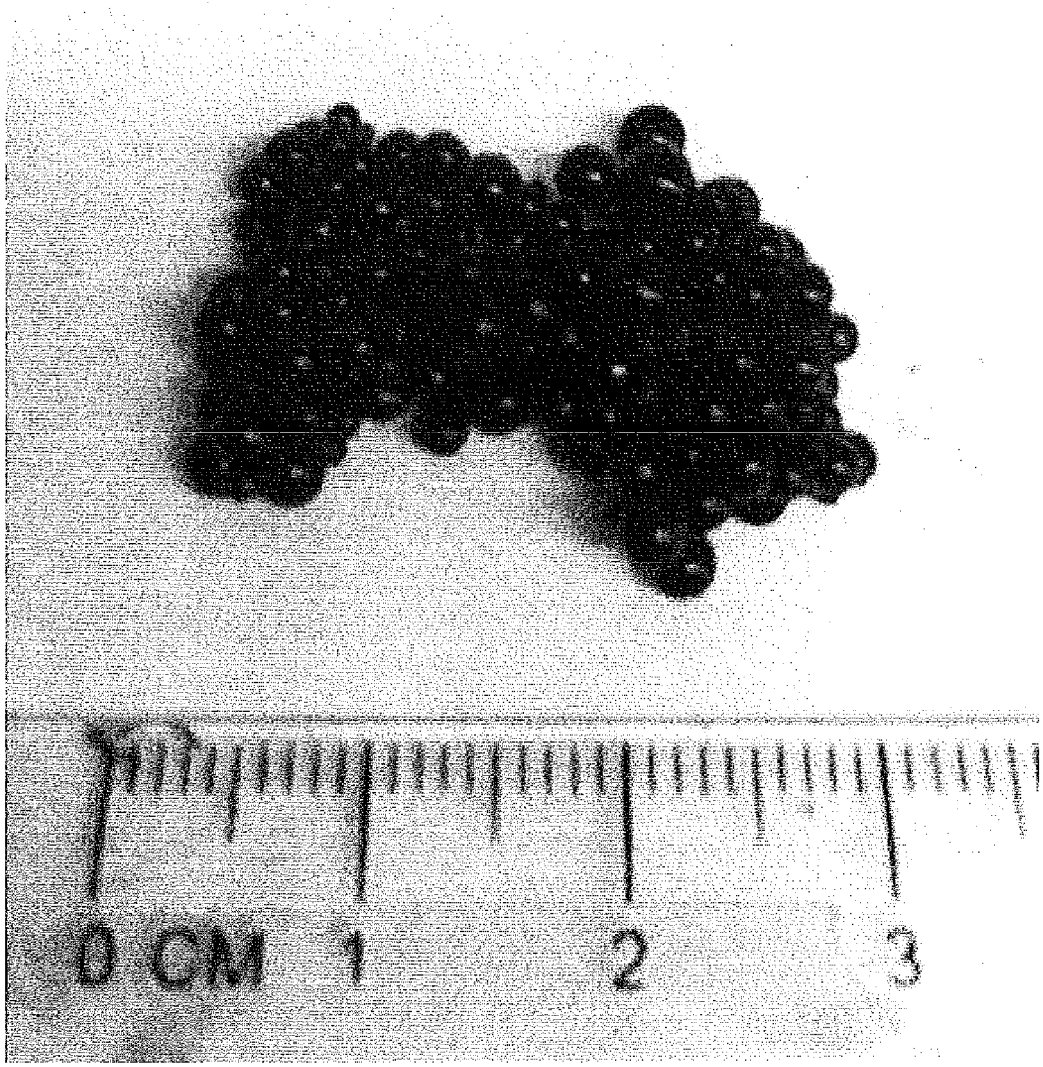
FIG. 36 is a photograph of polymer particles in gel form made according to one or more embodiments described.

As shown in FIGS. 34-36, gel particle size can be varied by changing the prepolymer formulations. FIG. 34 shows gel particles formed from a prepolymer composition comprising 30% solid, 5% acetic acid, Resorcinol:Ammonium Acetate ratio of 50, and Formaldehyde:Resorcinol of 2 (30/5/50/2). FIG. 35 shows gel particles formed from a prepolymer composition comprising 40% solid, 15% acetic acid, Resorcinol:Ammonium Acetate ratio of 25, and Formaldehyde:Resorcinol of 2 (40/15/25/2). FIG. 36 shows gel particles formed from a prepolymer composition comprising 40% solid, 25% acetic acid, Resorcinol:Ammonium Acetate ratio of 5, and Formaldehyde:Resorcinol of 2 (40/25/5/2).

Example 22

Control of Pore Structure by Formulation

Figure 37:
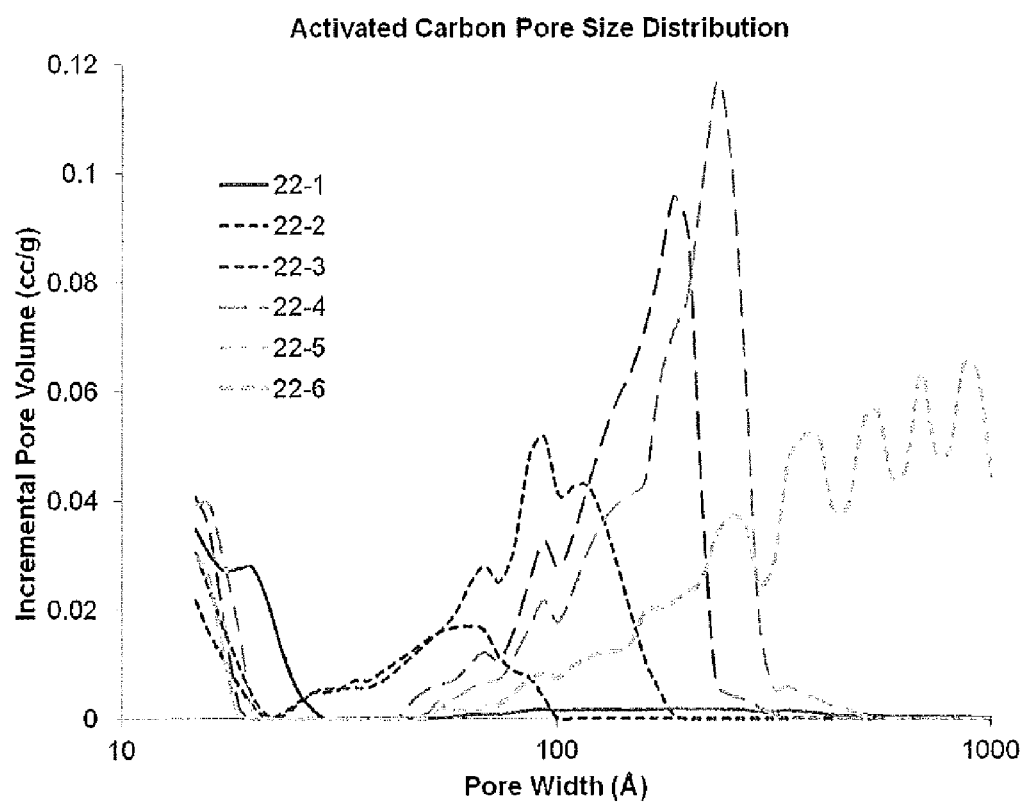
FIG. 37 demonstrates a range of activated carbon pore size distributions

Multiple Resorcinol-Formaldehyde resin formulations were prepared to express the range of pore structures achievable within the suspension polymerization technology stated above. These samples were dried and then pyrolyzed. All samples were activated in the tube furnace at 900° C. with the goal of achieving 1700-1900 m$^2$/g SSA. Table (23) shows the range of specific surface areas and pore volumes that can be achieved by modulating the formulation. As shown in FIG. 37), gel pore structure can be varied greatly by altering the formulation.

TABLE 23

Activated Carbon Data

| Sample | SSA | PV | P95/P5 | GM |
|---|---|---|---|---|
| 22-1 | 1846 | 0.832 | 1.25 | 22.2 |
| 22-2 | 1690 | 0.857 | 1.34 | 19.7 |
| 22-3 | 1628 | 0.934 | 1.53 | 17.4 |
| 22-4 | 1815 | 1.247 | 1.85 | 14.6 |
| 22-5 | 1913 | 1.736 | 2.44 | 11.0 |
| 22-6 | 2081 | 1.984 | 2.47 | 10.5 |
| 22-7 | 1776 | 2.431 | 1.97 | 7.3 |

Example 23

Control of Electrochemical Performance

Multiple Resorcinol-Formaldehyde resin formulations were prepared to express the range of electrochemical performance that can be achieved within the suspension polymerization technology stated above. These samples were dried and then pyrolyzed. All samples were activated in the tube furnace at 900° C. with the goal of achieving 1700-1900 m$^2$/g SSA. Table (24) shows the range of specific surface areas and pore volumes that can be achieved by modulating the formulation. Table (24) also displays the range of electrochemical performance achieved within the suspension system described above.

TABLE (24)

Electrochemical Data

| Sample | SSA | PV | GM | F/cc | F/g | Normalized F/cc | R1 | -45 Hz |
|---|---|---|---|---|---|---|---|---|
| 23-1 | 2090 | 1.924 | 10.9 | 14.8 | 129.7 | 13.7 | 4.45 | 0.28 |
| 23-2 | 1913 | 1.736 | 11.0 | 16.6 | 125.9 | 14.5 | 5.18 | 0.23 |
| 23-3 | 1973 | 1.306 | 15.1 | 18.7 | 125.3 | 18.0 | 4.56 | 0.22 |
| 23-4 | 1640 | 1.054 | 15.6 | 20.7 | 117.6 | 19.7 | 5.38 | 0.12 |
| 23-5 | 1660 | 0.698 | 23.8 | 22.3 | 116.6 | 25.6 | 4.46 | 0.19 |
| 23-6 | 1775 | 0.733 | 24.2 | 24.1 | 126.7 | 27.0 | 3.85 | 0.17 |
| 23-7 | 1781 | 0.736 | 24.2 | 25.5 | 124.0 | 26.4 | 4.02 | 0.14 |

Example 24

About 360 grams of resorcinol, about 10.8 grams of ammonium acetate, about 720 grams of deionized water, and about 253 grams acetic acid were added to a reactor and heated to a temperature of about 45° C. After the mixture was heated to about 45° C., about 531 grams of formaldehyde was slowly added to the reactor over the course of about 60 minutes to provide a reaction mixture. After adding the formaldehyde to the reactor the reaction mixture was pre-reacted until a refractive index of about 1.4078 was reached. The pre-reacted mixture or "pre-polymer" was then cooled down to a temperature of about 25° C. and placed into collection bottles. One collection bottle of the pre-polymer was stored in a cold room at a temperature of about 4° C. to about 5° C. overnight.

Figure 38:
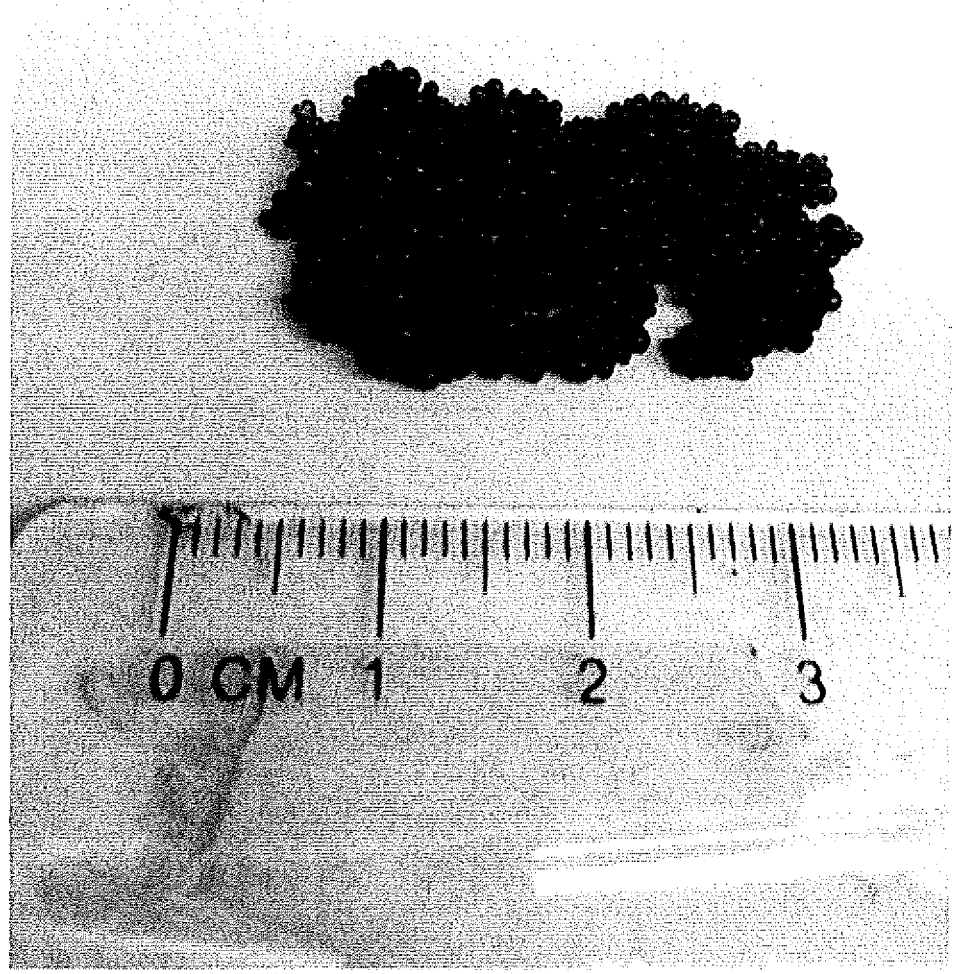
FIG. 38 is a photograph of polymer particles in gel form made according to one or more embodiments described.

The next day about 1.2 liters of WESSON® vegetable oil and were added to a 1 gallon reactor equipped with a heating mantle, a cooling coil, and a mechanical agitator. The vegetable oil was stirred via the mechanical agitator and heated to a temperature of about 80° C. About 205 ml of the pre-polymer was slowly added to the heated vegetable oil such that the temperature of the vegetable oil/pre-polymer mixture maintained a temperature above 75° C. The temperature was controlled with a J-KEM Scientific, Model 250. After adding the pre-polymer the contents of the reactor were stirred for about 1 hour at a temperature of about 80° C. to about 85° C. After about 20 minutes of stirring, the stir dial was adjusted to a 3.3 setting. After about 1 hour of stirring, the contents of the reactor (vegetable oil/polymer particulates) were cooled and transferred into about 3 250 ml bottles and placed in an oven heated to a temperature of about 85° C. Heating the vegetable oil/polymer particulate mixture in the oven further cured the polymer particulates. After about 12 hours the glass jars were removed from the oven and a polymer particle product in gel form (Example 24) was collected. The polymer particles in gel form (Example 24) are shown in FIG. 38. As shown in FIG. 38, the polymer particles in gel form had a cross-sectional length of about 1 mm.

Example 25

About 387.12 grams of resorcinol, about 5.43 grams of ammonium acetate, about 1,115.37 grams of deionized water, and about 69.72 grams acetic acid were added to a reactor and heated to a temperature of about 45° C. After the mixture was heated to about 45° C., about 423 grams of formaldehyde was slowly added to the reactor over the course of about 80 minutes to provide a reaction mixture. After adding the formaldehyde to the reactor the reaction mixture was pre-reacted until a refractive index of about 1.3940 was reached. The pre-reacted mixture or "pre-polymer" was then cooled down to a temperature of about 25° C. and placed into collection bottles. One collection bottle of the pre-polymer was stored in a cold room at a temperature of about 4° C. to about 5° C. overnight.

Figure 39:
FIG. 39 is another photograph of polymer particles in gel form made according to one or more embodiments described.

The next day about 250 grams of paraffin oil and a magnetic stir bar were added to a beaker located on a hot plate (Corning PC-351). The magnetic stir bar was started by turning the stir dial to the 2.5 setting and the paraffin oil was heated to a temperature of about 81° C. About 75 grams of the pre-polymer was slowly added to the heated paraffin oil such that the temperature of the paraffin oil/pre-polymer mixture maintained a temperature above 75° C. After adding the pre-polymer the contents of the beaker were stirred for about 2 hours at a temperature of about 80° C. to about 85° C. While the contents of the beaker were stirred the magnetic stir bar stopped rotating for about 20 minutes. During this time period manual stirring was continued using a spatula. After about 2 hours of stirring, the contents of the beaker (paraffin oil/polymer particulates) were cooled and transferred into 2 250 ml glass jars, each holding about 200 ml of the paraffin oil/polymer particulate mixture and placed in an oven heated to a temperature of about 85° C. After about 4 hours and 40 minutes the glass jars were removed from the oven and a polymer particle product in gel form (Example 25) was collected. The polymer particles in gel form (Example 25) are shown in FIG. 39. As shown in FIG. 39, the polymer particles in gel form had a cross-sectional length ranging from about 0.1 mm to about 2.5 mm.

Example 26

About 256.96 grams of resorcinol, about 7.19 grams of ammonium acetate, about 366.17 grams of deionized water, and about 89.35 grams acetic acid were added to a reactor and heated to a temperature of about 45° C. After the mixture was heated to about 45° C., about 281 grams of formaldehyde was slowly added to the reactor over the course of about 100 minutes to provide a reaction mixture. After adding the formaldehyde to the reactor the reaction mixture was pre-reacted until a refractive index of about 1.4263 was reached. The pre-reacted mixture or "pre-polymer" was then cooled down to a temperature of about 25° C. and placed into collection bottles. One collection bottle of the pre-polymer was stored in a cold box at a temperature of about 4° C. to about 5° C. overnight.

Figure 40:
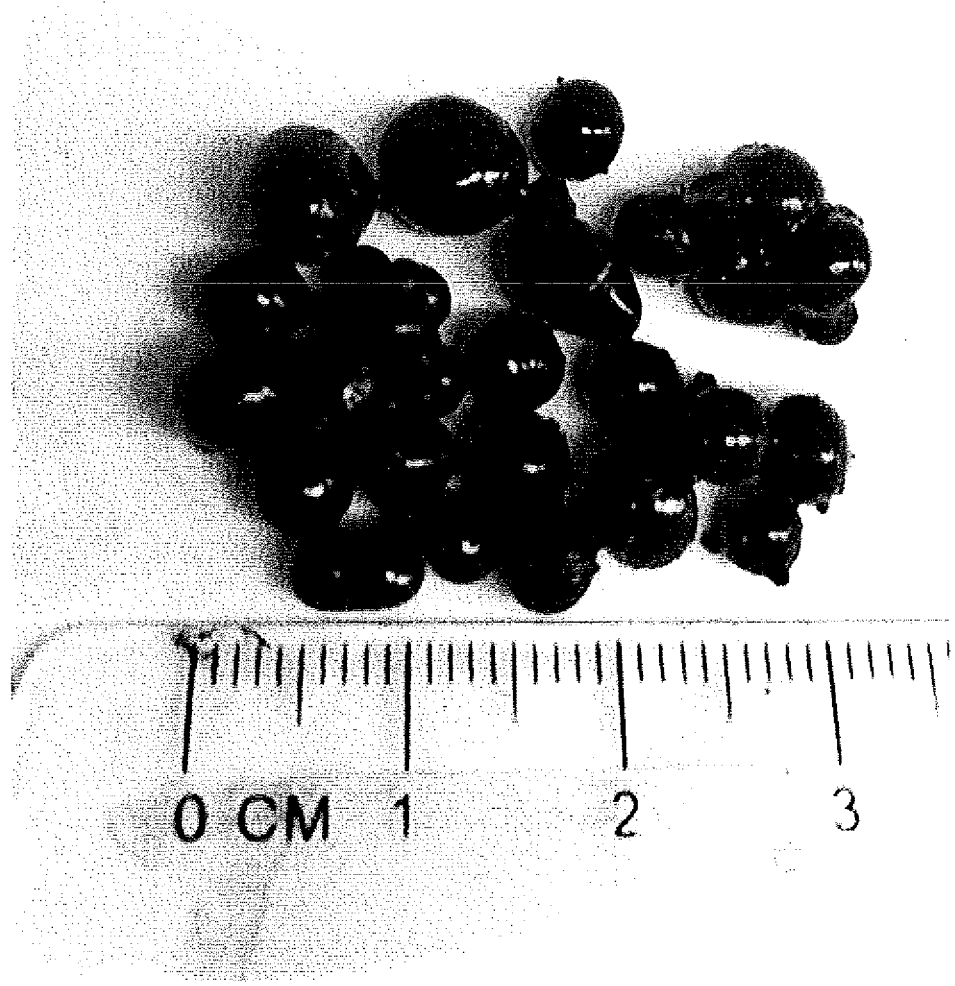
FIG. 40 is another photograph of polymer particles in gel form made according to one or more embodiments described.

The next day about 250 grams of paraffin oil and a magnetic stir bar were added to a beaker located on a hot plate (Corning PC-351). The magnetic stir bar was started by turning the stir dial to the 2.5 setting and the paraffin oil was heated to a temperature of about 81° C. About 75 grams of the pre-polymer was slowly added to the heated paraffin oil such that the temperature of the paraffin oil/pre-polymer mixture maintained a temperature above 75° C. After adding the pre-polymer the contents of the beaker were stirred for about 2 hours at a temperature of about 80° C. to about 85° C. While the contents of the beaker were stirred the magnetic stir bar stopped rotating for about 5 minutes. During this time period manual stirring was continued using a spatula. After about 2 hours of stirring, the contents of the beaker (paraffin oil/polymer particulates) were cooled and transferred into 2 glass jars, each holding about 200 ml of the paraffin oil/polymer particulate mixture and placed in an oven heated to a temperature of about 85° C. After about 6 hours the glass jars were removed from the oven and a polymer particle product in gel form (Example 26) was collected. The polymer particles in gel form (Example 26) are shown in FIG. 40. As shown in FIG. 40, the polymer particles in gel form had a cross-sectional length ranging from about 3 mm to about 7 mm.

Examples 27 and 28

A pre-polymer was prepared according to the following procedure. About 249.99 grams of resorcinol, about 34.91 grams of ammonium acetate, about 298.71 grams of deionized water, and about 144.82 grams acetic acid were added to a reactor and heated to a temperature of about 45° C. After the mixture was heated to about 45° C., about 251 grams of formaldehyde was slowly added to the reactor over the course of about 80 minutes to provide a reaction mixture. After adding the formaldehyde to the reactor the reaction mixture was pre-reacted until a refractive index of about 1.4332 was reached. The pre-reacted mixture or "pre-polymer" was then cooled down to a temperature of about 25° C. and placed into collection bottles. Two collection bottles (collection bottle A and B) of the pre-polymer were stored in a cold room at a temperature of about 4° C. to about 5° C. overnight.

Figure 41:
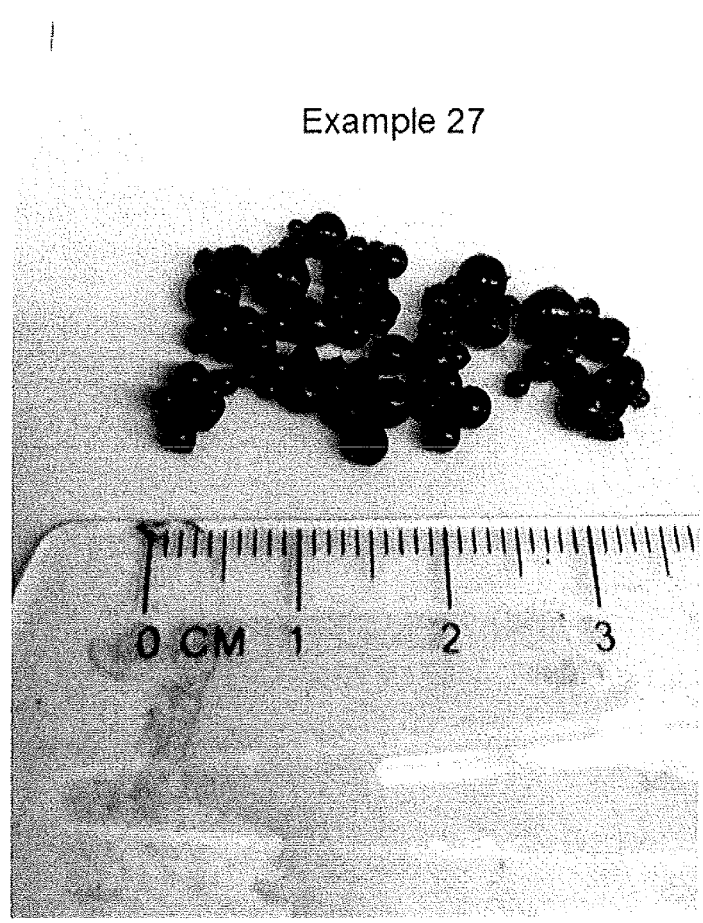
FIG. 41 is yet another photograph of polymer particles in gel form made according to one or more embodiments described.

Polymer particulates in gel form were prepared from the pre-polymer stored overnight in collection bottle A according to the following procedure. The next day about 250 grams of paraffin oil and a magnetic stir bar were added to a beaker located on a hot plate (Corning PC-351). The magnetic stir bar was started by turning the stir dial to the maximum setting and the paraffin oil was heated to a temperature of about 82° C. About 75 grams of the pre-polymer from collection bottle A was slowly added to the heated paraffin oil such that the temperature of the paraffin oil/pre-polymer mixture maintained a temperature above 75° C. After adding the pre-polymer the contents of the beaker were stirred for about 20 minutes at a temperature of about 80° C. to about 85° C. After about 20 minutes of stirring, the solids in the beaker were transferred into a beaker of water heated to a temperature of about 80° C. The solids in the water was stirred for about 1 hour at a temperature of about 80° C. and the contents of the beaker (paraffin oil/polymer particulates) were cooled and transferred into 2 glass jars, each holding about 200 ml of the paraffin oil/polymer particulate mixture and placed in an oven heated to a temperature of about 85° C. After about 15 hours the glass jars were removed from the oven and a polymer particle product in gel form (Example 27) was collected. The polymer particles in gel form (Example 27) are shown in FIG. 41. As shown in FIG. 41, the polymer particles in gel form had a cross-sectional length ranging from about 1 mm to about 4 mm.

Figure 42:
FIG. 42 is still another photograph of polymer particles in gel form made according to one or more embodiments described.

Polymer particulates in gel form were prepared from the pre-polymer stored overnight in collection bottle B according to the following procedure. The next day about 250 grams of paraffin oil and a magnetic stir bar were added to a beaker located on a hot plate (Corning PC-351). The magnetic stir bar was started by turning the stir dial to the maximum setting and the paraffin oil was heated to a temperature of about 97° C. About 75 grams of the pre-polymer from collection bottle A was slowly added to the heated paraffin oil such that the temperature of the paraffin oil/pre-polymer mixture maintained a temperature above 90° C. After adding the pre-polymer the contents of the beaker were stirred for about 15 minutes at a temperature of about 93° C. to about 97° C. and then the temperature was reduced to about 82° C. with stirring continued for about another 15 minutes and the contents of the beaker (paraffin oil/polymer particulates) were cooled and transferred into 2 glass jars, each holding about 200 ml of the paraffin oil/polymer particulate mixture and placed in an oven heated to a temperature of about 85° C. After about 7 hours the glass jars were removed from the oven and a polymer particle product in gel form (Example 28) was collected. The polymer particles in gel form (Example 28) are shown in FIG. 42. As shown in FIG. 42, the polymer particles in gel form had a cross-sectional length ranging from about 0.5 mm to about 3.5 mm.

A Bellingham+Stanley Ltd RFM 330 refractometer was used to determine the refractive index of the pre-polymers in Examples 24 to 28. The refractive index measurement procedure was as follows. Water at a temperature of about 25.0° C. was circulated into the refractometer 1 hr. before each refractive index (RI) measurement. The cleanliness of the prism was checked. If the RI reading of distilled water left from the previous RI measurement was not 1.3325+/−0.0001, the prism and presser were cleaned with distilled water, methanol, IPA (isopropyl alcohol), or other suitable solvent, and the prism was then refilled with distilled water. The presser was immediately closed and the RI measurement was taken. This step was repeated if necessary until the RI reading of distilled water read 1.3325±0.0001. The distilled water on the prism and the presser was wiped off after the refractometer was calibrated. The presser of the refractometer was lifted and the about 0.5 ml to about 1.0 ml of the sample was transferred to the prism with a plastic pipette. For an RI measurement, there must be sufficient sample transferred to the prism such that the entire prism area was covered with the sample. The sample was gently stirred in the prism with the pipet tip to break the surface tension. The presser was then closed and the RI measurement was taken. The temperature displayed by the refractometer was at 25° C.±0.1° C. The preceding procedure was repeated until two successive readings equal to or within 0.0001 RI units were acquired and the average of those two successive readings are the RI values reported herein.

Example 29

The following example illustrates the electrochemical stability can be measured (carbon physicochemical properties described in the table below).

| Test | | Result |
|---|---|---|
| Particle Size | Dv, 100 | 20.6 um |
| | Dv, 99 | 17.6 um |
| | Dv, 50 | 7.4 um |
| | Dv, 1 | 1.1 um |
| Tap Density | | 0.52 g/cm3 |
| Specific Surface Area | | 1709 m2/g |
| Total Pore Volume | | 0.710 cm3/g |
| GM (SSA/PV) | | 0.710 cm3/g |
| PIXE (Purity Analysis) | | Calcium = 4.664 ppm |
| | | Iron = 2.512 ppm |
| | | Nickel = 1.345 ppm |
| | | All other elements not detected |

In this case, the electrochemical performance was measured in terms of capacitance retention after exposure to high temperature at voltage hold. Specifically, this carbon was processed at pilot scale into electrodes produced via aqueous slurry processing of a 95:5:3 carbon:carbon black:styrene-butadiene copolymer mixture according to methods known in the art, and the electrodes were assembled into 100 F electric double layer capacitors with 1 M tetraethylammonium tetrafluoroborate in acetonitrile solvent employing methods known in the art. The ultracapacitors were subjected to incubation at 85 C and held under a voltage of 2.85 V. Following incubation at this condition for 32 hours, this device was cooled to room temperature within 1 hour and measured for its capacitance retention. The capacitance retention was found to retain 91.2% of the original capacitance, compared to a control case for a 100 F commercially available ultracapacitor produced from a commercial carbon which was found under the same conditions to exhibit a maximum theoretical capacitance of 19.9 F/cc, corresponding to 90.4% of its original capacitance.

Without being bound by theory, the techniques described herein to produce carbon with a maximum theoretical capacitance of greater than 26 F/cc would result in a carbon with greater than 23.7 F/cc after 32 hour exposure to 2.85 V hold and 85 C. Additionally, the techniques described herein to produce carbon with a maximum theoretical capacitance of greater than 27 F/cc would result in a carbon with greater than 24.6 F/cc after 32 hour exposure to 2.85 V hold and 85 C.

Embodiments described herein further relate to any one or more of the following paragraphs:

1. A method for making polymer particles in gel form via an emulsion or suspension process, the method comprising preparing a reactant mixture comprising a monomer component containing one or more phenolic compounds and optionally one or more crosslinking compounds, and a carrier fluid, wherein:
   a. the carrier fluid contains less than 50 wt % cyclohexane, based on the total weight of the carrier fluid,
   b. the monomer component polymerizes to form the polymer particles in gel form, and
   c. a volume average particle size (Dv,50) of the polymer particles in gel form is greater than or equal to 1 mm.

2. A method for making polymer particles in gel form via an emulsion or suspension process, the method comprising preparing a reactant mixture comprising a monomer component containing one or more phenolic compounds and optionally one or more crosslinking compounds, and a carrier fluid, wherein:
   a. the monomer component polymerizes to form the polymer particles in gel form,
   b. the carrier fluid is free of a surfactant or contains surfactant at a concentration less than the critical micelle concentration, and
   c. a volume average particle size (Dv,50) of the polymer particles in gel form is greater than or equal to 1 mm.

3. A method for making polymer particles in gel form via an emulsion or suspension process, the method comprising preparing a reactant mixture comprising a monomer component containing one or more phenolic compounds and optionally one or more crosslinking compounds, and a carrier fluid, wherein:
   a. the monomer component polymerizes to form the polymer particles in gel form, and,
   b. the carrier fluid contains less than 50 wt % cyclohexane, based on the total weight of the carrier fluid, and,
   c. the carrier fluid is free of a surfactant or contains surfactant at a concentration less than the critical micelle concentration, and
   d. a volume average particle size (Dv,50) of the polymer particles is less than or equal to 1 mm.

4. The method according to paragraph 1 or 2, wherein the volume average particle size (Dv,50) of the polymer particles in gel form is greater than or equal to 2 mm.

5. The method according to paragraph 1 or 2, wherein the volume average particle size (Dv,50) of the polymer particles in gel form is greater than or equal to 4 mm.

6. The method according to any one of paragraphs 1 to 5, wherein the carrier fluid comprises one or more vegetable oils, one or more minerals, one or more chlorinated hydrocarbons, one or more paraffinic oils, or any mixture thereof 7. The method according to any one of paragraphs 1 to 6, wherein the monomer component is an aqueous mixture comprising one or more catalysts.

8. The method according to paragraph 7, wherein the catalyst comprises ammonium carbonate, ammonium bicarbonate, ammonium acetate, ammonium hydroxide, or any mixture thereof 9. The method according to any one of paragraphs 1 to 6, wherein the monomer component is an aqueous mixture comprising one or more catalysts, and wherein the one or more catalysts comprises a basic salt, an organic acid, or any mixture thereof 10. The method according to paragraph 9, wherein the organic acid is acetic acid, formic acid, propionic acid, maleic acid, oxalic acid, uric acid, lactic acid, or any mixture thereof 11. The method according to any one of paragraphs 1 to 10, further comprising agitating the reaction mixture.

12. The method according to any one of paragraphs 1 to 11, further comprising heating the reactant mixture to a temperature of from about 30° C. to about 150° C.

13. The method according to any one of paragraphs 1 to 12, wherein the monomer component has a pH of less than 7 during polymerization.

14. The method according to any one of paragraphs 1 to 13, wherein the one or more crosslinking compounds is present, and wherein the one or more phenolic compounds and the one or more crosslinking compounds are prepolymerized with one another to form a prepolymer prior to making the polymer particles in gel form via the emulsion or suspension process.

15. The method according to any one of paragraphs 1 to 14, wherein the reaction mixture further comprises 0.01% to 20% of a non-ionic surfactant having a molecular weight of from about 100 Daltons to about 2,000 Daltons.

16. The method according to any one of paragraphs 1 to 15, further comprising heating the polymer particles in gel form in an inert atmosphere at a temperature of from about 500° C. to about 2,400° C. to produce pyrolyzed particles.

17. The method according to paragraph 16, wherein the pyrolyzed particles have a total pore volume greater than 0.5 $cm^3/g$ and a gerameter (GM) greater than or equal to 21.

18. An electrode comprising activated pyrolyzed particles produced according to the method in paragraph 17.

19. An electrical energy storage device comprising activated pyrolyzed particles produced according to the method in paragraph 17.

20. The method according to any one of paragraphs 1 to 19, wherein the carrier fluid has a boiling point of 81° C. or greater at a pressure of 100 kPa.

21. The method according to any one of paragraphs 1 to 20, further comprising separating the polymer particles from the carrier fluid to provide separated polymer particles in gel form.

22. The method according to any one of paragraphs 1 to 21, wherein the monomer component has a pH of greater than 7 during polymerization.

23. The method according to any one of paragraphs 1 to 22, wherein the reactant mixture is at a temperature of about 30° C. or more when the monomer component polymerizes to form the polymer particles in gel form.

24. The method according to any one of paragraphs 1 to 23, wherein the one or more crosslinking compounds is present, and wherein the one or more phenolic compounds and the one or more crosslinking compounds are prepolymerized with one another to form a liquid prepolymer having a refractive index ranging from about 1.1000 to about 1.7000 prior to making the polymer particles in gel form via the emulsion or suspension process.

25. The method according to any one of paragraphs 1 to 24, wherein the reactant mixture further comprises a nitrogen-containing electrochemical modifier.

26. The method according to any one of paragraphs 1 to 25, further comprising drying the polymer particles in gel form without any size reduction of the polymer particles in gel form.

27. The method according to any one of paragraphs 1 to 26, wherein the polymer particles in gel form have a total pore volume of between about 0.01 $cm^3/g$ and 1.5 $cm^3/g$.

28. The method according to any one of paragraphs 1 to 27, further comprising:
heating the polymer particles in gel form in an inert atmosphere at temperatures ranging from 500° C. to 2400° C. to produce pyrolyzed particles; and
activating the pyrolyzed particles in an atmosphere comprising carbon dioxide, carbon monoxide, steam, oxygen, or any mixture thereof at a temperature of from 500° C. to 1300° C. to produce activated particles.

29. The method according to paragraph 28, wherein the activated particles have a total pore volume greater than 0.5 $cm^3/g$ and gerameter (GM) is greater than or equal to 21.

30. The method according to paragraph 28, wherein the activated particles have a total pore volume greater than 1 $cm^3/g$ and gerameter (GM) is from 9 to 21.

31. An electrode comprising activated pyrolyzed particles produced according to the method in any one of paragraphs 28 to 30.

32. An electrical energy storage device comprising activated pyrolyzed particles produced according to the method according to any one of paragraphs 28 to 30.

33. The method according to paragraph 1 or 2, wherein the Dv,50 of the polymer particles is greater than or equal to 1.5 mm.

34. The method according to paragraph 1 or 2, wherein the Dv,50 of the polymer particles is greater than or equal to 3 mm.

35. The method according to any one of paragraphs 1 to 6 or 11 to 34, wherein the monomer component is an aqueous mixture comprising one or more catalysts.

36. The method according to paragraph 35, wherein one of more catalysts comprises an organic acid.

37. The method according to paragraph 36, wherein one of more catalysts comprises a basic salt.

38. The method according to paragraph 37, wherein the basic salt is ammonium carbonate, ammonium bicarbonate, ammonium acetate, or ammonium hydroxide, or any mixture thereof 39. The method according to any one of paragraphs 35 to 38, wherein the one or more catalysts is substantially free of any moiety comprised of any metal, metal ion, semi-metal ion, and halogen.

40. The method according to any one of paragraphs 7 to 10 or 35 to 39, wherein a molar ratio of the one or more phenolic compounds to the one or more catalysts ranges from about 5 to about 400.

41. The method according to any one of paragraphs 7 to 10 or 35 to 39, wherein a molar ratio of the one or more phenolic compounds to the one or more catalysts ranges from about 5 to about 50.

42. The method according to any one of paragraphs 1 to 41, wherein the polymer particles in gel form are made via the suspension process, the method further comprising agitating the suspension with a mixer.

43. The method according to any one of paragraphs 1 to 42, further comprising heating the reactant mixture to a temperature of from about 30° C. to about 100° C.

44. The method according to any one of paragraphs 1 to 43, wherein the monomer component has a pH of less than 4 during polymerization.

45. The method according to any one of paragraphs 1 to 44, wherein the reactant mixture is at a temperature ranging from about 80° C. to about 150° C. during polymerization of the monomer component.

46. The method according to paragraph 25, wherein the nitrogen-containing electrochemical modifier is urea, melamine, or mixture thereof.

47. The method according to any one of paragraphs 1 to 46, wherein the reaction mixture, the carrier fluid, or both comprises 0.01 to 20% SPAN™ 80, SPAN™ 85, SPAN™ 65, SPAN™ 60, SPAN™ 40, SPAN™ 20, TWEEN® 80, TWEEN® 40, TWEEN® 20, TWEEN® 21, TWEEN® 60, Triton-X® 100, or any mixture thereof.

48. The method according to any one of paragraphs 1 to 47, wherein the polymer gel particle comprise a total pore volume of between about 0.1 and 0.9 cm3/g.

49. The method according to any one of paragraphs 16-19 or 28-32, wherein the pyrolyzed polymer gel particles have a total pore volume greater than 0.8 cm$^3$/g, and wherein less than 50% of the total pore volume resides in pores less than 20 nm.

50. The method according to any one of paragraphs 1 to 49, wherein the one or more phenolic compounds comprises phenol, one or more substituted phenolic compounds, one or more tannins, or any mixture thereof.

51. The method according to any one of paragraphs 1 to 50, wherein the one or more crosslinking compounds is present, and wherein the crosslinking compound has the formula RCHO, wherein R is hydrogen or a hydrocarbon radical.

52. The method according to any one of paragraphs 1 to 51, wherein the one or more crosslinking compounds is present, and wherein the crosslinking compound is a multifunctional aldehyde compound.

53. The method according to any one of paragraphs 1 to 52, wherein the one or more crosslinking compounds is present, wherein the one or more phenolic compounds comprises 1,3-dihydroxybenzene, and wherein the one or more crosslinking compounds comprises formaldehyde.

54. The method according to any one of paragraphs 1 to 53, wherein the carrier fluid contains less than 0.3 wt % of any surfactant, based on the weight of the carrier fluid.

55. The method according to any one of paragraphs 1 to 54, wherein the carrier fluid contains less than 0.1 wt % of any surfactant, based on the weight of the carrier fluid.

56. The method according to any one of paragraphs 1 to 55, wherein the carrier fluid is free of any surfactant.

57. The method according to any one of paragraphs 1 to 56, wherein the volume average particle size (Dv,60) of the polymer particles in gel form is greater than or equal to 1.5 mm.

58. The method according to any one of paragraphs 1 to 57, wherein the volume average particle size (Dv,40) of the polymer particles in gel form is greater than or equal to 1.1 mm.

59. The method according to any one of paragraphs 1 to 58, wherein the volume average particle size (Dv,40) of the polymer particles in gel form is greater than or equal to 1.3 mm 60. The method according to any one of paragraphs 1 to 59, wherein the volume average particle size (Dv,40) of the polymer particles in gel form is greater than or equal to 1.5 mm.

61. The method according to any one of paragraphs 1 to 60, wherein the volume average particle size (Dv,40) of the polymer particles in gel form is greater than or equal to 1.7 mm.

62. The method according to any one of paragraphs 1 to 61, wherein the carrier fluid contains less than 0.5 wt % cyclohexane.

63. The method according to any one of paragraphs 1 to 62, wherein the carrier fluid is free of cyclohexane.

64. The method according to any one of paragraphs 1 to 63, wherein the carrier fluid comprises one or more cycloalkanes.

65. The method according to any one of paragraphs 1 to 64, wherein the monomer component is combined with a liquid medium.

66. The method according to any one of paragraphs 1 to 65, wherein the monomer component is an aqueous mixture.

67. The method according to any one of paragraphs 1 to 6, 11 to 34, or 40 to 66, wherein the reactant mixture further comprises one or more catalysts.

68. The method according to paragraph 67, wherein the one or more catalysts has a basic pH.

69. The method according to paragraph 67, wherein the one or more catalysts has an acidic pH.

70. The method according to paragraph 67, wherein the one or more catalysts comprises sodium hydroxide, sodium carbonate, sodium bicarbonate, magnesium oxide, calcium oxide, barium oxide, zeolite, potassium fluoride, potassium hydroxide, potassium carbonate, potassium bicarbonate, ammonium carbonate, hexamethylenetetramine, acetic acid, hydrochloric acid, sulfuric acid, phosphoric acid, phosphorous acid, sulfonic acid, gallic acid, oxalic acid, picric acid, ammonium acetate, ammonium carbonate, or any mixture thereof.

71. The method according to paragraph 67, wherein the one or more catalysts comprises a mixture of ammonium acetate and acetic acid.

72. The method according to any one of paragraphs 67 to 71, wherein the one or more catalysts is substantially free of any metal or metal ion.

73. The method according to any one of paragraphs 67 to 72, wherein the one or more catalysts is free of any metal or metal ion.

74. The method according to any one of paragraphs 67 to 73, wherein a molar ratio of the one or more phenolic compounds to the one or more catalysts ranges from about 5 to about 400.

75. The method according to any one of paragraphs 67 to 74, wherein a molar ratio of the one or more phenolic compounds to the one or more catalysts ranges from about 5 to about 100.

76. The method according to any one of paragraphs 67 to 75, wherein a molar ratio of the one or more phenolic compounds to the one or more catalysts ranges from about 5 to about 50.

77. The method according to any one of paragraphs 67 to 75, wherein a molar ratio of the one or more phenolic compounds to the one or more catalysts ranges from about 5 to about 45.

78. The method according to any one of paragraphs 67 to 75, wherein a molar ratio of the one or more phenolic compounds to the one or more catalysts is less than 50.

79. The method according to any one of paragraphs 1 to 78, further comprising drying the polymer particles in gel form to produce dried polymer particles.

80. The method according to any one of paragraphs 1 to 78, further comprising drying the polymer particles under supercritical conditions to produce dried polymer particles.

81. The method according to any one of paragraphs 1 to 78, further comprising freeze drying the polymer particles to produce dried polymer particles.

82. The method according to any one of paragraphs 1 to 78, further comprising air drying the polymer particles in gel form to produce dried polymer particles.

83. The method according to any one of paragraphs 1 to 82, wherein the polymer particles in gel form contain less than 1 wt % of any metal ion, metal atom, or mixture thereof, based on the total weight of the polymer particles in gel form.

84. The method according to any one of paragraphs 1 to 83, wherein the polymer particles in gel form contain less than 0.1 wt % of any metal ion, metal atom, or mixture thereof, based on the total weight of the polymer particles in gel form.

85. The method according to any one of paragraphs 1 to 84, wherein the polymer particles in gel form are made via the emulsion process, and wherein the emulsion process is an inverse emulsion process.

86. The method according to any one of paragraphs 1 to 85, wherein the carrier fluid comprises water.

87. The method according to any one of paragraphs 1 to 86, wherein the carrier fluid contains at least 50 wt % water, based on the total weight of the carrier fluid.

88. The method according to any one of paragraphs 1 to 87, wherein the carrier fluid contains at least 75 wt % water, based on the total weight of the carrier fluid.

89. The method according to any one of paragraphs 1 to 88, wherein the carrier fluid contains at least 90 wt % water, based on the total weight of the carrier fluid.

90. The method according to any one of paragraphs 1 89, wherein the carrier fluid contains at least 95 wt % water, based on the total weight of the carrier fluid.

91. The method according to any one of paragraphs 1 to 90, wherein the reactant mixture is at a temperature of about 90° C. or more during polymerization of the monomer component.

92. The method according to any one of paragraphs 1 to 91, wherein the reactant mixture is at a temperature of about 93° C. or more during polymerization of the monomer component.

93. The method according to any one of paragraphs 1 to 92, wherein the reactant mixture is at a temperature of about 95° C. or more during polymerization of the monomer component.

94. The method according to any one of paragraphs 1 to 93, wherein the reactant mixture is at a temperature of about 97° C. or more during polymerization of the monomer component.

95. The method according to any one of paragraphs 1 to 94, wherein the reactant mixture is at a temperature of about 99° C. or more during polymerization of the monomer component.

96. The method according to any one of paragraphs 1 to 95, wherein the reactant mixture is at a temperature of about 100° C. or more during polymerization of the monomer component.

97. The method according to any one of paragraphs 1 to 96, wherein the reactant mixture is at a temperature ranging from about 90° C. to about 150° C. during polymerization of the monomer component.

98. The method according to any one of paragraphs 1 to 97, wherein the reactant mixture is at a temperature ranging from about 95° C. to about 150° C. during polymerization of the monomer component.

99. A polymer gel having a particle size distribution such that a volume average particle size (Dv, 50) is greater than about 1 mm and (a volume average particle size (Dv, 90)—a volume average particle size (Dv,10))/(a volume average particle size (Dv,50)) is less than 3, wherein a volume average particle size (Dv,10), a volume average particle size (Dv,50), and a volume average particle size (Dv,90) are the particle sizes at 10%, 50% and 90%, respectively, of the particle size distribution by volume.

100. The polymer gel according to paragraph 99, wherein (a volume average particle size (Dv,90)—a volume average particle size (Dv,10))/(a volume average particle size (Dv,50)) is less than 2.

101. The polymer gel according to paragraph 99, wherein (a volume average particle size (Dv,90)—a volume average particle size (Dv,10))/(a volume average particle size (Dv,50)) is less than 1.

102. The polymer gel according to any one of paragraphs 99 to 101, wherein the polymer gel has a particle size (Dv, 50) that is greater than about 2 mm.

103. The polymer gel according to any one of paragraphs 99 to 101, wherein the polymer gel has a particle size (Dv, 50) that is greater than about 3 mm.

104. The polymer gel according to any one of paragraphs 99 to 101, wherein the polymer gel has a particle size (Dv, 50) that is greater than about 4 mm.

105. The polymer gel according to any one of paragraphs 99 to 104, wherein (a volume average particle size (Dv, 90)—a volume average particle size (Dv,10))/(a volume average particle size (Dv,50)) is less than 2.

106. A carbon material with greater than 26 F/cm$^3$ for the maximum theoretical capacitance as measured at a current density of 0.5 Amp/g employing an electrolyte comprising tetraethylammonium tetrafluoroborane in acetonitrile and wherein the carbon material has less than 500 ppm of all atoms having an atomic number between 11 and 92 as measured by photon induced x-ray emissions.

107. An electrode comprising the carbon material produced according to paragraph 106.

108. An electrical energy storage device comprising the carbon material of paragraph 106.

109. The electrical energy storage device of paragraph 108, wherein the electrical energy storage device is an electric double layer capacitor, and wherein the electric double layer capacitor exhibits greater than 26 F/cc for the maximum theoretical capacitance as measured at a current density of 0.5 Amp/g employing an electrolyte comprising tetraethylammonium tetrafluoroborane in acetonitrile.

110. The electrical energy storage device of paragraph 108, wherein the electrical energy storage device is an electric double layer capacitor.

111. The electrical energy storage device of paragraph 108, wherein the electrical energy storage device is a battery.

112. The electrical energy storage device of paragraph 108, wherein the electrical energy storage device is a lithium/carbon battery, a zinc/carbon battery, a lithium air battery, or a lead acid battery.

113. The method according to any one of paragraphs 1 to 98, wherein the carrier fluid comprises one or more hydrocarbons having at least 8, at least 10, at least 12, at least 14, at least 16, at least 18, at least 20, at least 22, at least 24, at least 26, at least 28, at least 30, at least 32, at least 34, at least 36, at least 38, or at least 40 carbon atoms.

114. The method according to any one of paragraphs 1 to 98, wherein the carrier fluid comprises one or more hydrocarbons having at least 8, at least 10, at least 12, at least 14, at least 16, at least 18, at least 20, at least 22, at least 24, at least 26, at least 28, at least 30, at least 32, at least 34, at least 36, at least 38, or at least 40 carbon atoms, and wherein the one or more hydrocarbon is present in an amount of at least 1 wt %, at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %.

115. The method according to any one of paragraphs 1 to 98, wherein the carrier fluid comprises one or more hydrocarbons having at least 8, at least 10, at least 12, at least 14, at least 16, at least 18, at least 20, at least 22, at least 24, at least 26, at least 28, at least 30, at least 32, at least 34, at least 36, at least 38, at least 40 carbon atoms, or any combination thereof, and wherein the one or more hydrocarbon is present in an amount of at least 1 wt %, at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %.

116. A electrode comprising carbon with greater than 26 $F/cm^3$ for the maximum theoretical capacitance and wherein the electrode retains greater than 90% of its capacitance after incubation at 2.85 V and 85° C. for 32 h, both as measured as measured at a current density of 0.5 Amp/g employing an electrolyte comprising tetraethylammonium tetrafluoroborane in acetonitrile.

117. A electrode comprising carbon with greater than 27 $F/cm^3$ for the maximum theoretical capacitance and wherein the electrode retains greater than 90% of its capacitance after incubation at 2.85 V and 85° C. for 32 h, both as measured as measured at a current density of 0.5 Amp/g employing an electrolyte comprising tetraethylammonium tetrafluoroborane in acetonitrile.

118. A electrode comprising carbon with greater than 28 $F/cm^3$ for the maximum theoretical capacitance and wherein the electrode retains greater than 90% of its capacitance after incubation at 2.85 V and 85° C. for 32 h, both as measured as measured at a current density of 0.5 Amp/g employing an electrolyte comprising tetraethylammonium tetrafluoroborane in acetonitrile.

119. A electrode comprising carbon with greater than 29 $F/cm^3$ for the maximum theoretical capacitance and wherein the electrode retains greater than 90% of its capacitance after incubation at 2.85 V and 85° C. for 32 h, both as measured as measured at a current density of 0.5 Amp/g employing an electrolyte comprising tetraethylammonium tetrafluoroborane in acetonitrile.

120. A electrode comprising carbon with greater than 24 $F/cm^3$ for the maximum theoretical capacitance, wherein the capacitance is measured after incubation at 2.85 V and 85° C. for 32 h, and at a current density of 0.5 Amp/g employing an electrolyte comprising tetraethylammonium tetrafluoroborane in acetonitrile.

121. A electrode comprising carbon with greater than 25 $F/cm^3$ for the maximum theoretical capacitance, wherein the capacitance is measured after incubation at 2.85 V and 85° C. for 32 h, and at a current density of 0.5 Amp/g employing an electrolyte comprising tetraethylammonium tetrafluoroborane in acetonitrile.

122. A electrode comprising carbon with greater than 26 $F/cm^3$ for the maximum theoretical capacitance, wherein the capacitance is measured after incubation at 2.85 V and 85° C. for 32 h, and at a current density of 0.5 Amp/g employing an electrolyte comprising tetraethylammonium tetrafluoroborane in acetonitrile.

123. A electrode comprising carbon with greater than 27 $F/cm^3$ for the maximum theoretical capacitance, wherein the capacitance is measured after incubation at 2.85 V and 85° C. for 32 h, and at a current density of 0.5 Amp/g employing an electrolyte comprising tetraethylammonium tetrafluoroborane in acetonitrile.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:
1. A method for making polymer particles in gel form via an emulsion or suspension process, comprising:
 contacting a carrier fluid and a monomer component containing one or more phenolic monomers to make an emulsion or a suspension; and
 polymerizing the monomer component in the emulsion or the suspension to make the polymer particles in gel form, wherein:
  the carrier fluid contains less than 50 wt % cyclohexane, based on the total weight of the carrier fluid,
  the carrier fluid has a viscosity of 1 cP to about 500 cP at a temperature of about 25° C.,
  the monomer component has a viscosity of about 5 cP to about 1,000 cP at a temperature of about 25° C.,
  a Dv,50 of the polymer particles in gel form is greater than or equal to 1 mm, and the polymer particles in gel form having the Dv,50 of greater than or equal to 1 mm are made without milling, grinding, or other physical means of particle sizing.

2. The method of claim 1, wherein the Dv,50 of the polymer particles in gel form is about 3 mm to about 7 mm.

3. A method for making polymer particles in gel form via an emulsion or suspension process, comprising:
contacting a carrier fluid and a monomer component containing one or more phenolic monomers to make an emulsion or a suspension, wherein the carrier fluid comprises one or more vegetable oils, one or more mineral oils, one or more chlorinated hydrocarbons, one or more paraffinic oils, or any mixture thereof; and
polymerizing the monomer component in the emulsion or the suspension to make the polymer particles in gel form, wherein:
the carrier fluid contains less than 50 wt % cyclohexane, based on the total weight of the carrier fluid,
the carrier fluid has a viscosity of about 1 cP to about 500 cP at a temperature of about 25° C.,
the monomer component has a viscosity of about 5 cP to about 1,000 cP at a temperature of about 25° C., and
a Dv,50 of the polymer particles in gel form is greater than or equal to 1 mm.

4. The method of claim 1, wherein:
the monomer component is an aqueous mixture and further one or more catalysts,
the Dv,50 of the polymer particles in gel form is greater than 1 mm to about 7 mm,
the polymer particles in gel form have a span of less than 3,
the span is equal to (a Dv,90–a Dv,10)/a Dv,50, and
the Dv,10, the Dv,50, and the Dv,90 are the volume particle sizes measured at 10%, 50% and 90%, respectively, of the particle size distribution.

5. The method of claim 1, wherein the monomer component is an aqueous mixture and further comprises ammonium acetate, acetic acid, or a mixture thereof.

6. The method of claim 1, further comprising agitating the emulsion or the suspension during polymerization of the monomer component, wherein:
the one or more phenolic monomers comprises monohydroxybenzene, 1,3-dihydroxybenzene, or a mixture thereof,
the carrier fluid comprises one or more vegetable oils, one or more mineral oils, one or more chlorinated hydrocarbons, one or more paraffinic oils, or any mixture thereof, and
the Dv,50 of the polymer particles in gel form is greater than 1 mm to about 7 mm.

7. The method of claim 1, further comprising heating the emulsion or the suspension to a temperature of about 30° C. to about 150° C., wherein:
the one or more phenolic monomers comprises monohydroxybenzene, 1,3-dihydroxybenzene, or a mixture thereof,
the monomer component is an aqueous mixture and further comprises ammonium acetate, acetic acid, or a mixture thereof,
the carrier fluid comprises one or more vegetable oils, one or more mineral oils, one or more chlorinated hydrocarbons, one or more paraffinic oils, or any mixture thereof, and
the Dv,50 of the polymer particles in gel form is greater than 1 mm to about 7 mm.

8. The method of claim 1, wherein the monomer component has a pH of less than 7 during polymerization.

9. The method of claim 1, wherein:
the monomer component further contains one or more crosslinking monomers.

10. The method of claim 1, wherein the emulsion or the suspension further comprises 0.01% to 20% of a non-ionic surfactant having a molecular weight of from about 100 Daltons to about 2,000 Daltons.

11. The method of claim 1, further comprising heating the polymer particles in gel form in an inert atmosphere at a temperature of from about 500° C. to about 2,400° C. to produce pyrolyzed particles.

12. The method of claim 11, wherein the pyrolyzed particles have a total pore volume greater than 0.5 $cm^3/g$ and a gerameter (GM) greater than or equal to 21.

13. A method for making polymer particles in gel form via an emulsion or suspension process, comprising:
contacting a carrier fluid and a monomer component containing one or more phenolic monomers to make an emulsion or a suspension; and
polymerizing the monomer component in the emulsion or the suspension to make the polymer particles in gel form, wherein:
the carrier fluid is free of surfactant or contains a surfactant at a concentration less than the critical micelle concentration,
the carrier fluid has a viscosity of about 1 cP to about 500 cP at a temperature of about 25° C.,
the monomer component has a viscosity of about 5 cP to about 1,000 cP at a temperature of about 25° C.,
a Dv,50 of the polymer particles in gel form is greater than or equal to 1 mm, and
the polymer particles in gel form having the Dv,50 of greater than or equal to 1 mm are made without milling, grinding, or other physical means of particle sizing.

14. The method of claim 13, wherein:
the viscosity of the carrier fluid is about 10 cP to about 100 cP at a temperature of about 25° C., the viscosity of the monomer component is about 5 cP to about 600 cP at a temperature of about 25° C., and
the Dv,50 of the polymer particles in gel form is greater than or equal to 1 mm to about 7 mm.

15. The method of claim 13, wherein the carrier fluid has a boiling point of 81° C. or greater at a pressure of 100 kPa.

16. The method of claim 13, wherein the monomer component is an aqueous mixture and further comprises ammonium acetate, acetic acid, or a mixture thereof.

17. The method of claim 16, wherein the monomer component comprises the mixture of ammonium acetate and acetic acid.

18. The method of claim 13, further comprising separating the polymer particles in gel form having the Dv,50 of greater than or equal to 1 mm from the carrier fluid by filtration, decanting, or a combination of filtration and decanting.

19. The method of claim 13, wherein the monomer component has a pH of greater than 7 during polymerization.

20. The method of claim 13, wherein the emulsion or the suspension is at a temperature of about 30° C. or more when the monomer component polymerizes to make the polymer particles in gel form, and wherein the Dv,50 of the polymer particles in gel form is greater than 1 mm.

21. The method of claim 13, wherein:
the monomer component further contains one or more crosslinking monomers,
and
the Dv,50 of the polymer particles in gel form is greater than or equal to 1 mm to about 7 mm.

22. The method of claim 13, wherein the monomer component further comprises a nitrogen-containing electrochemical modifier.

23. The method of claim 13, further comprising drying the polymer particles in gel form without any size reduction of the polymer particles in gel form.

24. The method of claim 13, wherein the polymer particles in gel form have a total pore volume of between about 0.01 cm$^3$/g and 1.5 cm$^3$/g.

25. The method of claim 13, further comprising:
heating the polymer particles in gel form in an inert atmosphere at temperatures ranging from 500° C. to 2400° C. to produce pyrolyzed particles; and
activating the pyrolzyed particles in an atmosphere comprising carbon dioxide, carbon monoxide, steam, oxygen, or any mixture thereof at a temperature of from 500° C. to 1300° C. to produce activated particles.

26. The method of claim 25, wherein the activated particles have a total pore volume greater than 0.5 cm$^3$/g and gerameter (GM) is greater than or equal to 21.

27. The method of claim 25, wherein the activated particles have a total pore volume greater than 1 cm$^3$/g and gerameter (GM) is from 9 to 21.

28. The method of claim 1, wherein:
the viscosity of the carrier fluid is about 10 cP to about 100 cP at a temperature of about 25° C.,
the viscosity of the monomer component is about 5 cP to about 100 cP at a temperature of about 25° C., and
the Dv,50 of the polymer particles in gel form is 1.5 mm to about 7 mm.

29. The method of claim 1, further comprising separating the polymer particles in gel form having the Dv,50 of greater than or equal to 1 mm from the carrier fluid by filtration, decanting, or a combination of filtration and decanting.

30. The method of claim 9, wherein the one or more crosslinking monomers comprises formaldehyde, paraformaldehyde, acetaldehyde, propionaldehyde, butyraldehyde, furfuraldehyde, benzaldehyde, glutaraldehyde, or any mixture thereof.

31. A method for making polymer particles in gel form via an emulsion or suspension process, comprising:
contacting a carrier fluid and a monomer component comprising resorcinol and formaldehyde to make an emulsion or a suspension;
polymerizing the monomer component in the emulsion or the suspension to make the polymer particles in gel form, wherein the polymer particles in gel form have a Dv,50 of 1 mm to about 7 mm; and
separating the polymer particles in gel form having the Dv,50 of 1 mm to about 7 mm from the carrier fluid by filtration, decanting, or a combination of filtration and decanting, wherein:
the carrier fluid contains less than 50 wt % cyclohexane, based on the total weight of the carrier fluid,
the carrier fluid is free of surfactant or contains a surfactant at a concentration less than the critical micelle concentration,
the carrier fluid has a viscosity of about 1 cP to about 500 cP at a temperature of about 25° C.,
the monomer component has a viscosity of about 5 cP to about 1,000 cP at a temperature of about 25° C.,
the polymer particles in gel form having the Dv,50 of 1 mm to about 7 mm are made without milling, grinding, or other physical means of particle sizing,
the polymer particles in gel form have a span of less than 3,
the span is equal to (a Dv,90−a Dv,10)/a Dv,50, and
the Dv,10, the Dv,50, and the Dv,90 are the volume particle sizes measured at 10%, 50% and 90%, respectively, of the particle size distribution.

32. The method of claim 31, wherein the monomer component is an aqueous mixture and further comprises ammonium acetate, acetic acid, or a mixture thereof.

33. The method of claim 1, wherein the monomer component further contains one or more crosslinking compounds, and wherein:
the one or more phenolic monomers comprises monohydroxybenzene, 1,3-dihydroxybenzene, or a mixture thereof,
the one or more crosslinking monomers comprises formaldehyde, paraformaldehyde, acetaldehyde, propionaldehyde, butyraldehyde, furfuraldehyde, benzaldehyde, glutaraldehyde, or any mixture thereof, and
the carrier fluid comprises one or more vegetable oils, one or more mineral oils, one or more chlorinated hydrocarbons, one or more paraffinic oils, or any mixture thereof.

34. The method of claim 1, wherein the carrier fluid has a viscosity of about 25 cP to about 500 cP at a temperature of about 25° C.

35. The method of claim 21, wherein the one or more crosslinking monomers comprises formaldehyde, paraformaldehyde, acetaldehyde, propionaldehyde, butyraldehyde, furfuraldehyde, benzaldehyde, glutaraldehyde, or any mixture thereof.

* * * * *